US008009872B2

(12) United States Patent
Kurata

(10) Patent No.: US 8,009,872 B2
(45) Date of Patent: Aug. 30, 2011

(54) TAKEN-IMAGE SIGNAL-DISTORTION COMPENSATION METHOD, TAKEN-IMAGE SIGNAL-DISTORTION COMPENSATION APPARATUS, IMAGE TAKING METHOD AND IMAGE-TAKING APPARATUS

(75) Inventor: Tohru Kurata, Saitama (JP)

(73) Assignee: Sony Corporation, Tokyo (JP)

( * ) Notice: Subject to any disclaimer, the term of this patent is extended or adjusted under 35 U.S.C. 154(b) by 1222 days.

(21) Appl. No.: 11/669,726

(22) Filed: Jan. 31, 2007

(65) Prior Publication Data

US 2007/0177037 A1 Aug. 2, 2007

(30) Foreign Application Priority Data

Feb. 1, 2006 (JP) ................................ 2006-024065

(51) Int. Cl.
*G06K 9/00* (2006.01)
(52) U.S. Cl. ...... 382/107; 382/103; 382/278; 348/208.2
(58) Field of Classification Search .................. 382/103, 382/107, 278; 348/208.1, 208.2, 208.3, 208.99, 348/208.16
See application file for complete search history.

(56) References Cited

U.S. PATENT DOCUMENTS

| 5,189,518 | A | 2/1993 | Nishida |
| 6,734,901 | B1 * | 5/2004 | Kudo et al. ................. 348/208.4 |
| 6,741,652 | B1 | 5/2004 | Kondo et al. |
| 6,778,210 | B1 | 8/2004 | Sugahara et al. |

| 2002/0036692 | A1 | 3/2002 | Okada |
| 2003/0174772 | A1 | 9/2003 | Voronov et al. |
| 2004/0052513 | A1 | 3/2004 | Ohkawara et al. |
| 2006/0007201 | A1 | 1/2006 | Jong |

FOREIGN PATENT DOCUMENTS

| EP | 0498730 | 8/1992 |
| EP | 0789487 | 8/1997 |
| EP | 1605691 | 12/2005 |
| JP | 6-086149 | 3/1994 |

(Continued)

OTHER PUBLICATIONS

Japanese Office Action issued on Mar. 18, 2009, for corresponding Japanese Patent Application JP 2006-024065.

(Continued)

*Primary Examiner* — Wesley Tucker
(74) *Attorney, Agent, or Firm* — K&L Gates LLP

(57) ABSTRACT

Disclosed herein is a method of compensating a signal of an image of one screen for distortions in the horizontal and/or vertical directions of a screen of the image. The method includes the steps of: dividing one screen area of the image into a plurality of picture divisions; and detecting a movement vector of the image for each particular one of the picture divisions from information on a difference in image between the particular picture division on one of two screens and the particular division on the other of the two screens. The method further includes the steps of: finding a difference in the detected movement vector between any specific picture division and a picture division adjacent to the specific picture division in order to detect a velocity of a change in image distortion for the specific picture division; and compensating the image for a distortion for each of the picture divisions on the basis of a velocity detected for each of the picture divisions as the velocity of a change in image distortion.

23 Claims, 55 Drawing Sheets

FOREIGN PATENT DOCUMENTS

| | | |
|---|---|---|
| JP | 2001-204038 | 7/2001 |
| JP | 3384459 | 12/2002 |
| JP | 2004-4266322 | 9/2004 |
| JP | 2004-343483 | 12/2004 |
| JP | 2005-038396 | 2/2005 |
| JP | 7-283999 | 1/2007 |

OTHER PUBLICATIONS

Kim, Dong-Noh et al., "A Simple Estimation of the Rotation Parameter for the 2-Axes Stabilization System," IEICE Trans. Fundamentals, vol. E88-A, pp. 1507-1511, Jun. 2005.

* cited by examiner

VECTOR CONTRACTION  1/n = 1/4

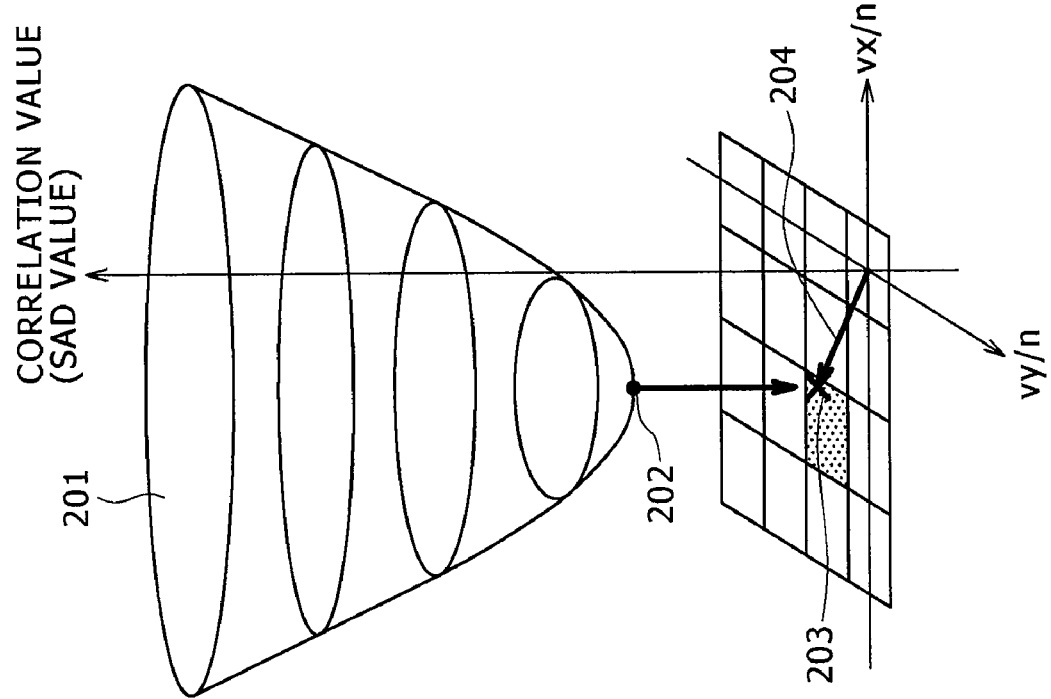
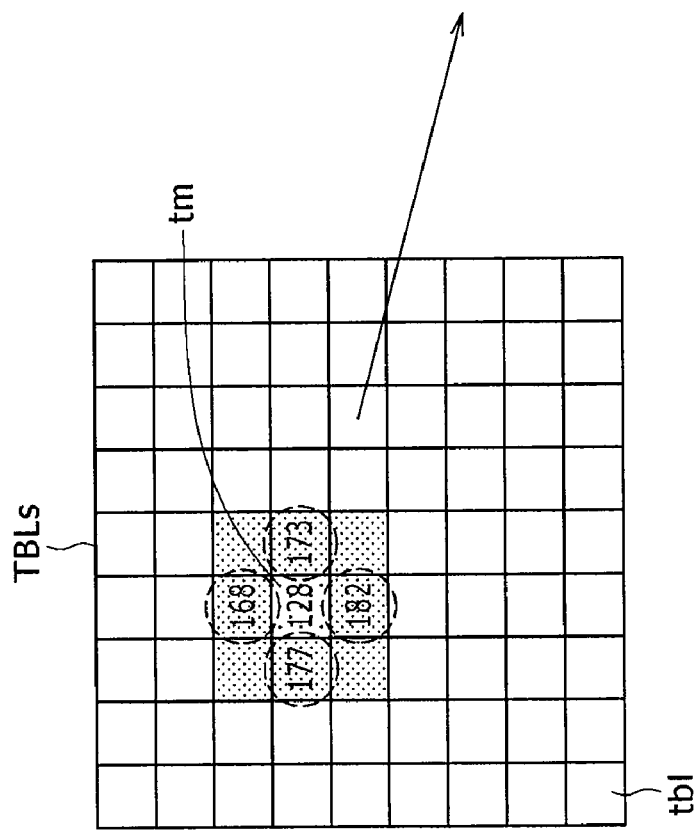

$$dx = \frac{\sum(Sxy \cdot Kx)}{4\sum Sxy - 6\sum(Sxy \cdot Kx^2)} \quad \cdots \text{(Eq. A)}$$

$$dy = \frac{\sum(Sxy \cdot Ky)}{4\sum Sxy - 6\sum(Sxy \cdot Ky^2)} \quad \cdots \text{(Eq. B)}$$

WHERE:

FOR x = -1, Kx = -1     FOR y = -1, Ky = -1
FOR x = 0, Kx = 0       FOR y = 0, Ky = 0
FOR x = 1, Kx = 1       FOR y = 1, Ky = 1

$$dx = \frac{8\sum(Sxy \cdot Kx)}{25\sum Sxy - 20\sum(Sxy \cdot Kx^2)} + \Delta x \quad \cdots \text{(Eq. C)}$$

$$dx = \frac{8\sum(Sxy \cdot Ky)}{25\sum Sxy - 20\sum(Sxy \cdot Ky^2)} + \Delta y \quad \cdots \text{(Eq. D)}$$

FIG. 22

SEGMENT Ra $$u = \frac{2S_3 - 11S_2 + 16S_1 - 7S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)} \quad \cdots \text{(Eq. E)}$$

SEGMENT Rb $$u = \frac{S_3 - 4S_2 + 5S_1 - 2S_0 + \sqrt{(S_3 - 5S_2 + 5S_1 - S_0)^2 + (S_2 - S_0)(S_1 - S_3)}}{3(S_3 - 3S_2 + 3S_1 - S_0)} \quad \cdots \text{(Eq. F)}$$

SEGMENT Rc $$u = \frac{-4S_3 + 7S_2 - 2S_1 - S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)} \quad \cdots \text{(Eq. G)}$$

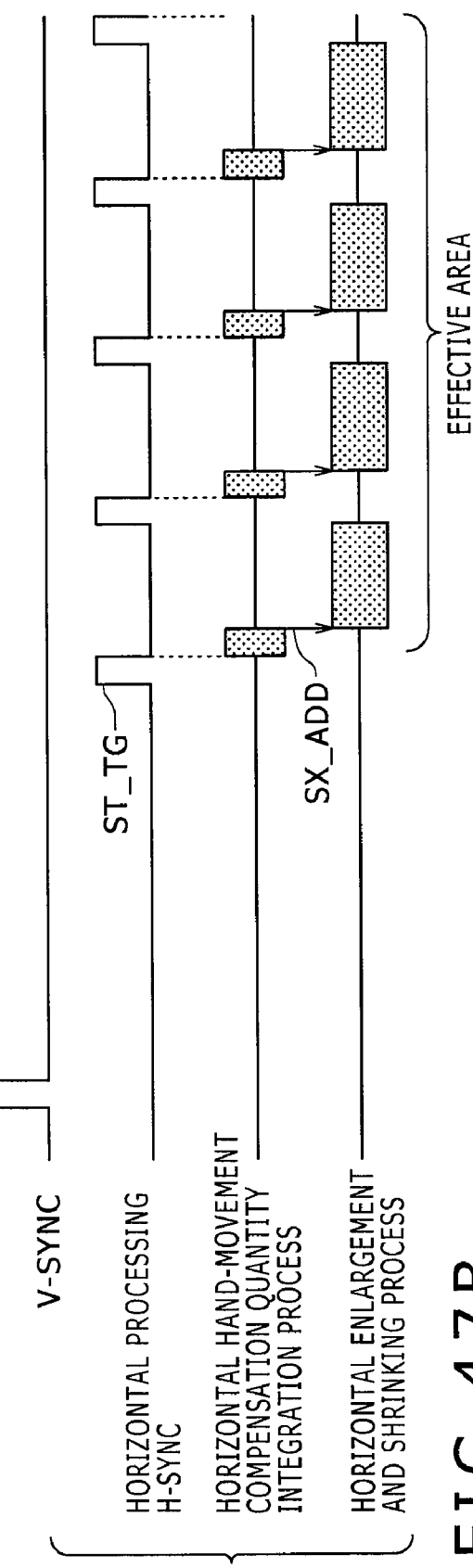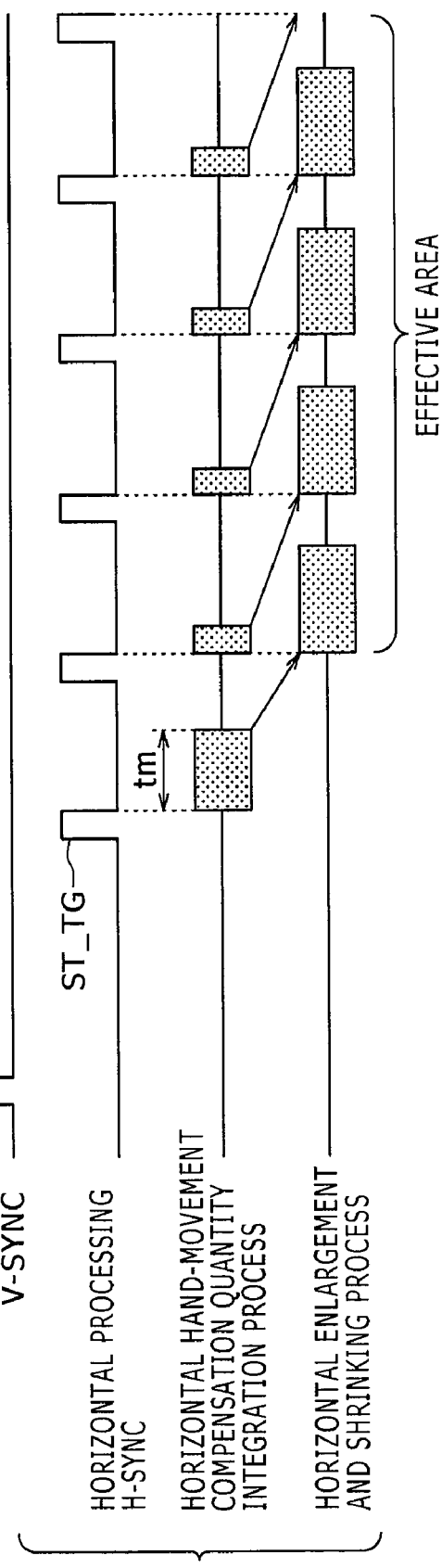

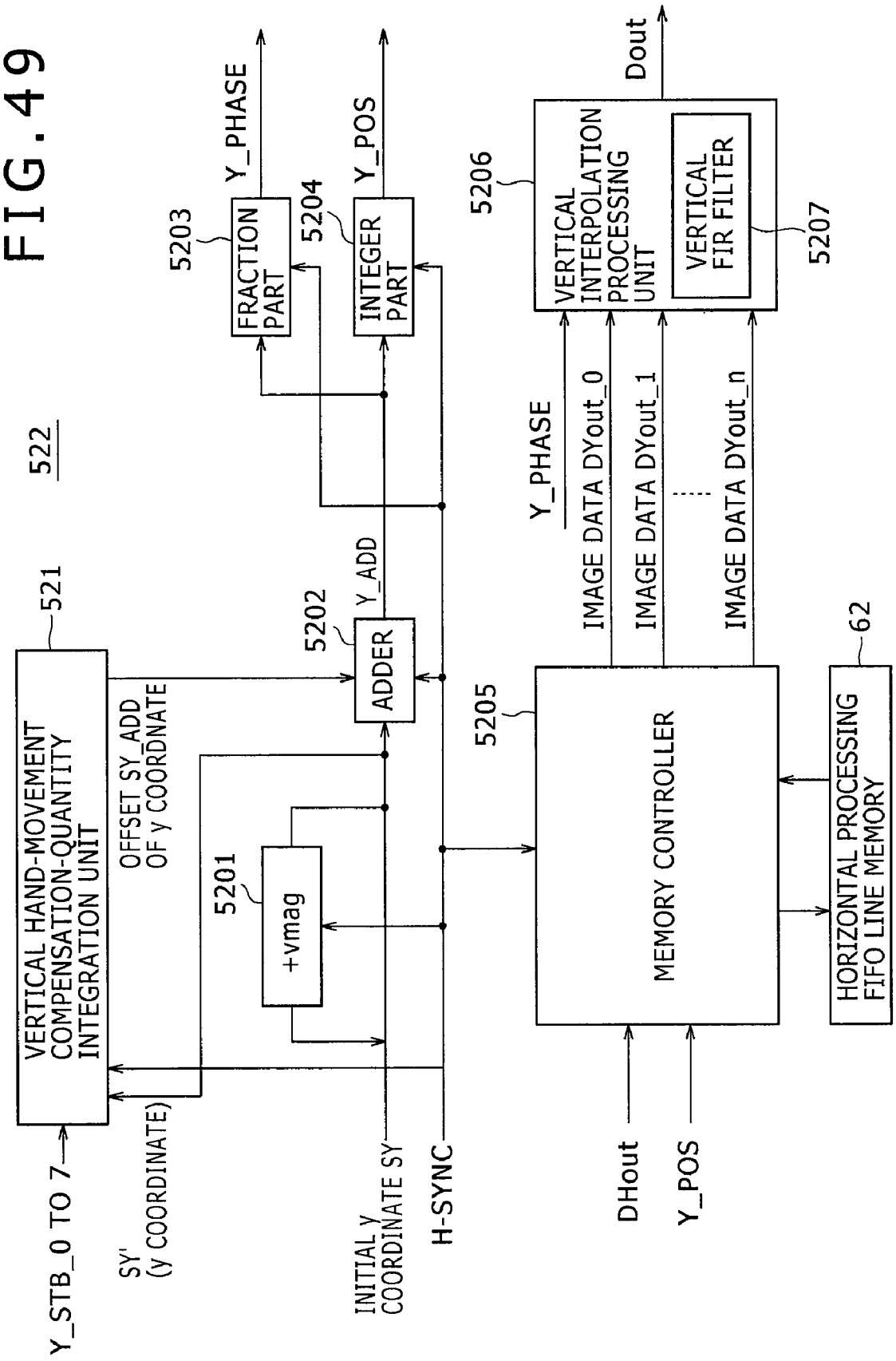

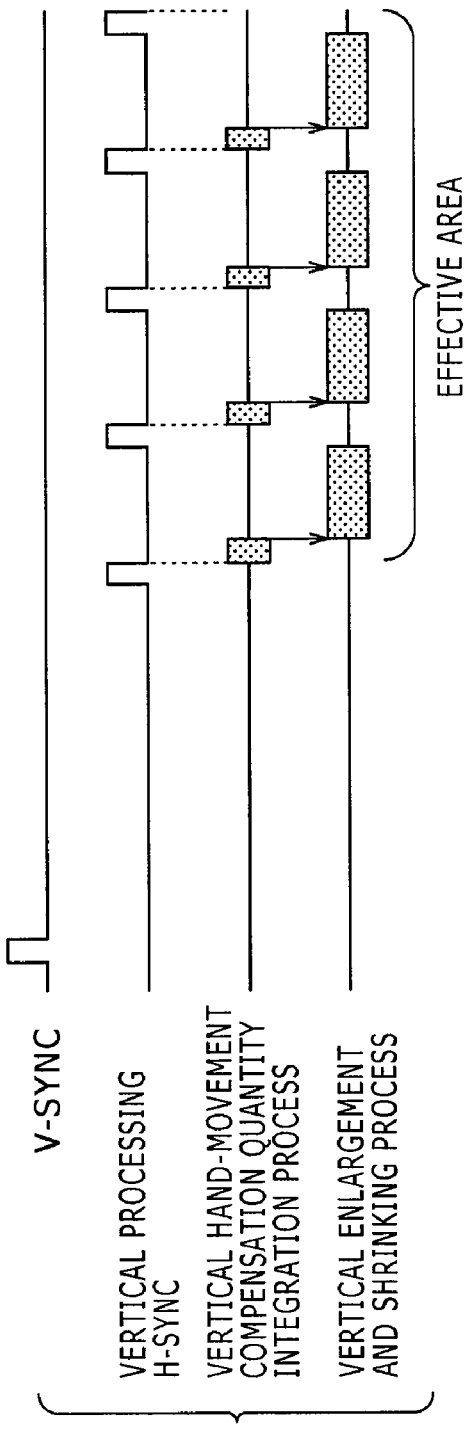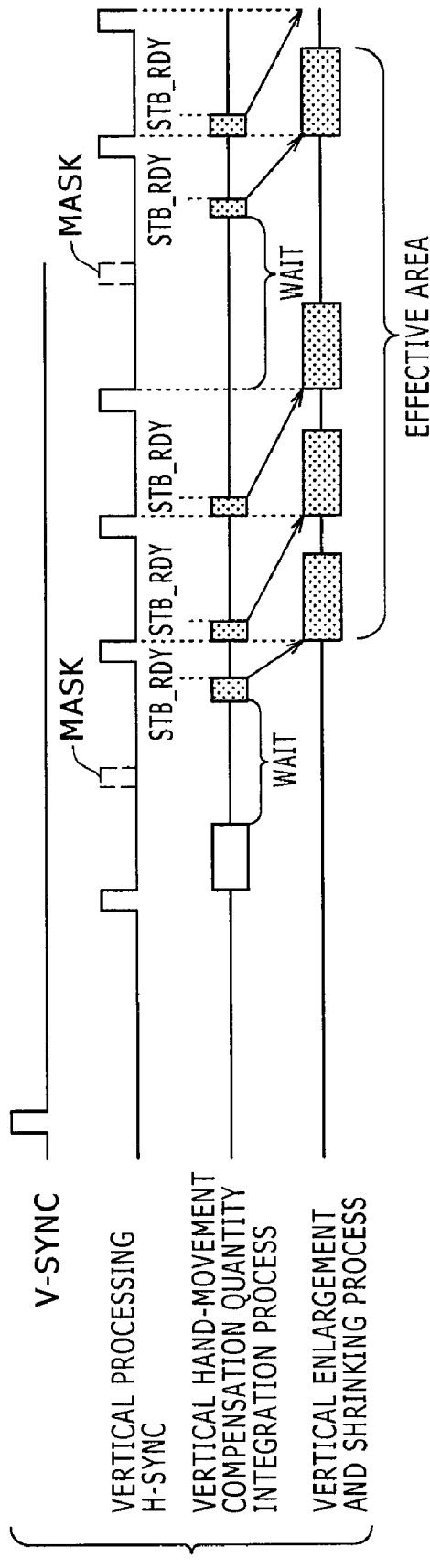

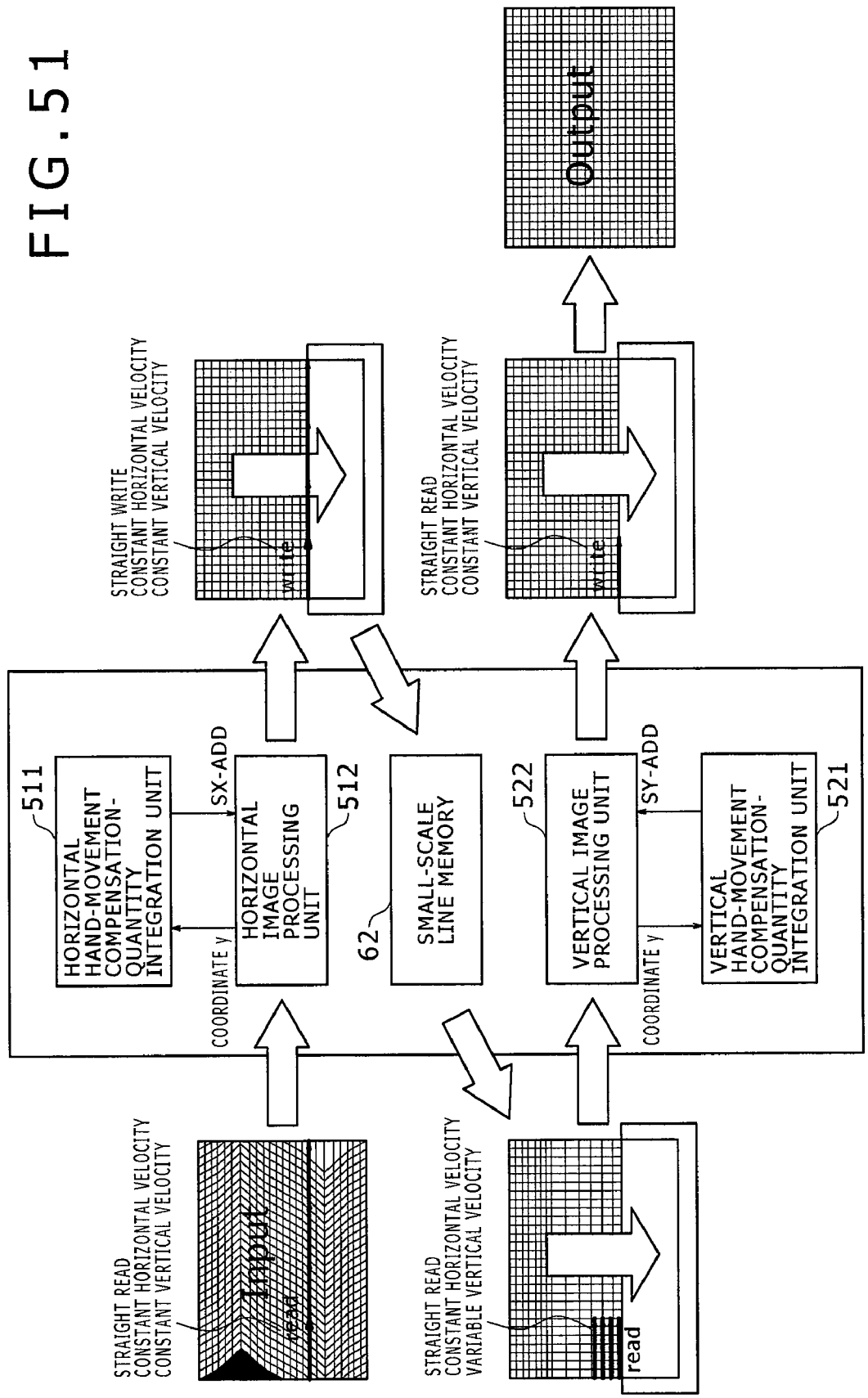

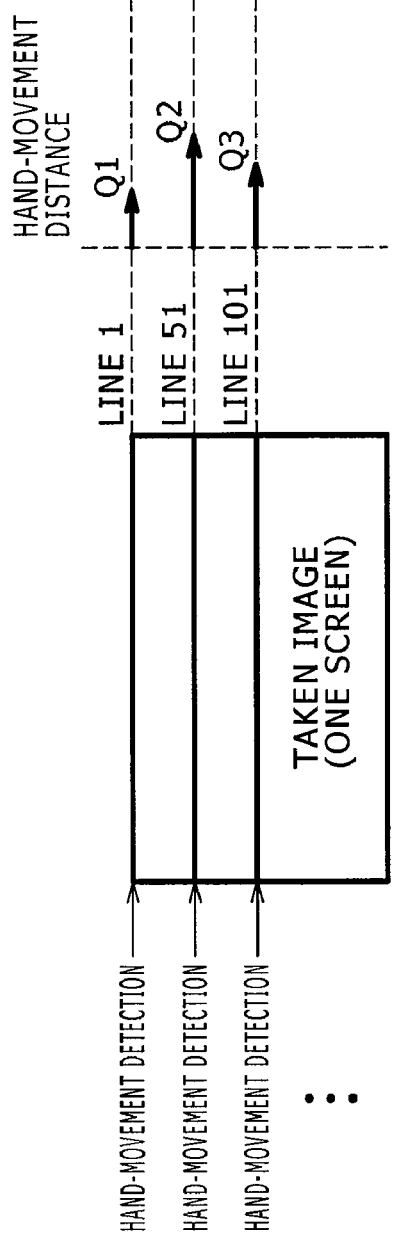
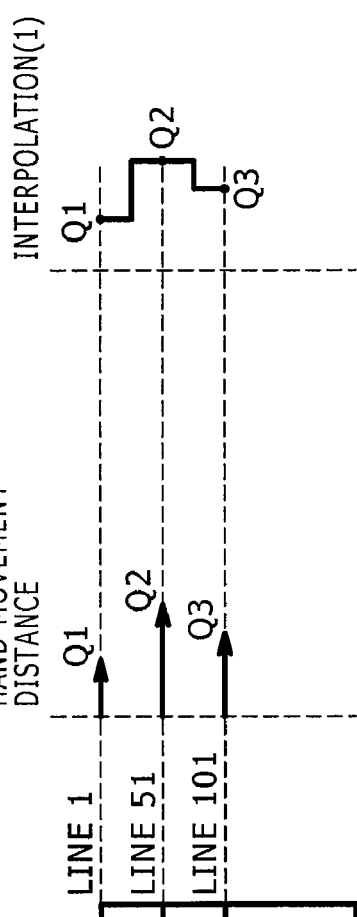
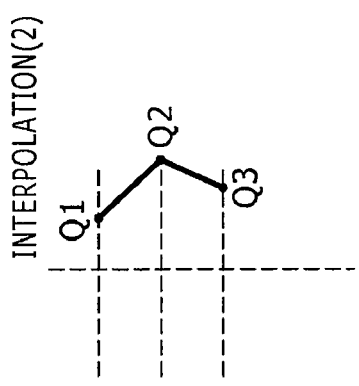
FIG. 61A  FIG. 61B  FIG. 61C  FIG. 61D

TAKEN-IMAGE SIGNAL-DISTORTION COMPENSATION METHOD, TAKEN-IMAGE SIGNAL-DISTORTION COMPENSATION APPARATUS, IMAGE TAKING METHOD AND IMAGE-TAKING APPARATUS

CROSS REFERENCES TO RELATED APPLICATIONS

The present application claims priority to Japanese Patent Application JP 2006-024065, filed in the Japanese Patent Office on Feb. 1, 2006, the entire contents of which is being incorporated herein by reference.

BACKGROUND

The present application relates to a method for compensating an imager-created image for distortions generated in the imager-created image as distortions caused by, among others, a hand movement occurring in a process to take a picture of a photographing object by making use of an image-taking apparatus and also relates to an apparatus for compensating an imager-created image for such distortions. More particularly, the present application is suitably applicable to an image-taking apparatus employing an X-Y address solid-state image pickup device such as a CMOS (Complementary Metal Oxide Semiconductor) solid-state image pickup device and a recording/reproduction apparatus having an image taking function. Examples of the image-taking apparatus employing an X-Y address solid-state image pickup device are a video camera and a digital still camera, that each employ the X-Y address solid-state image pickup device. In the following description, the CMOS solid-state image pickup device is also referred to as a CMOS imager.

In the case of an electronic image-taking apparatus, which stores an electronic imager-created image of a photographing object in an image pickup device employed in the electronic image-taking apparatus and reads out the image from the image pickup device later, for some reasons such as the so-called movements of the hands of the photographer and the fact that the photographing operation is carried out at an unstable place like a place on a ship, while the photographing operation is being carried out, the image pickup device may physically move to result in a change in position at a relatively high velocity in the horizontal and/or vertical directions of the photographing object so that distortions are generated in the imager-created image.

In an electronic image-taking apparatus, however, a digital process referred to as a distortion compensation process can be carried out in order to compensate the imager-created image read out from the image pickup device for the distortions caused by, among others, the so-called movements of the hands of the photographer.

In general, the image pickup device employed in the conventional image-taking apparatus such as the conventional video camera or the conventional digital still camera and a recording/reproduction apparatus having an image taking function is mostly a solid-state image taking element employing a CCD (Charge Coupled Device). Examples of the recording/reproduction apparatus having an image taking function are a hand phone having an embedded camera and a personal computer including an embedded camera. In the following description, the solid-state image taking element employing a CCD is also referred to as a CCD imager.

In the past, documents including U.S. Pat. No. 3,384,459, which is taken as Patent Document 1 in this patent specification, disclosed a large number of hand-movement compensation technologies assuming the use of a CCD imager as the image pickup device. In addition, products adopting the hand-movement compensation technologies are already widely used in the world.

The conventional hand-movement compensation technologies are characterized in that light quantities stored in all pixels in the structure of the CCD imager are sampled at the same time for all the pixels. That is to say, light quantities of one frame are sampled once. In the following description, a frame is also referred to as a screen.

In other words, the CCD imager exposes all its pixels in the same period and pixel data of one frame is fetched out from the imager with exactly the same timing. Thus, it is necessary to consider only one hand-movement positional displacement Vcs represented by an arrow shown in FIG. 58 as a hand-movement positional displacement for all the pixels of one frame. That is to say, in the diagram of FIG. 58, a photographing object supposed to be naturally stored in an area FLa represented by a solid-line rectangle is moved to an area FLb represented by a dashed-line rectangle by a hand movement. In this case, the hand-movement positional displacement Vcs of the frame of the imager-created image of the photographing object is detected and, by correcting a read pixel position (or a sampling pixel position) by the hand-movement positional displacement Vcs, the imager-created image can be compensated for a distortion caused by the hand movement.

It is to be noted that, in many cases, all the pixels of an image pickup device are generally not handled as effective pixels, but only some of the pixels are used as effective pixels. In the example shown in FIG. 58, peripheral areas of an area AFL covering all the pixels are excluded and only pixels in the remaining area EFL are handled as effective pixels. The area AFL covering all the pixels is referred to as an available image area whereas the remaining area EFL not including the peripheral areas is referred to as an effective image area. As shown in the figure, the effective image area EFL is a center area included in the available image area AFL as an area with a width determined by a horizontal effective size and a height determined by a vertical effective size.

If the imager described above is employed, the image stored in the imager can be compensated in a hand-movement distortion process for a distortion caused by a change in read pixel position by making use of pixel data stored originally in the imager provided that the positional displacement Vcs representing the distance of a hand movement is within a range smaller than the difference between the effective image area EFL and the available image area AFL. Thus, the amount of picture deterioration processing can be made small in comparison with a process such as interpolation processing to generate data for compensating an image for distortions caused by a hand movement.

By the way, in recent years, as the image pickup device, an electronic image-taking apparatus employs an X-Y address solid-state image pickup device that enables the image-taking apparatus to read out data of any pixel on the image pickup device by specifying the horizontal direction position (or the X-direction position) and vertical direction position (or Y-direction position) of the pixel, that is, to read out data in pixel units from the imager. An example of the X-Y address solid-state image pickup device is a CMOS solid-state image pickup device, which is referred to hereafter as a CMOS imager.

The CMOS imager has the following characteristics:

(a): The CMOS imager is an amplification type imager allowing an amplified signal to be read out from the imager so as to provide a high sensitivity.

(b): Since the CMOS imager employs a CMOS circuit, the power consumption is low.

(c): The CMOS imager can be produced at a low cost.

(d): In principle, the CMOS imager allows its data to be accessed (or read out) at random in pixel units.

Even though the CMOS imager allows its taken-image data to be accessed (or read out) at random in pixel units as described above, in practical use, the data is generally read out (sampled) and output from the CMOS imager in pixel-group units each corresponding to a horizontal line.

If taken-image data is read out (sampled) and output from the CMOS imager in pixel-group units each corresponding to a horizontal line as described above, as shown in FIG. 59, the light exposure period for a horizontal line is shifted from the light exposure period for the immediately preceding horizontal line by a read time difference $\Delta t$, which is time it takes to read out data of a horizontal line unit. It is to be noted that, if taken-image data is read out (sampled) and output from the CMOS imager in pixel units, on the other hand, the light exposure period for a pixel is shifted from the light exposure period for the immediately preceding pixel by an inter-pixel read time difference, which is much smaller than the inter-line read time difference $\Delta t$, so that the inter-pixel read time difference can be ignored. Nevertheless, even if taken-image data is read out (sampled) and output from the CMOS imager in pixel units, the inter-pixel read time difference exists.

Thus, when a picture of scenery is taken from for example a position inside a running train by making use of an image-taking apparatus employing a CMOS imager, the picture originally looking like one shown in FIG. 60A is obtained as a picture looking like one shown in FIG. 60B. In the picture actually obtained as a result of the photographing operation as shown in FIG. 60B, things such as a house and a tree, which are originally erected straightly upward in the vertical direction, are inclined. These inclined images of photographing objects are each a result of the so-called focal plane phenomenon, which is a phenomenon inherent in the CMOS imager.

The typical picture shown in FIG. 60B is an image obtained as a result of a photographing operation, which is carried out while the photographer is moving in the horizontal direction. If a photographing operation is carried out while the photographer is moving in the vertical direction, on the other hand, in the picture obtained as a result of the photographing operation, the image of a photographing object is shrunk or extended in the vertical direction. It is to be noted, however, that the picture obtained as a result of such a photographing operation is not shown in FIGS. 60A to 60C.

The focal plane phenomenon occurs when the photographer holding an image-taking apparatus employing a CMOS imager moves at a high velocity while a photographing operation is being carried out or, on the other hand, the photographer staying firmly at a fixed position takes a picture of a photographing object, which is moving at a high velocity. The larger the difference in movement velocity between the photographer and a photographing object, the more striking the focal plane phenomenon. It can be said, however, that in general photographing operations, there are only few rare conditions in which a difference in movement velocity between the photographer and a photographing object exists.

If the photographer carries out a photographing operation by holding an image-taking apparatus by its hands and the hands of the photographer vibrates a little bit at a high vibration velocity, that is, if the hands move, however, the focal plane phenomenon described above occurs.

This is because the hand movement of the CMOS imager is not represented by a single value in one frame as is the case with the CCD imager, but is represented by a value varying from pixel to pixel or from horizontal line to horizontal line in a frame due to the fact that the sampling time varies from pixel to pixel or from horizontal line to horizontal line as described above. In the following description, the hand movement of the CMOS imager is referred to as a CMOS hand movement. Thus, distortions generated by a focal plane phenomenon described before in an image taken by making use of an image-taking apparatus employing a CMOS imager cannot be eliminated and will inevitably remain in the image even if a compensation process making use of a hand-movement distance for each frame is carried out.

FIG. 60C is a diagram showing a typical picture obtained as a result of a photographing operation carried out on an object of photographing by making use of an image-taking apparatus employing a CMOS imager experiencing occurrence of a focal plane phenomenon. A picture having squishy odd distortions as shown in the figure is obtained because the direction, magnitude and velocity of the hand movement in the focal plane phenomenon are not uniform in a frame of the picture.

By the way, in the case of an apparatus for carrying out a photographing operation to take a still picture, effects of a focal plane phenomenon caused by the CMOS hand movement can be suppressed relatively with ease because the distance of the hand movement is limited on the assumption that, from the beginning, the photographer makes use of the apparatus for photographing a still object of photographing only. The easy suppression of effects of the focal plane phenomenon caused by the CMOS hand movement is also caused by the fact that the apparatus employs a mechanical shutter. The digital still camera mentioned before is a typical apparatus for carrying out a photographing operation to take a still picture.

On the other hand, a professional-application model or a high-performance model of an image-taking apparatus assumed to be an apparatus for carrying out a photographing operation to take a moving picture may adopt a method for essentially getting rid of effects of a focal plane phenomenon caused by the CMOS hand movement. In accordance with this method, an operation to read out image data from the CMOS imager is carried out in an extremely short period of time in order to reduce the largest sampling time difference in a frame. The largest sampling time difference is the difference in sampling timing between the top and bottom horizontal lines on the CMOS imager. The video camera mentioned before is a typical image-taking apparatus assumed to be an apparatus for carrying out a photographing operation to take a moving picture.

In addition, the magnitude of the hand-movement distance relative to the imager-created image increases proportionally to the magnification of the optical zoom. Thus, even in a moving-picture photographing application of the image-taking apparatus, the CMOS hand movement is not a big problem for an image-taking apparatus model having no optical zoom function or having a small optical zoom magnification. Right from the start, the bad effect of the CMOS hand movement is relatively small, raising no problem for most inexpensive image-taking apparatus not having even a hand-movement compensation function making use of an acceleration sensor as is the case with the hand-movement compensation function making use of the conventional CCD imager.

In order to solve the problems described above, it is necessary to provide a special function such as a mechanical shutter or provide a high-velocity clock function for an image-taking apparatus having an embedded optical zoom function with a large magnification for mainly moving-picture photographing applications in addition to still-picture photographing applications. With such a configuration, however, the precision of the image-taking apparatus becomes extremely high, raising a problem of a high manufacturing cost.

In addition, a method making use of a mechanical component such as a gyro sensor (or an angular velocity sensor) is generally adopted as a conventional method for detection of a hand movement. However, a gyro sensor employed in an image-taking apparatus will raise a problem of an obstacle to efforts to reduce the size, weight and production cost of the image-taking apparatus.

On top of that, in the past, even though the low precision of the gyro sensor itself was a shortcoming of a method to compensate an image for distortions caused by a hand movement by making use of a gyro sensor, the low precision of the gyro sensor did not raise a problem in the moving-picture photographing, which is the main application of the image-taking apparatus employing a gyro sensor. In recent years, however, a trend of rapid popularization of the digital still camera and a trend observed simultaneously with the trend of the rapid popularization as a trend of an abruptly increasing number of pixels employed in the image pickup device are starting to raise a new problem. A still picture taken by making use of a digital still camera in a photographing environment with low illumination requiring a long light exposure period also raises a strong demand for compensation of the picture for distortions caused by a hand movement. Nevertheless, these problems are solved only by making use of a sensor such as a gyro sensor. As a result, the aforementioned shortcoming of the gyro sensor and the other problems remain unsolved.

A still picture taken by making use of a camera available in the market for general consumers in the still-picture photographing application is compensated for distortions caused by a hand movement by measuring a hand-movement displacement vector through use of the commonly known gyro sensor or the commonly known acceleration sensor and feeding back to a mechanism in high-velocity control to prevent an image projected on an image sensor such as the CCD (Charge Coupled Device) or the CMOS (Complementary Metal Oxide Semiconductor) imager from being affected by the hand movement.

As the mechanism cited above, there has been proposed a mechanism including a lens, a prism and the imager (or an integrated module including the imager). In the following description, the lens, the prism and the imager are referred to as a lens shift, a prism shift and an imager shift respectively.

Even after an image is compensated for distortions caused by a hand movement as described above, the aforementioned precision error of the gyro sensor remains uncorrected. In addition, the delay caused by the feedback of the hand-movement displacement vector to the mechanism or an estimation error for nullifying the feedback delay and a control error of the mechanism are superposed on the precision error of the gyro sensor. It is thus totally impossible to compensate an image for distortions caused by a hand movement at a pixel precision level.

In spite of the fact that the method to compensate an image for distortions caused by a hand movement by making use of a contemporary sensor has a big problem of inability to pursue precision in principle, the image-taking apparatus adopting the method is highly appreciated in the market because the distortions can be decreased even if not eliminated completely.

However, the size of the pixel will decrease while the number of pixels will be increasing more and more in the future. Accompanying the decreasing size of the pixel, the limit of the distortion compensation must be brought by all means to the pixel precision and it is a problem of time that the market will be aware of the fact that the distortion compensation must be brought to the pixel precision to accompany pixel downsizing for a rising pixel count.

SUMMARY

Addressing the problems described above, an image taking method is provided that is capable of reducing distortions generated in an imager-created image in a focal plane phenomenon caused by, among others, a hand movement while providing solutions to the problems and an image-taking apparatus is provided for implementing the image taking method at a low cost in a digital signal process carried out with a high degree of precision by employing an X-Y address image pickup device such as the CMOS imager and employing no components for an aforementioned mechanism including a gyro sensor.

In accordance with an embodiment, there is provided an embodiment implementing a method of compensating a signal of an image of 1 screen for distortions in the horizontal and/or vertical directions of a screen of the image. The method includes the steps of: dividing one screen area of the image into a plurality of picture divisions; and detecting a movement vector of the image for each particular one of the picture divisions from information on a difference in image between the particular picture divisions on each of two screens. The method further includes the steps of: finding a difference in the detected movement vector between any specific picture division and a picture division adjacent to the specific picture division in order to detect a velocity of a change in image distortion for the specific picture division; and compensating the image for a distortion for each of the picture divisions on the basis of a velocity detected for each of the picture divisions as the velocity of a change in image distortion.

In accordance with the method according to the embodiment as described above, for each specific one of a plurality of picture divisions obtained by dividing one screen area of an image, a movement vector in the specific picture division is detected on the basis of image information of the picture division without making use of a mechanism component such as a gyro sensor.

Then, a difference between the movement vector detected for any specific picture division and a movement vector detected for each picture division adjacent to the specific picture division is found in order to compute the velocity of a change in image distortion for the specific picture division. Subsequently, on the basis of a velocity detected as the velocity of a change in image distortion for each picture division, the image is compensated for distortions such as distortions caused by a focal plane phenomenon.

In accordance with another embodiment, with the method according to the above embodiment, a time integration value of the velocity of a change in image distortion for each specific one of the picture divisions is taken as a displacement caused by a distortion occurring in the specific picture division serving as a distortion compensation object of the image and the image is compensated for the distortion by making use of this value of integration with respect of time.

In accordance with the method according to the other embodiment, as described above, a time integration value of the velocity of a change in image distortion for each specific one of the picture divisions is taken as a displacement caused by a distortion occurring in the specific picture division serving as a distortion compensation object of the image and the image is compensated for the distortion by making use of this value of integration with respect of time. Thus, the image can be compensated for distortions such as distortions caused by a focal plane phenomenon without causing a long processing time delay. In addition, since a value of integration with respect of time is used, even on a boundary between two adjacent picture divisions of the screen of the image, no image shift occurs in spite of the fact that the velocity of a change in image distortion on such a boundary changes.

In accordance with another embodiment, there is provided a further embodiment implementing a method for compensating a signal of an image of one screen for distortions in the horizontal and/or vertical directions of a reference screen. This method includes the steps of:

dividing one screen area of the image into a plurality of picture divisions;

detecting a movement vector of the image for each particular one of the picture divisions from information on a difference in image between the particular picture division on an observed screen serving as the reference screen and the particular picture division on an original screen leading ahead of the reference screen; and compensating the image for a distortion for each of the picture divisions on the basis of the movement vector detected for each of the picture divisions.

The step of detecting a movement vector of the image for each particular one of the picture divisions has the sub-steps of:

setting at least one target block having a predetermined size equal to the size of a plurality of pixels at predetermined locations in each of the picture divisions on the original screen;

setting a plurality of reference blocks each having a size equal to the predetermined size of the target block in a search range set in the reference screen for each of the target blocks;

detecting a reference block having the strongest correlation with said specific target block from said plurality of reference blocks, and detecting the movement vector representing the magnitude and direction of a shift over the reference screen from a position corresponding to the specific target block to the position of the detected reference block by carrying out:

a difference absolute value sum computation process for each specific one of the reference blocks as a process of finding a sum of the absolute values of differences in pixel value between all pixels in the specific reference block and all pixels at corresponding positions on the specific target block;

a contracted reference-vector setting process of setting reference vectors each representing the magnitude and direction of a shift over the reference screen from a position corresponding to the specific target block to the position of one of the reference blocks and contracting the reference vectors at a predetermined contraction factor to result in contracted reference vectors;

a sum-of-absolute-difference table creation process of creating a shrunk sum-of-absolute-difference table including table elements, the number of which is determined on the basis of the number of aforementioned contracted reference vectors and the contraction factor, and allocating each of the table elements as a location to be used for storing a value computed from sums each found for one of the reference blocks as the sum of the absolute values of the differences in pixel values; and a movement-vector computation process of computing the movement vector for each of the picture divisions as a movement vector between the reference screen and the original screen by making use of at least a contracted reference vector corresponding to the smallest one among values each stored in the shrunk sum-of-absolute-difference table as the sum of the absolute values of the differences in pixel values.

The sum-of-absolute-difference table creation process is carried out by execution of:

a neighborhood reference vector detection sub-process of determining a plurality of neighborhood reference vectors each having a vector quantity close to the vector quantity of a corresponding one of the contracted reference vectors obtained in the contracted reference-vector setting process;

a sum-component computation sub-process of computing a plurality of sum components each associated with one of neighborhood reference vectors determined in the neighborhood reference vector detection sub-process as the neighborhood reference vectors corresponding to a specific one of the contracted reference vectors from a sum computed in the difference absolute value sum computation process for a reference block, from which the specific contracted reference vector is contracted, as the sum of the absolute values of the differences in pixel values; and a component-total computation sub-process of computing a total of sum components, which have been computed in the sum-component computation sub-process as the sum components each associated with a specific one of the neighborhood reference vectors, by cumulatively adding each of the sum components to a cumulative total obtained so far for the specific neighborhood reference vector.

At a step included in the method for compensating an image signal for distortions in accordance with the further embodiment as the step of detecting a movement vector, a difference absolute value sum computation process is carried out for each specific one of reference blocks as a process of finding a sum of the absolute values of differences in pixel value between all pixels in the specific reference block and all pixels at corresponding positions on a target block. In the following description, the sum of the absolute values of differences in pixel value between all pixels in a specific reference block and all pixels at corresponding positions on a target block is referred to as a SAD (Sum of Absolute Differences) value between the specific reference block and the target block.

In accordance with the method according to the further embodiment, a SAD value between a specific reference block and the target block is stored not in a table element pointed to by a reference vector associated with the specific reference block. Instead, the SAD value is stored by being associated with a contracted reference vector obtained as a result of shrinking the reference vector in the contracted reference-vector setting process.

In this case, contracted reference vectors are not associated with table elements of a SAD table on a one-on-one basis. For this reason, an SAD table creation process is carried out by, first of all, execution of a neighborhood reference vector detection sub-process of determining a plurality of neighborhood reference vectors each having a vector quantity close to the vector quantity of a corresponding to one of the contracted reference vectors obtained in the contracted reference-vector setting process.

Then, a sum-component computation sub-process is carried out in order to compute a plurality of sum components each associated with one of neighborhood reference vectors determined in the neighborhood reference vector detection sub-process as the neighborhood reference vectors corresponding to a specific one of the contracted reference vectors from a sum computed in a difference absolute value sum computation process for a reference block pointed to by a reference vector, from which the specific contracted reference vector is contracted, as the SAD value. Subsequently, a component-total computation sub-process is carried out in order to compute a total of sum components, which have been computed in the sum-component computation sub-process as the sum components each associated with a specific one of the neighborhood reference vectors, by cumulatively adding each of the sum components to a cumulative total obtained so far as the SAD value for the specific neighborhood reference vector.

The SAD table obtained as a result of the processed described above is a SAD table consisting of table elements associated with neighborhood reference vectors, which each have a vector quantity close to the vector quantity of a corresponding one of the contracted reference vectors, on a one-one-one basis. The SAD table has a small size determined by a contraction factor at which a reference vector is contracted into a contracted reference vector.

In other words, the SAD table obtained as a result of the processed described above is generated by reducing the size of an original SAD table generated for reference blocks in the reference frame at a contraction factor corresponding to the contraction factor for contracting a reference vector into a contracted reference vector. In this case, however, the size of the target block and every reference block is not reduced. Only the size of the generated SAD table becomes smaller.

The SAD table having a reduced size is searched for the smallest SAD value, and neighborhood reference vectors each associated with the smallest SAD value are determined. Then, a movement vector is identified on the basis of the neighborhood reference vectors. To put it in more detail, a contracted reference vector representing the neighborhood reference vectors is identified and the contracted reference vector is multiplied by the reciprocal value of the contraction factor to get the movement vector.

In addition, in accordance with the method according to the further embodiment, it is not necessary to contract the image itself. Thus, the processing time does not increase due to a process to contract the image, and a larger storage capacity of a memory for storing processed data is not required either. On the top of that, a SAD value is found on the basis of all pixels in the original frame and, then, a plurality of components of the SAD value found for a reference vector are computed and associated with neighborhood reference vectors located in the neighborhood of a contracted reference vector obtained as a result of contracting the reference vector. The process to find components of a SAD value computed for a reference vector for neighborhood reference vectors located in the neighborhood of a contracted reference vector obtained as a result of contracting the reference vector by splitting the SAD value computed for the reference vector is by itself equivalent to a suitable filter process adapted to the contraction factor. Thus, implementation of a low-pass filter like one required for contracting an image is not required.

In accordance with the present application, it is possible to provide an image taking method capable of reducing distortions generated in an imager-created image in a focal plane phenomenon caused by, among others, a hand movement while giving solutions to problems and provide an image-taking apparatus for implementing the image taking method at a low cost in a digital signal process carried out with a high degree of precision by employing an X-Y address image pickup device such as the CMOS imager and employing no components for an aforementioned mechanism including a gyro sensor.

Additional features and advantages are described herein, and will be apparent from, the following Detailed Description and the figures.

BRIEF DESCRIPTION OF THE FIGURES

FIGS. 13A and 13B are each an explanatory diagram to be referred to in describing a process to detect an accurate movement vector in accordance with a first typical implementation of the movement-vector detection method according to the embodiment;

FIG. 22 is an explanatory diagram to be referred to in describing a process to detect an accurate movement vector in accordance with the second typical implementation of the movement-vector detection method according to the embodiment;

FIGS. 47A and 47B are each explanatory diagram showing timing charts of the processing operations shown in FIGS. 45 and 46;

FIG. 49 is a block diagram showing processing operations carried out in a typical detailed configuration of a vertical image processing unit employed in an image-taking apparatus according to an embodiment;

FIGS. 50A and 50B are each explanatory diagram showing timing charts of the processing operations shown in FIGS. 48 and 49;

FIG. 51 is an explanatory block diagram showing a flow of image data processed in processing operations carried out by units employed in an image-distortion compensation apparatus shown in FIG. 30 as an apparatus according to the first embodiment;

FIGS. 61A to 61D are each explanatory diagram to be referred to in description of a method for compensating an image created in a CMOS imager for distortions caused by a hand movement.

DETAILED DESCRIPTION

Figure 1:
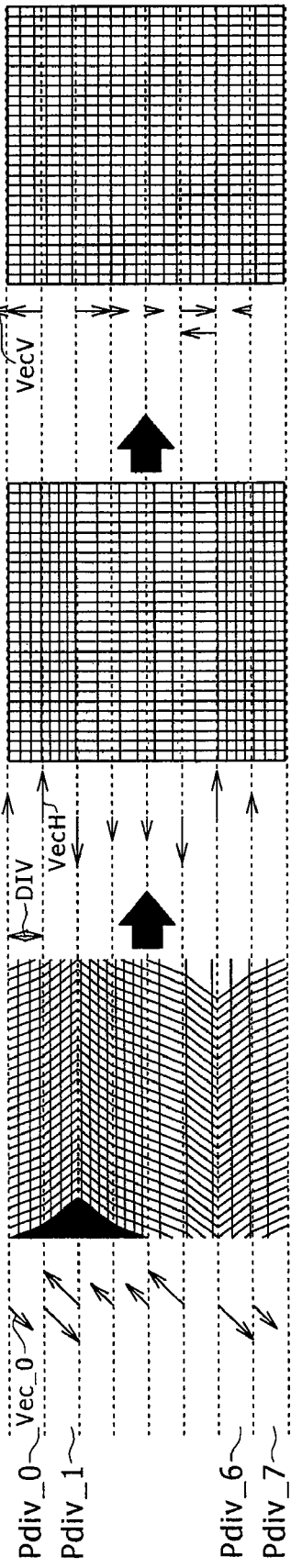
FIGS. 1A to 1D are each an explanatory diagram to be referred to in describing an outline of an image-distortion compensation method according to an embodiment.

Embodiment of the present application will be described below with reference to the figures.

[Embodiment for Compensating for Distortions Generated in a Focal Plane Phenomenon Caused by CMOS Hand Movements]

A technology for compensating an imager-created image for distortions generated in a focal plane phenomenon caused by a CMOS hand movement is disclosed in Japanese Patent Laid-open No. 2004-266322, which is taken as Patent Document 2 in this specification.

In accordance with the distortion compensation method disclosed in Patent Document 2, in a process to read out data of an imager-created image from the CMOS imager in horizontal-line units, a positional displacement caused by a hand movement is detected for each horizontal line and the taken-image data for a current position is read out from a position shifted from the current position in a direction opposite to the direction of the hand movement by the detected positional displacement, which is also referred to hereafter as a hand-movement distance.

Facing the fact that it is difficult to obtain a hand-movement distance for each horizontal line due to conditions including the sampling frequency of a sensor for detecting a hand movement, however, in accordance with the distortion compensation method disclosed in Patent Document 2, hand-movement distances are detected discretely at intervals each corresponding to a plurality of horizontal lines arranged in the vertical direction of the screen (or the frame) as shown in FIG. 61A. In a typical process to detect hand-movement distances as shown in FIGS. 61A to 61D, hand-movement distances Q1, Q2, Q3 and so on are detected discretely at intervals each corresponding to 50 horizontal lines as shown in FIG. 61B. It is to be noted, however, that the figure shows only distances of hand movements in the horizontal direction.

The hand-movement distances for the 49 horizontal lines in each interval sandwiched by the horizontal lines subjected to the processes to detect hand-movement distances are not detected directly. Instead, the hand-movement distances for the 49 horizontal lines are each found by interpolation based on the directly detected hand-movement distances Q1, Q2, Q3 and so on. As shown in FIG. 61C, there are some interpolation methods for finding the hand-movement distances for the 49 horizontal lines. In accordance with the interpolation methods shown in FIG. 61C, basically, the hand-movement distances for the 49 horizontal lines not directly subjected to the processes to detect hand-movement distances are each found on the basis of a hand-movement distance Qn for a horizontal line immediately preceding the 49 horizontal lines and a hand-movement distance Qn+1 for a horizontal line immediately succeeding the 49 horizontal lines where n is an integer at least equal to the unity.

In accordance with interpolation method (1), for example, the hand-movement distance Qn for a horizontal line immediately leading ahead of the 49 horizontal lines is used as it is as the hand-movement distance for horizontal lines pertaining to the first half of the 49 horizontal lines. On the other hand, the hand-movement distance Qn+1 for a horizontal line immediately lagging behind the 49 horizontal lines is used as it is as the hand-movement distance for horizontal lines pertaining to the second half of the 49 horizontal lines.

In accordance with interpolation method (2), on the other hand, the hand-movement distance for each particular one of the 49 horizontal lines is represented by a point located on a straight line connecting the hand-movement distance Qn for a horizontal line immediately leading ahead of the 49 horizontal lines to the hand-movement distance Qn+1 for a horizontal line immediately lagging behind the 49 horizontal lines as a point corresponding to the particular horizontal line. That is to say, interpolation method (2) is a method based on average-value interpolation.

In accordance with the interpolation methods described in Patent Document 2, it is possible to compensate an imager-created image for distortions generated in a focal plane phenomenon caused by a CMOS hand movement occurring in the CMOS imager.

In accordance with the interpolation methods described in Patent Document 2, however, hand-movement distances Q1, Q2, Q3 and so on are detected first at predetermined discrete sampling positions and the hand-movement distance at each point other than the predetermined discrete sampling positions is inferred by interpolation based on the directly detected hand-movement distances Q1, Q2, Q3 and so on.

Thus, in accordance with the interpolation methods described in Patent Document 2, the hand-movement distance at a point between predetermined discrete sampling positions corresponding to horizontal lines n and (n+1) is found in an interpolation process, which can be carried out only after detection of the hand-movement distance Qn for horizontal line n leading ahead of a horizontal line corresponding to the point and the hand-movement distance Qn+1 for horizontal line (n+1) lagging behind the horizontal line corresponding to the point. As a result, a hand-movement compensation process for a horizontal line following horizontal line n is delayed by a delay time up to a maximum value corresponding to a plurality of discrete horizontal lines existing in a sampling interval between horizontal lines n and (n+1).

In addition, in the case of interpolation method (1), it is quite within the bounds of possibility that the taken-image data for a current position in the imager is read out from a position not shifted correctly from the current position due to the fact that a hand-movement distance found by interpolation for a horizontal line is much different from the true hand-movement distance for the horizontal line because of an abrupt change in interpolated value.

On top of that, in the case of interpolation method (2), the gradient of a line representing changes in hand-movement distance is found from the hand-movement distance Qn for a horizontal line immediately leading ahead of horizontal lines in a sampling interval to the hand-movement distance Qn+1 for a horizontal line immediately lagging behind the horizontal lines in the sampling interval, and the hand-movement distance for a specific horizontal line following the immediately preceding horizontal line can be found only by multiplying the gradient by the number of horizontal lines existing between the specific horizontal line and the immediately preceding horizontal line. Thus, a multiplier is required and registers for storing multiplication parameters need to be provided separately from the multiplier. As a result, the hardware becomes complicated and the size of the circuit increases. Moreover, due to a multiplication error, at points in the neighborhood of a sampling point of a hand-movement distance, the distances found by interpolation do not change continuously. In the case of interpolation method (2) shown in FIG. 61C, for example, at points in the neighborhood of the sampling point of a hand-movement distance Q2, the distances found by interpolation do not change continuously so that it is quite within the bounds of possibility that the taken-image data for a current position in the imager is read out from a position not shifted correctly from the current position because of an abrupt change in interpolated value.

In an embodiment to be described below as an embodiment implementing an image-taking apparatus for solving the problems described above by employing an X-Y address image pickup device such as the CMOS imager, it is possible to compensate an imager-created image for distortions generated in a focal plane phenomenon caused by a CMOS hand movement occurring in the CMOS imager.

First of all, by referring to FIG. 1, the following description explains an outline of a method for reducing distortions generated on an imager-created image due to a focal plane phenomenon in an embodiment implementing a method to compensate an image signal for distortions in accordance with the present application. The embodiment to be described below is an embodiment for compensating an imager-created image for distortions caused by a CMOS hand movement described before. The imager-created image is obtained as a result of an image taking process making use of a CMOS imager, which is a typical representative of the X-Y address solid-state image pickup devices as described earlier. It is to be noted that the present application can be applied to cases in which the imager-created image obtained as a result of an image taking process is a moving or still pictures.

In the explanatory diagram of FIG. 1 referred to in description of an outline of the method for reducing distortions, FIG. 1A shows an original image without distortions caused by a CMOS hand movement in order to make distortions of an image easy to understand. The original image is imagined as a lattice pattern including a large number of rectangles. Thus, the distortion generated in an imager-created image by a CMOS hand movement appears as a deformation of each of the rectangles composing the lattice pattern.

Figure 58:
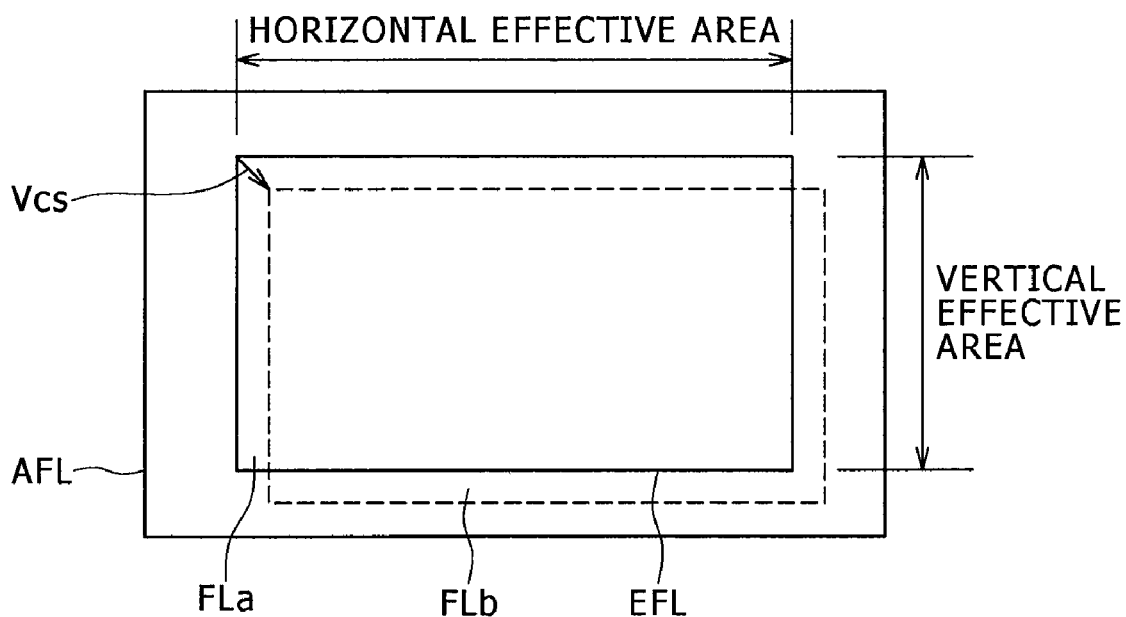
FIG. 58 is an explanatory diagram to be referred to in description of a conventional method to compensate an image for distortions caused by a hand movement.
Figure 59:
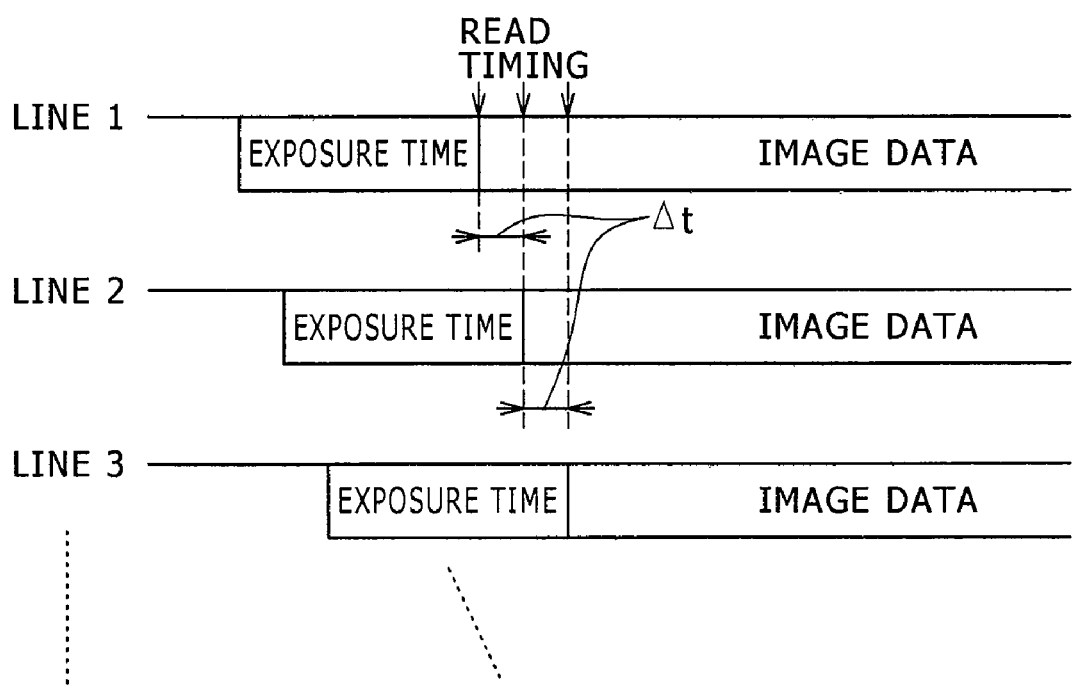
FIG. 59 is an explanatory diagram to be referred to in description of distortions caused by a hand movement as distortions in a frame created in a CMOS imager.
Figure 60A:
FIGS. 60A to 60C are each explanatory diagram to be referred to in description of distortions caused by a hand movement as distortions in a frame created in a CMOS imager.
Figure 60B:
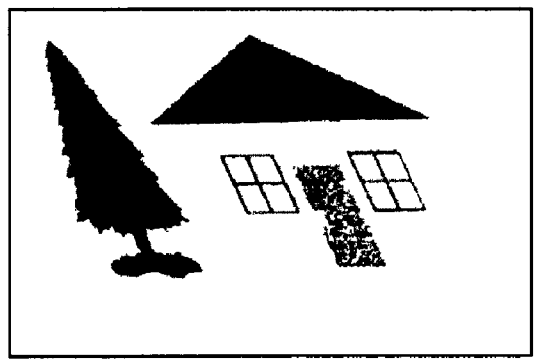
Figure 60C:
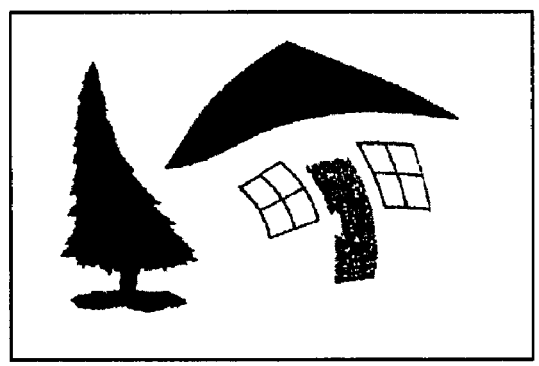

It is to be noted that, also in this embodiment, the CMOS imager is used for creating image data of one screen having an effective image area EFL, which is a center area included in an available image area AFL having a size greater than the size of the effective image area EFL as an area with a width determined by a horizontal effective size and a height determined by a vertical effective size as shown in FIG. 58. It is also worth noting that the image of one screen shown in FIGS. 1A to 1D is the image accommodated in the effective image area EFL shown in FIG. 58.

In this embodiment, the velocity of a pixel clock signal sweeping pixels in the horizontal direction is assumed to be sufficiently higher than the velocity of a hand movement, and operations to read out image data from the CMOS imager in horizontal-line units are carried out sequentially. Thus, the distortion compensation process is carried out also for each horizontal line.

In this embodiment, the picture segment of the effective image area EFL of the CMOS imager is divided in the vertical direction into a plurality of picture divisions Pdiv as shown in FIGS. 1B to 1D. Image data in every picture division Pdiv is assumed to be displaced by the same distance caused by a hand moving at a velocity. In this case, the number of divisions is so determined that the size of every picture division Pdiv is small enough to give a sufficient necessary effect in the distortion compensation process. In the embodiment to be described below, the picture segment of the effective image area EFL of the CMOS imager is divided in the vertical direction into eight picture divisions Pdiv_0 to Pdiv_7. That is to say, in this embodiment, the height of every picture division Pdiv is ⅛ of the aforementioned vertical effective size of the effective image area EFL.

Every picture division Pdiv includes a plurality of horizontal lines described above. The distortion compensation process is carried out on the assumption that image data on every horizontal line pertaining to the same picture division Pdiv is displaced by the same distance caused by a hand moving at a velocity, that is, the hand movement applied to the image data of the picture division Pdiv.

Each arrow shown on the left side of FIG. 1B represents the velocity vector of a hand movement applied to the first horizontal line in one of the eight picture divisions Pdiv_0 to Pdiv_7, which is associated with the arrow. The hand-movement velocity vector is detected by a hand-movement velocity detection unit configured to detect the vector of the velocity of a hand movement. That is to say, in the embodiment, hand-movement velocity vectors for an imager-created image of one screen are detected at eight discrete locations.

The image shown in FIG. 1B has taken-image distortions caused by hand movements represented by the arrows each shown on the left side of the figure to represent a hand-movement velocity vector as hand movements each applied to a picture division Pdiv. In this embodiment, a taken-image distortion caused by a hand movement is processed by carrying out distortion compensation processing split into horizontal-direction and vertical-direction processes in order to compensate the imager-created image for distortions in the horizontal and vertical directions respectively.

As will be described later in detail, in this embodiment, first of all, the horizontal-direction process of the distortion compensation processing for a distortion is carried out on the horizontal-direction component of the distortion. Then, the vertical-direction process of the distortion compensation processing for the distortion is carried out on the vertical-direction component of the distortion. In the distortion compensation processing, the vertical-direction distortion compensation process is started as soon as the vertical-direction distortion compensation process can be carried out on the vertical-direction component of a distortion even if the horizontal-direction distortion compensation process has not been completed yet for the data of the entire imager-created image of 1 screen. In this way, the vertical-direction distortion compensation process can be carried out concurrently with the horizontal-direction distortion compensation process in order to perform the distortion compensation processing with a high degree of efficiency.

In this embodiment, first of all, in order to compensate an imager-created image for distortions caused by a hand movement in the horizontal direction, a horizontal-direction distortion compensation process is carried out to find inverted-sign components X_STB_0 to X_STB_7. The inverted-sign component X_STB for a hand-movement velocity vector Vec detected for a picture division Pdiv is a component in a direction opposite to the direction of the horizontal-direction component of the hand-movement velocity vector Vec. In the case of this embodiment, hand-movement velocity vectors Vec_0 to Vec_7 are detected for picture divisions Pdiv_0 to Pdiv_7 respectively, and the inverted-sign components X_STB_0 to X_STB_7 are found for the hand-movement velocity vectors Vec_0 to Vec_7 respectively. The inverted-sign components X_STB_0 to X_STB_7 are shown on the left side of FIGS. 1C and 2. In the following description, the inverted-sign component X_STB in a direction opposite to the direction of the horizontal-direction component of the hand-movement velocity vector Vec is referred to as a horizontal compensation velocity component VecH, which is found in the horizontal-direction distortion compensation process cited above.

The inverted-sign component X_STB (or the horizontal compensation velocity component VecH) found for each picture division Pdiv as described above is integrated with respect to time covering all the horizontal lines of the picture division Pdiv by taking the point of time corresponding to the first horizontal line of the picture division Pdiv as the integration start in order to compute a compensation quantity used for compensating image data for a hand-movement distance in the horizontal direction for all the horizontal lines. To be more specific, the inverted-sign components X_STB_0 to X_STB_7 found for the picture divisions Pdiv_0 to Pdiv_7 respectively as described above are each integrated with respect to time. On the right side of FIG. 2, an integration result SX_ADD is shown to represent a horizontal-direction hand-movement compensation quantity, which is referred to hereafter simply as a horizontal hand-movement compensation quantity.

Figure 2:
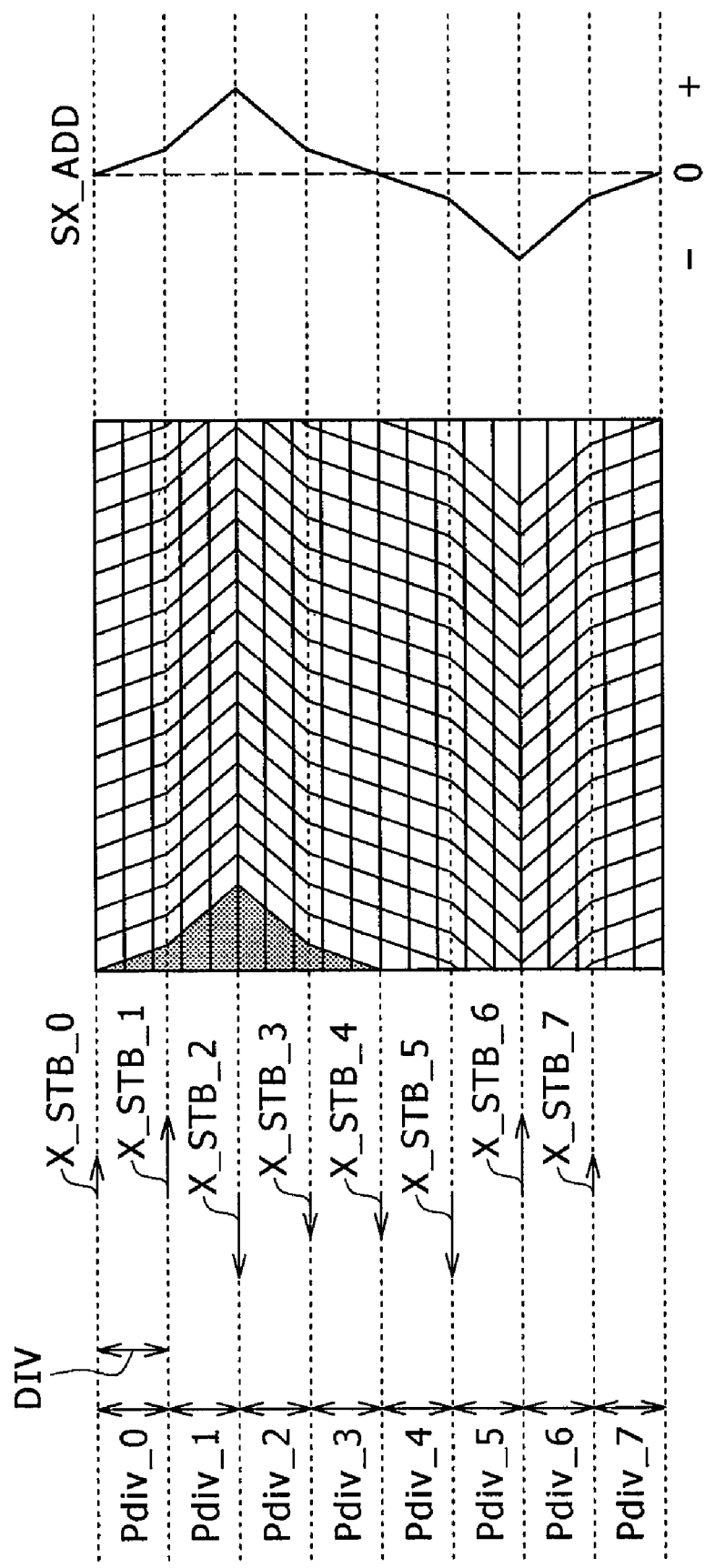
FIG. 2 is an explanatory diagram to be referred to in describing an outline of elements of the image-distortion compensation method according to an embodiment.

As is obvious from FIG. 2, in each of the picture divisions Pdiv_0 to Pdiv_7, the horizontal compensation displacement quantity SX_ADD representing compensation quantities for all the horizontal lines in the picture division changes at a fixed gradient. In addition, since the horizontal compensation displacement quantity SX_ADD is obtained as a result of integration, the horizontal compensation displacement quantity SX_ADD changes smoothly even though the horizontal compensation displacement quantity SX_ADD forms a broken curve on the boundary point between any two adjacent picture divisions Pdiv_n and Pdiv_(n+1) where n is an integer at least equal to zero. That is to say, the horizontal compensation displacement quantity SX_ADD does not show an abrupt change.

In the horizontal-direction distortion compensation process to compensate taken-image data for distortions, the horizontal compensation displacement quantity SX_ADD computed as described above as compensation quantities for all the horizontal lines in a picture division is used for finding the correct horizontal-direction read start position to read out image data for each of the horizontal line from the CMOS imager. That is to say, a position shifted in the horizontal direction by a hand movement applied to a horizontal line as shown in FIG. 1B is taken as the correct horizontal-direction read start position for the horizontal line. Thus, the imager-created image is compensated for the distortions in the horizontal direction to result in an image shown in FIG. 1C.

The image shown in FIG. 1C is obtained as a result of compensating the image shown in FIG. 1B for image distortions in the horizontal direction. In this image, distortions in the vertical direction have not been compensated for.

Thus, in order to compensate an imager-created image for distortions caused by a hand movement in the vertical direction, a vertical-direction distortion compensation process is carried out to find inverted-sign components Y_STB_0 to Y_STB_7. The inverted-sign component Y_STB for a hand-movement velocity vector Vec detected for a picture division Pdiv is a component in a direction opposite to the direction of the vertical-direction component of the hand-movement velocity vector Vec. In the case of this embodiment, hand-movement velocity vectors Vec_0 to Vec_7 are detected for picture divisions Pdiv_0 to Pdiv_7 respectively, and the inverted-sign components Y_STB_0 to Y_STB_7 are found for the hand-movement velocity vectors Vec_0 to Vec_7 respectively. The inverted-sign components Y_STB_0 to Y_STB_7 are shown on the left side of FIG. 1D. In the following description, the inverted-sign component Y_STB in a direction opposite to the direction of the vertical-direction component of the hand-movement velocity vector Vec is referred to as a vertical compensation velocity component VecV, which is found in the vertical-direction distortion compensation process cited above.

The inverted-sign component Y_STB (or the vertical compensation velocity component VecH) found for each picture division Pdiv as described above is integrated with respect to time covering all the horizontal lines of the picture division Pdiv by taking the point of time corresponding to the first horizontal line of the picture division Pdiv as the integration start in order to compute a compensation quantity used for compensating image data for a hand-movement distance in the vertical direction for all the horizontal lines. To be more specific, the inverted-sign components Y_STB_0 to Y_STB_7 found for the picture divisions Pdiv_0 to Pdiv_7 respectively as described above are each integrated with respect to time. On the right side of FIG. 2, an integration result SY_ADD is shown to represent a vertical-direction hand-movement compensation quantity, which is referred to hereafter simply as a vertical hand-movement compensation quantity.

In each of the picture divisions Pdiv_0 to Pdiv_7, the vertical compensation displacement quantity SY_ADD representing compensation quantities for all the horizontal lines in the picture division changes at a fixed gradient. In addition, since the vertical compensation displacement quantity SY_ADD is obtained as a result of integration, the vertical compensation displacement quantity SY_ADD changes smoothly even though the vertical compensation displacement quantity SY_ADD forms a broken curve on the boundary point between any two adjacent picture divisions Pdiv_n and Pdiv_(n+1). That is to say, the vertical compensation displacement quantity SY_ADD does not show an abrupt change.

In the vertical-direction distortion compensation process to compensate taken-image data for distortions, the vertical compensation displacement quantity SY_ADD computed as described above as compensation quantities for all the horizontal lines in a picture division is used for finding the correct vertical-direction read start position to read out image data for each of the horizontal line from the CMOS imager. That is to say, a position shifted in the vertical direction by a hand movement applied to a horizontal line as shown in FIG. 1C is taken as the correct vertical-direction read start position for the horizontal line. Thus, the imager-created image is compensated for the distortions in the vertical direction to result in an image shown in FIG. 1D.

A state obtained resulting as a result of the horizontal and vertical distortion compensation processes carried out on the image data created in the CMOS imager for distortions caused by a focal plane phenomenon by making use of horizontal and vertical hand-movement compensation quantities is identical with that described in Patent Document 2 mentioned before.

In accordance with the distortion compensation method disclosed in Patent Document 2, however, hand-movement distances are detected discretely at intervals each corresponding to a plurality of horizontal lines arranged in the vertical direction of the screen. Hand-movement distances for horizontal lines in each interval sandwiched by the horizontal lines subjected to the processes to detect hand-movement distances are not detected directly. Instead, the hand-movement distances for the horizontal lines in every interval are each found by interpolation based on the directly detected hand-movement distances. On the other hand, the distortion compensation method according to this embodiment is much different from the distortion compensation method disclosed in Patent Document 2 in that, in accordance with the distortion compensation method according to this embodiment, hand-movement velocities are detected discretely at intervals each corresponding to a plurality of horizontal lines arranged in the vertical direction of the screen and each integrated with respect to time covering all horizontal lines in every interval sandwiched by the horizontal lines subjected to the processes to detect hand-movement velocities in order to find a hand-movement distance (or a hand-movement compensation quantity) for every horizontal line.

As described above, in this embodiment, in each of the picture divisions Pdiv_0 to Pdiv_7, the horizontal compensation displacement quantity SX_ADD representing hand-movement distances (or hand-movement compensation quantities) for all the horizontal lines in the picture division is obtained as a result of integration, the horizontal compensation displacement quantity SX_ADD changes smoothly even though the horizontal compensation displacement quantity SX_ADD forms a broken curve on the boundary point between any 2 adjacent picture divisions Pdiv_n and Pdiv_(n+1) where n is an integer at least equal to the unity. That is to say, the horizontal compensation displacement quantity SX_ADD does not show an abrupt change.

It is to be noted that, in accordance with this embodiment, in a process to extract horizontal and vertical components from a hand-movement velocity vector, inverted-sign components are found by inverting the signs of the components of the hand-movement velocity vector and used as compensation velocity components. The sign of a component of a hand-movement velocity vector can be inverted to produce a compensation velocity component or a hand-movement compensation quantity at anytime as long as this sign inversion process is carried out prior to the process to compensate data of the imager-created image for distortions caused by a hand movement.

[Computation of a Hand-Movement Displacement Vector and a Hand-Movement Velocity Vector]

This embodiment adopts a block matching technique for finding a correlation between 2 screens as a method for detecting a hand-movement displacement vector of an imager-created image. Since the block matching method does not require a mechanical component such as a gyro sensor (or an angular-velocity sensor), the method offers merits including a small size of the image-taking apparatus and a low cost to manufacture the apparatus.

Figure 3:
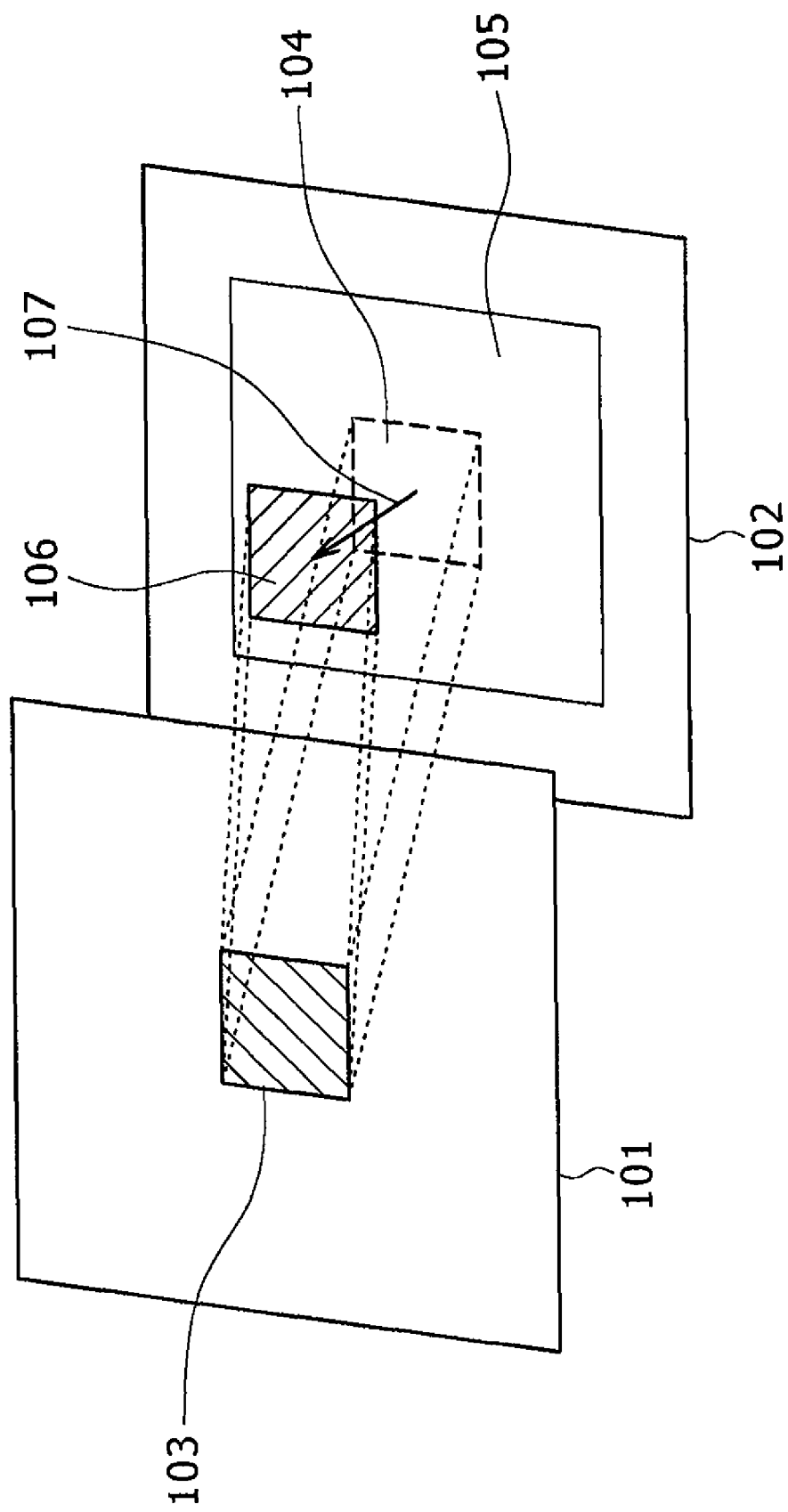
FIG. 3 is an explanatory diagram to be referred to in describing a process to detect a movement vector by adoption of a block matching technique.
Figure 4:
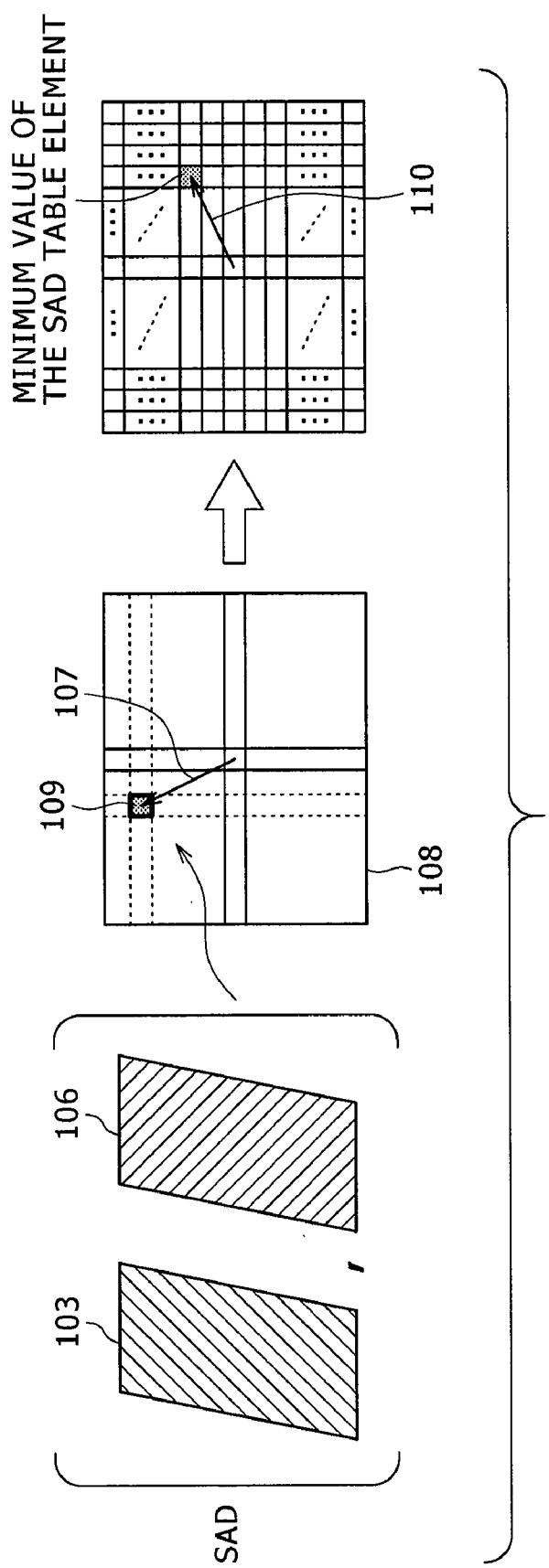
FIG. 4 is an explanatory diagram to be referred to in describing a process to detect a movement vector by adoption of the block matching technique.
Figure 5:
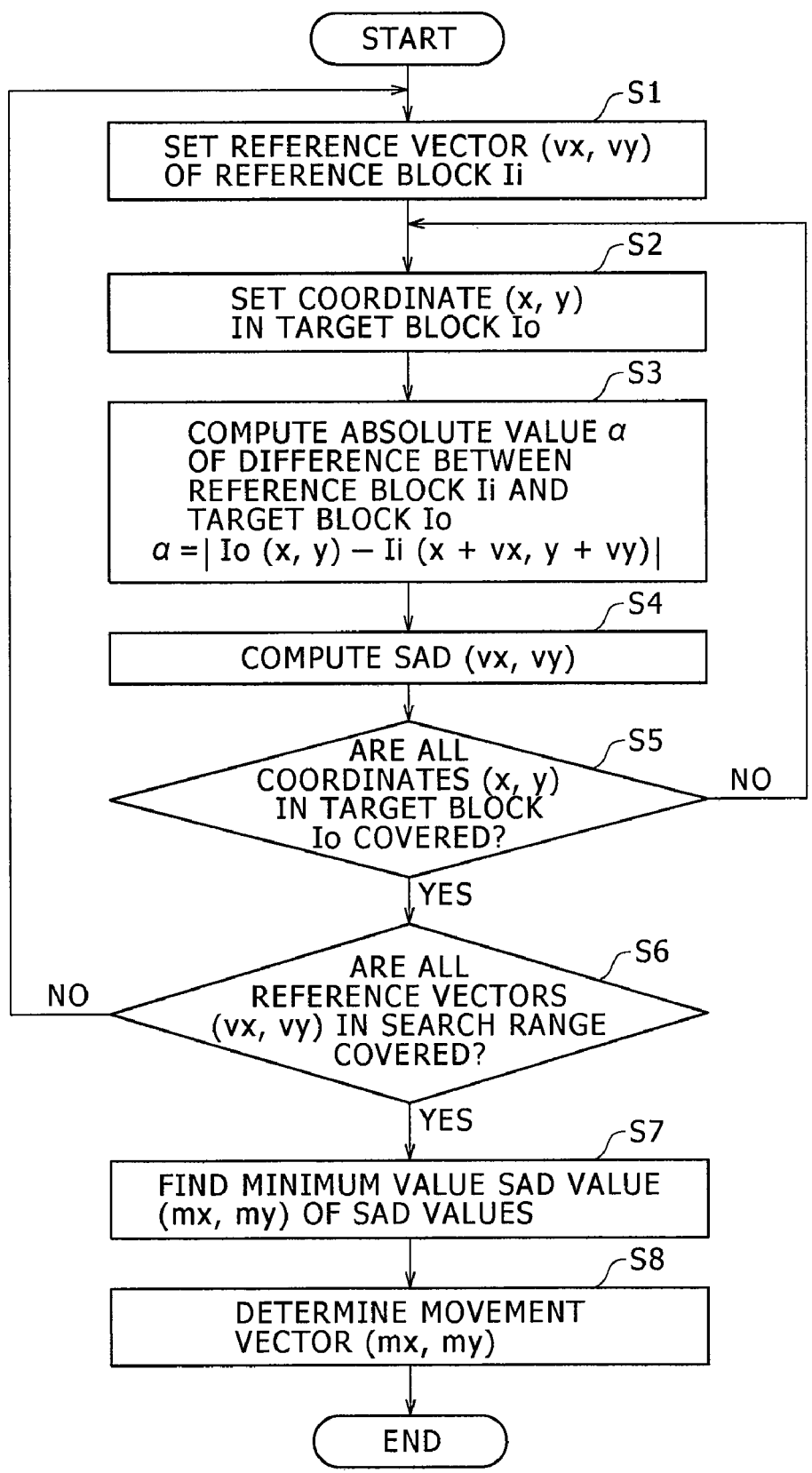
FIG. 5 is an explanatory diagram to be referred to in describing a process to detect a movement vector by adoption of the block matching technique.

FIGS. 3 and 4 are each a diagram to be referred to in description of an outline of the block matching method. On the other hand, FIG. 5 shows a flowchart representing typical processing based on the block matching method.

The block matching method is a method for computing a correlation between each block (which is also referred to hereafter as a reference block) in a reference screen of an imager-created image produced by an image taking unit and a predetermined block (which is also referred to hereafter as a target block) in an original screen of the same imager-created image in an attempt to find a correlation between the reference screen and the original screen as a correlation representing a screen-unit displacement vector between the reference screen and the original screen. The reference screen of the imager-created image is a screen currently being observed. On the other hand, the original screen of the imager-created image is a screen leading ahead of the reference screen by a time difference corresponding to 1 screen. That is to say, the original screen is a screen immediately preceding the reference screen. The block in a screen is a rectangular area having a predetermined size.

It is to be noted that, in this case, a screen is an image composed of image data of one frame or one field. However, in this patent specification, a screen is defined as an image composed of image data of one frame in order to make the explanation easy to understand. Thus, the screen is also referred to as a frame. That is to say, the reference and original screens are also referred to as reference and original frames respectively.

For example, the image data of the reference frame is image data, which is output by the image-taking unit as the image data of the current frame or has been stored in a frame memory for the lapse of a delay time corresponding to occurrence of one frame since the appearance of the current frame. On the other hand, the image data of the original frame is image data, which has been output by the image-taking unit and stored in a frame memory for the lapse of a delay time corresponding to occurrence of two consecutive frames since the appearance of the current frame, as the image of an immediately preceding frame.

As described above, FIGS. 3 and 4 are diagrams each referred to in description of the outline of the traditional block-matching technique. FIG. 5 shows a flowchart representing typical processing adopting the traditional block-matching technique.

In accordance with the traditional block-matching technique, as shown in FIG. 3, at any arbitrary predetermined position on the original frame 101 also referred to as a target frame 101, a target block 103 is set. The target block 103 is a rectangular area having a predetermined size. The target block 103 has a plurality of pixels arranged in the horizontal direction to form a line and a plurality of such lines arranged in the vertical direction.

On the other hand, at the same position on a reference frame 102 as the position of the target block 103, a target-block projected image block 104 will serve as the target block 103. In FIG. 3, the target-block projected image block 104 is drawn as a block enclosed by a dashed line. Then, a search range 105 is set with its center coinciding with the target-block projected image block 104. In FIG. 3, the search range 105 is drawn as a block enclosed by a dotted line. In addition, a reference block 106 is assumed to be a block to be moved from position to position over the search range 105 as will be described below.

Then, the position of the reference block 106 on the reference frame 102 is changed over the search range 105 in an endeavor to search the search range 105 for a position showing the strongest correlation between the image data included in the reference block 106 at the position and the image data included in the target block 103, that is, for a position at which the correlation between the moving reference block 106 and the target block 103 becomes strongest. A position showing the strongest correlation between the reference block 106 and the target block 103 is detected as the strongest-correlation position of the reference block 106 or the actual position of the target block 103 on the reference frame 102. The magnitude of the shift of the detected strongest-correlation position of the reference block 106 or the actual position of the target block 103 on the reference frame 102 from the position of the target-block projected image block 104 is detected as the aforementioned hand-movement displacement movement vector 110 also referred to simply as a movement vector 110, which includes a movement direction.

In the process, the position of the reference block 106 on the reference frame 102 is changed over the search range 105 typically in the vertical and horizontal directions by a distance corresponding to one pixel or a plurality of pixels at one time. Thus, a plurality of reference block positions are each set in the search range 105 in advance as a position to which the reference block 106 is to be moved during the search process.

The strongest correlation between the reference block 106 moving from position to position over the search range 105 and the target block 103 is basically computed on the basis of pixels of the reference block 106 at every present position thereof and corresponding pixels of the target block 103. The SAD (Sum of Absolute Differences) value is a sum of the absolute values of differences in luminance value between all pixels in the reference block 106 and all corresponding pixels in the target block 103. The strongest correlation is represented by a minimum SAD for the strongest correlation position indicated by the movement vector 110 from the position of the target-block projected image block 104.

In accordance with the block-matching technique, a plurality of positions to which the reference block 106 is to be moved over the search range 105 are set in advance, the positions are searched for a specific one showing the strongest correlation between the reference block 106 and the target block 103 or a specific one having the minimum SAD value between the reference block 106 and the target block 103, and a reference vector 107 including a shift direction is used as a vector representing a shift from the position of the target block 103 on the original frame 101 or the position of the target-block projected image block 104 on the reference frame 102 to the specific position showing the strongest correlation between the reference block 106 and the target block 103 or the specific position having the minimum SAD value between the reference block 106 and the target block 103 as shown in FIG. 3. The reference vector 107 pointing to the reference block 106 thus has a value determined by the strongest-correlation position of the reference block 106 on the reference frame 102 and, in the case of the block-matching technique, the strongest-correlation position of the reference block 106 is a position showing a minimum SAD value.

In accordance with the block-matching technique, for each of a plurality of positions to which the reference block 106 is to be moved over the search range 105, a computed SAD value between the reference block 106 and the target block 103 is generally recorded in a memory by being associated with a reference vector 107 pointing to the position of the reference block 106 as shown in FIG. 4. In order to make the explanation simple, in the following description, a SAD value between the reference block 106 and the target block 103 is also referred to as a reference block SAD value. The reference vector 107 pointing to the position of the reference block 106 having the minimum SAD value is the movement vector 110 cited before. Thus, the movement vector 110, which is associated with the reference block 106 having the minimum SAD value can be found by searching all the reference block SAD values stored in the memory for the minimum reference block SAD value.

As described above, for each of a plurality of positions to which the reference block 106 is to be moved over the search range 105, a reference block SAD value between the reference block 106 and the target block 103 is recorded as a table element 109 in a correlation-value table 108 also referred to hereafter as a SAD table 108 by being associated with a reference vector 107. The reference-block SAD value represents a correlation between the reference block 106 and the target block 103. As shown in FIG. 4, each element 109 of the correlation-value table 108 is a correlation value of the reference block 106 at a position corresponding to the address of the element, or a reference-block SAD value for the position. In the following description, a SAD value and a correlation value are used interchangeably to imply the same quantity.

It is to be noted that, in the above description, the position of the target block 103 or the reference block 106 is the position of a specific portion of the target block 103 or the reference block 106 respectively. An example of the specific portion is the center of the target block 103 or the reference block 106. Also as described above, the reference vector 107 including a shift direction is a vector representing the quantity of a shift from the position of the target block 103 on the original frame 101 or the position of the target-block projected image block 104 on the reference frame 102 to the position showing the strongest correlation between the reference block 106 and the target block 103 or the position having the minimum SAD value between the reference block 106 and the target block 103. In the examples shown in FIGS. 3 and 4, the target block 103 and the target-block projected image block 104 are each located at the center of the frame.

The reference vector 107 pointing to the reference block 106 and including a shift direction is a vector representing the quantity of a shift from the position of the target block 103 on the original frame 101 or the position of the target-block projected image block 104 on the reference frame 102 to the position showing the strongest correlation between the reference block 106 and the target block 103 or the position having the minimum SAD value between the reference block 106 and the target block 103. Thus, if the position showing the strongest correlation between the reference block 106 and the target block 103 or the position having the minimum SAD value between the reference block 106 and the target block 103 is identified, the value of the reference vector 107 is also identified. That is to say, if the address of the element of the correlation-value table 108 in the memory is identified, the value of the reference vector 107 is also identified.

The traditional block-matching processing described above is explained in more detail by referring to the flowchart shown in FIG. 5 as follows.

The flowchart begins with a step S1 at which a reference block Ii denoted by reference numeral 106 in FIG. 3 is specified at a position having coordinates of (vx, vy) in the search range 105. An operation to specify a reference block Ii in the search range 105 is equivalent to an operation to specify a reference vector 107 corresponding to the reference block Ii. In the typical processing represented by the flowchart shown in FIG. 5, the coordinates of (vx, vy) are the coordinates of the position pointed to by the specified reference vector 107 with coordinates of (0, 0) taken as the coordinates of an origin position. The coordinates of (0, 0) are the coordinates of the position of the target block 103 on the original frame 101 or the coordinates of the position of the target-block projected image block 104 on the reference frame 102. The coordinate vx represents the horizontal-direction shift of the position pointed to by the specified reference vector 107 from the origin position whereas the coordinate vy represents the vertical-direction shift of the position pointed to by the specified reference vector 107 from the origin position having the coordinates of (0, 0).

The shift quantities (vx, vy) are each a quantity expressed in terms of pixel units. For example, an expression vx=+1 expresses a position shifted in the horizontal direction to the right from the origin position (0, 0) by a distance equivalent to one pixel. On the other hand, an expression vx=−1 expresses a position shifted in the horizontal direction to the left from the origin position (0, 0) by a distance equivalent to one pixel. In addition, an expression vy=+1 expresses a position shifted in the vertical downward direction from the origin position (0, 0) by a distance equivalent to one pixel. On the other hand, an expression vy=−1 expresses a position shifted in the vertical upward direction from the origin position (0, 0) by a distance equivalent to one pixel.

As described above, the coordinates (vx, vy) are the coordinates of a position pointed to by a reference vector 107 as a position relative to the origin position (0, 0). In the following description, the position pointed to by the reference vector 107 as a position relative to the origin position (0, 0) is referred to simply as a position pointed to by the reference vector 107 in order to make the explanation easy to understand. Each point pointed to by a reference vector 107 is said to be a position corresponding to the reference vector 107. That is to say, quantities (vx, vy), where notations vx and vy are each an integer, represent the reference vector 107 itself. Thus, in the following description, a reference vector 107 pointing to a position (vx, vy), which is a position having the coordinates of (vx, vy), is expressed as a reference vector (vx, vy).

As described earlier, the center position of the search range 105 is taken as the center position of the target-block projected image block 104 or the origin position (0, 0). The reference block 106 is moved from position to position over the search range 105 in the horizontal directions by distances in the range ±Rx defining the horizontal limits of the search range 105 and the vertical directions by distances in the range ±Ry defining the vertical limits of the search range 105. In this case, the quantities (vx, vy) satisfy the following relation:

$$-Rx \leq vx \leq +Rx \text{ and } -Ry \leq vy \leq +Ry$$

At the next step S2, a point (or a pixel) with coordinates (x, y) is specified as a point in the target block Io denoted by reference numeral 103 in FIG. 3. Let us have notation Io (x, y) denote a pixel value at the specified point (x, y) and notation Ii (x+vx, y+vy) denotes a pixel value at a point (x+vx, y+vy) in the reference block Ii set at the block position (vx, vy) at the step S3. In the following description, the point (x+vx, y+vy) in the reference block Ii is said to be a point corresponding the point (x, y) in the target block Io. Then, at the next step S3, the absolute value α of the difference between the pixel value Io (x, y) and the pixel value Ii (x+vx, y+vy) is computed in accordance with Eq. (1) as follows:

$$\alpha = |Io(x, y) - Ii(x+vx, y+vy)| \quad (1)$$

The above difference absolute value a is to be computed for all points (x, y) in the target block Io and all their corresponding points (x+vx, y+vy) in the reference block Ii, and a SAD value representing the sum of the difference absolute values α computed for the target block Io and the reference block Ii is stored at the address of a table element associated with the reference vector (vx, vy) pointing to the current location of the reference block Ii. That is to say, the SAD value is stored as a reference-value table element 109 associated with the reference block Ii as an element of the correlation-value table 108. In order to compute such a SAD value, at the next step S4, the difference absolute value α found at the step S3 is cumulatively added to a temporary SAD value already stored as a reference-value table element 109 associated with the reference block Ii pointed to by the reference vector (vx, vy) as a SAD value computed so far. The final SAD value SAD (vx, vy) is obtained as a result of a process to cumulatively sum up all difference absolute valuesα, which are computed for all points (x, y) in the target block Io and all their corresponding points (x+vx, y+vy) in the reference block Ii as described above. Thus, the final SAD value SAD (vx, vy) can be expressed by Eq. (2) as follows:

$$SAD(vx, vy) = \Sigma \alpha = \Sigma |Io(x, y) - Ii(x+vx, y+vy)| \quad (2)$$

Then, the flow of the traditional block-matching processing goes on to the next step S5 to produce a result of determination as to whether or not the processes of the steps S3 and S4 have been carried out for all points (x, y) in the target block Io and all their corresponding points (x+vx, y+vy) in the reference block Ii. If the result of the determination indicates that the processes of the steps S3 and S4 have not been carried out yet for all points (x, y) in the target block Io and all their corresponding points (x+vx, y+vy) in the reference block Ii, the flow of the traditional block-matching processing goes back to the step S2 at which another point with coordinates (x, y) is specified as another point in the target block Io. Then, the processes of the steps S3 and S4 following the step S2 are repeated.

If the determination result produced at the step S5 indicates that the processes of the steps S3 and S4 have been carried out for all points (x, y) in the target block Io and all their corresponding points (x+vx, y+vy) in the reference block Ii, that is, if the final SAD value SAD (vx, vy) for the reference vector (vx, vy) has been found, on the other hand, the flow of the traditional block-matching processing goes on to a step S6 to produce a result of determination as to whether or not the processes of the steps S2 to S5 have been carried out for all reference-block locations in the search range 105, that is, for all reference vectors (vx, vy).

If the determination result produced at the step S6 indicates that the processes of the steps S2 to S5 have not been carried out yet for all reference blocks in the search range 105, that is, for all reference vectors (vx, vy), the flow of the traditional block-matching processing goes back to the step S1 at which another reference block Ii pointed to by another reference vector (vx, vy) is set at another block position (vx, vy) in the search range 105. Then, the processes of the step S1 and the subsequent steps are repeated.

If the determination result produced at the step S6 indicates that the processes of the steps S2 to S5 have been carried out for all reference-block positions in the search range 105 or for all reference vectors (vx, vy), that is, all elements of the correlation-value table 108 have been filled with final SAD values (vx, vy), on the other hand, the flow of the traditional block-matching processing goes on to a step S7 at which the smallest value among all the final SAD values (vx, vy) stored in all the elements of the correlation-value table 108 is detected as a minimum value. Then, at the next step S8, a reference vector (vx, vy) pointing to the address of an element included in the correlation-value table 108 as the element used for storing the smallest final SAD value (vx, vy) is recognized as the movement vector 110 described earlier. Let us have notation SAD (mx, my) denote the smallest final SAD value (vx, vy) whereas notation vector (mx, my) denote the reference vector (vx, vy) pointing to the address of an element 109 included in the correlation-value table 108 as the element used for storing the SAD (mx, my) or denote the movement vector 110.

As described above, the traditional block-matching processing for a target block 103 is carried out to determine a vector (mx, my) for the target block 103.

In accordance with the sensorless method for detecting a hand-movement displacement vector (also referred to hereafter as a movement vector) by making use of a block matching technique as described above, in principle, a hand-movement displacement vector can be detected at a pixel precision level. In addition, since the method does not require mechanical components such as a sensor and a lens shift, the method is very excellent from the cost point of view.

In an extension of a technology depending on the traditional block-matching technique, nevertheless, the number of elements composing the correlation-value table 108 (or the SAD table 108) described earlier increases in proportion to the number of pixels on a screen. It is thus very difficult to implement a process to detect a movement vector for a still picture appearing on the contemporary display screen with a size of more than 5,000,000 pixels by making use of a circuit having a realistic scale.

On a background of suffering a bitter failure in an attempt made to eliminate a circuit for detecting a hand-movement displacement vector for an NTSC (National Television System Committee) moving picture appearing on a display screen with a size not exceeding 170,000 pixels while trying a variety of efforts in manufacturers of image-taking apparatus in the past, a narrow hand-movement search range can be used in a process to detect a hand-movement displacement vector for an NTSC moving picture produced at a rate of 60 fps (frames per second). However, in the case of a still picture, a rate of 3 fps is taken as a prerequisite so that the hand-movement search range becoming an extremely large serves as one of causes, which make the existing problem even more difficult to solve. This is because the number of elements composing the correlation-value table 108 increases in proportion to the number of pixels on a screen as well as the size of the hand-movement search range.

A method of implementing the sensorless hand-movement compensation technique for still pictures has been disclosed in some documents and, in particular, in Japanese Patent Laid-open No. Hei 7-283999 taken as Patent Document 3. In accordance with the technique disclosed in Patent Document 3, there is disclosed an algorithm whereby some consecutive still pictures are taken during such a short exposure time that no hand movement occurs, hand-movement displacement vectors between the static pictures are found. Then, a plurality of still pictures taken consecutively during the exposure time are superposed on each other (or on an average of the still pictures taken consecutively during the exposure time) while being moved in parallel in accordance with their hand-movement displacement vectors in order to produce an eventual high-quality still image with no distortions caused by a hand movement and no low-illumination noises.

Japanese Patent Laid-open No. 2005-38396 taken as Patent Document 4 proposes a realistic technology at a level that can be implemented. The technology disclosed in Patent Document 4 includes a unit configured to find a movement vector for a picture size obtained as a result of a conversion process to contract an original picture and a unit configured to allow a common SAD table to be shared by a plurality of blocks. The technique to contract an original picture and allow a common SAD table to be shared by a plurality of blocks is a very good method to implement reduction of the size of the correlation-value table 108 and also used in other fields such as detection of a movement vector in an MPEG (Moving Picture Expert Group) picture compression system and detection of a scene change.

However, the algorithm disclosed in Patent Document 4 has a problem that it takes time to carry out the conversion process to contract an original picture and make an access to a memory used in the process as a memory having a large size. An example of the memory is a DRAM (Dynamic RAM (Random Access Memory)). The time to make an access to the memory particularly becomes very long due to the fact that the algorithm makes use of a unit configured to make accesses to the correlation-value table 108 (or the SAD table 108), which is shared by a plurality of blocks, on a time-sharing basis. The very long time to make an access to the memory also unavoidably increases the time to carry out the processing based on the algorithm. Since the process to compensate an image-taking apparatus for distortions caused by a hand movement must be carried out in a real-time manner in order to shorten a system delay time, the long time it takes to carry out the processing based on the algorithm particularly raises a problem.

In addition, in order to carry out the conversion process to contract an original picture, it is necessary to carry out pre-processing prior to the conversion process by making use of a low-pass filter for getting rids of aliasing and low-illumination noises. Since the characteristic of the low-pass filter changes in accordance with the contraction factor of the conversion process and, in particular, in the case of a vertical-direction low-pass filter, a multi-tap digital filter is used, however, a number of line memories and processing logic circuits are required, raising a problem of an increasing circuit size.

On the other hand, algorithms each making use of no block-matching technique have also been proposed in documents such as Japanese Patent Laid-open No. Hei 6-86149 used as Patent Document 5 and Japanese Patent Laid-open No. 2004-343483 used as Patent Document 6. The proposed algorithms each employ a unit configured to detect a plurality of points each considered to be a characteristic point for some reasons on two consecutive frame images and associate the two consecutive frame images with each other on the basis of the detected characteristic points in order to find a global vector, which is a hand-movement displacement vector for the whole face of each of the frame images. As an alternative, characteristic points of only one of the two consecutive frame images are detected and a block-matching process is carried out with respect to the other frame image only for areas each surrounding one of the detected characteristic point.

The algorithms disclosed in Patent Documents 5 and 6 each reduce the size of the processing circuit and are each a very effective, hence, being ideal. However, the effectiveness of the algorithms much depends on how much the number of identified characteristic points truly serving as characteristics of the entire faces of both the frame images and characteristics common to the two consecutive frame images can be reduced with a high degree of efficiency. The block-matching technique is considered to be a little ahead of the algorithms disclosed in Patent Documents 5 and 6 in robustness as long as all things in the universe are each taken as the photographing object of a consumer image-taking apparatus.

As described earlier, in the image-taking apparatus such as a digital camera, efforts are made to increase the pixel density of an imager more and more in the future in anticipation of a demand for better performance. In such a condition, implementation of a process to compensate the image-taking apparatus for distortions caused by a hand movement occurring in an operation to take a still picture by adoption of a sensorless technique making use of no gyro (or angular velocity) sensor is very meaningful.

In order to implement such a process, as described before, a promising method is taken as a method to identify a hand-movement displacement movement vector in a sensorless way by adoption of the block-matching technique and compensate the image-taking apparatus for distortions caused by a hand movement by making use of the identified vector. In the present state, however, the solution of adopting the block-matching technique has a problem that a proposal meeting all demands for a small processing-circuit size, a high processing speed and excellent robustness has not been made.

The block-matching technique has the biggest problem caused by the increased size of the correlation-value table. As already described earlier, at the present time where the image generated in a digital camera is required to have a size of at least 5,000,000 pixels as a precondition, the size of the correlation-value table unavoidably increases in proportion to the number of pixels composing the image and, on the top of that, a rate of about 3 fps is taken in the case of a still picture. Thus, a hand-movement search range with a size of about 10 times the size of the hand-movement search range for a moving picture generated at a rate of 60 fps is required for a still picture. The increased size of the hand-movement search range is equivalent to the increased size of the correlation-value table, and the increased size of the correlation-value table is regarded as the biggest problem raised by the block-matching technique.

A result of evaluation given by a number of users obviously indicates that, on the assumption that the entire area of a frame is 100, the size of the hand-movement search area in case of the still picture with a rate of 3 fps is about ±10%. In the case of a high-performance image-taking apparatus, the number of pixels composing the image is already assumed to be 12,000,000 and, with the presently proposed technology adopted as it is, the size of the required SAD table is estimated to be about 80 megabits. In addition, if an attempt is made to satisfy a realistic processing speed, an SRAM (Static RAM (Random Access Memory)) is required as a memory used for storing infomation contained in the correlation-value table. In spite of the fact that the semiconductor process rule is said to be making progress, this size of about 80 megabits is far away from a realistic level, being greater than a realistic value by about three digits.

Addressing the problems described above, inventors of the present application have provided an image-processing method allowing the size of a SAD table used in a process to identify a movement vector between two consecutive frames by adoption of the block-matching technique to be substantially reduced and provided an image-processing apparatus adopting the image-processing method.

In addition, among the proposed traditional methods in the field of block matching, with regard to a technique disclosed in Patent Document 4 as a technique to reduce the size of the correlation-value table by carrying out an image conversion process to contract the image, the inventors pointed out the following two problems. One of the problems is an increased processing time and a raised memory size, which are caused by the image conversion process to contract the image. The other problem is an increased processing-circuit size caused by implementation of a proper low-pass filter for avoiding aliasing in execution of the image conversion process to contract the image. It is thus a desire of an embodiment described below to solve these problems.

[Outline of a New Block-Matching Technique Adopted by the Embodiment]

Figure 6:
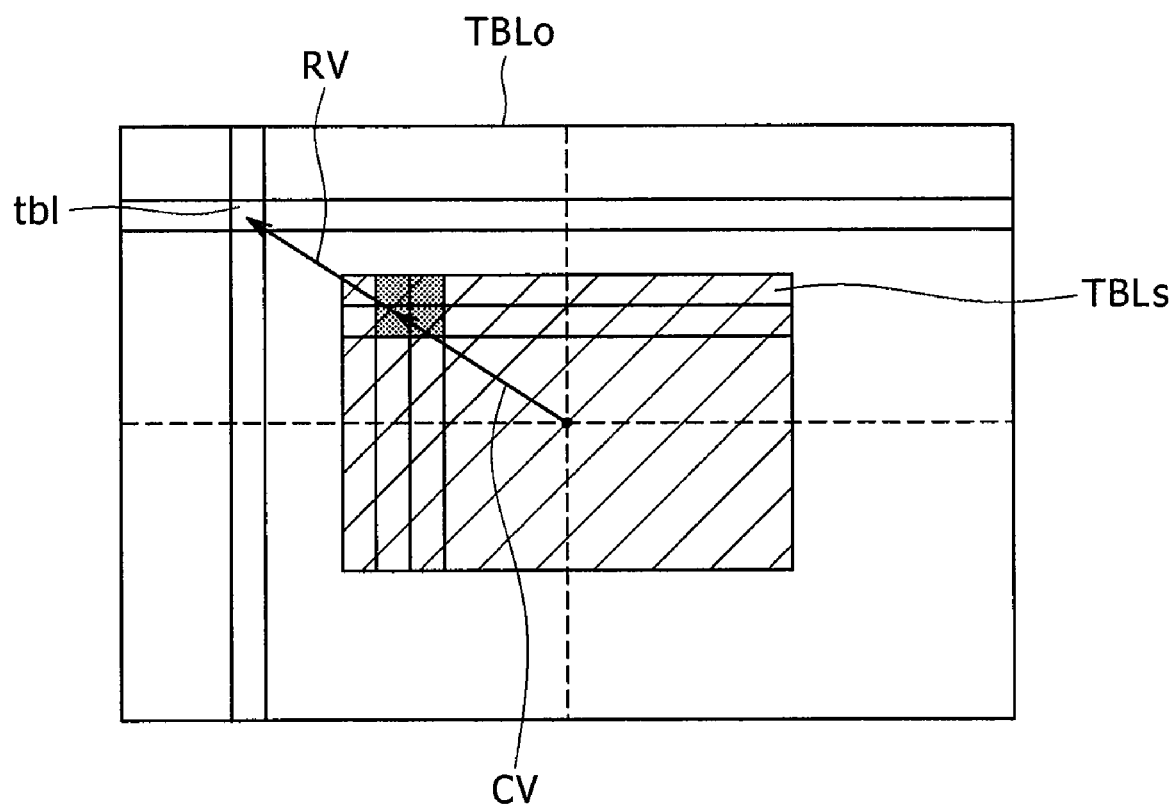
FIG. 6 is an explanatory diagram to be referred to in describing an outline of a process to detect a movement vector in accordance with an embodiment.

Also in this embodiment, the block-matching technique described above is adopted to detect a movement vector between two consecutive frames. In the case of this embodiment, however, SAD values each found between a target block and a reference block are each stored as a table element tbl in the correlation-value table TBLo not by associating the SAD value with a reference vector RV pointing to a reference block, for which the SAD value has been found. Instead, as shown in FIG. 6, every reference vector RV originally provided for the original SAD table TBLo is contracted into a contracted reference vector CV for a shrunk SAD table TBLs with a size much smaller than the size of the original SAD table TBLo. Then, a SAD value originally stored in a table element included in the original SAD table TBLo as a table element pointed to by a reference vector RV associated with the SAD value is now split into component SAD values, which are then stored in a plurality of table elements included in the shrunk SAD table TBLs as table elements associated with the contracted reference vector CV. As shown in the figure, the table elements associated with the contracted reference vector CV are located in the neighborhood of a position pointed to by the contracted reference vector CV. Each of the table elements associated with a contracted reference vector CV is also associated with another contracted reference vector CV. Thus, each of the table elements is associated with a plurality of contracted reference vectors CV and used for storing the sum of component SAD values each obtained by splitting a SAD value found for a reference vector RV, which is contracted into one of the contracted reference vectors CV.

As described above, the shrunk SAD table TBLs has a size much smaller than the size of the original SAD table TBLo.

Figure 7A:
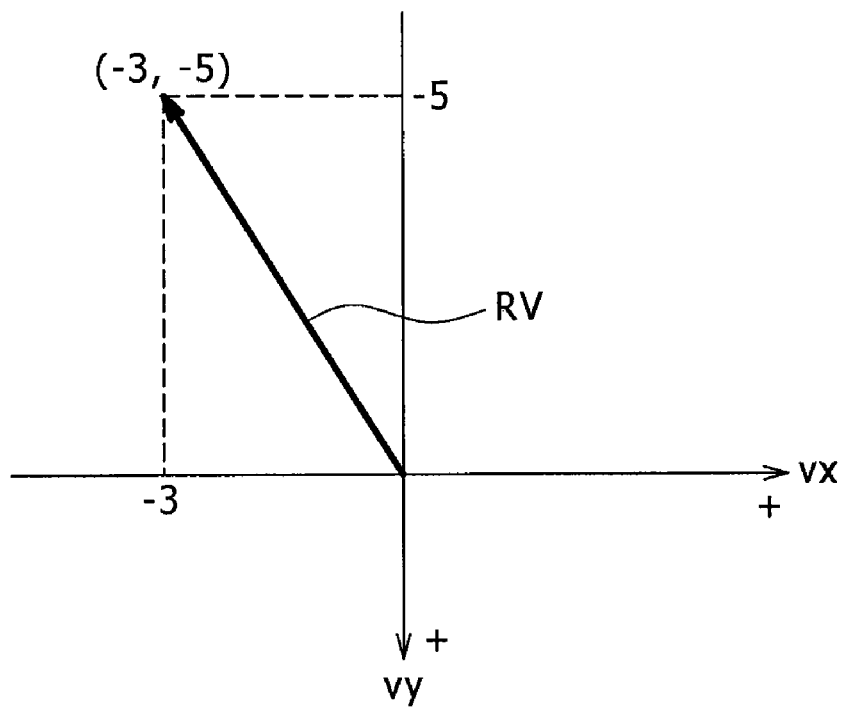
FIGS. 7A and 7B are each explanatory diagram to be referred to in describing an outline of a process to detect a movement vector in accordance with an embodiment.
Figure 7B:
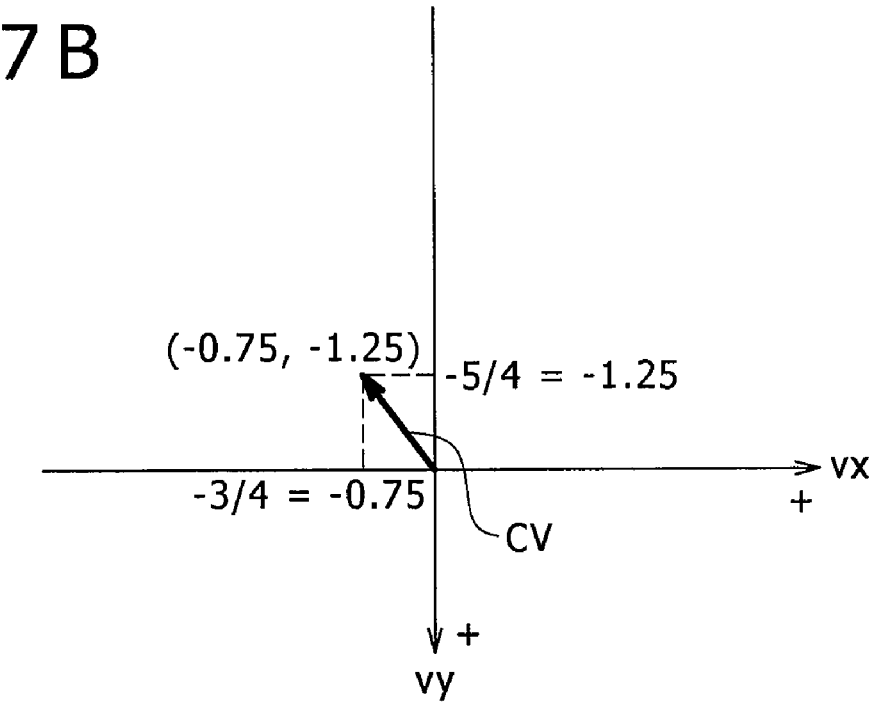
Figure 8:
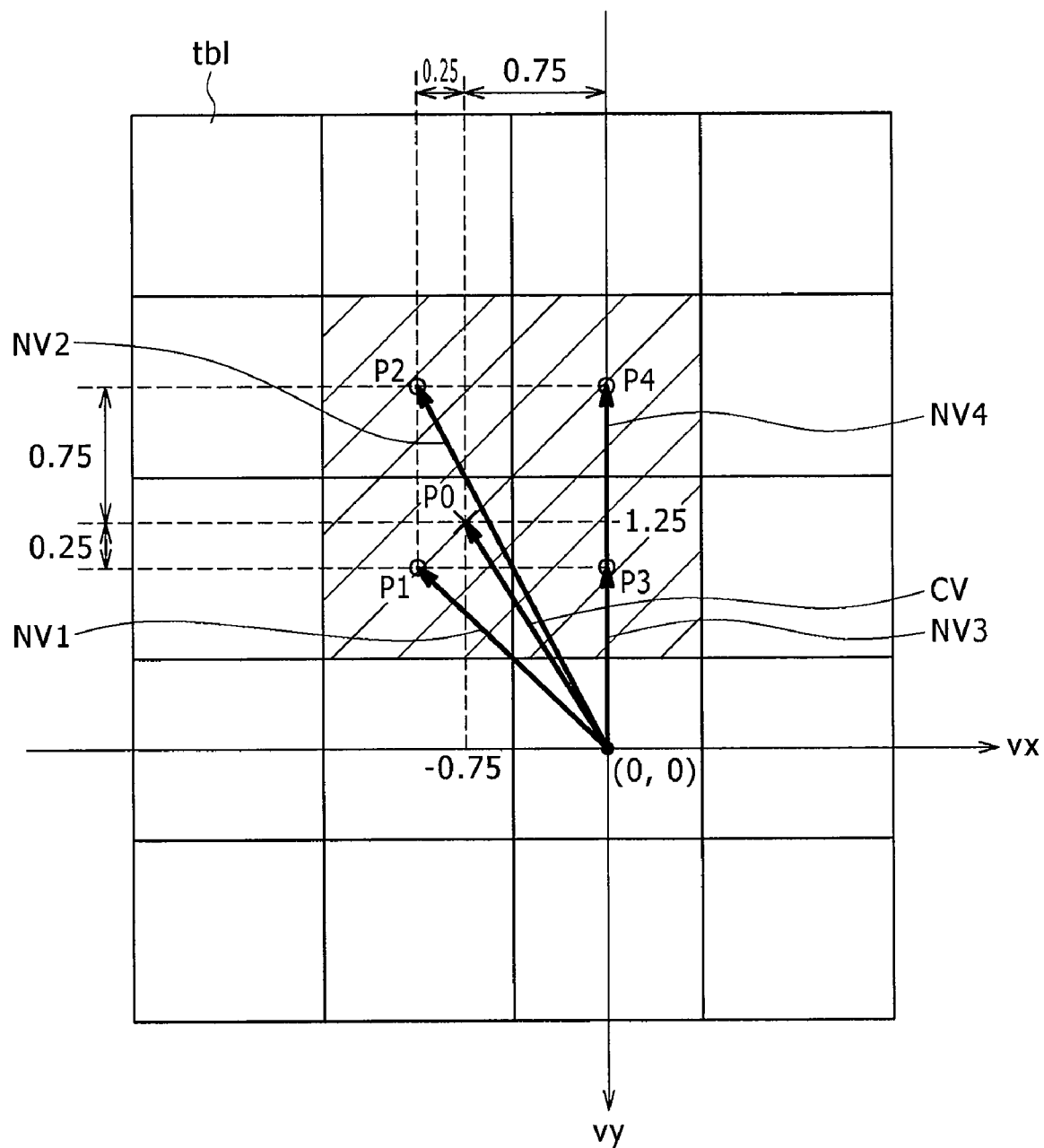
FIG. 8 is an explanatory diagram to be referred to in describing an outline of a process to detect a movement vector in accordance with an embodiment.

FIGS. 6 to 8 are each an explanatory diagram to be referred to in description of an outline of a new block-matching technique adopted by this embodiment. FIG. 6 is a diagram showing a relation between the conventional SAD table TBLo and the shrunk SAD table TBLs generated in the new block-matching technique adopted by this embodiment.

Also in the case of this embodiment, much like the conventional method explained earlier by referring to FIG. 3, a search range is set in the reference frame as a range centered at the center position of the target-block projected image block 104 corresponding to the target block 103 in the original frame, which is the target frame 101. Then, in the search range, a plurality of reference blocks 106 described earlier are set and a SAD value between the luminance values of pixels in each of the reference blocks 106 and the luminance values of the corresponding pixels in the target block 103 is computed. As described before, the SAD value is a sum of the absolute values of differences in luminance value between all pixels in the reference block 106 and all corresponding pixels in the target block 103.

In accordance with the traditional block-matching method, as shown in FIG. 6, a computed SAD value is stored in the SAD table TBLo as a table element tbl located at an address pointed to by a reference vector RV of a reference block, for which the SAD value has been computed.

Thus, in the case of the traditional block-matching technique, a reference vector RV representing the magnitude of a shift from the target block on the target frame to a reference block on a reference frame is associated with a SAD value stored as a table element tbl for the reference block in the SAD table TBLo on a one-on-one basis. That is to say, the number of table elements composing the traditional SAD table TBLo is equal to the number of reference vectors RV that can be set in the search range.

In the case of the block-matching technique according to this embodiment, on the other hand, as shown in FIGS. 6, 7A and 7B, each reference vector RV pointing to a reference block being processed is contracted at a contraction factor of 1/n, where notation n denotes an integer, into a contracted reference vector CV as described earlier.

In the following description, in order to make the explanation easy to understand, the horizontal-direction contraction factor is assumed to be equal to the vertical-direction contraction factor. However, the horizontal-direction contraction factor and the vertical-direction contraction factor can also be set independently of each other at values different from each other. In addition, as will be described later, the horizontal-direction contraction factor and the vertical-direction contraction factor are rather set independently of each other at any arbitrary fractions (such as 1/m and 1/n, where notations m and n each denote an integer) in order to provide a higher degree of flexibility as well as a higher degree of convenience.

Also in the case of this embodiment, much like the traditional image-processing method, the position of the target-block projected image block corresponding to the target block is taken as the origin position (0, 0) at the center of the search range. The horizontal-direction and vertical-direction components (vx, vy) of a reference vector RV are each an integer representing horizontal-direction and vertical-direction magnitudes measured from the origin position (0, 0). In the following description, a reference vector RV having horizontal-direction and vertical-direction components (vx, vy) is referred to as a reference vector RV (vx, vy).

A reference vector RV (vx, vy) is contracted at a contraction factor of 1/n into a contracted reference vector CV (vx/n, vy/n). Thus, even though the horizontal-direction and vertical-direction components (vx, vy) of the pre-contraction original reference vector RV (vx, vy) are each an integer, the horizontal-direction and vertical-direction components (vx/n, vy/n) of the contracted reference vector CV (vx/n, vy/n) are not necessarily integers. That is to say, they may each be a value including a fraction part in some cases. Thus, if a SAD value computed for a pre-contraction original reference vector RV is merely stored as an element included in the contracted SAD table as an element associated with a contracted reference vector having integer vx/n and vy/n values closest to the non-integer vx/n and vy/n values of the contracted reference vector CV in this embodiment, an error will be generated.

In this embodiment, a plurality of positions (table elements) pointed by neighborhood reference vectors of a contracted reference vector CV (vx/n, vy/n) is defined. Then, the SAD value computed for the reference block pointed by the reference vector RV is split into as many component SAD values as neighborhood reference vectors located in the neighborhood of the contracted reference vector CV. Then, each of the component SAD values is stored cumulatively in the shrunk correlation-value table as a table element associated with one of the neighborhood reference vectors.

In this case, a contracted reference vector CV (vx/n, vy/n) is not associated with a table element of the shrunk correlation-value table. However, neighborhood reference vectors are associated with table elements of the the shrunk correlation-value table on a one-on-one basis. Thus, in this embodiment, a component SAD value computed based on the distances between a position pointed to by a contracted reference vector CV and positions pointed to by neighborhood reference vectors NV located in the neighborhood of the contracted reference vector CV for a neighborhood reference vector is stored in the table element associated with the neighborhood reference vector cumulatively. To be more specific, the SAD value is stored in the table element by cumulatively adding the value to an already stored SAD value computed for another pre-contraction original reference vector.

Each of the table elements included in the shrunk correlation-value table as elements each associated with a contracted reference vector CV is also associated with another contracted reference vector CV. Thus, each of the table elements is associated with a plurality of contracted reference vectors CV and used for storing the sum of component SAD values obtained by splitting SAD values found for reference vectors RV, which are contracted into the contracted reference vectors CV respectively. The sum of component SAD values is stored in a table element by cumulatively adding the component SAD values.

It is to be noted that, if the values (vx/n, vy/n) of a contracted reference vector CV (vx/n, vy/n) are each an integer, the contracted reference vector CV (vx/n, vy/n) itself is associated with an element of the shrunk correlation-value table on a one-on-one basis. Thus, in the table element associated with the contracted reference vector CV (vx/n, vy/n), the SAD value corresponding to the reference vector RV (vx, vy) itself can be stored. In addition, in the case of such a contracted reference vector CV (vx/n, vy/n), it is not necessary to determine a plurality of neighborhood reference vectors for the contracted reference vector CV (vx/n, vy/n).

Next, the processing described above is explained by giving an example as follows. As described before, the target-block projected image block corresponding to the target block is placed at the origin position (0, 0). In this case, let us assume that a reference vector RV (−3, −5) shown in FIG. 7A is contracted in both the horizontal and vertical directions at a contraction factor of $1/n(=1/4)$ to result in a contracted reference vector CV (−0.75, −1.25) shown in FIG. 2B.

The values of the position pointed by the contracted reference vector CV each include a fraction part, indicating that the position is different from the position pointed by the reference vector.

In an example shown in FIG. 8, a plurality of such neighborhood reference vectors are selected that the values of each of the neighborhood reference vectors are integers closest to the values of the contracted reference vector. As shown in FIG. 8, four neighborhood reference vectors NV1 (−1, −1), NV2 (−1, −2), NV3 (0, −1) and NV4 (0, −2) are determined for the above contracted reference vector CV (−0.75, −1.25).

In the example shown in FIG. 8, the four neighborhood reference vectors NV1, NV2, NV3 and NV4 are vectors pointing from the origin point (0, 0) to positions P1, P2, P3 and P4 respectively, which are each shown as a circle. On the other hand, the contracted reference vector CV is a vector pointing from the origin point (0, 0) to a point P0 shown as notation X.

Then, in the case of this embodiment, component correlation values for the four neighborhood reference vectors NV1, NV2, NV3 and NV4 are computed by application of the linear weighted distribution technique to a correlation value found for the reference vector RV serving as the origin of the contracted reference vector CV. Then, the component correlation value for the neighborhood reference vector NV1 is stored cumulatively in a table element included in the shrunk correlation-value table as an element associated with the neighborhood reference vector NV1. By the same token, the component correlation values for the neighborhood reference vectors NV2, NV3 and NV4 are stored cumulatively in table elements included in the shrunk correlation-value table as elements associated with the neighborhood reference vectors NV2, NV3 and NV4 respectively.

For example, weights to be used in a process to find the component correlation values for the neighborhood reference vectors NV1, NV2, NV3 and NV4 are determined as follows. As described above, the contracted reference vector CV points to the point P0 whereas the neighborhood reference vectors NV1, NV2, NV3 and NV4 point to the positions P1, P2, P3 and P4 respectively. Thus, (the distance between the positions P0 and P1):(the distance between the positions P0 and P2):(the distance between the positions P0 and P3):(the distance between the positions P0 and P4)=1:3:3:9.

Let us assume that the correlation value computed for the pre-contraction original reference vector RV serving as the origin of the contracted reference vector CV is S$\alpha$. In this case, component correlation values SADp1, SADp2, SADp3, SADp4 for the neighborhood reference vectors NV1, NV2, NV3 and NV4 pointing to the positions P1, P3, P3 and P4 respectively are found as follows:

$SADp1 = S\alpha \times 9/16$ $SADp2 = S\alpha \times 3/16$ $SADp3 = S\alpha \times 3/16$ $SADp4 = S\alpha \times 1/16$ Final component correlation values of the component correlation values SADp1, SADp2, SADp3 and SADp4 for the four neighborhood reference vectors NV1, NV2, NV3 and NV4 are computed by cumulatively adding currently calculated values to their respective temporary sums and stored in table elements included in the SAD table as elements provided for the four neighborhood reference vectors NV1, NV2, NV3 and NV4 pointing to the positions P0, P1, P2, P3 and P4 respectively.

In this embodiment, the above processes are carried out for all reference vectors each pointing to a reference block set in the search range.

As is obvious from the descriptions given so far, in this embodiment, the process to contract each reference vector RV into a contracted reference vector CV is carried out at a contraction factor of 1/n to accompany a process of contracting the SAD table TBLo, which has the original size and includes elements associated with reference vectors RVs on a one-on-one basis, at the same contraction factor of 1/n in both the horizontal and vertical directions to in order generate a shrunk SAD table TBLs with a shrunk size. Then, a component SAD value is computed for each element of the shrunk SAD table TBLs by splitting a SAD value computed for a reference block pointed to by a reference vector RV serving as the origin of a contracted reference vector CV associated with the element. For more information, the reader is suggested to refer to FIG. 6.

Thus, in the case of this embodiment, the number of elements composing the shrunk SAD table TBLs is $(1/n^2)$ times the number of elements composing the original correlation-value table TBLo. That is to say, the size of the correlation-value table can be reduced substantially.

In accordance with the above description of the embodiment, for each element of the shrunk SAD table TBLs, four neighborhood reference vectors NVs in the neighborhood of a contracted reference vector CV are selected and, then, component correlation values for the selected neighborhood reference vectors NVs are found from a correlation value computed for a processed reference block pointed to by a reference vector RV serving as the origin of the contracted reference vector CV. A component correlation value for a neighborhood reference vector NV located in the neighborhood of a contracted reference vector CV is found in a process based on the so-called linear weighted distribution technique to split a correlation value computed for the a reference block pointed to by the reference vector RV serving as the origin of the contracted reference vector CV. It is to be noted, however, that the method of selecting neighborhood reference vectors NV in the neighborhood of a contracted reference vector CV and the linear weighted distribution technique of finding a component correlation value for every element of the shrunk SAD table TBLs are by no means limited to those adopted by the embodiment.

For example, as an alternative, for each element of the shrunk SAD table TBLs, 9 or 16 neighborhood reference vectors NVs in the neighborhood of a contracted reference vector CV are selected, then, component correlation values for the selected neighborhood reference vectors NVs are found from a correlation value computed for a processed reference block pointed to by a reference vector RV serving as the origin of the contracted reference vector CV. In this case, however, a component correlation value for a neighborhood reference vector NV located in the neighborhood of a contracted reference vector CV is found in a process based on the so-called cubic interpolation technique to split a correlation value computed for the a reference block pointed to by the reference vector RV serving as the origin of the contracted reference vector CV By carrying out these processes, the precision of the component correlation value is improved. If a stronger emphasis is to be laid upon a real-time requirement and reduction of the processing-circuit count, however, the process of finding component correlation values of only four neighborhood reference vectors NV is more effective.

Also in the case of this embodiment, a component correlation value is stored as an element of the shrunk SAD table, which is a shrunk SAD table, in a cumulative addition process carried out in the same way as the traditional block-matching technique whereby a correlation value is stored as an element of the original correlation-value table for each of locations included in the search range as locations to which the reference block is to be moved.

However, in the case of the traditional block-matching technique, reference vectors are associated with the addresses of the elements composing the correlation-value table on a one-on-one basis so that a correlation value is computed for each reference block corresponding to a reference vector and merely stored in the correlation-value table as an element associated with the reference vector. In the case of the technique according to this embodiment, on the other hand, reference vectors are associated with the addresses of the elements composing the shrunk SAD table (or the contracted SAD table) not on a one-on-one basis. Thus, a correlation value computed for a reference block is spilt into a plurality of component reference values, which are each then cumulatively stored in the shrunk SAD table as an element corresponding to one of neighborhood reference vectors associated with the component reference values. Much like every element of the correlation-value table, the memory locations each used for storing a computed component reference value are each also initialized to 0 at an initial time.

In the case of the traditional block-matching technique as described before, the correlation-value table is searched for a table element used for storing a minimum SAD value. Then, a reference vector pointing to address of the table element used for storing the minimum SAD value is taken as a movement vector representing a movement from the position of the target frame to the position of the reference frame.

In the case of the embodiment, on the other hand, a correlation value stored in the shrunk SAD table according to the embodiment as an element of the shrunk SAD table is a component correlation value, which is also a SAD value. Then, the shrunk SAD table is searched for a table element used for storing a minimum SAD value indicating the strongest correlation between the target block on the target frame and a plurality of reference blocks included in the reference frame as blocks pointed to by their respective neighborhood reference vectors, from which a movement vector must be identified because a neighborhood reference vector itself cannot be identified as a movement vector as it is due to the fact that each of the neighborhood reference vectors may not necessarily be an accurate movement vector.

As a most reasonable technique to identify a movement vector from neighborhood reference vectors each associated with a table element of the shrunk SAD table, the shrunk SAD table is restored to the original correlation-value table by multiplying the size of the shrunk SAD table by an integer n (which is the reciprocal of the contraction factor of 1/n) and, then, an element included in the original correlation-value table as an element corresponding to the detected element of the shrunk SAD table is identified. Finally, a movement vector pointing to the selected element of the original correlation-value table is determined. However, this technique can be adopted only for an image processing apparatus tolerating errors to a certain degree.

In order to detect a movement vector with a higher degree of accuracy, however, it is necessary to carry out one of typical interpolation processes described below on element values stored in the shrunk SAD table. By carrying out one of the typical interpolation processes, an accurate movement vector can be detected with the original degree of precision.

[First Typical Interpolation Process to Detect a Movement Vector with a Higher Degree of Accuracy]

A first typical interpolation process to detect a movement vector with a higher degree of accuracy adopts a technique whereby a plurality of correlation values stored in elements of the shrunk SAD table are approximately represented by a quadratic surface. This technique is a technique obtained by applying the method described in Patent Document 1 cited before to a shrunk SAD table.

In this embodiment, since a SAD value is used as a correlation value, the smaller the correlation value, the stronger the correlation indicated by the correlation value. Thus, in this embodiment, the shrunk correlation-value table is searched for a specific table element used for storing a minimum correlation value indicating the strongest correlation between the target block on the target frame and a plurality of reference blocks included in the reference frame as blocks pointed to by their respective neighborhood reference vectors. A table element of the shrunk correlation-value table can be searched for at table-address precision, which is the precision of the integer level. In addition, a plurality of neighborhood table elements in a table area centered at the specific table element already detected at the precision of the integer level as an area in the shrunk correlation-value table are also each identified also at the precision of the integer level. Then, by adoption of the method of least squares, a quadratic surface is found as a surface representing the correlation values stored in the shrunk correlation-value table as the specific table element and the neighborhood table elements detected in the table area. Subsequently, the minimum value of the quadratic surface representing the correlation values is determined and the position of the correlation value determined as the minimum value is identified as a position shifted from the origin position (0, 0). The identified position of a correlation value determined as the minimum value corresponds to a location included in the search area on the reference frame as the location of a reference block exhibiting the strongest correlation with the target block. The identified position is a position included in the contracted correlation-value table (or the contracted SAD table) as a position at an address having precision of the fraction level. Finally, a contracted reference vector pointing to the identified position is detected as a vector pointing to the position identified at the precision of the fraction level.

Figure 9A:
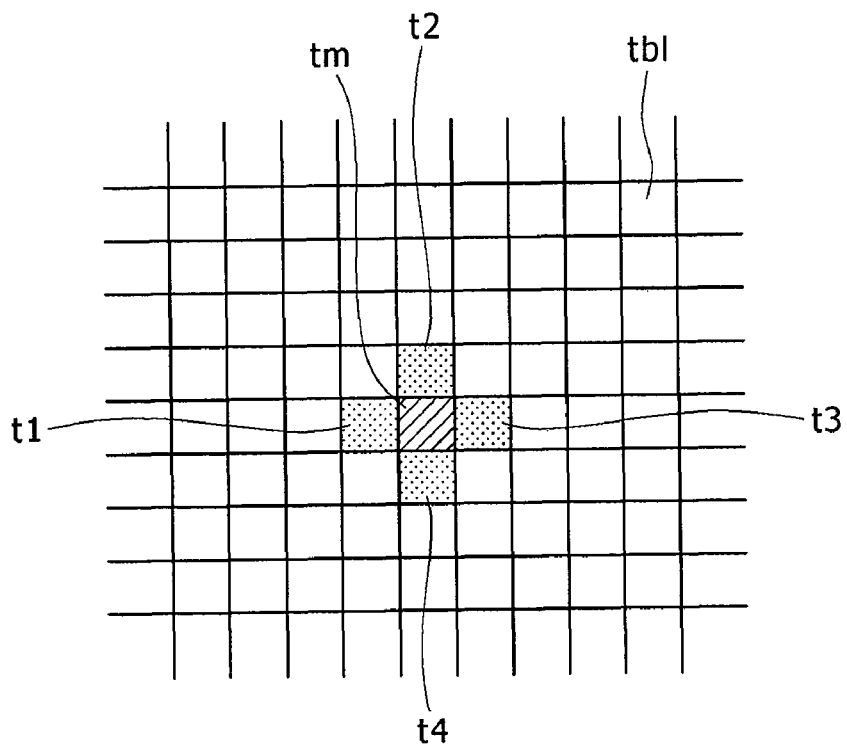
FIGS. 9A and 9B are each an explanatory diagram to be referred to in describing a process to detect an accurate movement vector in accordance with a first typical implementation of the image processing method according to the embodiment.
Figure 9B:
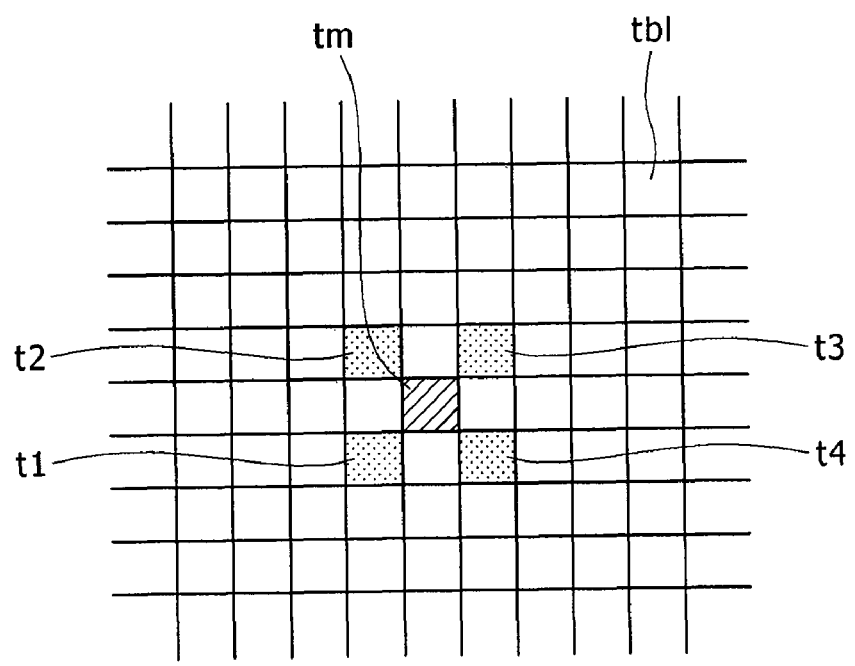

An example of the process to set a quadratic surface is shown in FIG. 9A or 9B. In either of the examples, notation tm denotes the specific table element in the shrunk correlation-value table as an element, which is identified at the precision of the integer level as a table element representing the minimum correlation value. On the other hand, notations t1, t2, t3 and t4 each denote a table element also identified at the precision of the integer level in the table area centered at the specific table element tm. At least four table elements sandwiching the specific table element tm in two directions are required.

Figure 10:
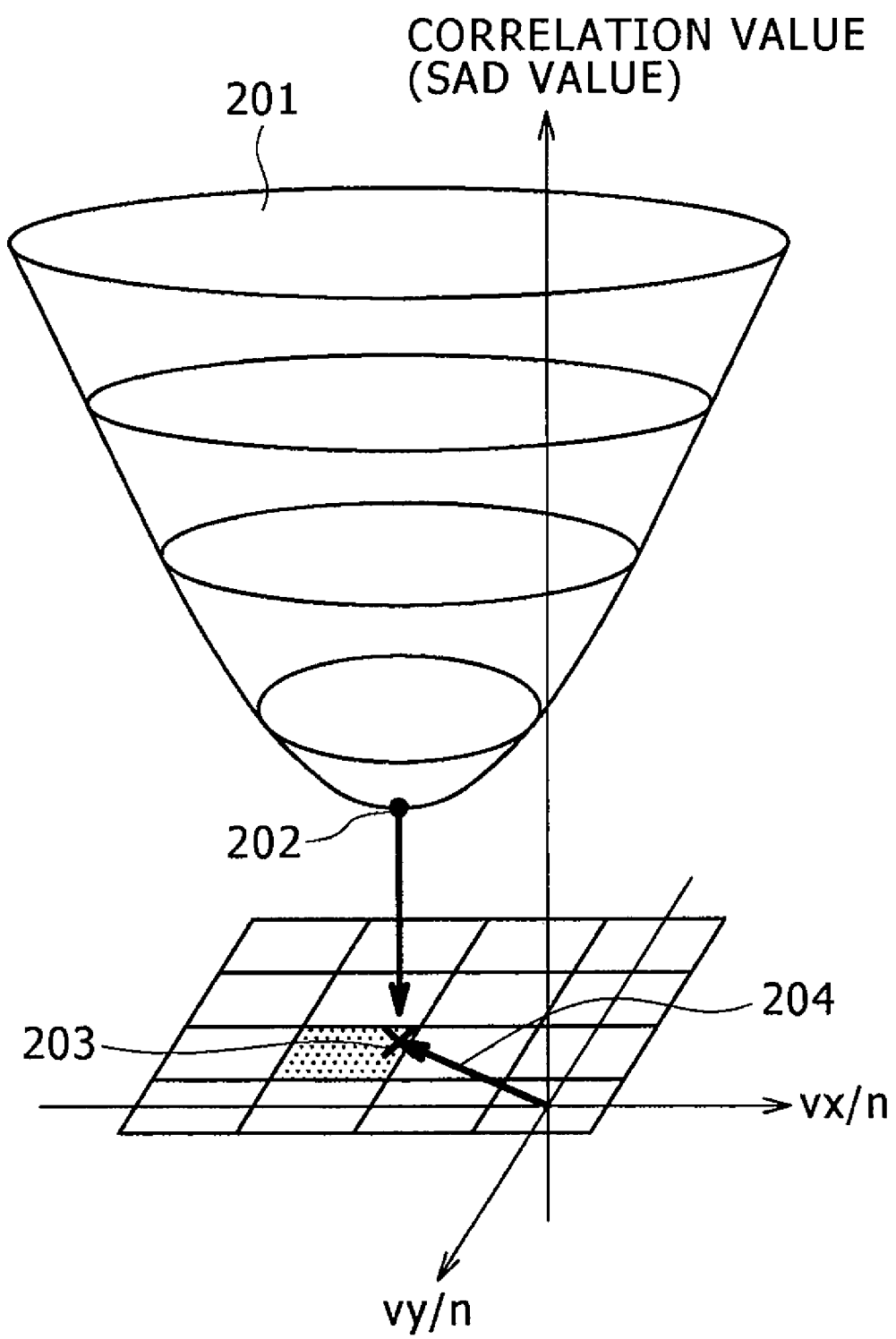
FIG. 10 is an explanatory diagram to be referred to in describing a process to detect an accurate movement vector in accordance with the first typical implementation of the image processing method according to the embodiment.

Then, as shown in FIG. 10, a coordinate space is assumed in the range of contracted reference vectors (or the range of the shrunk correlation-value table). The range of contracted reference vectors corresponds to the search range of the reference frame. The position of the target frame (or, strictly speaking, the position of the target-block projected image block 104 shown in FIG. 3) is taken as the origin position (0, 0, 0) of the coordinate space, which has the following three axes. The vertical Z axis (or the correlation-value axis) is taken as an axis representing the correlation value, which decreases in inverse proportion to the correlation between the reference and target blocks. In this embodiment, the correlation value is a SAD value. The horizontal X axis (or a vx/n axis) is taken as an axis representing the shift of the reference block from the target block in the X direction or an axis representing the value vx/n of the contracted reference vector. By the same token, the horizontal Y axis (or a vy/n axis) is taken as an axis representing the shift of the reference block from the target block in the Y direction perpendicular to the X direction or an axis representing the value vy/n of the contracted reference vector. The vertical Z axis is perpendicular to a plane on which the horizontal X and Y axes are laid.

Then, from the correlation value of the minimum-value table element tm identified at the precision of the integer level as well as the correlation values of the two table elements t1 and t3 identified also at the precision of the integer level as table elements sandwiching the minimum-value table element tm in a specific direction, a quadratic curve is created in the coordinate space shown in FIG. 10. By the same token, from the correlation value of the minimum-value table element tm as well as the correlation values of the two table elements t2 and t4 identified also at the precision of the integer level as table elements sandwiching the minimum-value table element tm in another direction perpendicular to the specific direction, another quadratic curve is created in the coordinate space. Then, an approximation quadratic surface 201 including these two quadratic curves is found in the coordinate space shown in FIG. 10 by adopting the method of least squares.

Figure 11:
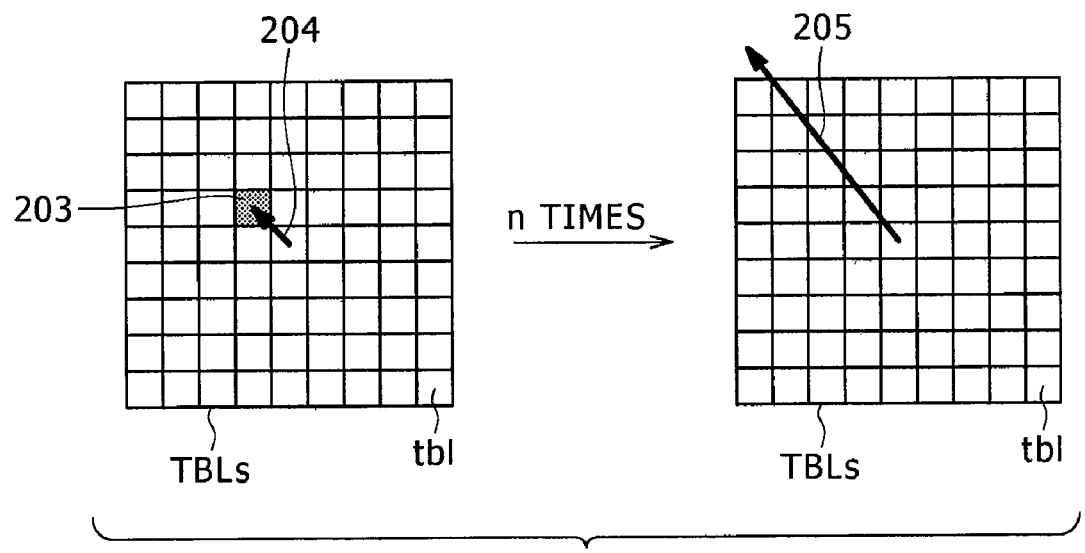
FIG. 11 is an explanatory diagram to be referred to in describing an outline of a process to detect a movement vector in accordance with an embodiment.

Subsequently, a minimum-value point 202 of the approximation quadratic surface 201 is detected at a position 203 existing on the X-Y plane as a position with coordinates of (vx/n, vy/n) as shown in FIG. 10. The position (vx/n, vy/n) is a position identified at the precision of the fraction level as the position of a table element (or a table-element address) with the smallest correlation value in the shrunk correlation-value table. Finally, a minimum-value vector 204 pointing to the position (vx/n, vy/n) identified at the precision of the fraction level is determined, and the movement vector 205 with the original magnitude and the original direction is computed by multiplying the minimum-value vector 204 by the reciprocal value n of the contraction factor as shown in FIG. 11.

Figure 12:
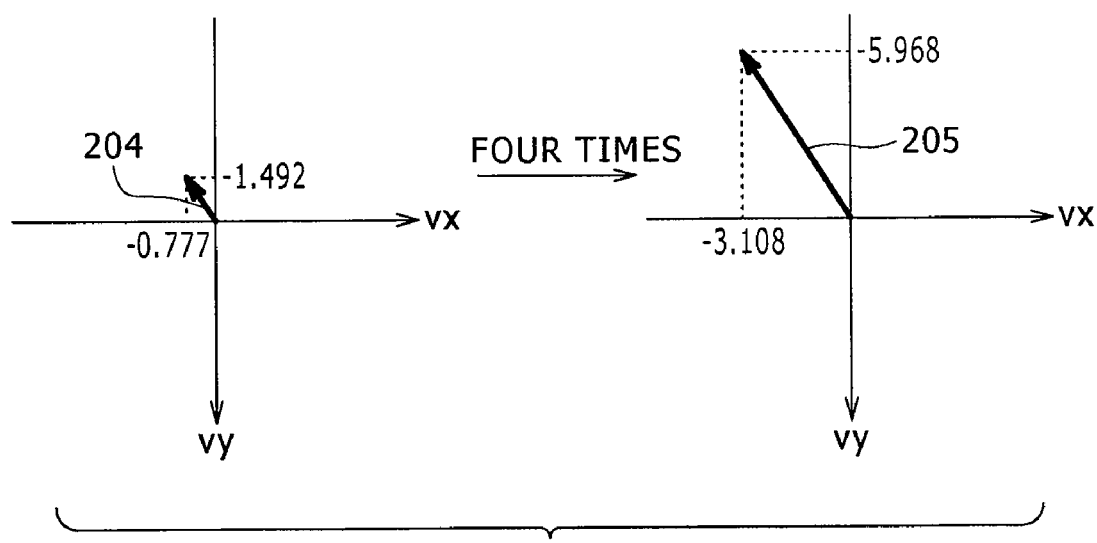
FIG. 12 is an explanatory diagram to be referred to in describing an outline of a process to detect a movement vector in accordance with an embodiment.

For example, a shrunk correlation-value table TBLs shown in FIG. 12 is obtained by shrinking the original correlation-value table to accompany a process of contracting reference vectors at a contraction factor of ¼, and a movement vector (−0.777, −1.492) denoted by reference numeral 204 is found from the address of the minimum-value table element identified at the precision of the fraction level. In this case, the minimum-value vector 204 is multiplied by 4 to obtain the original movement vector (−3.108, −5.968) denoted by reference numeral 205. The movement vector 205 is a movement vector at the scale of the original image.

In accordance with the present application described above, the shrunk correlation-value table is searched for a specific table element tm used for storing a minimum correlation value indicating the strongest correlation and four neighborhood table elements in a table area centered at the specific table element tm. In order to set an approximation quadratic surface of correlation values, however, it is better to find a larger number of neighborhood table elements in such a table area. For this reason, in general, neighborhood table elements in a rectangular table area centered at the specific table element tm detected at the precision of the integer level as an area including m×m table elements (where notation m denotes an integer at least equal to 3) in the horizontal and vertical directions are found.

However, a larger number of neighborhood table elements is not necessarily better. This is because neighborhood table elements in such a large table area leads to an increased amount of processing. In addition, if the number of neighborhood table elements is increased, it will be more likely within the bounds of possibility that a false local minimum value dependent on the image pattern is inevitably detected. Thus, table elements in a rectangular table area including a proper number of neighborhood table elements are selected.

The following description explains two examples of the rectangular table area included in the shrunk correlation-value table as an area containing a proper number of neighborhood table elements. One of the examples according to this embodiment is a rectangular table area centered at the minimum-value table element tm found at the precision of the integer level as an area containing 3×3 neighborhood table elements surrounding the minimum-value table element tm in the horizontal and vertical directions. The other example according to this embodiment is a rectangular table area centered at the minimum-value table element tm found at the precision of the integer level as an area containing 4×4 neighborhood table elements surrounding the minimum-value table element tm in the horizontal and vertical directions.

[Rectangular Table Area Including 3×3 Table Elements]

FIG. 13 is a diagram showing a technique to find a movement vector by making use of a rectangular table area centered at the minimum-value table element tm found at the precision of the integer level as an area including 3×3 neighborhood table elements surrounding the minimum-value table element tm in the horizontal and vertical directions. In FIG. 13A, the table area is shown as a gray block.

In accordance with the technique shown in FIGS. 13A and 13B, an approximation quadratic surface 201 shown in FIG. 13B is set by adopting the method of least squares on the basis of correlation values of the minimum-value table element tm found at the precision of the integer level and eight neighborhood table elements surrounding the minimum-value table element tm as shown in FIG. 13A. Subsequently, a minimum-value point 202 of the approximation quadratic surface 201 is detected at a position 203 existing on the X-Y plane as a position with coordinates of (vx/n, vy/n) as shown in FIG. 13B. The position (vx/n, vy/n) is a position identified at the precision of the fraction level as the position corresponding to a table element (or a table-element address) with the smallest correlation value in the shrunk correlation-value table.

Finally, a minimum-value vector 204 pointing to the position 203 identified at the precision of the fraction level as a position of the table element is determined, and the movement vector 205 (or the minimum-value vector) with the original magnitude and the original direction is computed by multiplying the minimum-value vector 204 by the reciprocal value n of the contraction factor as shown in FIG. 11.

Figures 14, 15:
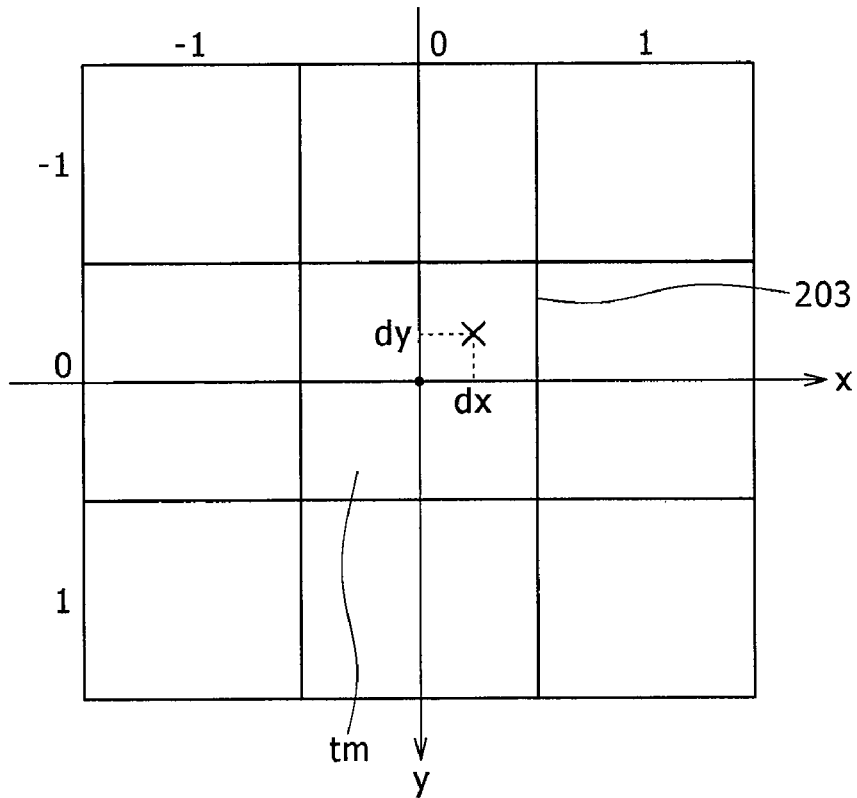
FIG. 14 is an explanatory diagram to be referred to in describing a process to detect an accurate movement vector in accordance with the first typical implementation of the movement-vector detection method according to the embodiment.
FIG. 15 is an explanatory diagram to be referred to in describing a process to detect an accurate movement vector in accordance with the first typical implementation of the movement-vector detection method according to the embodiment.

A process to find the position 203 corresponding to the minimum-value point 202 on the approximation quadratic surface 201 is carried out by adoption of a method described as follows. As shown in FIG. 14, a coordinate (x, y) system is devised as a system in which the position of the center of the minimum-value table element tm found at the precision of the integer level is taken as the origin point (0, 0). In this case, eight neighborhood table elements surrounding the minimum-value table element tm found at the precision of the integer level are located at positions with x-axis coordinates represented by x=−1, x=0 and x=+1 in the horizontal direction and y-axis coordinates represented by y=−1, y=0 and y=+1 in the vertical direction except the position at a coordinate of (x=0 and y=0). That is to say, the 8 neighborhood table elements surrounding the minimum-value table element tm found at the precision of the integer level are located at coordinates of (−1, −1), (0, −1), (1, −1), (−1, 0), (0, 1), (−1, 1), (0, 1) and (1, 1).

Let us have notation Sxy denote the correlation value of a table element in the coordinate system shown in FIG. 14. For example, the correlation value of the minimum-value table element tm found at the origin position (0, 0) at the precision of the integer level is denoted by symbol $S_{00}$ whereas the correlation value of the neighborhood table element at the position (1, 1) on the right side of the minimum-value table element tm and below the minimum-value table element tm is denoted by symbol $S_{11}$.

Thus, the coordinates (dx, dy) of the position 203 observed in the (x, y) coordinate system at the precision of the fraction level with the minimum-value table element tm found at the origin position (0, 0) of the (x, y) coordinate system at the precision of the integer level can be found in accordance with Eqs. (A) and (B) shown in FIG. 15.

In Eqs. (A) and (B) shown in FIG. 15, the values of Kx and Ky are given as follows:

For x=−1, Kx=−1;
for x=0, Kx=0;
for x=1, Kx=1;
for y=−1, Ky=−1;
for y=0, Ky=0; and
for y=1, Ky=1.

Since the coordinates of (dx, dy) are the coordinates of a position observed in the (x, y) coordinate system at the precision of the fraction level with the minimum-value table element tm found at the origin position (0, 0) of the (x, y) coordinate system at the precision of the integer level, from the position (dx, dy) observed in the (x, y) coordinate system at the precision of the fraction level and the position of the minimum-value table element tm found at the origin position (0, 0) of the (x, y) coordinate system at the precision of the integer level, the position 203 can be detected as a position separated away from the center of the identified minimum-value table element tm.

[Rectangular Table Area Including 4×4 Table Elements]

Figure 16B:
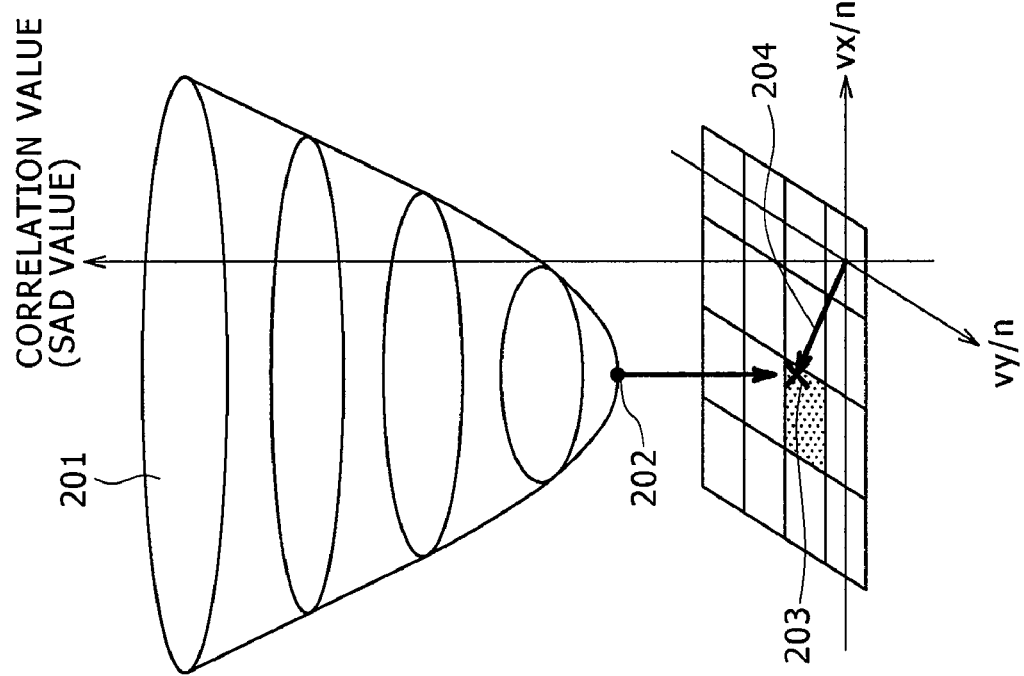
FIGS. 16A and 16B are each an explanatory diagram to be referred to in describing a process to detect an accurate movement vector in accordance with the first typical implementation of the movement-vector detection method according to the embodiment.
Figure 16A:
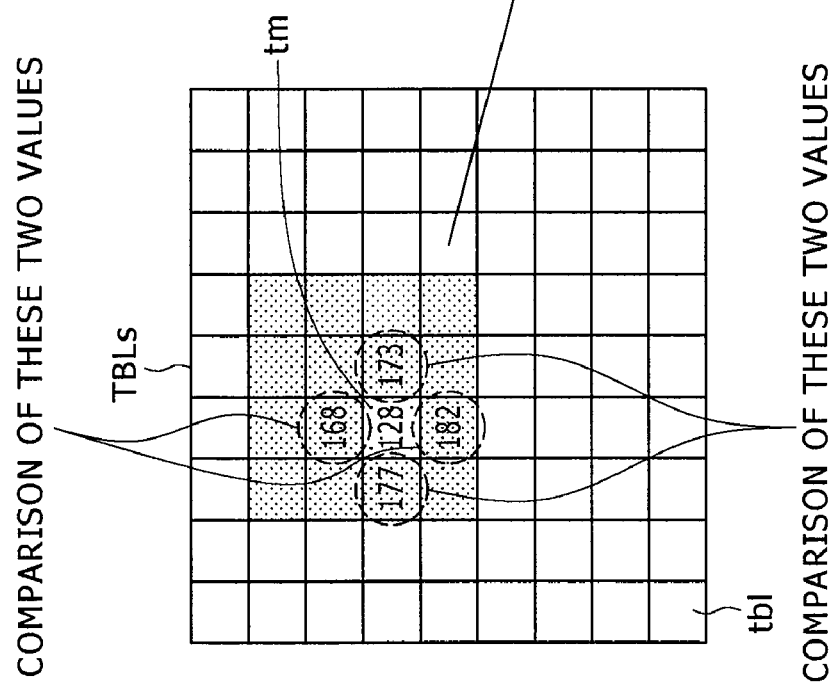

FIG. 16 is a diagram showing a technique to find a movement vector by making use of a rectangular table area centered at the minimum-value table element tm found at the precision of the integer level as an area including 4×4 neighborhood table elements surrounding the minimum-value table element tm in the horizontal and vertical directions. In FIG. 16A, the table area is shown as a screening block.

In the case of an m×m table area (including m×m neighborhood table elements where m is an odd integer) such as a table area including 9(=3×3) neighborhood table elements described above and a table area including 25=(5×5) neighborhood table elements, the minimum-value table element tm found at the precision of the integer level is always located as the center table element of the neighborhood table elements. Thus, the rectangular table area used for determining a movement vector can be set with ease.

In the case of an m×m table area (including m×m neighborhood table elements where m is an even integer) such as a table area including 4×4 table elements consisting of the minimum-value table element tm found at the precision of the integer level and the 15 neighborhood table elements, on the other hand, the minimum-value table element tm is located not as the center table element of the neighborhood table elements. Thus, the rectangular table area used for determining a movement vector cannot be set with ease so that some devised endeavors described below must be made.

In this case, the correlation values (which are each a final component SAD value in this embodiment) of neighborhood table elements including the minimum-value table element tm found at the precision of the integer level on the same row of the shrunk correlation-value table as the minimum-value table element tm are compared with each other and, as a result of the comparison, such a rectangular table area is set that the minimum-value table element tm serves as the second table element of the row while the table element having the smallest correlation value among four adjacent neighborhood table elements including the minimum-value table element tm serves as the fourth neighborhood table element of the row. By the same token, the correlation values of neighborhood table elements including the minimum-value table element tm found at the precision of the integer level on the same column of the shrunk correlation-value table as the minimum-value table element tm are compared with each other and, as a result of the comparison, such a rectangular table area is set that the minimum-value table element tm serves as the second table element of the column while and the table element having the smallest correlation value among four adjacent neighborhood table elements including the minimum-value table element tm serves as the fourth neighborhood table element of the column.

In the example shown in FIG. 16A, the minimum-value table element tm found at the precision of the integer level is sandwiched by two adjacent neighborhood table elements having correlation values of 177 and 173 respectively on the same row. In this case, the minimum-value table element tm is taken as the second table element of the row while a neighborhood table element on the right side of the neighborhood table element having the smaller correlation value of 173 is taken as the fourth neighborhood table element of the row. By the same token, the minimum-value table element tm found at the precision of the integer level is sandwiched by the two adjacent neighborhood table elements having SAD values of 168 and 182 respectively on the same column. In this case, the minimum-value table element tm is taken as the second table element of the column while a neighborhood table element above the neighborhood table element having the smaller correlation value of 168 is taken as the fourth neighborhood table element of the column.

Then, in the example shown in FIGS. 16A and 16B, an approximation quadratic surface 201 shown in FIG. 16B is set by adopting the method of least squares on the basis of correlation values of the minimum-value table element tm found at the precision of the integer level and 15 neighborhood table elements surrounding the minimum-value table element tm as shown in FIG. 16A. Subsequently, a minimum-value point 202 of the approximation quadratic surface 201 is detected at a position 203 existing on the X-Y plane as a position with coordinates of (vx/n, vy/n) as shown in FIG. 16B. The position (vx/n, vy/n) is a position identified at the precision of the fraction level as the position corresponding to a table element (or a table-element address) with the smallest correlation value in the shrunk correlation-value table.

Finally, a minimum-value vector 204 pointing to the position 203 identified at the precision of the fraction level as a position of the table element is determined, and the movement vector 205 (or the minimum-value vector) with the original magnitude and the original direction is computed by multiplying the minimum-value vector 204 by the reciprocal value n of the contraction factor as shown in FIG. 11.

A process to find the position 203 corresponding to the minimum-value point 202 on the approximation quadratic surface 201 is carried out by adoption of a method described as follows. As shown in FIG. 17, a coordinate (x, y) system is devised as a system in which the position of the center of the minimum-value table element tm found at the precision of the integer level is taken as the origin point (0, 0).

In the case of the example shown in FIGS. 17A, 17B, 17C and 17D, there are four rectangular table areas including the 16 table elements laid out in different ways resulting in different positions of the minimum-value table element tm found at the precision of the integer level. The position of the minimum-value table element tm found at the precision of the integer level in the rectangular table area depends on whether the aforementioned fourth table element of the row including the minimum-value table element tm is a neighborhood table element on the right side or the left side of the minimum-value table element tm and whether the aforementioned fourth table element of the column including the minimum-value table element tm is a neighborhood table element above or below the minimum-value table element tm.

In this case, as is obvious from FIGS. 17A, 17B, 17C and 17D, while the position the minimum-value table element tm found at the precision of the integer level is fixed at the position (0, 0) in the coordinate system, the positions of the 15 neighborhood table elements located in the neighborhood of the minimum-value table element tm have x-axis coordinates represented by x=−2 or x=−1, x=0, and x=+1 or x=+2 in the horizontal direction and y-axis coordinates represented by y=−2 or y=−1, y=0 and y=+1 or y=+2 in the vertical direction.

Let us have notation Sxy denote the correlation value of a table element in the coordinate system shown in FIG. 17. For example, the correlation value of the minimum-value table element tm found at the origin position (0, 0) at the precision of the integer level is denoted by symbol $S_{00}$ whereas the correlation value of the table element at the position (1, 1) on the right side of the minimum-value table element tm and below the minimum-value table element tm is denoted by symbol $S_{11}$.

Thus, the coordinates (dx, dy) of the position 203 observed in the (x, y) coordinate system at the precision of the fraction level with the minimum-value table element tm found at the origin position (0, 0) of the (x, y) coordinate system at the precision of the integer level can be found in accordance with Eqs. (C) and (D) shown in FIG. 18. The origin position (0, 0) of the (x, y) coordinate system coincides with the center of a rectangular area covering 16 table elements including the minimum-value table element tm found at the origin position (0, 0) of the (x, y) coordinate system at the precision of the integer level.

In Eqs. (C) and (D) shown in FIG. 18, the values of Kx and Ky are the values represented by respectively the horizontal and vertical axes of a (Kx, Ky) coordinate system shown in FIG. 19 as a coordinate system placed over a rectangular table area, which includes the minimum-value table element tm found at the precision of the integer level and the 15 neighborhood table elements located in the neighborhood of the minimum-value table element tm, in such a way that the center of the rectangular area coincides with the origin point (0, 0) of the (Kx, Ky) coordinate system. The values of Kx and Ky are values dependent on four different layouts (A), (B), (C) and (D) shown in FIGS. 17A, 17B, 17C and 17D respectively as layouts of the table elements.

Figures 17A, 17B:
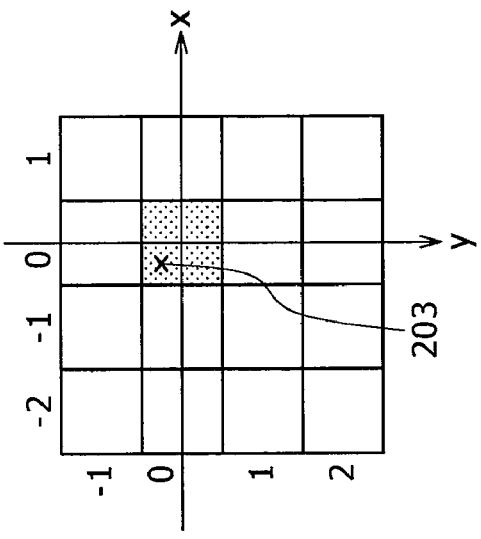
FIGS. 17A, 17B, 17C and 17D are each an explanatory diagram to be referred to in describing a process to detect an accurate movement vector in accordance with the first typical implementation of the movement-vector detection method according to the embodiment.
Figures 18, 19:
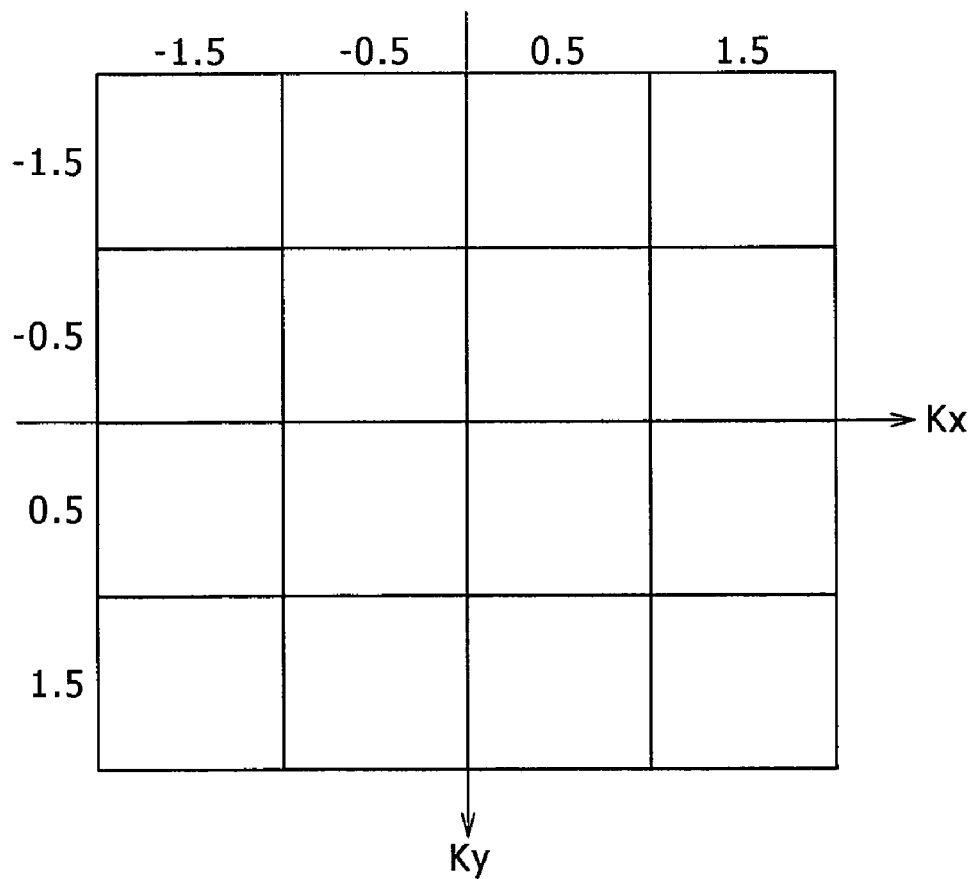
FIG. 18 is an explanatory diagram to be referred to in describing a process to detect an accurate movement vector in accordance with the first typical implementation of the movement-vector detection method according to the embodiment.
FIG. 19 is an explanatory diagram to be referred to in describing a process to detect an accurate movement vector in accordance with the first typical implementation of the movement-vector detection method according to the embodiment.

To put it in detail, in the case of the coordinate system shown in FIG. 17A, the coordinates Kx and Ky of the (Kx, Ky) coordinate system shown in FIG. 19 have the following values:

For x=−2, Kx=−1.5;
for x=−1, Kx=−0.5;
for x=0, Kx=0.5;
for x=1, Kx=1.5;
for y=−2, Ky=−1.5;
for y=−1, Ky=−0.5;
for y=0, Ky=0.5; and
for y=1, Kx=1.5.

In the case of the coordinate system shown in FIG. 17B, the coordinates Kx and Ky of the (Kx, Ky) coordinate system shown in FIG. 19 have the following values:

For x=−2, Kx=−1.5;
for x=−1, Kx=−0.5;
for x=0, Kx=0.5;
for x=1, Kx=1.5;
for y=−1, Ky=−1.5;
for y=0, Ky=−0.5;
for y=1, Kx=0.5; and
for y=2, Kx=1.5.

Figures 17C, 17D:
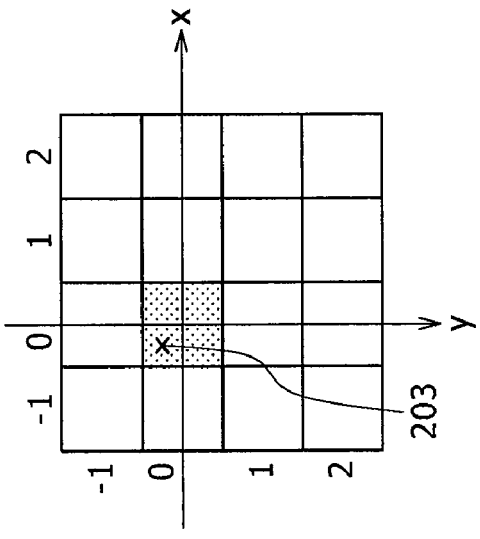

In the case of the coordinate system shown in FIG. 17C, the coordinates Kx and Ky of the (Kx, Ky) coordinate system shown in FIG. 19 have the following values:

For x=−1, Kx=−1.5;
for x=0, Kx=−0.5;
for x=1, Kx=0.5;
for x=2, Kx=1.5;
for y=−2, Ky=−1.5;
for y=−1, Ky=−0.5;
for y=0, Kx=0.5; and
for y=1, Kx=1.5.

In the case of the coordinate system shown in FIG. 17D, the coordinates Kx and Ky of the (Kx, Ky) coordinate system shown in FIG. 19 have the following values:

For x=−1, Kx=−1.5;
for x=0, Kx=−0.5;
for x=1, Kx=0.5;
for x=2, Kx=1.5;
for y=−1, Ky=−1.5;
for y=0, Ky=−0.5;
for y=1, Kx=0.5; and
for y=2, Kx=1.5.

Notation Δx used in Eqs. (C) shown in FIG. 18 is a shift of the coordinate x of the position of a table element in the (x, y) coordinate system shown in FIGS. 17A, 17B, 17C or 17D for the coordinate Kx in the (Kx, Ky) coordinate system shown in FIG. 19. By the same token, notation Δy used in Eqs. (D) shown in FIG. 18 is a shift of the coordinate y of the position of a table element in the (x, y) coordinate system shown in FIG. 17A, 17B, 17C or 17D for the coordinate Ky in the (Kx, Ky) coordinate system shown in FIG. 19. The shifts Δx and Δy have the following values:

In the case of FIG. 17A, Δx=−0.5 and Δy=−0.5;
in the case of FIG. 17B, Δx=−0.5 and Δy=0.5;
in the case of FIG. 17C, Δx=0.5 and Δy=−0.5; and
in the case of FIG. 17D, Δx=0.5 and Δy=0.5.

Since the coordinates (dx, dy) are the coordinates of a position observed in the (x, y) coordinate system at the precision of the fraction level with the minimum-value table element tm found at the origin position (0, 0) of the (x, y) coordinate system at the precision of the integer level, from the position (dx, dy) observed in the (x, y) coordinate system at the precision of the fraction level and the position of the minimum-value table element tm found at the origin position (0, 0) of the (x, y) coordinate system at the precision of the integer level, the position 203 can be detected as a position separated away from the center of the identified minimum-value table element tm.

[Second Typical Interpolation Process to Detect a Movement Vector with a Higher Degree of Accuracy]

A second typical interpolation process to detect a movement vector with a higher degree of accuracy adopts a technique whereby a plurality of correlation values (which are each a final component SAD value in this embodiment) stored in elements arranged in the horizontal direction on a row including the minimum-value table element tm found at the precision of the integer level in the shrunk SAD table are used to create a cubic curve laid on a plane oriented in the horizontal direction, whereas a plurality of correlation values stored in elements arranged in the vertical direction on a column including the minimum-value table element tm in the shrunk SAD table as are used to create a cubic curve laid on a plane oriented in the vertical direction. Then, a position (vx, vy) of the minimum values of the cubic curves is detected and taken as a minimum-value address having the precision of the fraction level.

Figure 20B:
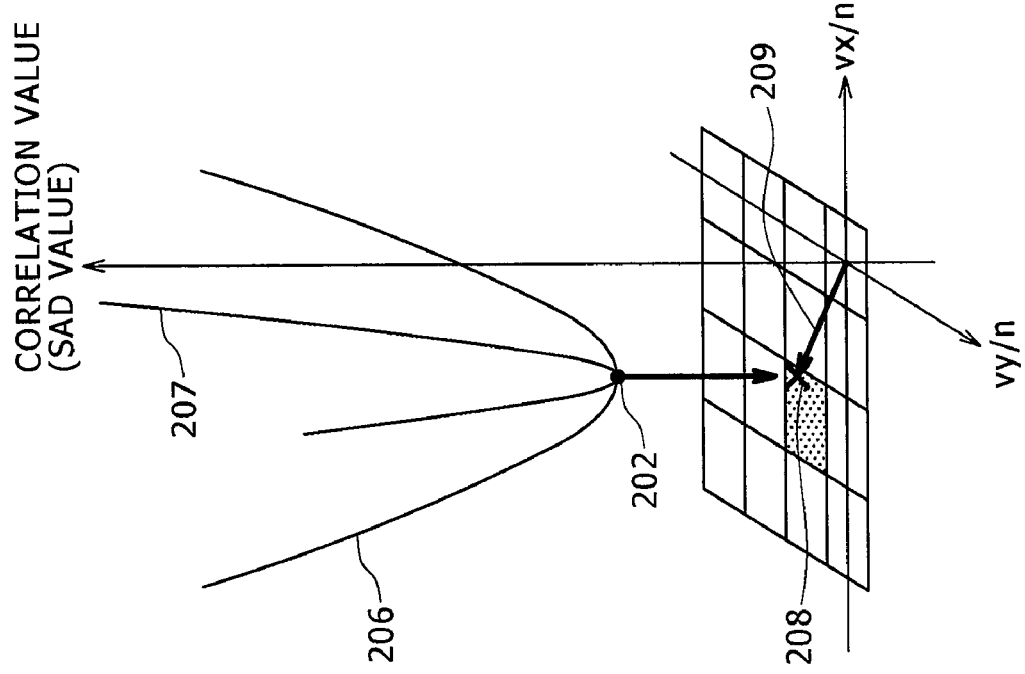
FIGS. 20A and 20B are each an explanatory diagram to be referred to in describing a process to detect an accurate movement vector in accordance with a second typical implementation of the movement-vector detection method according to the embodiment.
Figure 20A:
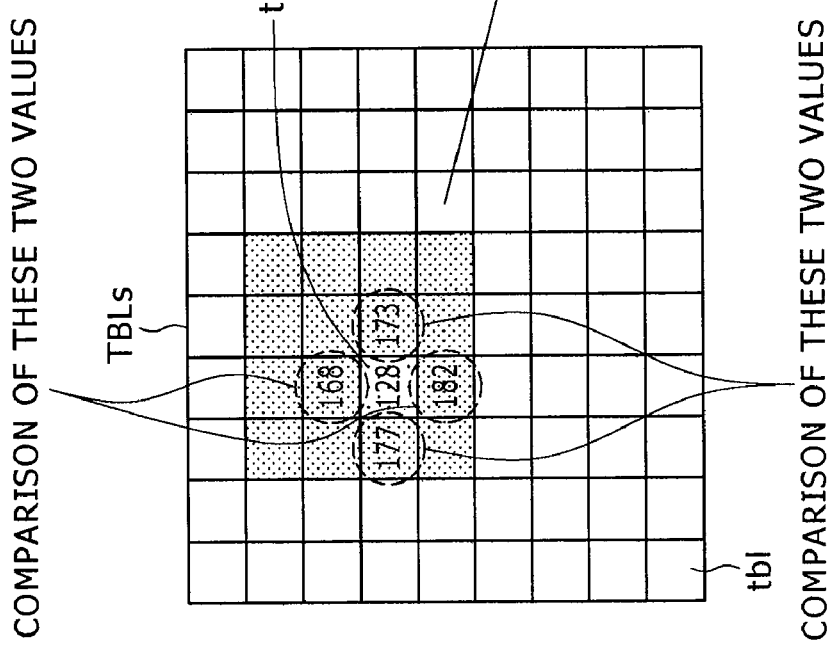

FIGS. 20A and 20B are explanatory diagrams referred to in the following description of the second typical interpolation process to detect a movement vector with a higher degree of accuracy. Much like the first typical interpolation process to detect a movement vector with a higher degree of accuracy, the second typical interpolation process is carried out to find a movement vector by making use of a rectangular table area centered at the minimum-value table element tm found at the precision of the integer level as an area including neighborhood table elements surrounding the minimum-value table element tm in the horizontal and vertical directions. In the example shown in FIG. 20, the number of neighborhood table elements is set at 16(=4×4). In FIG. 20 A, the table area is shown as a screening block.

Next, much like the first typical interpolation process to detect a movement vector with a higher degree of accuracy, as shown in FIG. 20B, a coordinate space is assumed in the range of contracted reference vectors (or the range of the shrunk SAD table). The range of contracted reference vectors corresponds to the search range of the reference frame. The position of the target frame is taken as the origin position (0, 0, 0) of the coordinate space, which has three axes as follows. The vertical Z axis (or the correlation-value axis) is taken as an axis representing the correlation value, which decreases in inverse proportion to the correlation between the reference and target blocks. In this embodiment, the correlation value is a final component SAD value. The horizontal X axis (or a vx/n axis) is taken as an axis representing the shift of the reference block from the target block in the X direction or an axis representing the value vx/n of the contracted reference vector. By the same token, the horizontal Y axis (or a vy/n axis) is taken as an axis representing the shift of the reference block from the target block in the Y direction perpendicular to the X direction or an axis representing the value vy/n of the contracted reference vector. The vertical Z axis is perpendicular to a plane on which the horizontal X an Y axes are laid.

Then, four table elements on a horizontal-direction row including the minimum-value table element tm found at the precision of the integer level are selected among the 16 table elements in the neighborhood of the table minimum-value element tm. Subsequently, the correlation values (which are each a final component SAD value) of the four selected table elements are used to create a horizontal cubic curve 206 laid on a plane oriented in the horizontal direction in the coordinate system. Then, the horizontal-direction position vx/n of the minimum value on the horizontal cubic curve 206 is selected in the area of a table element at the precision of the fraction level.

By the same token, four table elements on a vertical-direction column including the minimum-value table element tm found at the precision of the integer level are selected among the 16 table elements in the neighborhood of the table minimum-value element tm. Subsequently, the correlation values (which are each a final component SAD value) of the four selected table elements are used to create a vertical cubic curve 207 laid on a plane oriented in the vertical direction in the coordinate system. Then, the vertical-direction position vy/n of the minimum value on the vertical cubic curve 207 is selected in the area of a table element at the precision of the fraction level.

From the horizontal-direction position vx/n selected at the precision of the fraction level and the vertical-direction position vy/n selected at the precision of the fraction level, a minimum-value table address 208 is then found at the precision of the fraction level. The fraction-precision minimum-value table address 208 is a table-element address corresponding to the minimum value on the horizontal cubic curve 206 and the vertical cubic curve 207. Finally, a minimum-value vector 209 pointing to the fraction-precision minimum-value table address 208 identified at the precision of the fraction level as a position in a the table element is determined, and the movement vector (or the minimum-value vector) with the original magnitude and the original direction is computed by multiplying the minimum-value vector 209 by the reciprocal value n of the contraction factor as shown in FIG. 11.

That is to say, the second typical interpolation process adopts a technique whereby four table elements are selected in each of a row oriented in the horizontal direction and a column oriented in the vertical direction by adoption of the same technique as the first typical interpolation process and, then, a cubic curve laid on a plane oriented in the horizontal direction is created on the basis of the four table elements selected on the row whereas a cubic curve laid on a plane oriented in the vertical direction is created on the basis of the four table elements selected on the column as shown in FIG. 20B.

Figure 21:
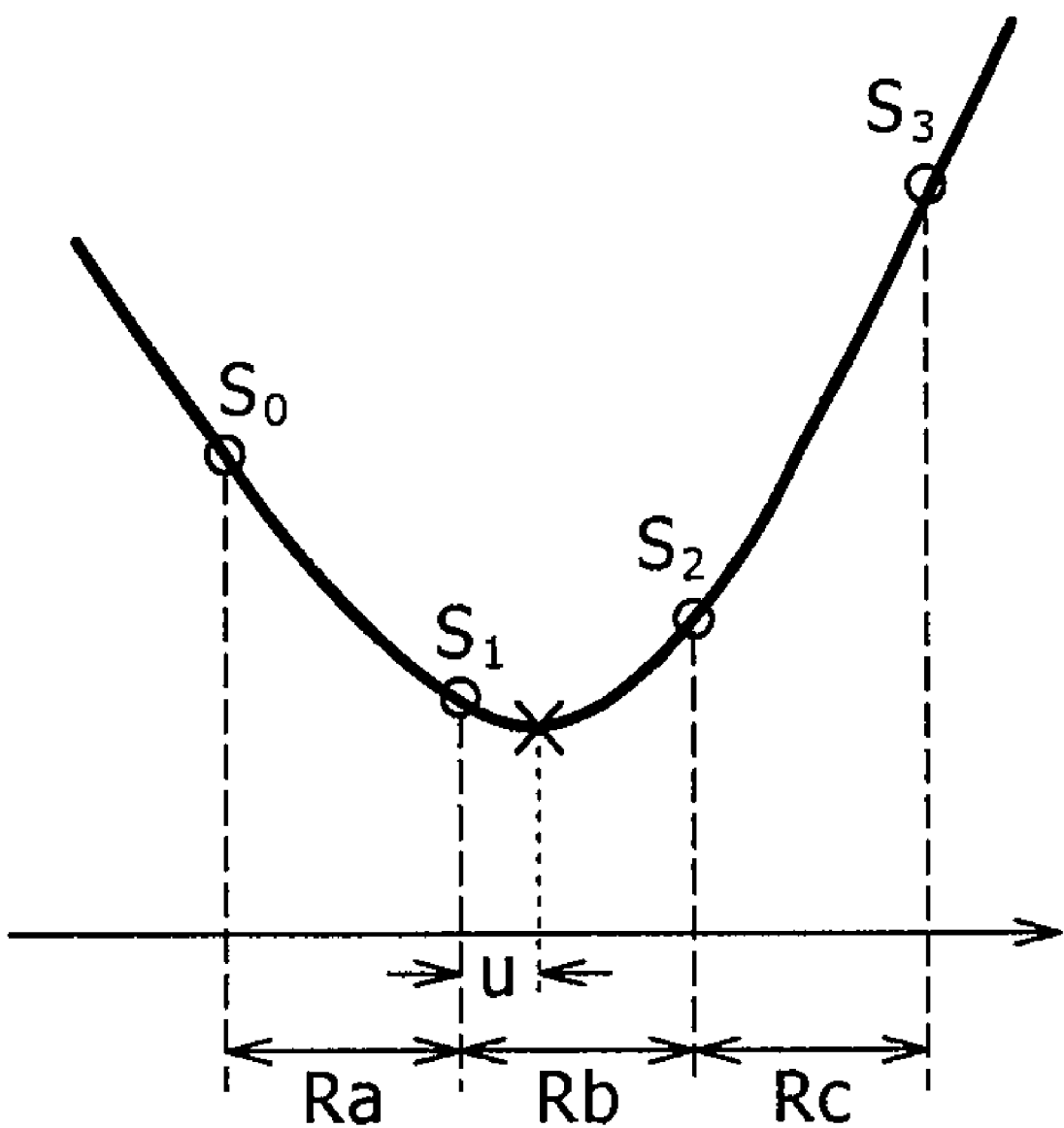
FIG. 21 is an explanatory diagram to be referred to in describing a process to detect an accurate movement vector in accordance with the second typical implementation of the movement-vector detection method according to the embodiment.

A process to find the fraction-precision minimum-value table address 208 corresponding to the minimum-value point 202 on the horizontal cubic curve 206 and the vertical cubic curve 207 is carried out by adoption of a method described as follows. Let us have notations $S_0$, $S_1$, $S_2$ and $S_3$ denote correlation values of the four table elements selected on a row oriented in the horizontal direction or a column oriented in the vertical direction. As described above, in this embodiment, a correlation value is a final component SAD value. The correlation values $S_0$, $S_1$, $S_2$ and $S_3$ correspond to four adjacent points laid out consecutively along the horizontal cubic curve 206 in the horizontal direction or the vertical cubic curve 207 in the vertical direction. As shown in FIG. 21, notations Ra, Rb and Rc respectively denote a segment representing the axis-direction distance between the points $S_0$ and $S_1$, a segment representing the axis-direction distance between the points $S_1$ and $S_2$ and a segment representing the axis-direction distance between the points $S_2$ and $S_3$. A segment portion u is a fraction part included the coordinate value of the position of the minimum correlation value. The segment portion u is found in accordance with an equation dependent on which of the three segments Ra, Rb and Rc shown in FIG. 21 includes the segment portion u serving as the fraction part included in the coordinate value of the position of the minimum correlation value.

As described above, the segment Ra is a segment between the position corresponding to the correlation value (or SAD value) $S_0$ and the position corresponding to the correlation value $S_1$, the segment Rb is a segment between the position corresponding to the correlation value $S_1$ and the position corresponding to the correlation value $S_2$ whereas the segment Rc is a segment between the position corresponding to the correlation value $S_2$ and the position corresponding to the correlation value $S_3$. As described above, in this embodiment, a correlation value is a final component SAD value.

If the fraction-precision position of the minimum correlation value exists in the segment Ra shown in FIG. 21, the segment portion u representing the distance from the beginning of the segment Ra to the position is found as a fraction by making use of Eq. (E) shown in FIG. 22.

By the same token, if the fraction-precision position of the minimum correlation value exists in the segment Rb shown in FIG. 21, the segment portion u representing the distance from the beginning of the segment Rb to the position is found as a fraction by making use of Eq. (F) shown in FIG. 22.

In the same way, if the fraction-precision position of the minimum correlation value exists in the segment Rc shown in FIG. 21, the segment portion u representing the distance from the beginning of the segment Rc to the position is found as a fraction by making use of Eq. (G) shown in FIG. 22.

The following description explains a technique to determine which of the three segments Ra, Rb and Rc shown in FIG. 21 includes the fraction part u.

FIGS. 23A to 23D are explanatory diagrams referred to in description of the technique to determine which of the three segments Ra, Rb and Rc shown in FIG. 21 includes the fraction part u. First of all, notation Smin denotes the minimum correlation value at a position detected at the precision of the integer level whereas notation Sn2 denotes a correlation value located at an integer-precision position as a correlation value having the smallest difference from the minimum correlation value Smin among the correlation values at the integer-precision positions of all the four table elements. The true minimum correlation value denoted by symbol x in FIGS. 23A, 23B and 23C must exist at a position detected at the precision of the fraction level as a position between the position of the minimum correlation value Smin and the position of the correlation value Sn2. Then, by recognizing which of the correlation values $S_0$, $S_1$, $S_2$ and $S_3$ shown in FIG. 21 serve as the minimum correlation value Smin and the correlation value Sn2, it is possible to determine which of the three segments Ra, Rb and Rc includes the fraction part u.

Figure 23A:
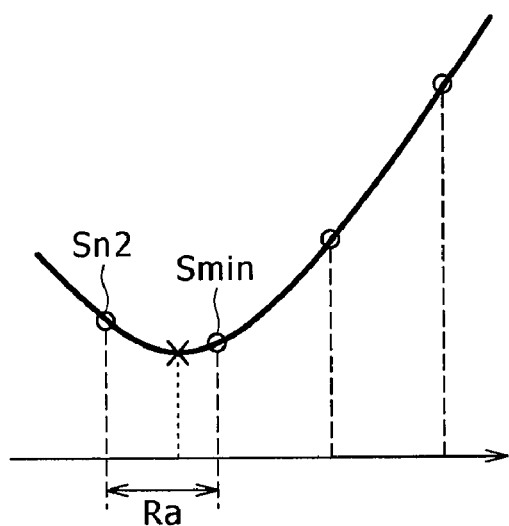
FIGS. 23A, 23B, 23C and 23D are each an explanatory diagram to be referred to in describing a process to detect an accurate movement vector in accordance with the second typical implementation of the movement-vector detection method according to the embodiment.
Figure 23B:
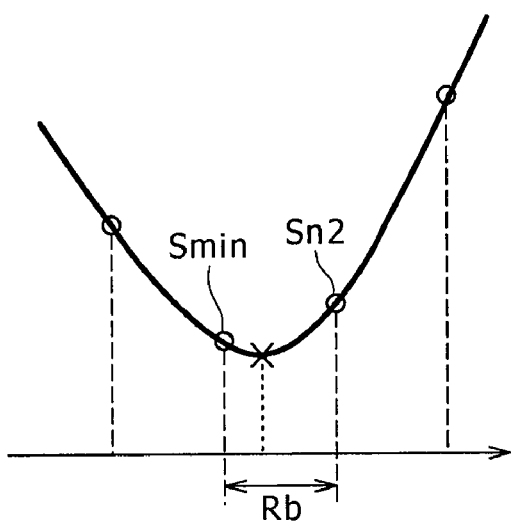
Figure 23C:
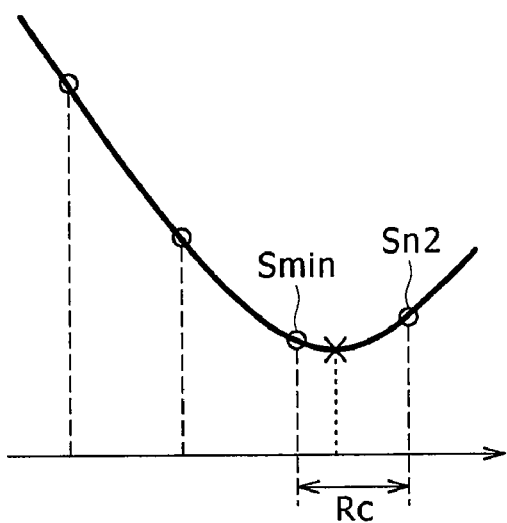
Figure 23D:
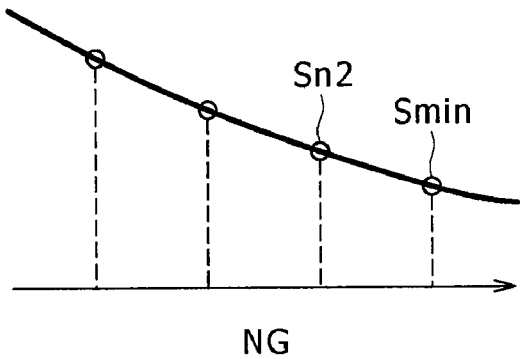

It is to be noted that there is also a case in which the integer-precision position of the minimum correlation value Smin is an edge of a range including the positions of the correlation values of the four table elements as shown in FIG. 23D. In this case, the position of the true minimum correlation value x cannot be determined, and the embodiment does not find the position of the true minimum correlation value x, handling this case as an error. Nevertheless, the position of the true minimum correlation value x can also be found even in the case like the one shown in FIG. 23D.

Figure 24:
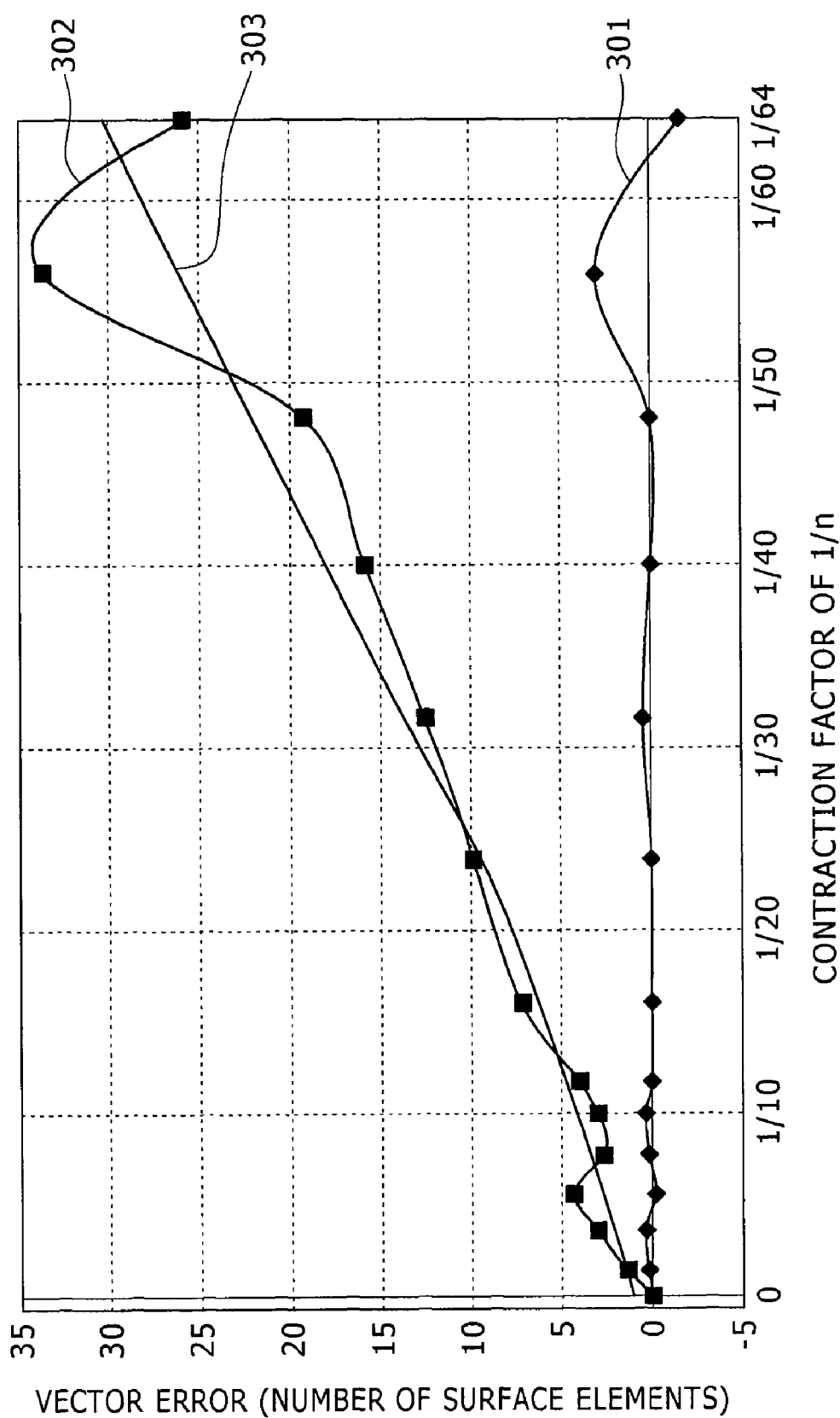
FIG. 24 is an explanatory diagram to be referred to in describing the performance of the movement-vector detection method according to an embodiment.

As described above, in accordance with the embodiments described above, by making use of a shrunk correlation-value table with a size scaled down by a down-sizing factor of $1/n^2$, the movement vector at the original image scale can be detected. FIG. 24 is a diagram showing the fact that all but the same vector detection results as the conventional image-processing apparatus can be obtained in spite of the use of a shrunk correlation-value table with a size scaled down by a down-sizing factor of $1/n^2$.

The horizontal axis of FIG. 24 represents the one-dimensional contraction factor of 1/n used in contracting the correlation-value table in the horizontal or vertical direction. On the other hand, the vertical axis represents the vector error, which is an error of a detected movement vector. The value of the vector error shown in FIG. 24 is expressed in terms of pixels.

In FIG. 24, a curve 301 represents the average value of vector errors detected for different contraction factors. A curve 302 represents the 3-time value (3σ(99.7%) value) of the variance σ of the vector errors detected for different contraction factors. A curve 303 is an approximation curve of the curve 302.

The curves shown in FIG. 24 represent the vector error detected at different one-dimensional contraction factors 1/n. Since the correlation-value table is a two-dimensional table, however, the size of the table (that is, the number of elements composing the correlation-value table) is reduced at a rate equal to the square of the one-dimensional contraction factor of 1/n used in FIG. 24. Nevertheless, the usefulness of the technique according to the embodiments is obvious from the curves indicating that the average of vector errors does not change and the variance of the vector errors only increases linearly with changes in contraction factor.

In addition, even for n=64 (or a contraction factor of 1/64), the average of vector errors is small, proving that there is not a failure caused by detection of an incorrect movement vector. Thus, we can say that the size of the correlation-value table can be reduced essentially by a down-sizing factor of 1/4,096.

On top of that, as described earlier, in a process to compensate a moving picture for distortions caused by a hand movement, a real-time response and reduction of the time delay are strongly required. However, errors of the detected movement vector can be tolerated to a certain degree as long as the error is not a failure caused by detection of an incompletely incorrect movement vector. Thus, the size of the SAD table can be reduced substantially without causing a failure. As a result, the embodiments can be said to be very useful.

In comparison with the conventional method disclosed in Patent Document 4 as a method for detecting a movement vector for an image with a reduced size, the image processing method according to the embodiments described above has the following big merits different from those of the conventional method.

In the first place, unlike the conventional method disclosed in Patent Document 4, the image processing method according to the embodiments does not require a process to contract an image at all. This is because, in accordance with the image processing method provided by the embodiments, in a process to store a component correlation value computed for a reference block in a shrunk SAD table as an element of the table, a process to translate the address of the element is carried out at the same time. As described above, the correlation value computed for a reference block is actually a final component SAD value computed for the reference block.

Thus, in comparison with the conventional method disclosed in Patent Document 4, the image processing method according to the embodiments offers merits such as elimination of logic to contract an image, the time it takes to store a contracted image in a memory, the bandwidth of a process to store a contracted image in the memory and the memory for storing a contracted image.

In the second place, the conventional method disclosed in Patent Document 4 raises another serious problem that, as described earlier, the method requires a low-pass filter for getting rid of aliasing and low-illumination noises generated in the process to shrink an image. That is to say, in the process to shrink an image, image data must be supplied to a proper low-pass filter before being re-sampled. Otherwise, aliasing will occur and the precision of a movement vector detected by making use of a shrunk image will deteriorate substantially.

A function exhibited by a low-pass filter used in the process to shrink an image as a function resembling the sinc function has been proven theoretically to be an ideal characteristic of a low-pass filter. The sinc function itself is the function of an infinite-tap FIR (Finite Impulse Response) filter having a cut-off frequency f/2 expressed by $\sin(x\pi)/(x\pi)$. In the case of a low-pass filter having an ideal cut-off frequency of f/(2n) for a contraction factor of 1/n, the cut-off frequency is represented by $\sin(x\pi/n)/(x\pi/n)$, which can also be used as a form of the sinc function though.

Figure 25:
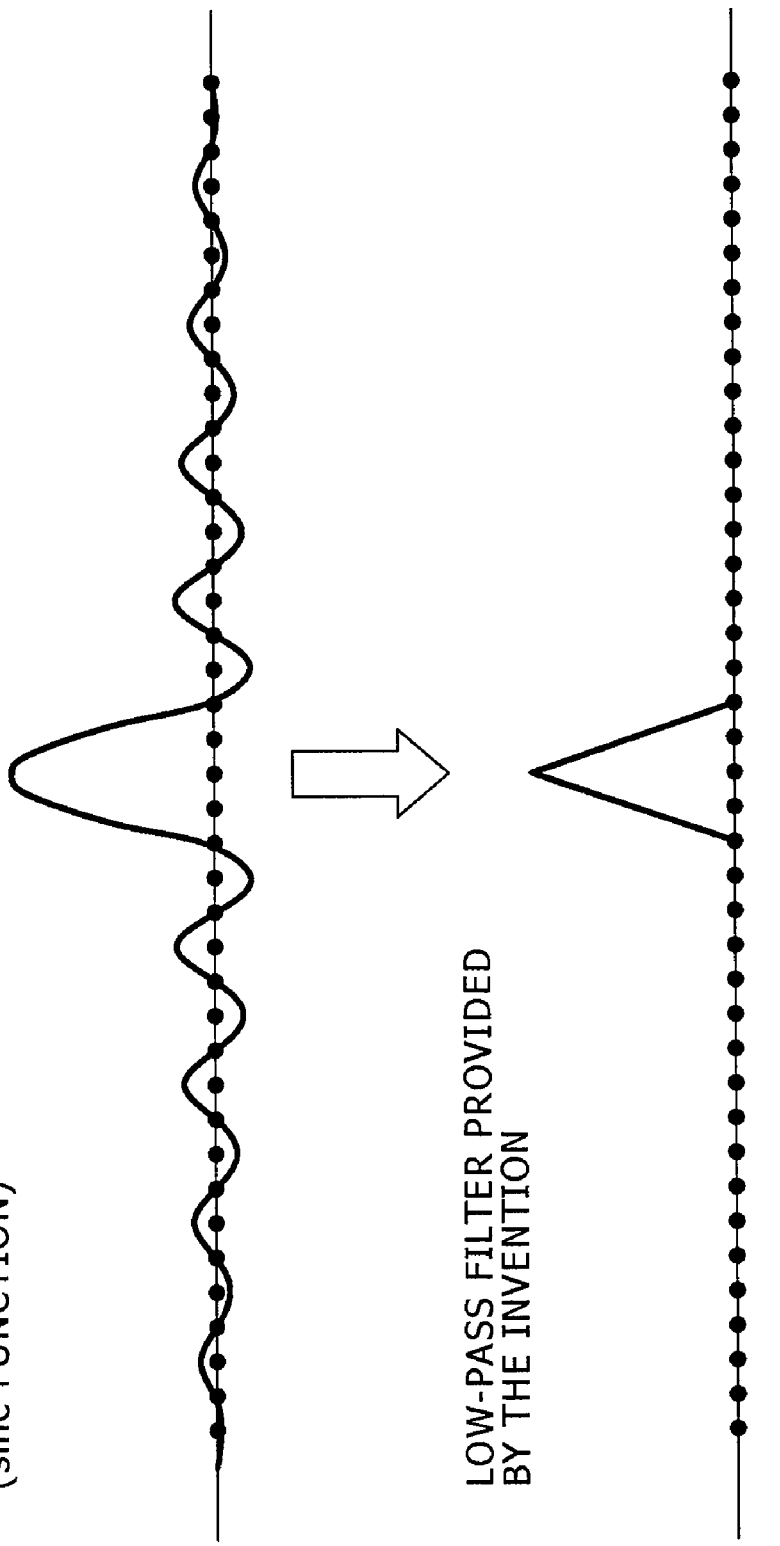
FIG. 25 is an explanatory diagram comparing the characteristic of the movement-vector detection method according to the embodiment with that of the conventional method.
Figure 26:
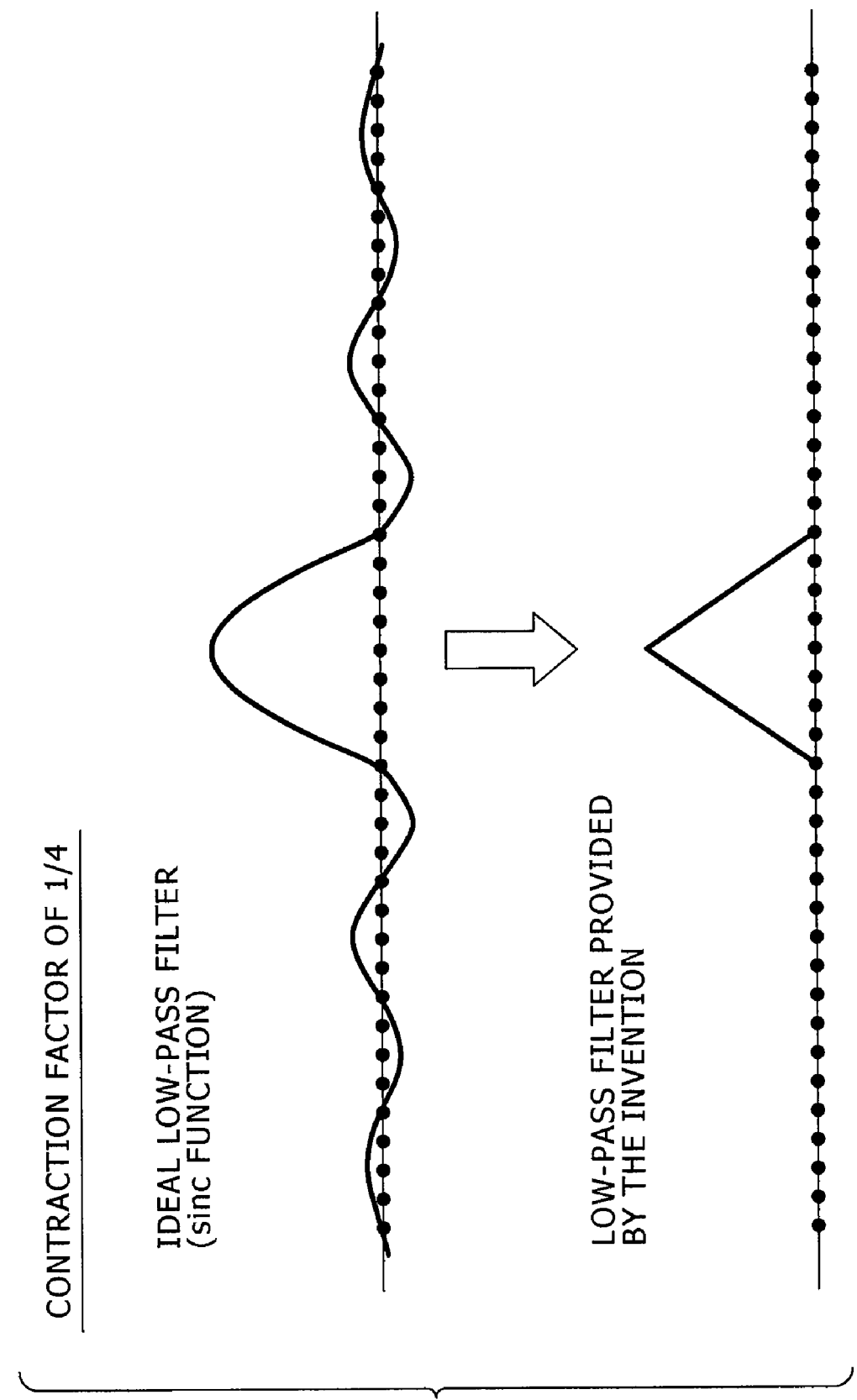
FIG. 26 is an explanatory diagram comparing the characteristic of the movement-vector detection method according to the embodiment with that of the conventional method.
Figure 27:
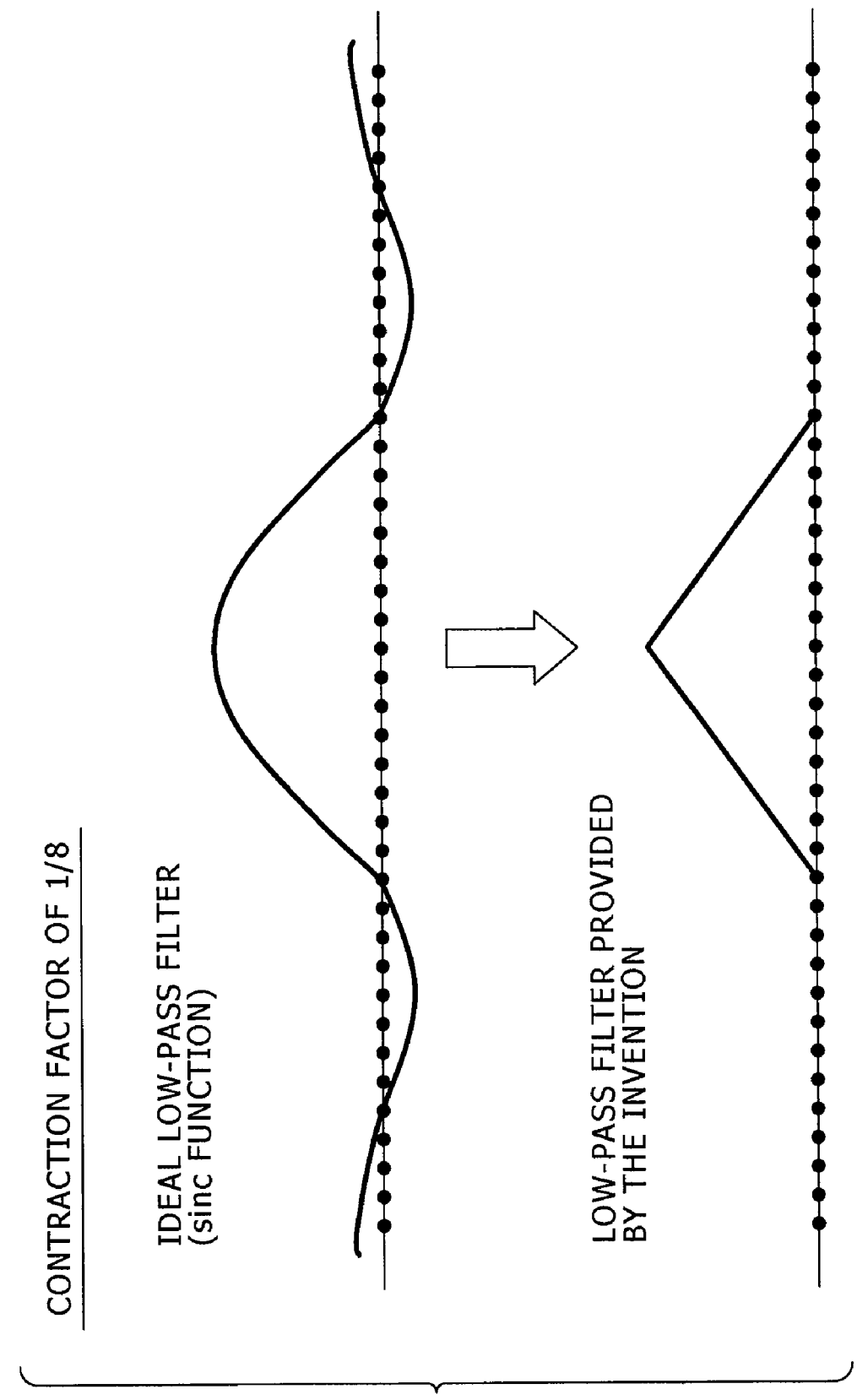
FIG. 27 is an explanatory diagram comparing the characteristic of the movement-vector detection method according to the embodiment with that of the conventional method.

Diagrams on the upper side of FIGS. 25, 26 and 27 show the shapes of the sinc function (or the ideal characteristic of a low-pass filter) for contraction factors of ½, ¼ and ⅛ respectively. It is obvious from FIGS. 25 to 27 that, the larger the contraction factor, the larger the factor at which the function is expanded in the tap-axis direction. In other words, even for a case in which the infinite-tap sinc function is approximated by only principal coefficients, we can say that the number of taps of the FIR filter must be increased.

In addition, it is known that, in general, the lower the cut-off frequency in the frequency band, the more predominant the number of taps in the performance of the low-pass filter in comparison with the dominance of the filter shape.

Thus, a movement-vector identification method making use of a shrunk image generated in accordance with the conventional method disclosed in Patent Document 4 generally shows a contradiction that, in spite of the fact that, the larger the contraction factor of an image, the bigger the effect of reducing the size of the correlation-value table, we encounter the fact that the cost increases in proportion to the increase in contraction factor.

In general, in implementation of a high-order tap FIR filter, the cost of the processing logic increases in proportion to the square of the number of taps, raising a big problem. However, an even bigger problem is caused by an increased number of line memories used to realize a vertical filter. In digital still cameras manufactured in recent years, in order to reduce the size of the line memory to keep up with the increasing number of pixels, the so-called strap processing is carried out. However, even if the size per memory line is reduced for example, the number of line memories themselves increases, raising the total cost substantially if a physical layout area is translated into the cost.

As described above, the approach based on image contraction according to the conventional method disclosed in Patent Document 4 is known to have a big barrier encountered particularly in implementation of a vertical low-pass filter. On the other hand, the image processing method according to the embodiments has solved this problem effectively in a completely different way.

Diagrams on the lower side of FIGS. 25 to 27 each show an image of the low-pass filters according to the image-processing method provided by the present application. In accordance with the image-processing method provided by the present application, the processing to shrink an image is not carried out. However, the process to generate a shrunk correlation-value table includes the processing of a low-pass filter, the image of which is shown in any of the figures.

As is obvious from the diagrams on the lower side of FIGS. 25 to 27, the characteristic of this low-pass filter is a simple filter characteristic in which the principal-coefficient portions of the sinc function can be approximated linearly, but the number of taps increases in a manner interlocked with the contraction factor. The simple filter characteristic and the increasing manner of the tap count are suitable for the fact that the lower the cut-off frequency, the more predominant the number of taps in the performance of the low-pass filter. That is to say, the process to find component correlation values (which are each a component SAD value) in accordance with the present application is equivalent to implementation of a low-pass filter exhibiting high performance in a manner interlocked with the contraction factor as a simple circuit. As described earlier, the process to find component correlation values is processing carried out in accordance with the embodiments as a process based on the linear weighted distribution technique to find component correlation values.

With regard to the low-pass filter, the simple circuit implementing a low-pass filter offers another merit in comparison with the conventional method disclosed in Patent Document 4. That is to say, in accordance with the conventional method disclosed in Patent Document 4, an image is shrunk in a sampling process after the image passes through a low-pass filter. In this shrinking process, much image information is lost. To be more specific, in the processing carried out by the low-pass filter, the word length of the luminance value of the image information is rounded considerably before the image information is stored in a memory. Thus, most of low-order bits of the pixel information have no effect on the shrunk image.

In accordance with the image processing technique according to the embodiments, on the other hand, the luminance values of all pixels in the target block are used equally in a process to compute a final component correlation value stored in a shrunk SAD table as an element of the table. That is to say, the final component correlation is a cumulative sum of correlation values each found for one of the pixels in the target block. Thus, by merely increasing the word length of every element of the shrunk correlation-value table, it is possible to carry out such a correlation-value computation process that even the eventually computed final correlation value does not include a rounding-process error at all. Since the size of the shrunk correlation-value table is small in comparison with the size of the frame memory, the extension of the word length of every element composing the shrunk correlation-value table does not raise a big problem. As a result, the shrunk correlation-value table and the processing to determine a movement vector can be implemented with a high degree of precision.

As described above, a search range 105 centered at the target-block projected image block 104 of a target block 103 considered in the original frame 101 is set in a reference frame 102 being observed and a movement vector 110 pointing to a reference block with the smallest SAD value in the search range 105 is detected. In an actual system for compensating an image for distortions caused by a hand movement, however, the original frame 101 is divided into a plurality of image sub-areas and target blocks 103 are each taken into consideration in one of the image sub-areas. Then, search ranges 105 each centered at the target-block projected image block 104 of every considered target block 103 are set in a reference frame 102 being observed and a movement vector 205 in the search range 105 is detected for each of the search ranges 105.

In addition, in an actual system for compensating an image for distortions caused by a hand movement by making use of a CCD imager as the image pickup device, a plurality of movement vectors are detected for a plurality of reference blocks in a plurality of search ranges set in the reference frame and used in order to determine a global movement vector for the reference frame, that is, a hand-movement displacement vector of the reference frame by also considering transitions each indicated by one of the movement vectors from a past frame in a statistical process.

In the case of this embodiment, on the other hand, for every original frame serving as a target frame, a plurality of target blocks 103 are determined and a plurality of search ranges 105 are set for each of the target blocks 103. Then, a plurality of movement vectors 110 each detected for one of the target blocks 103 are each used for finding a hand-movement velocity vector for one of the image sub-areas cited above.

In this embodiment, the image area of one frame is typically divided into eight rows arranged in the vertical directions and eight columns arranged in the horizontal directions to result in 64 image sub-areas. In this case, the frame can be the target frame 101 or a reference frame 102 shown in FIG. 28.

Figure 28:
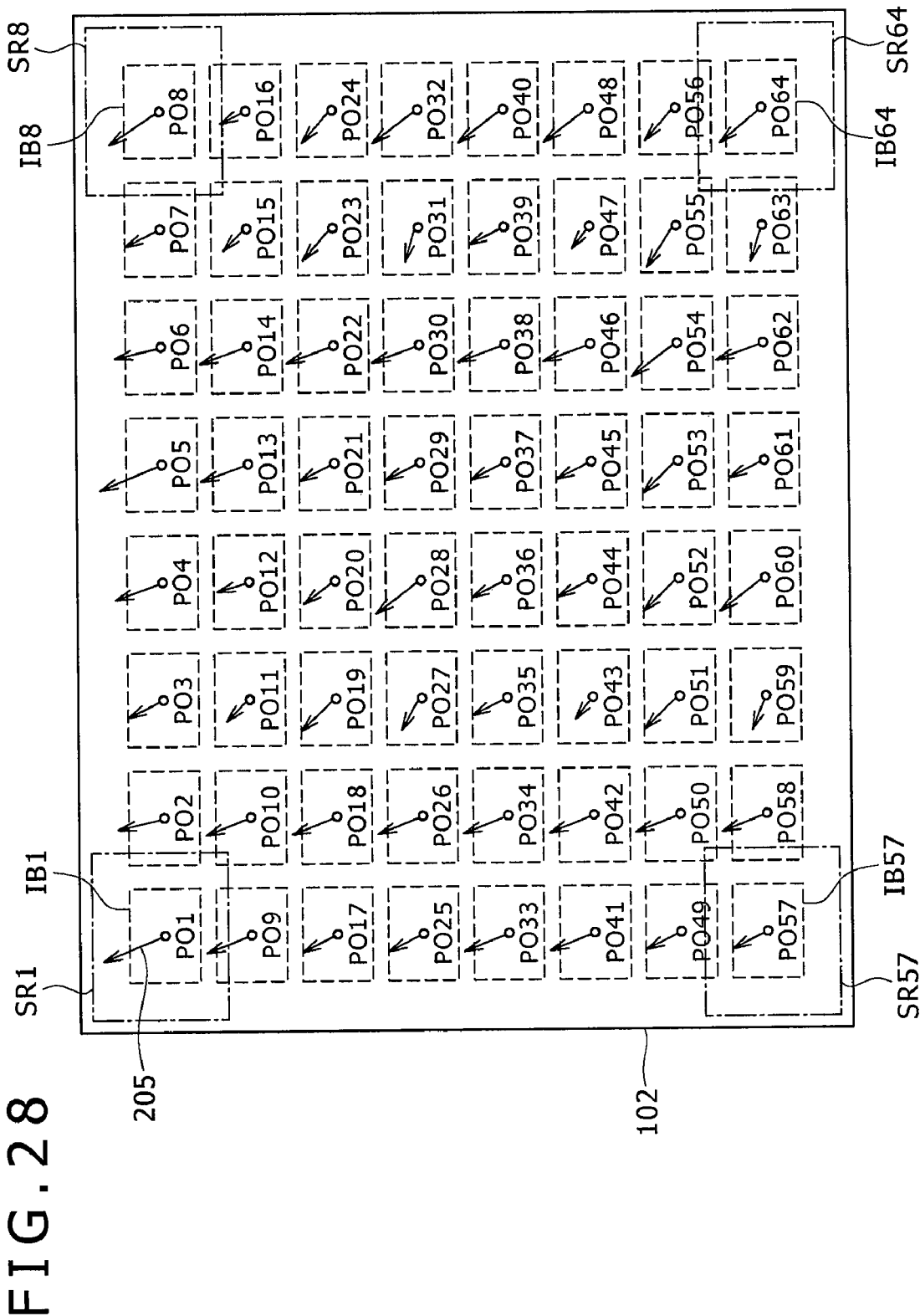
FIG. 28 is an explanatory diagram to be referred to in describing an outline of a process to detect a movement vector in accordance with an embodiment.

In the case of a reference frame 102, 64 movement vectors 205 are to be detected for the 64 image sub-areas respectively. Then, as shown in FIG. 28, 64 search ranges SR1, SR2, . . . and SR64 are set, being centered at the 64 reference positions PO1, PO2, . . . and PO64 of the 64 movement vectors 205 respectively. In the search ranges SR1, SR2, . . . and SR64, target-block projected image blocks IB1, IB2, . . . and IB64 are imagined. Even though adjacent target-block projected image blocks IB1, IB2, . . . and IB64 do not overlap each other, adjacent search ranges SR1, SR2, . . . and SR64 may overlap each other as is obvious from FIG. 28.

Then, 64 reference blocks each having the same size as the target-block projected image blocks IB1, IB2, . . . and IB64 are set in the 64 search ranges SR1, SR2, . . . and SR64 respectively to be moved over their respective search ranges SR1, SR2, ... and SR64 in order to generate shrunk correlation-value (SAD) tables as described above. Subsequently, a total of 64 movement vectors 205V1, 205V2, ... and 205V64 shown in FIG. 29 for target blocks TG1, TG2, ... and TG64 shown in none of the figures are detected from the shrunk correlation-value tables respectively.

Figure 29:
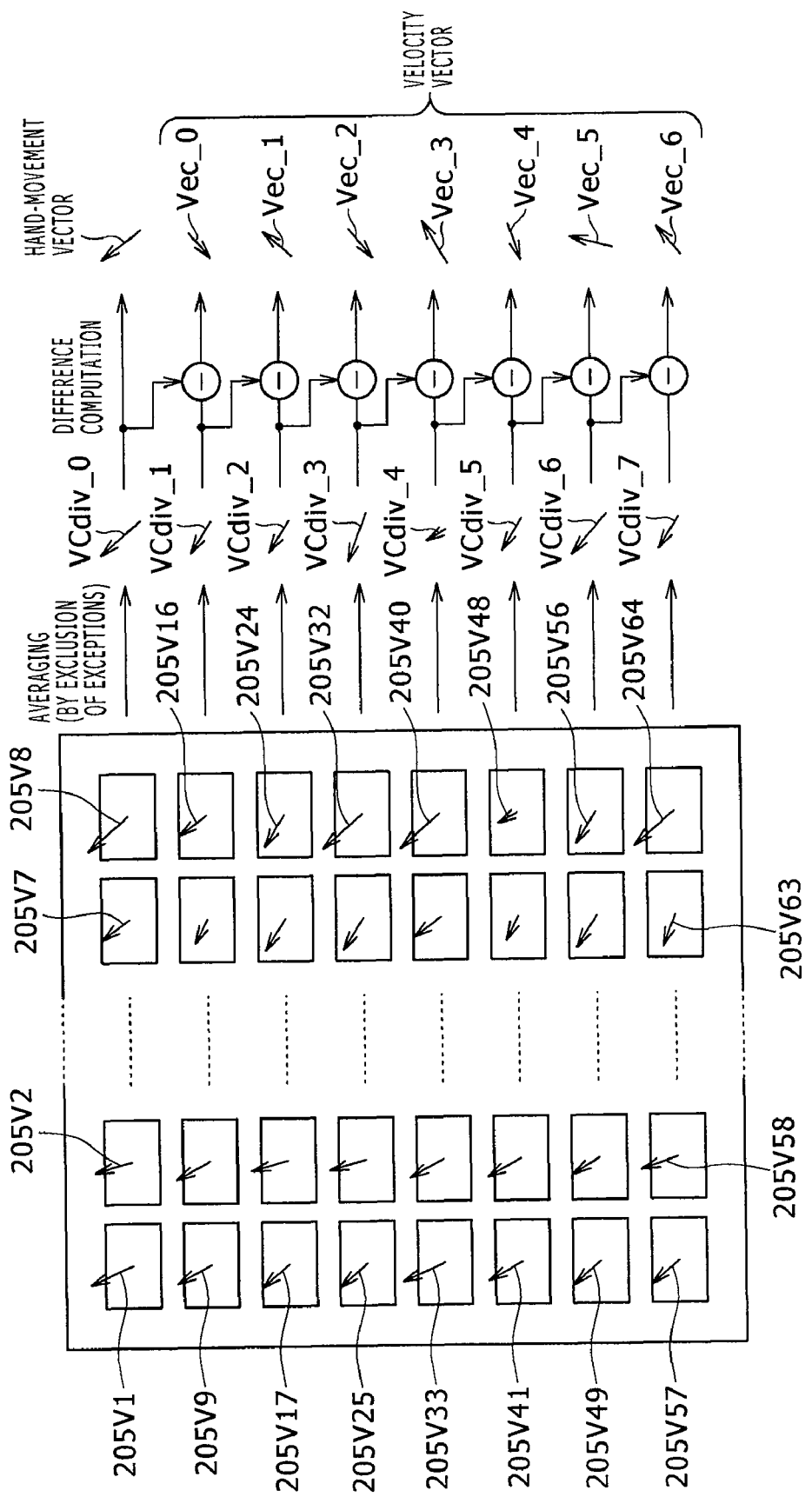
FIG. 29 is an explanatory diagram to be referred to in describing an outline of a process to detect a movement vector in accordance with an embodiment.

Then, in this embodiment, eight hand-movement displacement vectors (each also referred to hereafter as a movement vector) detected for eight target blocks TG1 to TG8 included in a vertical image sub-areas corresponding to the picture division Pdiv_0 cited before are subjected to an averaging process to result in a hand-movement displacement vector (or a movement vector) VCdiv_0. This averaging process is carried out in the same way for the picture divisions Pdiv_1 to Pdiv_7 to compute hand-movement displacement vectors (or movement vectors) VCdic_1 to VCdiv_7 as shown in FIG. 29.

To put it in detail, the eight movement vectors 205V1 to 205V8 are subjected to an averaging process to result in a hand-movement displacement vector VCdiv_0 for the picture division Pdiv_0. By the same token, the eight movement vectors 205V9 to 205V16 are subjected to an averaging process to result in a hand-movement displacement vector VCdiv_1 for the picture division Pdiv_1. In the same way, the eight movement vectors 205V17 to 205V24 are subjected to an averaging process to result in a hand-movement displacement vector VCdiv_2 for the picture division Pdiv_2. Likewise, the eight movement vectors 205V25 to 205V32 are subjected to an averaging process to result in a hand-movement displacement vector VCdiv_3 for the picture division Pdiv_3. Similarly, the eight movement vectors 205V33 to 205V40 are subjected to an averaging process to result in a hand-movement displacement vector VCdiv_4 for the picture division Pdiv_4. By the same token, the eight movement vectors 205V41 to 205V48 are subjected to an averaging process to result in a hand-movement displacement vector VCdiv_5 for the picture division Pdiv_5. In the same way, the eight movement vectors 205V49 to 205V56 are subjected to an averaging process to result in a hand-movement displacement vector VCdiv_6 for the picture division Pdiv_6. Likewise, the eight movement vectors 205V57 to 205V64 are subjected to an averaging process to result in a hand-movement displacement vector VCdiv_7 for the picture division Pdiv_7.

If the eight movement vectors 205Vi to 205V(i+7), where i=1, 9, 17, 25, 33, 41, 49 or 57, include an exceptional movement one, the exceptional movement vector is excluded from the averaging process.

This embodiment produces a result of determination as to whether or not a specific movement vector detected for a specific target block is an exceptional vector by comparing the specific movement vector with another movement vector detected for a target block vertically or horizontally adjacent to the specific target block and, if the result of the determination indicates that a difference between the specific and any other movement vector is greater than a threshold value determined in advance, the specific movement vector is regarded as an exceptional vector and excluded from the averaging process.

It is to be noted that methods each used for producing a result of determination as to whether or not a specific movement vector detected for a specific target block is an exceptional vector are by no means limited to the technique described above. For example, in a process carried out to produce a result of determination as to whether or not a specific movement vector detected for a specific picture division is exceptional, the average and variance of movement vectors detected for the specific picture division and picture divisions horizontally adjacent to the specific picture division are found, and the result of the determination as to whether or not the specific movement vector is exceptional is produced by determining whether or not the difference between the specific movement vector and the average is beyond a predetermined range centered at the variance.

Then, in this embodiment, a hand-movement velocity vector Vec_i for a specific picture division Pdiv_i, where i is an integer in the range 0 to 6, is found as shown in FIG. 29 as a difference (or a change) in hand-movement displacement vector VCdiv between the specific picture division Pdiv_i and a picture division Pdiv_(i+1) immediately following the specific picture division Pdiv_i as follows:

$$Vec\_0 = VCdiv\_1 - VCdiv\_0$$

$$Vec\_1 = VCdiv\_2 - VCdiv\_1$$

$$Vec\_2 = VCdiv\_3 - VCdiv\_2$$

$$Vec\_3 = VCdiv\_4 - VCdiv\_3$$

$$Vec\_4 = VCdiv\_5 - VCdiv\_4$$

$$Vec\_5 = VCdiv\_6 - VCdiv\_5$$

$$Vec\_6 = VCdiv\_7 - VCdiv\_6 \qquad (3)$$

Since a picture division Pdiv following the picture division Pdiv_7 at the bottom of the image of a frame does not exist, however, the hand-movement velocity vector Vec_7 for the picture division Pdiv_7 at the bottom of the image cannot be found by making use of the above formula for computing a difference.

In this embodiment, the hand-movement velocity vector Vec_7 for the picture division Pdiv_7 at the bottom of the image is computed by estimation based on a preceding hand-movement velocity vector or a plurality of hand-movement velocity vectors found for picture divisions leading ahead of the picture division Pdiv_7 corresponding to the hand-movement velocity vector Vec_7. It is to be noted that the hand-movement velocity vector Vec_6 found for the picture division Pdiv_6 leading ahead of the picture division Pdiv_7 corresponding to the hand-movement velocity vector Vec_7 can also be used as it is as the hand-movement velocity vector Vec_7.

It is also worth noting that, as described earlier by referring to FIG. 1, inverted-sign components obtained by inverting the signs of the hand-movement velocity vectors Vec_0 to Vec_7 for the picture divisions Pdiv_0 to Pdiv_7 are used for compensating the frame for distortions caused by a hand movement and a focal plane phenomenon.

In addition, in this embodiment, the hand-movement displacement vector VCdiv_i for any picture division Pdiv_i of a frame is used as the movement vector of the picture division Pdiv_i of the frame. The image data of the picture division Pdiv_i of the frame is read out from an image memory used for storing the image data by starting the read operation from an image location shifted from the location physically corresponding to the picture division Pdiv_i by a displacement computed on the basis of the hand-movement displacement vector VCdiv_i for the picture division Pdiv_i. The shifted image location is also referred to as a memory address location of the picture-division image data to be read out from the image memory.

To put it in detail, in the processing to compensate a frame for distortions caused by a hand movement and a focal plane phenomenon in this embodiment, the image data of the picture division Pdiv_0 of a frame is read out from the image memory by starting the read operation from an image location shifted in the horizontal and vertical directions from the location physically corresponding to the picture division Pdiv_0 by an image-distortion displacement computed on the basis of a value obtained by carrying out an integration process with respect to time on the inverted-sign component of the hand-movement velocity vector Vec_0 which is derived from the hand-movement displacement vector VCdiv_0 for the picture division Pdiv_0 in accordance with Eq. (3) given earlier. This read operation is carried out in the same way for the other picture divisions Pdiv_1 to Pdiv_7 on the basis of the hand-movement velocity vectors Vec_1 to Vec_7 respectively.

Figure 30:
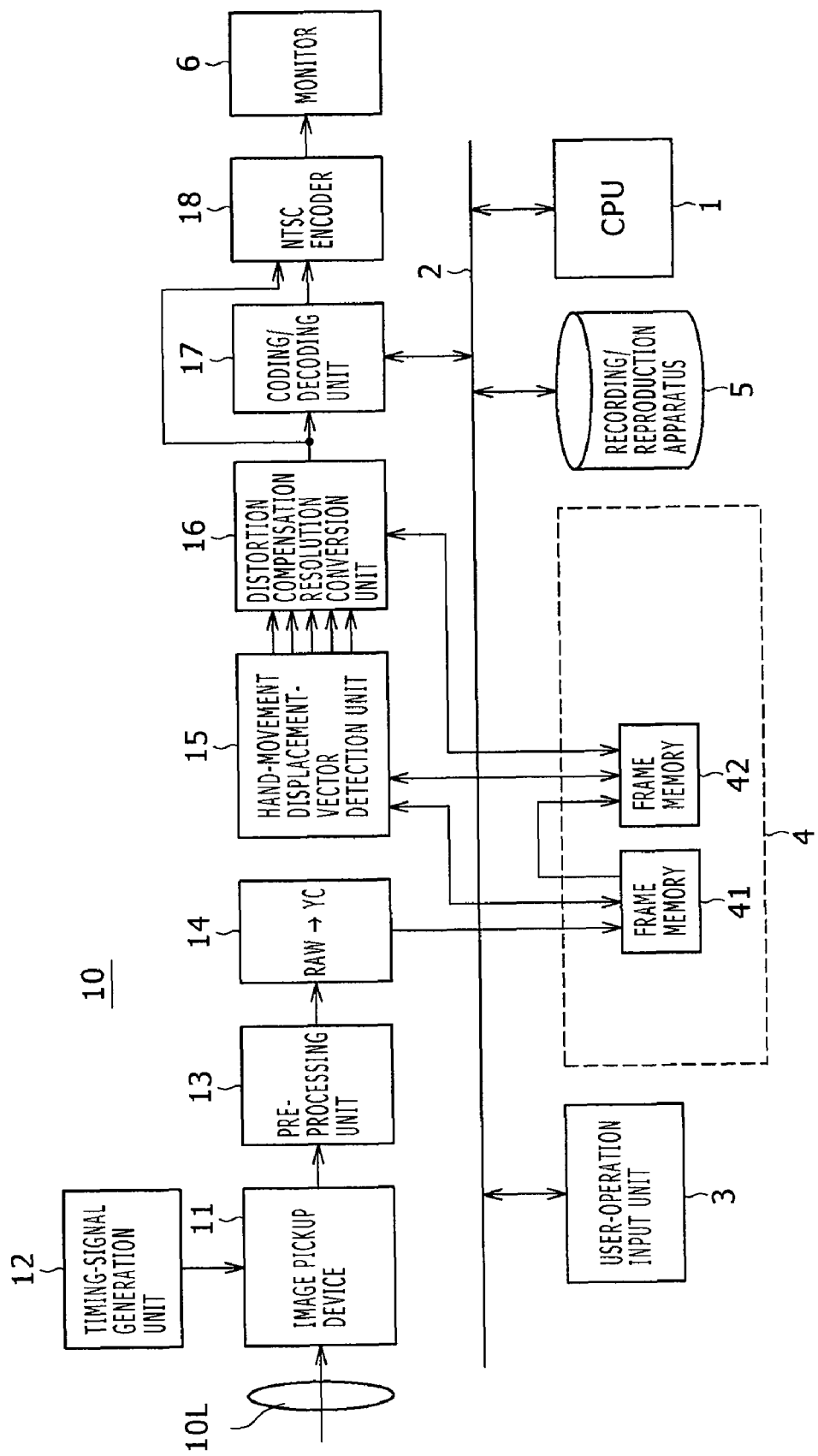
FIG. 30 is a block diagram showing a typical configuration of an image-taking apparatus adopting a method to compensate an image signal for distortions in accordance with a first embodiment.

First Embodiment of an Apparatus Provided by the Invention as an Apparatus for Compensating an Image Signal for Distortions By referring to diagrams, the following description explains a first embodiment implementing a distortion compensation apparatus for compensating an image signal for distortions caused by a hand movement by making use of the features described above. FIG. 30 is a block diagram showing the first embodiment implementing an image-taking apparatus as a distortion compensation apparatus provided by the present application.

As shown in FIG. 30, the image-taking apparatus 10 according to the embodiment includes a taken-image signal processing system, a CPU (Central Processing Unit) 1, a user-operation input unit 3, an image memory unit 4 and a recording/reproduction apparatus 5, which are connected to each other by a system bus 2. The taken-image signal processing system includes an image-taking lens 10L, an image pickup device 11, a timing-signal generation unit 12, a preprocessing unit 13, a data conversion unit 14, a hand-movement displacement-vector detection unit 15, a distortion compensation resolution conversion unit 16, a coding/decoding unit 17, an NTSC encoder 18 and a monitor 6. It is to be noted that the CPU 1 described in this patent specification includes a ROM (Read Only Memory) for storing various kinds of software to be executed by the CPU 1 as processing programs and a RAM (Random Access Memory) used by the CPU 1 as a work area.

Receiving an operation command entered by the user via the user-operation input unit 3 as a command to start an image-taking and recording process, the image-taking apparatus 10 shown in FIG. 30 carries out a process to record taken-image data to be described later. Receiving an operation command entered by the user via the user-operation input unit 3 as a command to start a process to reproduce recorded taken-image data, the image-taking apparatus 10 shown in FIG. 30 carries out a process to reproduce the taken-image data recorded on a recording medium employed in the recording/reproduction apparatus 5.

An input entered by the user to the user-operation input unit 3 is supplied to the CPU 1 functioning as a control unit. Examples of the input are an image enlarging/shrinking command, a resolution specifying input and a zoom-magnification specifying input. The CPU 1 generates a control signal based on the input entered by the user and supplies the control signal to the timing-signal generation unit 12 and other processing units.

As shown in FIG. 30, a light beam entering from an object of photographing by way of a camera optical system employing the image-taking lens 10L is radiated to the image pickup device 11 for carrying out an image-taking process on the light beam. It is to be noted that the camera optical system itself is not shown in the figure. In this embodiment, the image pickup device 11 is configured as a CCD (Charge Coupled Device) imager. It is to be noted the image pickup device 11 can also be configured as a CMOS (Complementary Metal Oxide Semiconductor) imager.

In the image-taking apparatus according to this embodiment, when the user enters an operation command to the image-taking apparatus 10 via the user-operation input unit 3 as a command to start an image-taking and recording process, the image pickup device 11 outputs a RAW (Read After Write) signal of a bayer array including the three primary colors, i.e., the read (R), green (G) and blue (B) colors.

In this embodiment, the RAW signal, which is an analog taken-image signal, is a signal obtained as a result a sampling process according to a timing signal generated by the timing-signal generation unit 12.

The image pickup device 11 supplies the analog taken-image signal to the preprocessing unit 13 for carrying out preprocessing such as a defect compensation process and a γcompensation process. The preprocessing unit 13 outputs a result of the preprocessing to the data conversion unit 14.

The data conversion unit 14 converts the analog taken-image signal supplied thereto into a digital taken-image signal (YC data) including a luminance signal component Y and chrominance signal component Cb/Cr, supplying the digital taken-image signal to the image memory unit 4 through the system bus 2.

In the embodiment shown in FIG. 30, the image memory unit 4 includes 2 frame memories 41 and 42. First of all, the digital taken-image signal received from the data conversion unit 14 is stored in the frame memory 41. Then, after the lapse of time corresponding to one frame, the digital taken-image signal stored in the frame memory 41 is transferred to the frame memory 42 and a new digital taken-image signal received from the data conversion unit 14 is stored in the frame memory 41. Thus, a frame represented by the digital taken-image signal stored in the frame memory 42 is an immediately preceding frame, which precedes a frame represented by the digital taken-image signal stored in the frame memory 41 by one frame.

Then, the hand-movement displacement-vector detection unit 15 makes accesses to the 2 frame memories 41 and 42 through the system bus 2 in order to read out the digital taken-image signals from the frame memories 41 and 42. The hand-movement displacement-vector detection unit 15 then carries out a process to detect a movement vector between the digital taken-image signals as described earlier. In this movement-vector detection process, a frame represented by the digital taken-image signal stored in the frame memory 41 is taken as the reference frame while a frame represented by the digital taken-image signal stored in the frame memory 42 is taken as the original frame serving as the target frame.

Then, the hand-movement displacement-vector detection unit 15 supplies the detected movement vector obtained as a result of the movement-vector detection process to the distortion compensation resolution conversion unit 16 as a control signal.

In accordance with the movement vector received from the hand-movement displacement-vector detection unit 15, the distortion compensation resolution conversion unit 16 carries out a process to cut out image data of the delayed frame represented by the digital taken-image signal stored in the frame memory 42 and convert the frame into a frame having a required resolution and a required size. By cutting out image data of the frame represented by the digital taken-image signal stored in the frame memory 42 in accordance with the movement vector received from the hand-movement displacement-vector detection unit 15, the image obtained as a result of the conversion process is an image free of distortions caused by a hand movement and a focal plane phenomenon.

The image data produced by the distortion compensation resolution conversion unit 16 as image data not including distortion caused by a hand movement is supplied to the NTSC (National Television System Committee) encoder 18 for converting the image data into a standard color video signal conforming to an NTSC system. The NTSC encoder 18 then supplies the standard color video signal to the monitor 6 serving as an electronic view finder for displaying the imager-created image on a screen for the purpose of monitoring.

Concurrently with the process to display the imager-created image on the screen of the monitor 6 for the purpose of monitoring, the distortion compensation resolution conversion unit 16 also supplies the image data not including distortions caused by a hand movement to the coding/decoding unit 17 for carrying out a coding process such as modulation recording. The coding/decoding unit 17 then supplies image data obtained as a result of the coding process to the recording/reproduction apparatus 5 for recording the image data onto a recording medium. Examples of the recording medium are an optical disc such as a DVD (Digital Versatile Disc) and a hard disc.

When the user enters an operation command to the image-taking apparatus 10 via the user-operation input unit 3 as a command to start a process to reproduce recorded taken-image data, the data is reproduced from the recording medium of the recording/reproduction apparatus 5 and supplied to the coding/decoding unit 17. This time, the coding/decoding unit 17 carries out a decoding/reproduction process on the taken-image data. The coding/decoding unit 17 then supplies image data obtained as a result of the decoding/reproduction process to the monitor 6 by way of the NTSC encoder 18 for displaying the reproduced image on a screen. It is to be noted that the NTSC encoder 18 is also capable of supplying a video signal output thereby to an external signal recipient by way of an video output terminal even though this feature is not shown in FIG. 24.

The hand-movement displacement-vector detection unit 15 can be implemented as hardware or a DSP (Digital Signal Processor). As an alternative, the hand-movement displacement-vector detection unit 15 can also implemented as software executed by the CPU 1. By the same token, the distortion compensation resolution conversion unit 16 can be implemented as hardware or a DSP (Digital Signal Processor). As an alternative, the distortion compensation resolution conversion unit 16 can also implemented as software executed by the CPU 1.

[Operations of the Hand-Movement Displacement-Vector Detection Unit 15]

<First Typical Implementation>

The processing flow of a first typical implementation realizing operations of the hand-movement displacement-vector detection unit 15 is explained by referring to a flowchart shown in FIGS. 31 and 32 as follows.

The flowchart begins with a step S101 at which a reference block Ii denoted by reference numeral 106 in FIG. 3 or 28 is specified at a position having coordinates of (vx, vy) in the search range 105. An operation to specify a reference block Ii in the search range 105 is also an operation to specify a reference vector (vx, vy) corresponding to the reference block Ii. As described earlier, the coordinates of (vx, vy) are the coordinates of the position pointed to by the specified reference vector 107 with coordinates of (0, 0) taken as the coordinates of an origin position. The coordinates of (0, 0) are the coordinates of the position of the target block 103 on the original frame 101 or the coordinates of the position of the target-block projected image block 104 on the reference frame 102. The coordinate vx represents the horizontal-direction shift of the position pointed to by the specified reference vector 107 from the origin position having the coordinates of (0, 0) whereas the coordinate vy represents the vertical-direction shift of the position pointed to by the specified reference vector 107 from the origin position. Much like the conventional method described earlier, the shifts vx and vy are expressed in terms of pixels.

As described earlier, the center position of the search range 105 is taken as the center position of the target-block projected image block 104 or the origin position (0, 0). The reference block 106 is moved from position to position over the search range 105 in the horizontal directions by distances in the range ±Rx defining the horizontal limits of the search range 105 and the vertical directions by distances in the range ±Ry defining the vertical limits of the search range 105. In this case, the quantities (vx, vy) satisfy the following relation:

$$-Rx \leq vx \leq +Rx \text{ and } -Ry \leq vy \leq +Ry$$

At the next step S102, a point (or a pixel) with coordinates (x, y) is specified as a point in the target block Io denoted by reference numeral 103 in FIG. 3. Let us have notation Io (x, y) denote a pixel value at the specified point (x, y) and notation Ii (x+vx, y+vy) denotes a pixel value at a point (x+vx, y+vy) in the reference block Ii set at the block position (vx, vy) at the step S101. In the following description, the point (x+vx, y+vy) in the reference block Ii is said to be a point corresponding the point (x, y) in the target block Io. Then, at the next step S103, the absolute value a of the difference between the pixel value Io (x, y) and the pixel value Ii (x+vx, y+vy) is computed in accordance with Eq. (1) given earlier.

The above difference absolute value a is to be computed for all points (x, y) in the target block Io and all their corresponding points (x+vx, y+vy) in the reference block Ii, and a SAD value representing the sum of the difference absolute values a computed for the target block Io and the reference block Ii is stored at a temporary memory location associated with the reference vector (vx, vy) pointing to the current location of the reference block Ii. In order to compute such a SAD value, at the next step S104, the difference absolute value a found at the step S103 is cumulatively added to a temporary SAD value already stored at the temporary memory location as a SAD value computed so far. The final SAD value SAD (vx, vy) is obtained as a result of a process to cumulatively sum up all difference absolute values a, which are computed for all points (x, y) in the target block Io and all their corresponding points (x+vx, y+vy) in the reference block Ii as described above. Thus, the final SAD value SAD (vx, vy) can be expressed by Eq. (2) as follows:

$$SAD(vx, vy) = \Sigma \alpha = \Sigma |Io(x, y) - Ii(x + vx, y + vy)| \quad (2)$$

Then, the flow of the processing according to the first typical implementation goes on to the next step S105 to produce a result of determination as to whether or not the processes of the steps S103 and S104 have been carried out for all pixels (x, y) in the target block Io and all their corresponding pixels (x+vx, y+vy) in the reference block Ii. If the result of the determination indicates that the processes of the steps S3 and S4 have not been carried out yet for all pixels (x, y) in the target block Io and all their corresponding pixels (x+vx, y+vy) in the reference block Ii, the flow of the processing according to the first typical implementation goes back to the step S102 at which another pixel with coordinates (x, y) is specified as another pixel in the target block Io. Then, the processes of the steps S103 and S104 following the step S102 are repeated.

The processes of the steps S101 to S105 are exactly the same as respectively the processes of the steps S1 to S5 of the flowchart shown in FIG. 5 except that, in the case of the steps S103 and S104, the SAD value is stored at a temporary memory location.

If the determination result produced at the step S105 indicates that the processes of the steps S3 and S4 have been carried out for all pixels (x, y) in the target block Io and all their corresponding points (x+vx, y+vy) in the reference block Ii, on the other hand, the flow of the processing according to the first typical implementation goes on to a step S106 at which a contracted reference vector (vx/n, vy/n) is computed by contracting the reference vector (vx, vy). To put it concretely, the contracted reference vector (vx/n, vy/n) is computed by multiplying the reference vector (vx, vy) by a contraction factor of 1/n.

Then, at the next step S107, a plurality of neighborhood reference vectors located in the neighborhood of the contracted reference vector (vx/n, vy/n) are identified. The neighborhood reference vectors are each a contracted reference vector having an integer vx/n value and an integer vy/n value, which are closest to respectively the x-direction and y-direction values (vx/n, vy/n) of the contracted reference vector (vx/n, vy/n). In this embodiment, the number of neighborhood reference vectors is set at 4. Then, at the next step S108, the SAD value stored at the temporary location at the step S104 is split into four component SAD values by adoption of a linear weighted distribution technique based on relations between positions pointed to by the neighborhood reference vectors and a position pointed to by the contracted reference vector (vx/n, vy/n) as described earlier. Subsequently, at the next step S109, the four component SAD values are distributed among four table elements included in the contracted correlation-value table as four table elements associated with the four neighborhood reference vectors respectively.

Figure 32:
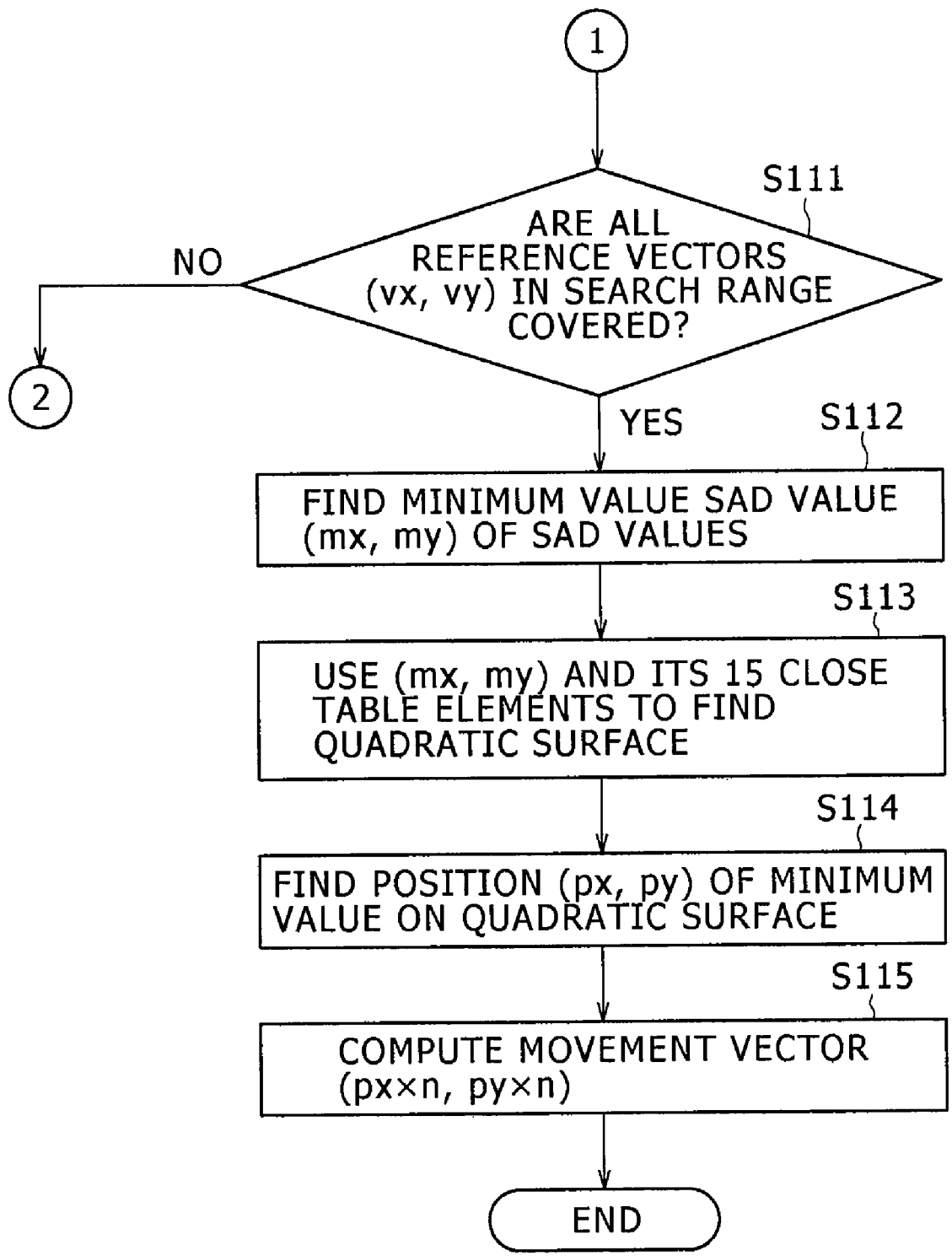
FIG. 32 shows the continuation of the flowchart representing the processing carried out to detect a movement vector in accordance with the first typical implementation in the image-taking apparatus according to the first embodiment.

After the process of the step S109 is completed, the flow of the processing according to the first typical implementation goes on to a step S111 of the flowchart shown in FIG. 32 to produce a result of determination as to whether or not the processes of the steps S101 to S109 have been carried out for all reference-block locations in the search range 105, that is, for all reference vectors (vx, vy).

If the determination result produced at the step S111 indicates that the processes of the steps S101 to S109 have not been carried out yet for all reference vectors (vx, vy), the flow of the processing according to the first typical implementation goes back to the step S101 at which another reference block Ii pointed to by another reference vector (vx, vy) is set at another block position (vx, vy) in the search range 105. Then, the processes of the step S101 and the subsequent steps are repeated.

If the determination result produced at the step S111 indicates that the processes of the steps S101 to S109 have been carried out for all reference vectors (vx, vy), that is, if all elements of the contracted correlation-value table have each been filled with a final component SAD value, on the other hand, the flow of the processing according to the first typical implementation goes on to a step S112 at which the smallest value among all the component final SAD values stored in all the elements of the contracted correlation-value table is detected at a table-element address (mx, my).

Then, at the next step S113, a quadratic surface is created as a surface approximating the minimum correlation value detected at the table-element address (mx, my) and a plurality of correlation values stored in the shrunk correlation-value table as table elements in the neighborhood of the table-element address (mx, my). As described above, the correlation values are each a SAD value. In the case of this embodiment, the number of correlation values stored in the shrunk correlation-value table as table elements in the neighborhood of the table-element address (mx, my) is set at 15. Then, at the next step S114, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S115, a movement vector (px×n, py×n) with the original magnitude and the original direction is computed by multiplying the minimum-value vector (px, py) by the reciprocal value n of the contraction factor as shown in FIG. 6.

Figure 31:
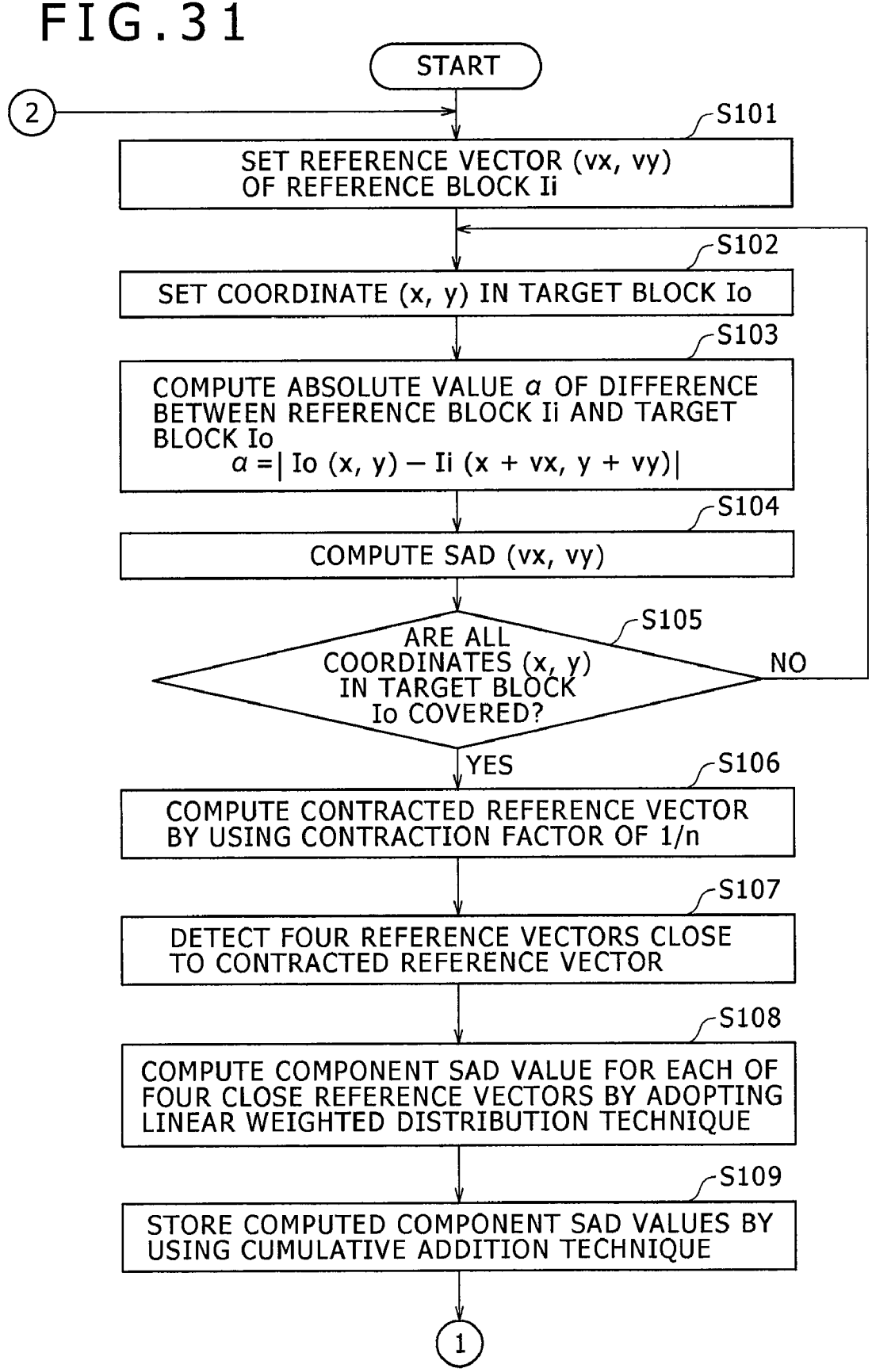
FIG. 31 shows a flowchart representing processing carried out to detect a movement vector in accordance with a first typical implementation in the image-taking apparatus according to the first embodiment.

The flowchart shown in FIGS. 31 and 32 represents processing carried out in accordance with a block-matching technique according to the first typical implementation to detect a movement vector for one target block. For a segmented frame, a plurality of movement vectors need to be detected for frame segments as shown in FIG. 28. In this case, for each one of the movement vectors to be detected or each of the frame segments, a search range and a contraction factor of 1/n must be set anew in order to carry out the processing represented by the flowchart shown in FIGS. 31 and 32.

Please keep in mind that it is needless to say that, the method to make use of cubic curves laid on planes oriented the vertical and horizontal directions respectively as described above can also be adopted as a technique to find the minimum-value vector (px, py) pointing to a position detected on the search range with the precision of the fraction level.

<Second Typical Implementation>

In the case of the first typical implementation described above, a SAD value is found for a reference block or a reference vector and, by adoption of the linear weighted distribution technique, the SAD value is then split into a plurality of component SAD values for a plurality of neighborhood reference vectors each located in close proximity to a shrunk reference vector obtained as a result of contracting the reference vector.

In the case of a second typical implementation, on the other hand, a correlation value is computed as a difference in pixel value between a pixel on the target block and a corresponding pixel on a reference block. The computed correlation value is thus not a SAD value. Then, by adoption of the linear weighted distribution technique, the computed correlation value is split into a plurality of component correlation values for a plurality of neighborhood reference vectors each located in close proximity to a shrunk reference vector obtained as a result of contracting a reference vector pointing to the reference block. The process to compute a correlation value and the process to split the computed correlation value into a plurality of component correlation values are repeated for all pixels in the target block (or all corresponding pixels in the reference blocks) to find a plurality of final component correlation values by adoption of the cumulative addition technique. When the process to compute a correlation value and the process to split the computed correlation value into a plurality of component correlation values are completed for all pixels in the reference block, the state of a resulting contracted correlation-value table (or a resulting contracted SAD table) is the same as the contracted correlation-value table (or the contracted SAD table) generated by the first typical implementation.

The processing flow of the second typical implementation realizing operations of the hand-movement displacement-vector detection unit 15 is explained by referring to a flowchart shown in FIGS. 33 and 34 as follows.

Figure 33:
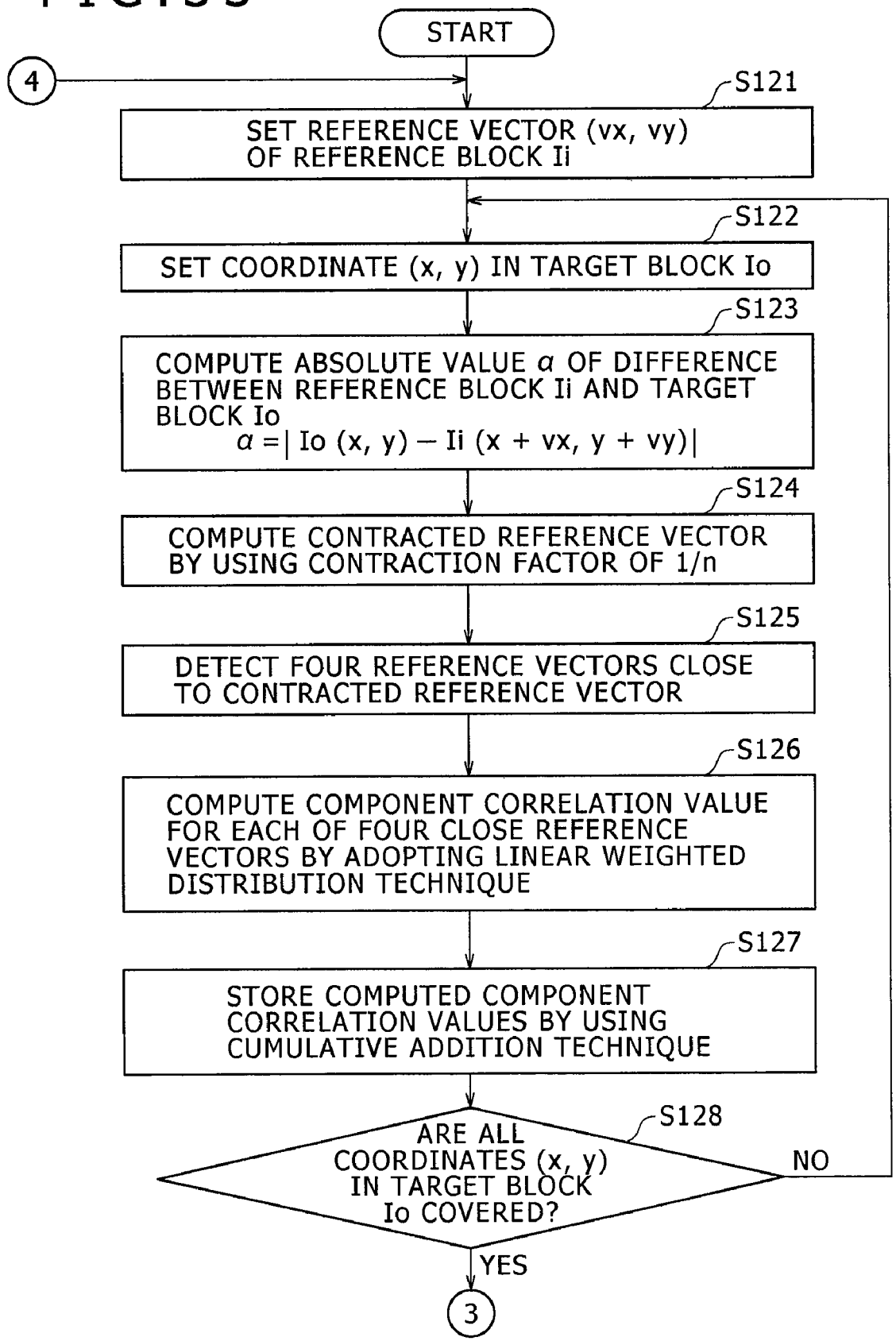
FIG. 33 shows a flowchart representing processing carried out to detect a movement vector in accordance with a second typical implementation in the image-taking apparatus according to the first embodiment.

Since the processes of steps S121 to S123 of the flowchart shown in FIG. 33 are the same as respectively those of the steps S101 to S103 of the flowchart shown in FIG. 31, the processes of steps S121 to S123 are not explained in detail.

At the next step S123 of the flowchart for the second typical implementation, the absolute value a of the difference between the pixel value Io (x, y) of a pixel (x, y) on the target block Io and the pixel value Io (x+vx, y+vy) of the corresponding pixel on the reference block Ii is computed in accordance with Eq. (1). Then, at the next step S124, a contracted reference vector (vx/n, vy/n) is computed by contracting the reference vector (vx, vy) pointing to the reference block Ii at a contraction factor of 1/n.

Subsequently, at the next step S125, a plurality of neighborhood reference vectors located in the neighborhood of the contracted reference vector (vx/n, vy/n) are identified. The neighborhood reference vectors are each a contracted reference vector having an integer vx/n value and an integer vy/n value, which are closest to respectively the x-direction and y-direction values (vx/n, vy/n) of the contracted reference vector (vx/n, vy/n). In this embodiment, the number of neighborhood reference vectors is set at 4. Then, at the next step S126, the absolute value a found at the step S123 as the absolute value of the difference in pixel value is split into four component differences by adoption of the linear weighted distribution technique based on relations between positions pointed to by the neighborhood reference vectors and a position pointed to by the contracted reference vector (vx/n, vy/n) as described earlier.

Subsequently, at the next step S127, the four component differences are distributed among four table elements included in the contracted correlation-value table as four table elements associated with the four neighborhood reference vectors respectively.

After the process of the step S127 is completed, the flow of the processing according to the second typical implementation goes on to the next step S128 to produce a result of determination as to whether or not the processes of the steps S122 to S127 have been carried out for all points (x, y) in the target block Io and all their corresponding points (x+vx, y+vy) in the reference block Ii. If the result of the determination indicates that the processes of the steps S122 to S127 have not been carried out yet for all pixels (x, y) in the target block Io and all their corresponding pixels (x+vx, y+vy) in the reference block Ii, the flow of the processing according to the second typical implementation goes back to the step S122 at which another pixel with coordinates (x, y) is specified as another pixel in the target block Io. Then, the processes of the steps S123 to S127 following the step S122 are repeated.

Figure 34:
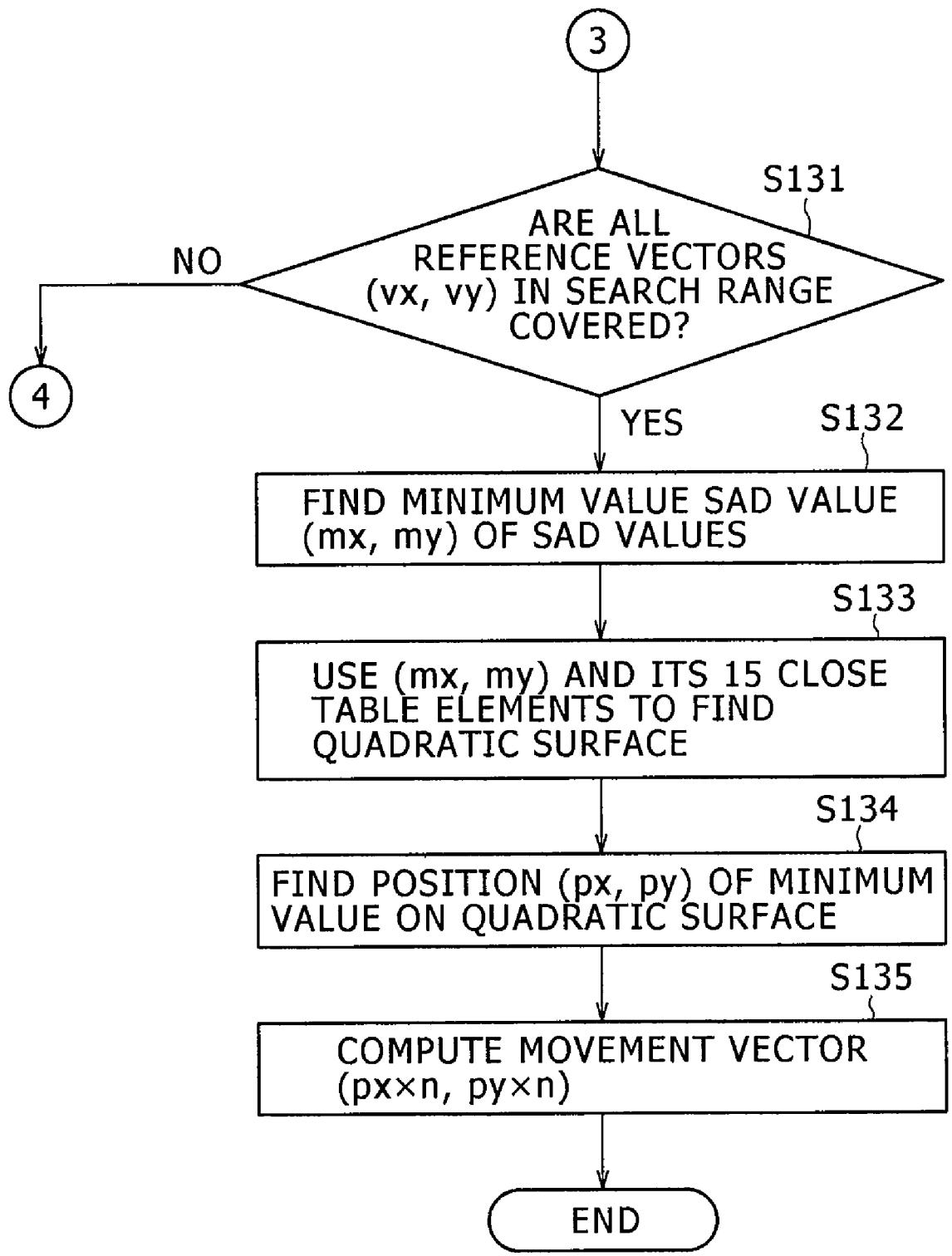
FIG. 34 shows the continuation of the flowchart representing the processing carried out to detect a movement vector in accordance with the second typical implementation in the image-taking apparatus according to the first embodiment.

If the determination result produced at the step S128 indicates that the processes of the steps S123 to S127 have been carried out for all pixels (x, y) in the target block Io and all their corresponding points (x+vx, y+vy) in the reference block Ii, on the other hand, the flow of the processing according to the second typical implementation goes on to a step S131 of the flowchart shown in FIG. 34 to produce a result of determination as to whether or not the processes of the steps S122 to S128 have been carried out for all reference-block locations in the search range 105, that is, for all reference vectors (vx, vy).

If the determination result produced at the step S131 indicates that the processes of the steps S122 to S128 have not been carried out yet for all reference blocks in the search range 105, that is, for all reference vectors (vx, vy), the flow of the processing according to the second typical implementation goes back to the step S121 at which another reference block Ii pointed to by another reference vector (vx, vy) is set at another block position (vx, vy) in the search range 105. Then, the processes of the step S122 and the subsequent steps are repeated.

If the determination result produced at the step S131 indicates that the processes of the steps S122 to S128 have been carried out for all reference-block positions in the search range 105 or for all reference vectors (vx, vy), that is, if all elements of the contracted correlation-value table have each been filled with a final component SAD value, on the other hand, the flow of the processing according to the second typical implementation goes on to a step S132 at which the smallest value among all the component final SAD values stored in all the elements of the contracted correlation-value table or the contracted SAD table is detected at a table-element address (mx, my).

Then, at the next step S133, a quadratic surface is created as a surface approximating the minimum correlation value detected at the table-element address (mx, my) and a plurality of correlation values stored in the shrunk correlation-value table as table elements in the neighborhood of the table-element address (mx, my). As described above, the correlation values are each a SAD value. In the case of this embodiment, the number of correlation values stored in the shrunk correlation-value table as table elements in the neighborhood of the table-element address (mx, my) is set at 15. Then, at the next step S134, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S135, a movement vector (px×n, py×n) with the original magnitude and the original direction is computed by multiplying the minimum-value vector (px, py) by the reciprocal value n of the contraction factor as shown in FIG. 6.

The flowchart shown in FIGS. 33 and 34 represents processing carried out in accordance with a block-matching technique according to the second typical implementation to detect a movement vector for one target block. For a segmented frame, a plurality of movement vectors need to be detected for frame segments as shown in FIG. 28. In this case, for each one of the movement vectors to be detected or each of the frame segments, a search range and a contraction factor of 1/n must be set anew in order to carry out the processing represented by the flowchart shown in FIGS. 33 and 34.

Please keep in mind that it is needless to say that, even in the case of the second typical implementation, in place of the quadratic-surface method described above, the cubic-curve method based on two cubic curves laid on planes oriented the vertical and horizontal directions respectively as described above can also be adopted as a technique to find the minimum-value vector (px, py) pointing to a position detected on the search range with the precision of the fraction level.

<Third Typical Implementation>

If any of the methods to determine a movement vector in accordance with the embodiment is adopted, the process to determine a movement vector does not end with a failure such as detection of a completely incorrect movement vector even for a one-dimensional contraction factor of 1/64 used for contracting reference vectors as is obvious from the effects exhibited by the method as shown in FIG. 24. Thus, in essence, the size of the SAD table used as a typical correlation-value table can be reduced at a two-dimensional shrinking factor of 1/4096(=1/64×1/64) successfully.

As a matter of fact, an attempt can be made to further reduce the size of a shrunk SAD table (used as a typical correlation-value table), which has been obtained as a result of a contraction process using the two-dimensional shrinking factor of 1/4096 or the one-dimensional contraction factor of 1/64. That is to say, first of all, a shrunk SAD table is obtained by carrying out a first process to detect a movement vector at the one-dimensional contraction factor 1/na of 1/64. Then, the size of the search range (which corresponds to the correlation-value table) is further reduced to result in a new search range with its center coinciding with the position pointed to by the detected movement vector before carrying out a second process to detect a movement vector at a one-dimensional contraction factor 1/nb of typically 1/8. Thus, processes to detect a movement vector are carried out by reducing the one-dimensional contraction factor (that is, increasing the magnitude of 1/n) in order to reduce the resulting vector error to a value within a range of tolerance. By properly setting the one-dimensional contraction factor for the second process to detect a movement vector at a proper value, the movement vector can be detected with a very high degree of precision.

The processing flow of the third typical implementation implementing operations of the hand-movement displacement-vector detection unit 15 is explained by referring to a flowchart shown in FIGS. 35 to 38 as follows.

Figure 35:
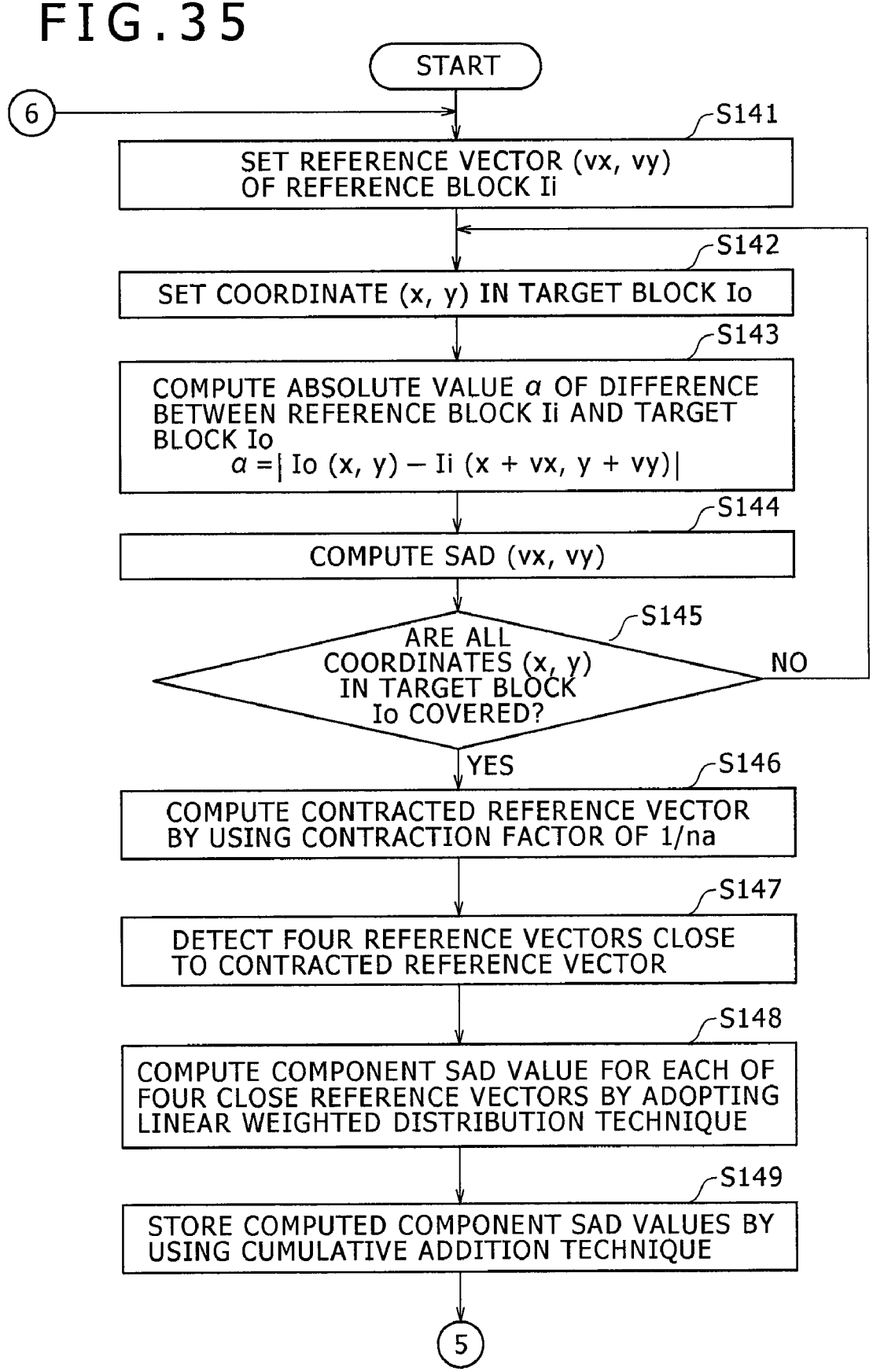
FIG. 35 shows a flowchart representing processing carried out to detect a movement vector in accordance with a second typical implementation in the image-taking apparatus according to the first embodiment.
Figure 36:
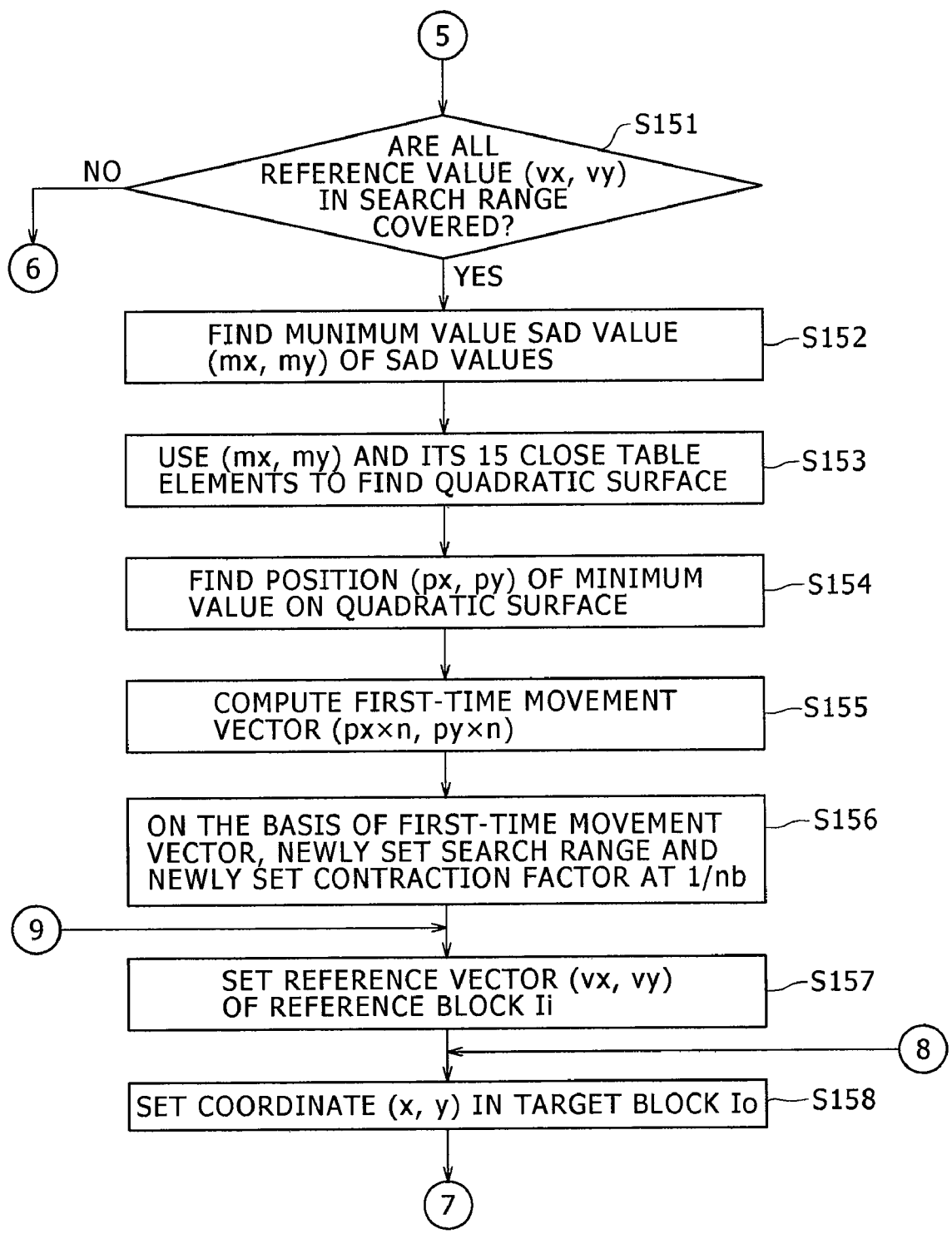
FIG. 36 shows a continuation of the flowchart representing the processing carried out to detect a movement vector in accordance with the third typical implementation in the image-taking apparatus according to the first embodiment.

The processing represented by the flowchart shown in FIGS. 35 to 38 as processing according to the third typical implementation is basically based on the processing to detect a movement vector in accordance with the first typical implementation. Thus, the processes of steps S141 to S149 of the flowchart shown in FIG. 35 are exactly the same as respectively the processes of the steps S101 to S109 of the flowchart shown in FIG. 31 whereas the processes of steps S151 to S155 of the flowchart shown in FIG. 36 are exactly the same as respectively the processes of the steps S111 to S115 of the flowchart shown in FIG. 32.

In the case of the third typical implementation, however, the processing to detect a movement vector is not ended at the step S155 of the flowchart shown in FIG. 36. Instead, the movement vector detected at the step S155 is used as a first movement vector. Then, at the next step S156, the size of the search range in the same reference frame is further reduced to result in a new search range by using the position pointed to by the detected first movement vector as the center of the new search range with a reduced size and by reducing the one-dimensional contraction factor from 1/na used in the first processing to detect a movement vector to 1/nb used in the second processing where na>nb.

To put it in detail, a movement vector detected in the first movement-vector detection processing points to an approximate block range including a reference block having correlation with the target block to a certain degree. Then, it is possible to newly set a narrower search range centered at the approximate block range including the reference block having correlation with the target block to a certain degree as a new block range to be used in the second processing to detect another movement vector. By using a smaller contraction vector, it can be expected that a second movement vector with a smaller error can be detected.

Figure 37:
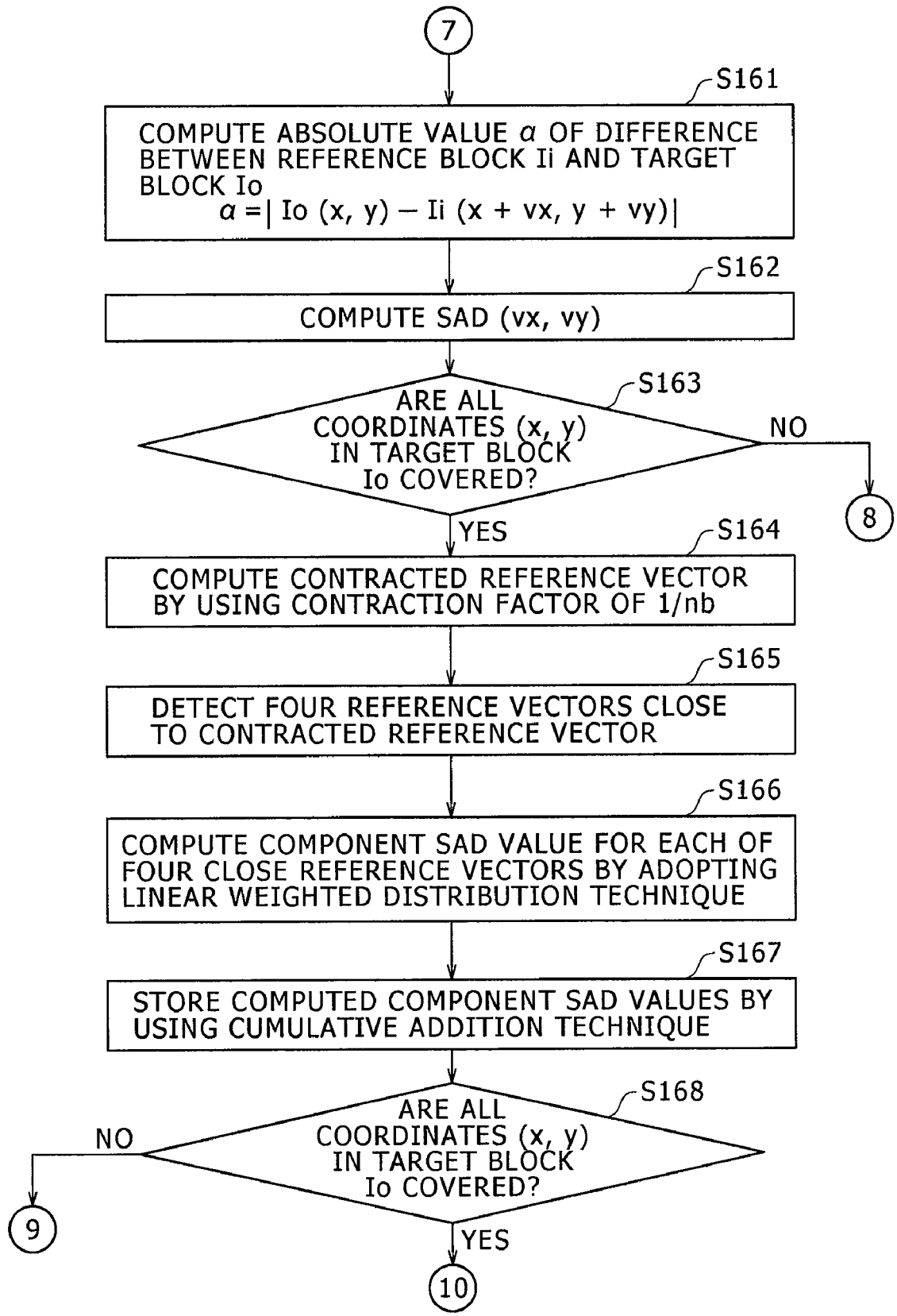
FIG. 37 shows another continuation of the flowchart representing the processing carried out to detect a movement vector in accordance with the third typical implementation in the image-taking apparatus according to the first embodiment.
Figure 38:
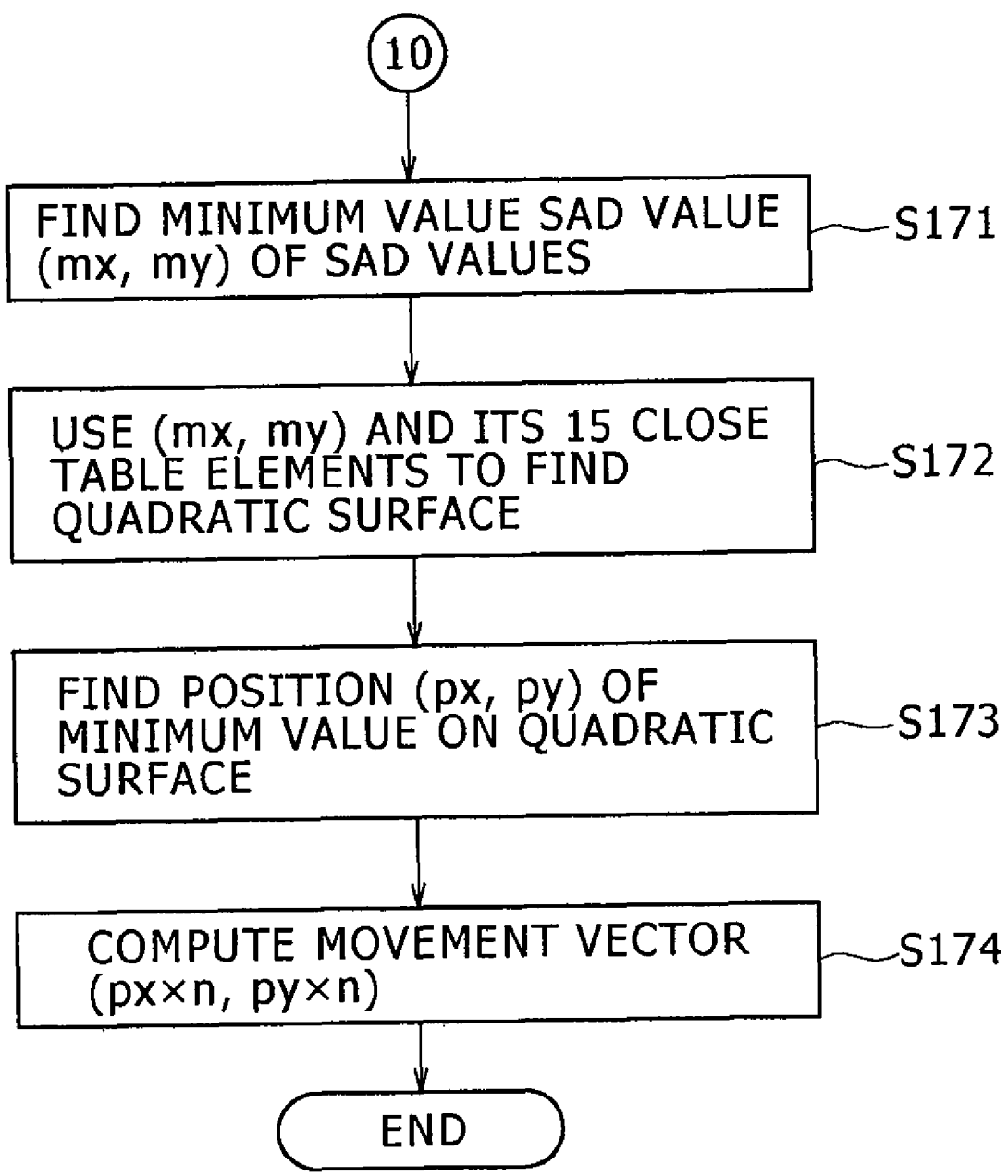
FIG. 38 shows a further continuation of the flowchart representing the processing carried out to detect a movement vector in accordance with the third typical implementation in the image-taking apparatus according to the first embodiment.

Thus, as described above, at the step S156, a narrower search range and a reduced one-dimensional contraction factor are used to carry out the second processing to detect another movement vector in entirely the same way as the first movement-vector detection processing at steps S157 and S158 of the flowchart shown in FIG. 36, steps S161 to S168 of the flowchart shown in FIG. 37 and steps S171 to S174 of the flowchart shown in FIG. 38. The processes of these steps are entirely the same way as the processes of the steps S101 to S109 of the flowchart shown in FIG. 31 and the processes of the steps S111 to S115 of the flowchart shown in FIG. 32.

By carrying out the second movement-vector detection processing as described above, eventually, a second movement vector is detected at the step S174 as the desired final movement vector.

The method to detect a movement vector in accordance with the third typical implementation is implemented by executing the method to detect a movement vector in accordance with the first typical implementation repeatedly two times. It is needless to say, however, that the method to detect a movement vector in accordance with the first typical implementation can be executed repeatedly more than two times with gradually decreased search ranges and, if necessary, gradually decreased contraction factors.

In addition, it is also needless to say that, in realization of the method to detect a movement vector (px, py) in accordance with the third typical implementation, the method to detect a movement vector (px, py) in accordance with the second typical implementation can be executed in place of the method to detect a movement vector (px, py) in accordance with the first typical implementation. On the top of that, in place of the quadratic-surface method described above, the cubic-curve method based on two cubic curves laid on planes oriented in the vertical and horizontal directions respectively can also be adopted as a method to detect a movement vector (px, py) pointing to a position with the precision of the fraction level as is the case the first and second typical implementations described earlier.

[Typical Configuration of the Distortion Compensation Resolution Conversion Unit 16 and Its Processing Operations]

Figure 39:
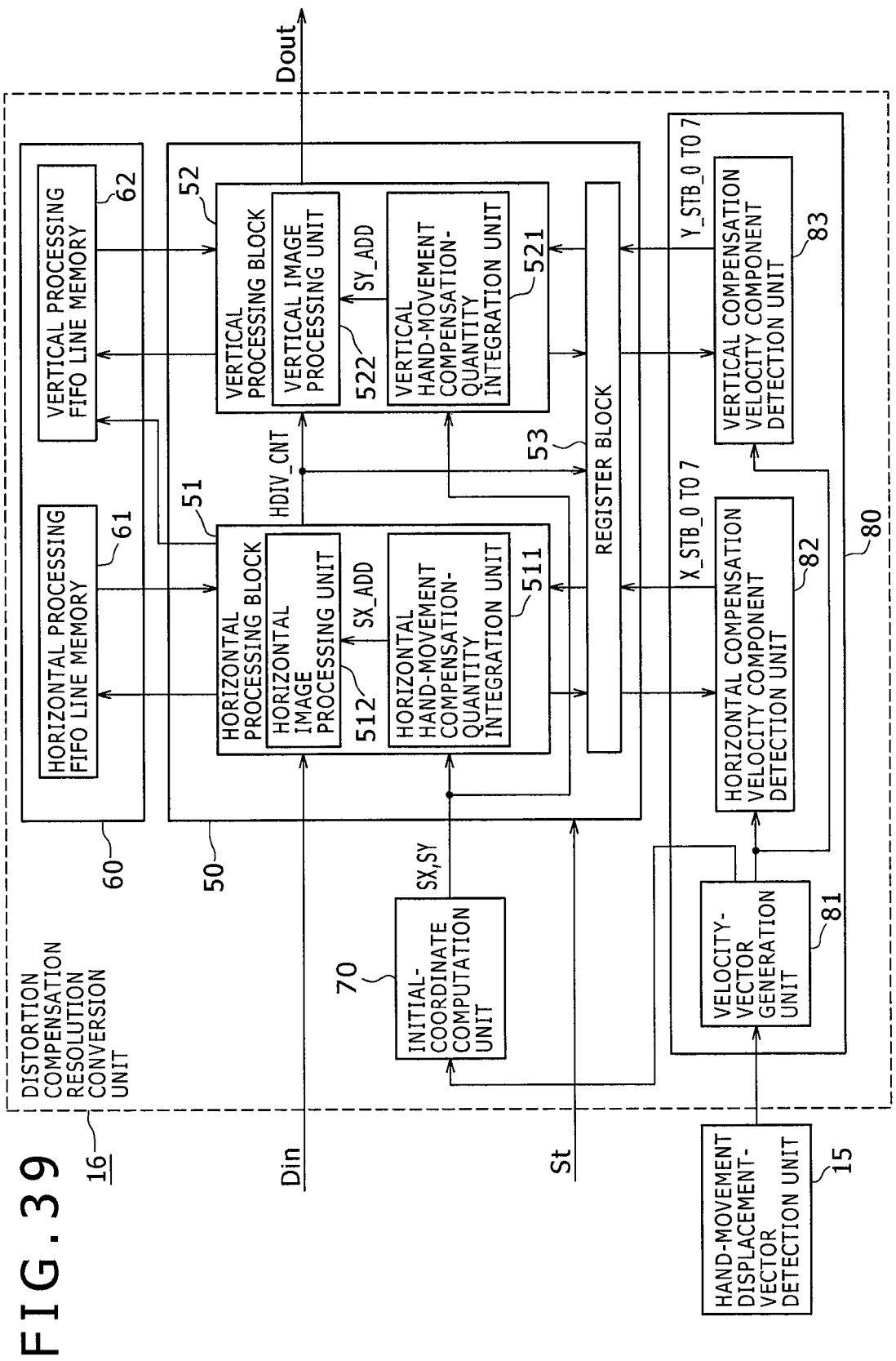
FIG. 39 is a block diagram showing a more detailed typical configuration of a partial block of the image-taking apparatus shown in FIG. 30 as the image-taking apparatus according to the first embodiment.

FIG. 39 is a block diagram showing a typical configuration of the distortion compensation resolution conversion unit 16 according to this embodiment.

As shown in the figure, the distortion compensation resolution conversion unit 16 includes a signal processing unit 50, an image memory 60, an initial-coordinate computation unit 70 and a velocity-vector processing unit 80. The image memory 60, the initial-coordinate computation unit 70 and the velocity-vector processing unit 80 are connected to the signal processing unit 50.

The signal processing unit 50 is a section for carrying out compensation processing on imager-created image data Din received from the frame memory 42 employed in the image memory unit 4 while executing control of processes to read out data from the image memory 60 connected to the signal processing unit 50 and write data into the image memory 60 in order to generate output image data Dout having a specified resolution. The processing carried out by the signal processing unit 50 includes a process to compensate the imager-created image data Din for distortions caused by a hand movement and an electronic zoom process of the imager-created image data Din. The electronic zoom process of the imager-created image data Din is a process to electronically enlarge and shrink the imager-created image data Din.

The signal processing unit 50 receives signals such as a horizontal synchronization signal H-SYNC, a vertical synchronization signal V-SYNC, a 1-pixel period clock signal CLK and a clock signal for synchronization of the horizontal synchronization signal H-SYNC, the vertical synchronization signal V-SYNC and the 1-pixel period clock signal CLK from the timing-signal generation unit 12 with a timing determined by a processing timing signal St. The horizontal synchronization signal H-SYNC is a signal synchronized to the horizontal periods of the output image data Dout whereas the vertical synchronization signal V-SYNC is a signal synchronized to the vertical periods of the output image data Dout. It is to be noted that the horizontal synchronization signal H-SYNC, the vertical synchronization signal V-SYNC, the 1-pixel period clock signal CLK, the clock signal and the processing timing signal St themselves are not shown in the figure.

The velocity-vector processing unit 80 is a section for receiving movement vectors from the hand-movement displacement-vector detection unit 15 described earlier. In the case of this embodiment, the velocity-vector processing unit 80 receives 64 movement vectors 205V1 to 205V64 shown in FIG. 29 from the hand-movement displacement-vector detection unit 15. The velocity-vector processing unit 80 can be implemented as hardware or software executed by the CPU 1.

As shown in FIG. 39, the velocity-vector processing unit 80 includes a velocity-vector generation unit 81, a horizontal compensation velocity component detection unit 82 and a vertical compensation velocity component detection unit 83. The velocity-vector generation unit 81 is a section for generating eight hand-movement velocity vectors Vec_0 to Vec_7 for the eight picture divisions Pdiv_0 to Pdiv_7 respectively from the 64 movement vectors 205V1 to 205V64 received from the hand-movement displacement-vector detection unit 15. The velocity-vector generation unit 81 supplies the eight hand-movement velocity vectors Vec_0 to Vec_7 to the horizontal compensation velocity component detection unit 82 and the vertical compensation velocity component detection unit 83.

Figure 40:
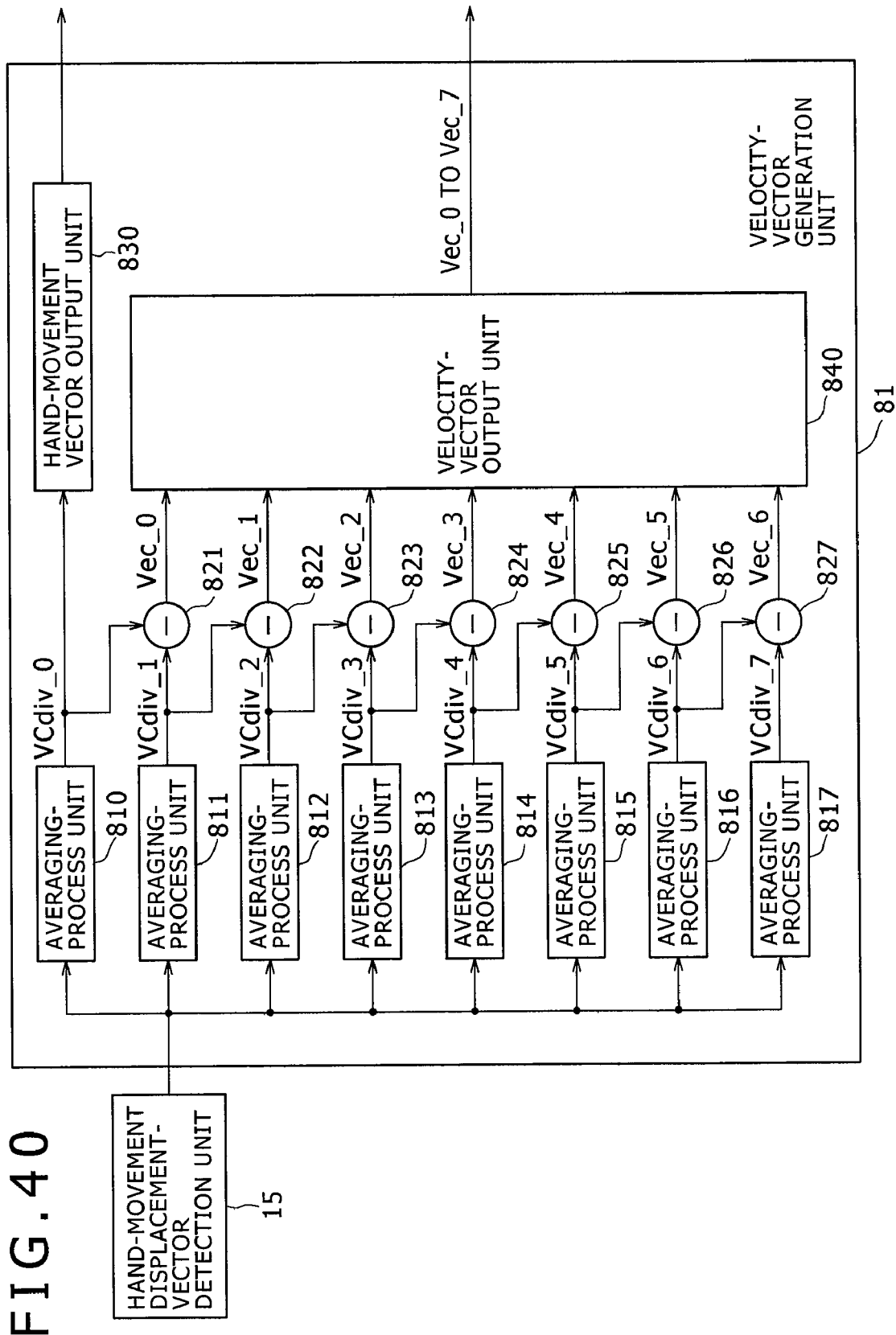
FIG. 40 is a block diagram showing a more detailed typical configuration of a partial block of the image-taking apparatus shown in FIG. 30 as the image-taking apparatus according to the first embodiment.

FIG. 40 is a diagram showing a typical hardware configuration of the velocity-vector generation unit 81. As shown in FIG. 40, the velocity-vector generation unit 81 includes averaging process units 810, 811, 812, 813, 814, 815, 816 and 817, which are associated with the eight picture divisions Pdiv_0 to Pdiv_7 respectively, subtraction units 821, 822, 823, 824, 825, 826 and 827, a hand-movement vector output unit 830 as well as a velocity-vector output unit 840. The subtraction units 821, 822, 823, 824, 825, 826 and 827 are each a section for carrying out a subtraction in order to find a difference between two hand-movement displacement vectors VCdiv received from two averaging process units located at the preceding stage.

The averaging process unit 810 is a section for receiving 8 movement vectors 205V1 to 205V8 for the picture division Pdiv_0 associated with the average process unit 810 from the hand-movement displacement-vector detection unit 15 and carrying out an averaging process including an exception excluding process as described before on the 8 movement vectors 205V1 to 205V8 in order to generate a hand-movement displacement vector VCdiv_0 for the picture division Pdiv_0. By the same token, the other averaging process unit 811, 812, 813, 814, 815, 816 or 817 is a section for receiving 8 movement vectors 205Vi to 205V(i+7) for the picture division Pdiv_1, Pdiv_2, Pdiv_3, Pdiv_4, Pdiv_5, Pdiv_6 or Pdiv_7 associated with the average process units 811, 812, 813, 814, 815, 816 or 817 respectively from the hand-movement displacement-vector detection unit 15 and carrying out an averaging process including an exception excluding process as described before on the 8 movement vectors 205Vi to 205V(i+7) in order to generate a hand-movement displacement vector VCdiv_1, VCdiv_2, VCdiv_3, VCdiv_4, VCdiv_5, VCdiv_6 or VCdiv_7 for the picture division Pdiv_1, Pdiv_2, Pdiv_3, Pdiv_4, Pdiv_5, Pdiv_6 or Pdiv_7 respectively where i is an integer having the value 9, 17, 25, 33, 41, 49 or 57 respectively.

The subtraction unit 821 is a section for finding a hand-movement velocity vector Vec_0 for the picture division Pdiv_0 by computing a difference between the hand-movement displacement vectors VCdiv_0 and VCdiv_1 received from the averaging process units 810 and 811 respectively on the basis of Eq. (3) described earlier and supplying the hand-movement velocity vector Vec_0 to the velocity-vector output unit 840. By the same token, the other subtraction unit 822, 823, 824, 825, 826 or 827 is a section for finding a hand-movement velocity vector Vec_1, Vec_2, Vec_3, Vec_4, Vec_5, or Vec_6 for the picture division Pdiv_1, Pdiv_2, Pdiv_3, Pdiv_4, Pdiv_5 or Pdiv_6 respectively by computing a difference between the hand-movement displacement vectors VCdiv_i and VCdiv_(i+1) received from the averaging process units 81i and 81(i+1) respectively on the basis of Eq. (3) described earlier and supplying the hand-movement velocity vector Vec_1, Vec_2, Vec_3, Vec_4, Vec_5 or Vec_6 to the velocity-vector output unit 840 where i is an integer in the range 1 to 6.

The velocity-vector output unit 840 is a section for finding a hand-movement velocity vector Vec_7 for the picture division Pdiv_7 at the bottom of the image as described earlier. In the case of this embodiment, the velocity-vector output unit 840 finds a hand-movement velocity vector Vec_7 for the picture division Pdiv_7 at the bottom of the image by adoption of an estimation technique based on the hand-movement velocity vectors Vec_0, Vec_1, Vec_2, Vec_3, Vec_4, Vec_5 and Vec_6. The velocity-vector output unit 840 supplies the hand-movement velocity vector Vec_7 to the horizontal compensation velocity component detection unit 82 and the vertical compensation velocity component detection unit 83 along with the hand-movement velocity vector Vec_0 to Vec_6 received from the subtraction units 821 to 827 respectively.

Figure 41:
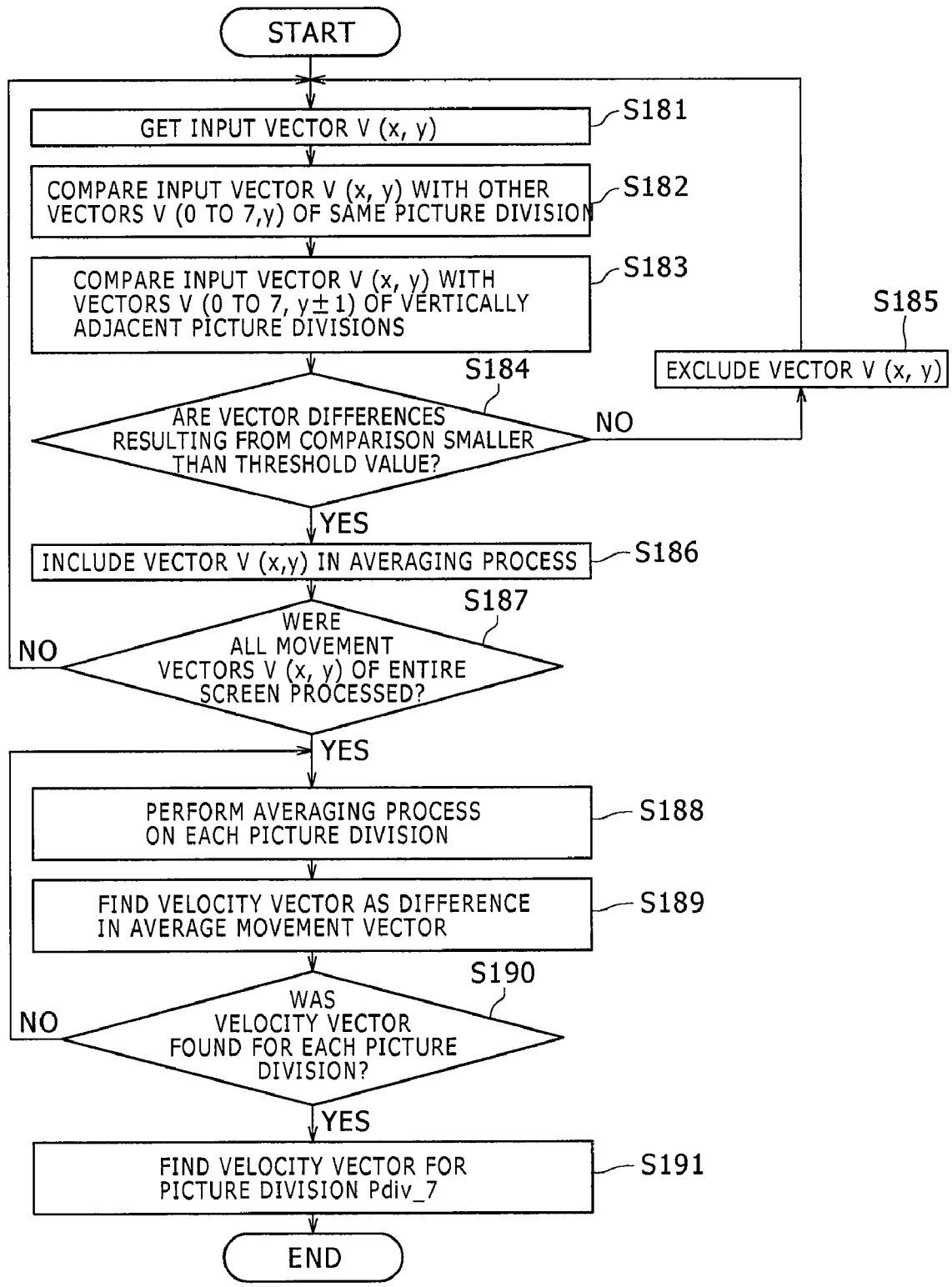
FIG. 41 shows a flowchart representing processing operations carried out by a partial block of the image-taking apparatus shown in FIG. 30 as the image-taking apparatus according to the first embodiment.

FIG. 41 shows a flowchart representing software executed in order to carry out processing of the velocity-vector generation unit 80. It is to be noted that, in the following description of the flowchart shown in FIG. 41, the movement vectors 205Vi to 205V(i+7) are referred to as vectors V(x, y) where x and y are each an integer in the range 1 to 8.

As shown in the figure, the flowchart begins with a step S181 at which a movement vector V (x, y) is retrieved from the hand-movement displacement-vector detection unit 15. Then, at the next step S 182, the retrieved movement vector V (x, y) is compared with other retrieved movement vectors V (0 to 7, y) of the same picture division by finding differences between the compared movement vectors. Subsequently, at the next step S183, the retrieved movement vector V (x, y) is compared with retrieved movement vectors V (0 to 7, y±1) of picture divisions vertically adjacent to a picture division, from which the movement vector V (x, y) has been retrieved, by finding differences between the compared movement vectors.

Then, the flow of the processing goes on to the next step S184 to produce a result of determination as to whether or not the retrieved movement vector V (x, y) is an exceptional vector by confirming that each of the differences obtained as results of the comparison processes carried out at the steps S182 and S183 is not greater than a threshold value determined in advance.

If the determination result produced at the step S184 indicates that the retrieved movement vector V (x, y) is an exceptional vector as evidenced by the fact that any of the differences obtained as results of the comparison processes carried out at the steps S182 and S183 are greater than the threshold value, the flow of the processing goes on to a step S185 at which the retrieved movement vector V (x, y) is excluded from an averaging process. Then, the flow of the processing goes back to the step S181 to repeat the processes of this and subsequent steps.

If the determination result produced at the step S184 indicates that the retrieved movement vector V (x, y) is not an exceptional vector as evidenced by the fact that none of the differences obtained as results of the comparison processes carried out at the steps S182 and S183 are greater than the threshold value, on the other hand, the flow of the processing goes on to a step S186 at which a decision is made to include the retrieved movement vector V (x, y) in the averaging process. Then, the flow of the processing goes on to a step S187 to produce a result of determination as to whether or not the processes of the steps S181 to S186 have been carried out for all movement vectors of the entire screen.

If the determination result produced at the step S187 indicates that the processes of the steps S181 to S186 have not been carried out for all movement vectors of the entire screen, the flow of the processing goes back to the step S181 to repeat the processes of this and subsequent steps.

If the determination result produced at the step S187 indicates that the processes of the steps S181 to S186 have been carried out for all movement vectors of the entire screen, on the other hand, the flow of the processing goes on to a step S188 at which the averaging process is carried out to compute an average movement vector VCdiv for every picture division Pdiv.

Then, at the next step S189, a difference in average movement vector computed in the averaging process between any two adjacent picture divisions is found and taken as a hand-movement velocity vector Vec. Subsequently, the flow of the processing goes on to a step S190 to produce a result of determination as to whether or not the averaging process to compute an average movement vector VCdiv and the process to find a hand-movement velocity vector Vec have been completed for the picture divisions Pdiv_0 to Pdiv_6.

If the determination result produced at the step S190 indicates that the averaging process to compute an average movement vector VCdiv and the process to find a hand-movement velocity vector Vec have not been completed for all the picture divisions Pdiv_0 to Pdiv_6, the flow of the processing goes back to the step S188 to repeat the processes of this and subsequent steps. If the determination result produced at the step S190 indicates that the averaging process to compute an average movement vector VCdiv and the process to find a hand-movement velocity vector Vec have been completed for all the picture divisions Pdiv_0 to Pdiv_6, on the other hand, the flow of the processing goes on to a step S191 at which a hand-movement velocity vector Vec_7 for the picture division Pdiv_7 at the bottom of the image is found by adoption of an estimation technique as described before. Finally, the processing is ended.

As explained earlier, the velocity-vector output unit 840 supplies the hand-movement velocity vectors Vec_0 to Vec_7 found for the picture divisions Pdiv_0 to Pdiv_7 respectively by carrying out the processing described above to the horizontal compensation velocity component detection unit 82 and the vertical compensation velocity component detection unit 83.

The horizontal compensation velocity component detection unit 82 is a section for extracting the horizontal-direction component of each of the hand-movement velocity vectors Vec_0 to Vecv_7 found for the picture divisions Pdiv_0 to Pdiv_7 respectively and finding the inverted-sign component of every horizontal-direction component. Let us refer the inverted-sign components as horizontal compensation velocity components X_STB_0 to X_STB_7. The horizontal compensation velocity component detection unit 82 supplies the horizontal compensation velocity components X_STB_0 to X_STB_7 to the signal processing unit 50.

On the other hand, the vertical compensation velocity component detection unit 83 is a section for extracting the vertical-direction component of each of the hand-movement velocity vectors Vec_0 to Vec_7 found for the picture divisions Pdiv_0 to Pdiv_7 respectively and finding the inverted-sign component of every vertical-direction component. Let us refer the inverted-sign components as vertical compensation velocity components Y_STB_0 to Y_STB_7. The vertical compensation velocity component detection unit 83 supplies the vertical compensation velocity components Y_STB_0 to Y_STB_7 to the signal processing unit 50.

In addition, the velocity-vector generation unit 81 supplies the average movement vector VCdiv_0 found by the averaging-process unit 810 for the picture division Pdiv_0 to the initial-coordinate computation unit 70 as it is by way of the hand-movement vector output unit 830.

The initial-coordinate computation unit 70 finds the initial coordinates (SX, SY) of the read position in an image memory used for storing image data of the frame being processed from the hand-movement velocity vector VCdiv_0 and supplies the initial coordinates (SX, SY) to the signal processing unit 50.

Then, as will be described later in detail, while controlling operations to write image data into the image memory 60 and read out image data from the image memory 60, the signal processing unit 50 computes a horizontal compensation displacement quantity SX_ADD for every horizontal line from the horizontal compensation velocity components X_STB_0 to X_STB_7 received from the horizontal compensation velocity component detection unit 82 employed in the velocity-vector processing unit 80 and also computes a vertical compensation displacement quantity SY_ADD for every horizontal line from the vertical compensation velocity components Y_STB_0 to Y_STB_7 received from the vertical compensation velocity component detection unit 83 employed in the velocity-vector processing unit 80. Then, the signal processing unit 50 makes use of the horizontal compensation displacement quantities SX_ADD and the vertical compensation displacement quantities SY_ADD to carry out a process of compensating the imager-created image data Din received from the image memory unit 4 for image distortions caused by a hand movement in order to generate output image data Dout.

It is to be noted that, as described before, in addition to the electronic zoom (image enlarging and shrinking) process, the signal processing unit 50 also carries out processing such as a resolution conversion process according to predetermined quantities including a standard fineness and a high fineness.

That is to say, the signal processing unit 50 is provided with a horizontal processing block 51, a vertical processing block 52 and a register block 53 for carrying out the distortion compensation process, the electronic zoom process and the output-data generation process. The horizontal processing block 51 includes a horizontal hand-movement compensation-quantity integration unit 511 and a horizontal image processing unit 512 whereas the vertical processing block 52 includes a vertical hand-movement compensation-quantity integration unit 521 and a vertical image processing unit 522.

The horizontal processing block 51 is a section for carrying out horizontal-direction processes on the imager-created image data Din. The horizontal-direction processes include a horizontal-direction distortion compensation process. On the other hand, the vertical processing block 52 is a section for carrying out vertical-direction processes on the imager-created image data Din. The vertical-direction processes include a vertical-direction distortion compensation process. The register block 53 is a section for carrying out a process to pass on the horizontal compensation velocity components X_STB each detected in the horizontal compensation velocity component detection unit 82 employed in the velocity-vector processing unit 80 as the component of every hand-movement velocity vector Vec to the horizontal processing block 51 and the vertical compensation velocity components Y_STB each detected in the vertical compensation velocity component detection unit 83 employed in the velocity-vector processing unit 80 as the component of every hand-movement velocity vector Vec to the vertical processing block 52.

In the case of this embodiment, the horizontal compensation velocity components X_STB_0 to X_STB_7 and the vertical compensation velocity components Y_STB_0 to Y_STB_7 are each a hand-movement compensation quantity per horizontal-line period time length.

That is to say, the horizontal compensation velocity components X_STB (X_STB_0 to X_STB_7) is quantitatively expressed as follows:

X_STB=Horizontal compensation quantity/Time length of a horizontal line period

By the same token, the vertical compensation velocity components Y_STB (Y_STB_0 to Y_STB_7) is quantitatively expressed as follows:

Y_STB=Vertical compensation quantity/Time length of a horizontal line period

The horizontal compensation velocity components X_STB_0 to X_STB_7 are each a multiple of a horizontal-direction pixel pitch dx, which is defined as the horizontal-direction distance between 2 horizontally adjacent pixels. In the following description, the value of a multiple of a horizontal-direction pixel pitch dx may include a fraction part. That is to say, the horizontal compensation velocity components X_STB_0 to X_STB_7 are each a pixel count assumed in the following description to be a value, which may include a fraction part. By the same token, the vertical compensation velocity components Y_STB_0 to Y_STB_7 are each a multiple of a vertical-direction pixel pitch dy, which is defined as the vertical-direction distance between 2 vertically adjacent pixels. In the following description, the value of a multiple of a vertical-direction pixel pitch dx may include a fraction part. That is to say, the vertical compensation velocity components Y_STB_0 to Y_STB_7 are each a pixel count assumed in the following description to be a value, which may include a fraction part.

The horizontal compensation velocity components X_STB_0 to X_STB_7 can be found in the horizontal compensation velocity component detection unit 82 by making use of a table for converting the horizontal component of a hand-movement velocity Vec output by the velocity-vector generation unit 81 into a pixel count assumed in the following description to be a value, which may include a fraction part. To be more specific, the table is search for a pixel count corresponding to the horizontal component of a hand-movement velocity Vec input from the velocity-vector generation unit 81. Then, a sign having a direction opposite to the direction of the horizontal component of the hand-movement velocity Vec is appended to the pixel count in order to obtain a horizontal compensation velocity component X_STB. By the same token, the vertical compensation velocity components Y_STB_0 to Y_STB_7 can be found in the vertical compensation velocity component detection unit 83 by making use of a similar table. To be more specific, the table is search for a pixel count corresponding to the vertical component of a hand-movement velocity Vec input from the velocity-vector generation unit 81. Then, a sign having a direction opposite to the direction of the vertical component of the hand-movement velocity Vec is appended to the pixel count in order to obtain a vertical compensation velocity component Y_STB.

In this embodiment, each of the horizontal compensation velocity components X_STB_0 to X_STB_7 is used for finding the horizontal hand-movement compensation displacement quantity SX_ADD in a time-axis integration process, which is actually a simple cumulative addition process for a horizontal line associated with the horizontal compensation velocity component X_STB. That is to say, as shown in FIG. 2, the process of integration with respect to time is a process to find the horizontal hand-movement compensation displacement quantity SX_ADD as follows:

SX_ADD=Cumulative sum of X_STB

By the same token, each of the vertical compensation velocity components Y_STB_0 to Y_STB_7 is used for finding the vertical hand-movement compensation quantity SY_ADD in a time-axis integration process, which is actually a simple cumulative addition process for a horizontal line associated with the vertical compensation velocity component Y_STB. That is to say, the process of integration with respect to time is a process to find the vertical hand-movement compensation quantity SY_ADD as follows:

SY_ADD=Cumulative sum of Y_STB

Then, the horizontal compensation velocity components X_STB_0 to X_STB_7 generated by the horizontal compensation velocity component detection unit 82 and the vertical compensation velocity components Y_STB_0 to Y_STB_7 generated by the vertical compensation velocity component detection unit 83 are sequentially supplied to an IF (interface) register of the register block 53 employed in the signal processing unit 50 with timings set by for example a timing signal St produced by the timing-signal generation unit 12. It is to be noted that the IF register itself is not shown in FIG. 39.

Subsequently, the horizontal compensation velocity components X_STB_0 to X_STB_7 are sequentially transferred from the IF (interface) register to a horizontal processing register employed in the register block 53 with processing timings generated for the horizontal processing block 51 as timings other than the above timings set by the timing signal St. By the same token, the vertical compensation velocity components Y_STB_0 to Y_STB_7 are sequentially transferred from the interface register to a vertical processing register employed in the register block 53 with processing timings generated for the vertical processing block 52 as timings other than the above timings set by the timing signal St. It is to be noted that the horizontal processing register and the vertical processing register are not shown in FIG. 39.

The horizontal hand-movement compensation-quantity integration unit 511 employed in the horizontal processing block 51 carries out an aforementioned process of integration with respect to time on the horizontal compensation velocity components X_STB_0 to X_STB_7 stored in the horizontal processing register employed in the register block 53 for the picture divisions Pdiv_0 to Pdiv_7 respectively in order to find a horizontal hand-movement compensation displacement quantity SX_ADD for the picture divisions Pdiv_0 to Pdiv_7 as shown in FIG. 2. By the same token, the vertical hand-movement compensation-quantity integration unit 521 employed in the vertical processing block 52 carries out the process of integration with respect to time on the vertical compensation velocity components Y_STB_0 to Y_STB_7 stored in the vertical processing register employed in the register block 53 for the picture divisions Pdiv_0 to Pdiv_7 respectively in order to find a vertical hand-movement compensation quantity SY_ADD for the picture divisions Pdiv_0 to Pdiv_7.

The horizontal image processing unit 512 employed in the horizontal processing block 51 carries out a compensation process in order to compensate the image for distortions caused by a hand movement in the horizontal direction by making use of the horizontal hand-movement compensation displacement quantity SX_ADD computed by the horizontal hand-movement compensation-quantity integration unit 511. By the same token, the vertical image processing unit 522 employed in the vertical processing block 52 carries out a compensation process in order to compensate the image for distortions caused by a hand movement in the vertical direction by making use of the vertical hand-movement compensation quantity SY_ADD computed by the vertical hand-movement compensation-quantity integration unit 521. The horizontal image processing unit 512 employed in the horizontal processing block 51 and the vertical image processing unit 522 employed in the vertical processing block 52 carry out the compensation processes while controlling operations to write image data into the image memory 60 and read out image data from the image memory 60.

In this embodiment, the image memory 60 has a horizontal processing FIFO line memory 61 and a vertical processing FIFO line memory 62. In the case of this embodiment, the horizontal processing FIFO line memory 61 has a storage capacity for storing data of one horizontal line. On the other hand, the vertical processing FIFO line memory 62 has a storage capacity for storing data of as many horizontal lines as taps of a FIR (Finite Impulse Response) filter for a vertical-direction interpolation process to be described later.

The horizontal image processing unit 512 employed in the horizontal processing block 51 has a FIFO memory controller and a horizontal-direction interpolation processing unit, both of which are not shown in FIG. 39. The FIFO memory controller is a section for controlling operations to write image data into the horizontal processing FIFO line memory 61 and read out image data from the horizontal processing FIFO line memory 61. The horizontal-direction interpolation processing unit is a section for carrying out an interpolation process on the assumption that the computed horizontal hand-movement compensation displacement quantity SX_ADD has a fraction part indicating that the post-compensation position of a pixel coincides with a horizontal-direction offset from the true position of a pixel. As will be described later, the horizontal-direction interpolation processing unit according to this embodiment employs a horizontal-direction digital FIR filter referred to hereafter simply as a horizontal FIR filter.

By the same token, the vertical image processing unit 522 employed in the vertical processing block 52 has a memory controller and a vertical-direction interpolation processing unit, both of which are not shown in FIG. 39. The memory controller is a section for controlling operations to write image data into the vertical processing FIFO line memory 62 and read out image data from the vertical processing FIFO line memory 62. The vertical-direction interpolation processing unit is a section for carrying out an interpolation process on the assumption that the computed vertical hand-movement compensation quantity SY_ADD has a fraction part indicating that the post-compensation position of a pixel coincides with a vertical-direction offset from the true position of a pixel. As will be described later, the vertical-direction interpolation processing unit according to this embodiment employs a vertical-direction digital FIR filter referred to hereafter simply as a vertical FIR filter.

The following description explains the interpolation processes on the assumption that any of the computed horizontal hand-movement compensation displacement quantity SX_ADD and the computed vertical hand-movement compensation quantity SY_ADD have a fraction part.

Figure 42:
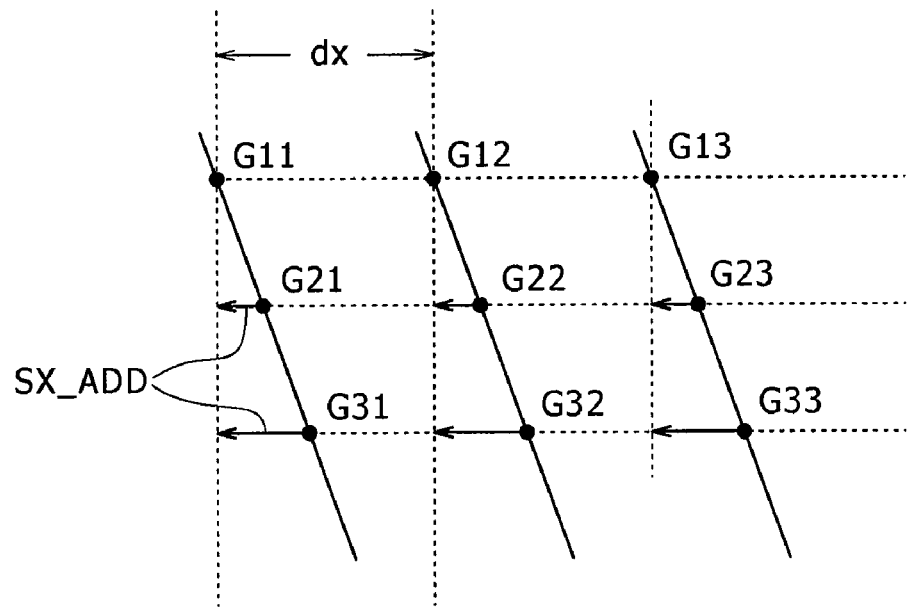
FIG. 42 is an explanatory diagram to be referred to in description of an interpolation process carried out as part of processing to compensate an image for distortions by adoption of an image-distortion compensation method according to an embodiment.

Let us imagine a typical case in which horizontal-direction component velocity components X_STB of a hand movement results in image distortions like ones shown in FIG. 42. That is to say, in the example shown in FIG. 42, if there is no hand movement, pixels G11, G21, G31 and so on, pixels G12, G22, G32 and so on and pixels G13, G23, G33 and so on are each located at an intersection of vertical and horizontal dashed lines. Since there is a hand movement, however, the pixels G11, G21, G31 and so on, the pixels G12, G22, G32 and so on and the pixels G13, G23, G33 and so on are each located at an intersection of an inclined solid line and a horizontal dashed line.

In order to compensate the image for the distortions caused by the hand movement, it is necessary to restore the shifted pixel positions to their original positions. As shown in FIG. 42, the magnitude of a pixel-position shift for a horizontal line is the horizontal hand-movement compensation displacement quantity SX_ADD computed for the line. If the computed horizontal hand-movement compensation displacement quantity SX_ADD is a multiple of a pixel pitch dx, in order to compensate the image for the distortions caused by the hand movement, image data read out from a specific position is taken as the image data of a pixel at a position shifted from the specific position by a distance equal to the computed horizontal hand-movement compensation displacement quantity SX_ADD, which is a multiple of the pixel pitch dx.

If the computed horizontal hand-movement compensation displacement quantity SX_ADD is not a multiple of the pixel pitch dx, that is, if the computed horizontal hand-movement compensation displacement quantity SX_ADD has a fraction part, however, a pixel does not exist at a position shifted from the specific position by a distance equal to the computed horizontal hand-movement compensation displacement quantity SX_ADD. In this case, the image data of a pixel at an observed position needs to be obtained by carrying out an interpolation technique based on image data of pixels at a plurality of positions each shifted from the observed position by a distance, which is equal to a multiple of the pixel pitch dx and closest to the computed horizontal hand-movement compensation displacement quantity SX_ADD.

Figure 43:
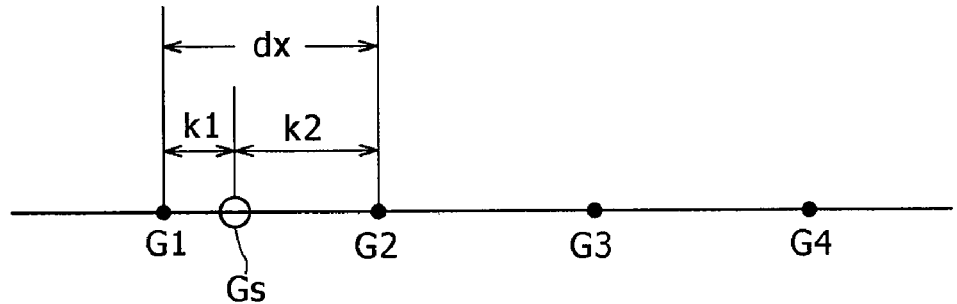
FIG. 43 is an explanatory diagram to be referred to in description of an interpolation process carried out as part of processing to compensate an image for distortions by adoption of an image-distortion compensation method according to an embodiment.
Figure 44:
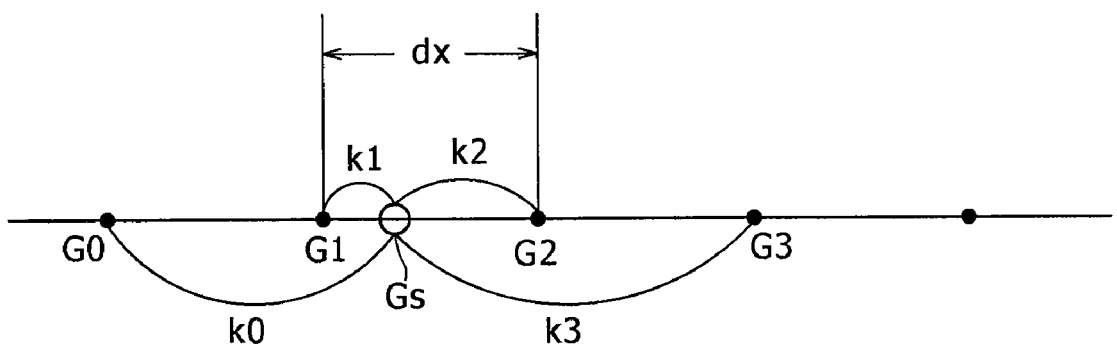
FIG. 44 is an explanatory diagram to be referred to in description of an interpolation process carried out as part of processing to compensate an image for distortions by adoption of an image-distortion compensation method according to an embodiment.

FIG. 43 is a diagram showing the interpolation technique described above. The computed horizontal hand-movement compensation displacement quantity SX_ADD having a fraction part corresponds to a distance from an observed position mentioned above to a non-existing pixel position Gs between specific pixels G1 and G2. In this case, the image data of a pixel at the observed position is obtained by carrying out an interpolation technique based on image data of the pixels G1 and G2 existing at positions each shifted from the observed position by a distance, which is equal to a multiple of the pixel pitch dx and closest to the computed horizontal hand-movement compensation displacement quantity SX_ADD. Let us assume that the ratio k1:k2 of the distance k1 between G1 and Gs to the distance k2 between Gs and G2 is W:(1−W), that is, k1:k2=W:(1−W). In this case, interpolated image data found in accordance with the following interpolation equation is taken as the image data of the pixel at the observed position:

Interpolated image data at $Gs = G1$'s image data $\times (W-1) + G2$'s image data $\times W$ Instead of making use of pixel data of only two pixels G1 and G2 in the interpolation process as is the case with the example shown in FIG. 43, image data of more than two pixels can be used. In another example shown in FIG. 44, pixel data of four pixels G0 to G3 is used in the interpolation process. Much like the example shown in FIG. 43, the pixels G0 to G3 exist at positions each shifted from the observed position by a distance, which is equal to a multiple of the pixel pitch dx and closest to the computed horizontal hand-movement compensation displacement quantity SX_ADD. In this case, interpolation weights W0, W1, W2 and W3 for the pixels G0, G1, G2 and G3 respectively are determined on the basis of distances k0, k1, k2 and k3 from the non-existing pixel position Gs to the positions of the pixels G0, G1, G2 and G3 respectively, and interpolated image data found in accordance with the following interpolation equation is taken as the image data of the pixel at the observed position:

Interpolated image data at $Gs = G0 \times W0 + G1 \times W1 + G2 \times W2 + G3 \times W3$ The interpolation weights W0, W1, W2 and W3 for the pixels G0, G1, G2 and G3 respectively are typically found from a interpolation-weight table having entries each showing a set of aforementioned interpolation weights W0, W1, W2 and W3. Then, by making use of a distance ds from the non-existing pixel position Gs to the position of the pixel G1 or G2 as a search key, the interpolation-weight table is searched for an entry showing a set of aforementioned interpolation weights W0, W1, W2 and W3 corresponding to the search key. It is to be noted that, as is obvious from FIG. 44, the distance ds from the non-existing pixel position Gs to the position of the pixel G1 or G2 corresponds to the fraction part of the computed horizontal hand-movement compensation displacement quantity SX_ADD.

In this embodiment, the interpolation process is carried out by making use of a horizontal FIR filter. That is to say, the interpolation-weight table described above is searched for a set of interpolation weights corresponding to the fraction part of a computed horizontal hand-movement compensation displacement quantity SX_ADD. Then, the interpolation weights are supplied to the horizontal FIR filter in order carry out the interpolation process.

A vertical-direction interpolation process is the same as the horizontal-direction process described above except that the horizontal direction taken in the horizontal-direction process as the interpolation direction is replaced by the vertical direction in the vertical-direction interpolation process.

[Processing Operations of the Horizontal Processing Block 51]

[Integration to Produce a Horizontal Hand-Movement Compensation Displacement Quantity SX_ADD]

Figure 45:
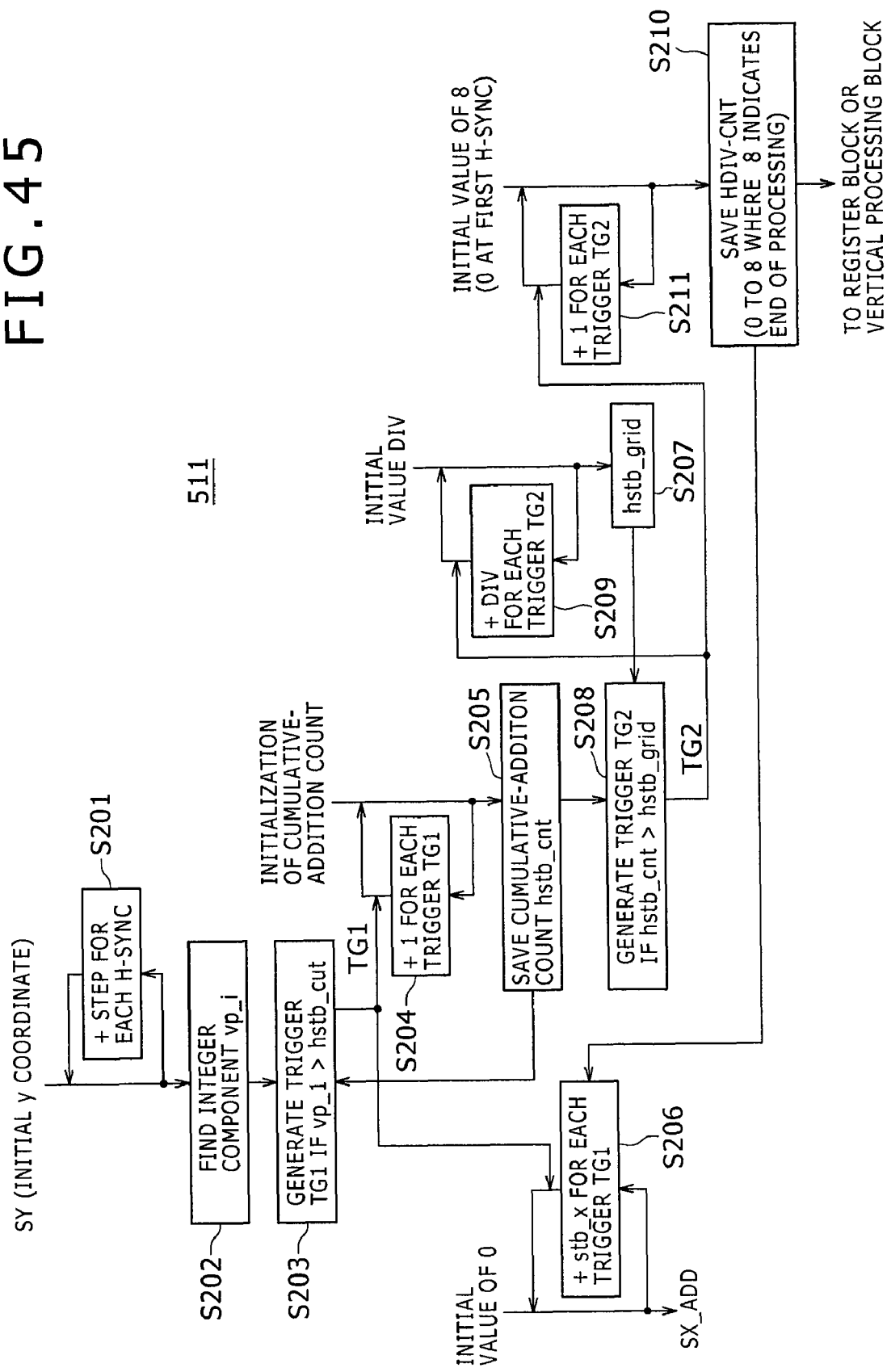
FIG. 45 is a block diagram showing processing operations carried out by a horizontal hand-movement compensation-quantity integration unit employed in an image-taking apparatus according to an embodiment.

FIG. 45 shows a flowchart representing integration processing operations carried out by the horizontal hand-movement compensation-quantity integration unit 511 to produce a horizontal hand-movement compensation displacement quantity SX_ADD as a result of integration.

As shown in the figure, the flowchart includes a step S201 at which a value 'step' is cumulatively added to an initial y-axis coordinate SY for every pulse of a horizontal synchronization signal H-SYNC. In this case, the y axis represents the positions of horizontal lines whereas the horizontal synchronization signal H-SYNC means a timing signal included in an ordinary horizontal scanning signal as a signal masking out regions outside an effective pixel area.

The initial y-axis coordinate SY indicates the position the first horizontal line of an output screen in an all-pixel coordinate system on the CMOS imager. In general, the initial y-axis coordinate SY does not correspond to the y-axis coordinate of 0 of the all-pixel coordinate system. In the following description, the all-pixel coordinate system is referred to as an absolute coordinate system.

In addition to the fact that initial coordinates (SX, SY) include an initial displacement caused by a hand movement applied to the frame described above, the initial coordinates (SX, SY) are determined on the basis of the following factors. That is to say, in the case of a moving picture, normally, image data of all pixels on the CMOS imager is not supplied to the signal processing unit 50 as it is. Instead, the image data is subjected to an averaging process for each of the picture divisions arranged in the vertical direction in the CMOS imager before being supplied to the signal processing unit 50 provided at the following stage. In addition, even after being supplied to the signal processing unit 50, the image data is again subjected to some processes. For this reason, the absolute coordinate of the first line does not correspond to '0' in many cases. Moreover, if a vertical-direction partial enlargement process is carried out on the input image data, the initial y-axis coordinate SY becomes the position of a horizontal line in the middle of the screen. Thus, instead of being equal to 0, the initial y-axis coordinate SY may have an extremely large value.

The value 'step' cumulatively added to the initial y-axis coordinate SY for every pulse of the horizontal synchronization signal H-SYNC at the step S201 represents an inter-line increment of the vertical coordinate of the absolute-coordinate system. Due to the averaging process carried out on image data for a plurality of horizontal lines arranged in the vertical direction in the CMOS imager of the averaging process block placed at the previous stage, it is quite within the bounds of possibility that the value 'step' is other than 1. For example, the value 'step' is 2 or 4.

By cumulatively adding the value 'step' to the initial y-axis coordinate SY for every pulse of the horizontal synchronization signal H-SYNC at the step S201, the absolute coordinate of a horizontal line currently being processed can be found. Then, at a step S202, the integer component vp_i of the absolute coordinate is found. The integer component corresponds to the number of cumulative additions to be carried out on the horizontal compensation velocity component X_STB_* in an integration process up to the present point of time. Notation * is an integer in the range 0 to 7. That is to say, in the following description, the horizontal compensation velocity component X_STB_* represents any of the horizontal compensation velocity components X_STB_0 to X_STB_7. Notation X_STB_* is used in the following description as a symbol representing the horizontal compensation velocity components X_STB_0 to X_STB_7. The number of cumulative additions carried out on a horizontal compensation velocity component in the integration process is an integration value for the screen.

Then, at a step S203, the integer component vp_i of the absolute coordinate of the horizontal line currently being processed is compared with the number of cumulative additions carried out on a horizontal compensation velocity component in the integration process performed so far up to a horizontal line immediately leading ahead of the horizontal line currently being processed. By the way, in the following description, the horizontal line currently being processed is referred to as a currently processed line whereas the number of cumulative additions carried out on a horizontal compensation velocity component in the integration process carried out so far up to a horizontal line immediately leading ahead of the currently processed line is referred to as a cumulative-addition count hstb_cnt. The difference between the integer component vp_i and the cumulative-addition count vstb_cnt indicates how many more additional cumulative additions need to be carried out on a horizontal compensation velocity component in the integration process of this the currently processed line. Then, as many trigger pulses TG1 as the needed additional cumulative additions of the integration process are each generated for each processing unit cycle, which is shorter than one horizontal period.

Then, at steps S204 and S205, the horizontal cumulative-addition count hstb_cnt is incremented by 1 every time a trigger pulse TG1 is generated.

Subsequently, at a step S206, the integration process is carried out to produce a horizontal hand movement correction displacement quantity SX_ADD by cumulative adding a horizontal compensation velocity component X_STB_*, which is selected from the horizontal compensation velocity components X_STB_0 to X_STB_7 as a component for a picture division including the currently processed line, to a cumulative sum obtained so far every time the trigger pulse TG1 is generated. Notation stb_x shown at the step S206 of the flowchart of FIG. 45 denotes the horizontal compensation velocity component X_STB_* selected from the horizontal compensation velocity components X_STB_0 to X_STB_7. That is to say, notation stb_x shown at the step S206 of the flowchart of FIG. 45 denotes the horizontal compensation velocity component X_STB_* for a picture division to which the currently processed line pertains.

If the value 'step' cumulatively added to the initial y-axis coordinate SY for every pulse of the horizontal synchronization signal H-SYNC at the step S201 is 1 (that is, step=1) and the process to output an image is a process not enlarging the image or another normal process, the trigger pulse TG1 is generated for every pulse of the horizontal synchronization signal H-SYNC. Thus, at the step S206, stb_x representing the horizontal compensation velocity component X_STB_* is added cumulatively in the integration process for every horizontal line.

As described before, the horizontal compensation displacement quantity SX_ADD obtained in this way is used as a horizontal-direction compensation quantity of the read start position for each horizontal line in the CMOS imager. That is to say, the horizontal compensation displacement quantity SX_ADD is no other than the horizontal initial position (or the horizontal offset) of each horizontal line in a horizontal-direction image-distortion process carried out by the horizontal processing block 51.

As described above, in the integration process carried out at the step S206, one of the horizontal compensation velocity components X_STB_0 to X_STB_7 must be selected as an object of the process, depending on which of the eight picture divisions Pdiv_0 to Pdiv_7 the currently processed line pertains to. As described before, the eight picture divisions Pdiv_0 to Pdiv_7 are divisions obtained as a result of dividing 1 screen (or one frame, which is a vertical synchronization period) in the vertical direction. A mechanism to select one of the horizontal compensation velocity components X_STB_0 to X_STB_7 is implemented in processing carried out in the remaining portion of the flowchart shown in FIG. 45.

In this embodiment, at a step S207, a horizontal cumulative line count hstb_grid of the horizontal compensation velocity components is found. The initial value of the horizontal cumulative line count hstb_grid is a line count DIV representing the number of horizontal lines in one picture division.

At a step S208, the horizontal cumulative line count hstb_grid is compared with the horizontal cumulative-addition count hstb_cnt. Every time the horizontal cumulative-addition count hstb_cnt exceeds the horizontal cumulative line count hstb_grid, a trigger pulse TG2 is generated at a step S208. Every time a trigger pulse TG2 is generated, the horizontal cumulative-addition count hstb_cnt is updated by adding the line count DIV representing the number of horizontal lines in one picture division to the horizontal cumulative-addition count hstb_cnt at a step S209.

In the processing described above, a trigger pulse TG2 is generated every time the currently processed line transits from a picture division to the next picture division. Thus, at a step S210, a horizontal picture division value HDIV_CNT representing the number of trigger pulses TG2 generated so far in the integration process or the number of picture divisions already processed so far is found. That is to say, the horizontal picture division value HDIV_CNT indicates which of the picture divisions Pdiv_0 to Pdiv_7 is being subjected to the integration process. At a step S211, the horizontal picture division value HDIV_CNT is incremented by one every time a trigger pulse TG2 is generated. Thus, the horizontal picture division value HDIV_CNT has an integer value in the range 0 to 7 corresponding to the picture divisions Pdiv_0 to Pdiv_7 respectively. That is to say, the horizontal picture division value HDIV_CNT is an indicator showing the degree of progress in the horizontal integration process. Thus, the value of notation stb_x shown at the step S206 as a selected horizontal compensation velocity component X_STB_* is determined by referring to the horizontal picture division value HDIV_CNT.

It is to be noted that, in this embodiment, the horizontal picture division value HDIV_CNT=8 means that the integration process carried out on the image data of one frame has been completed. In addition, if the horizontal picture division value HDIV_CNT=8 is incremented by 1, the horizontal picture division value HDIV_CNT is reset back to 0.

The horizontal picture division value HDIV_CNT is supplied to the vertical processing block 52 and the register block 53 as an indicator showing which of the picture divisions Pdiv_0 to Pdiv_7 the currently processed line pertains to or the degree of progress in the horizontal integration process carried out by the horizontal processing block 51.

[Processing Operations of the Horizontal Image Processing Block 512]

Figure 46:
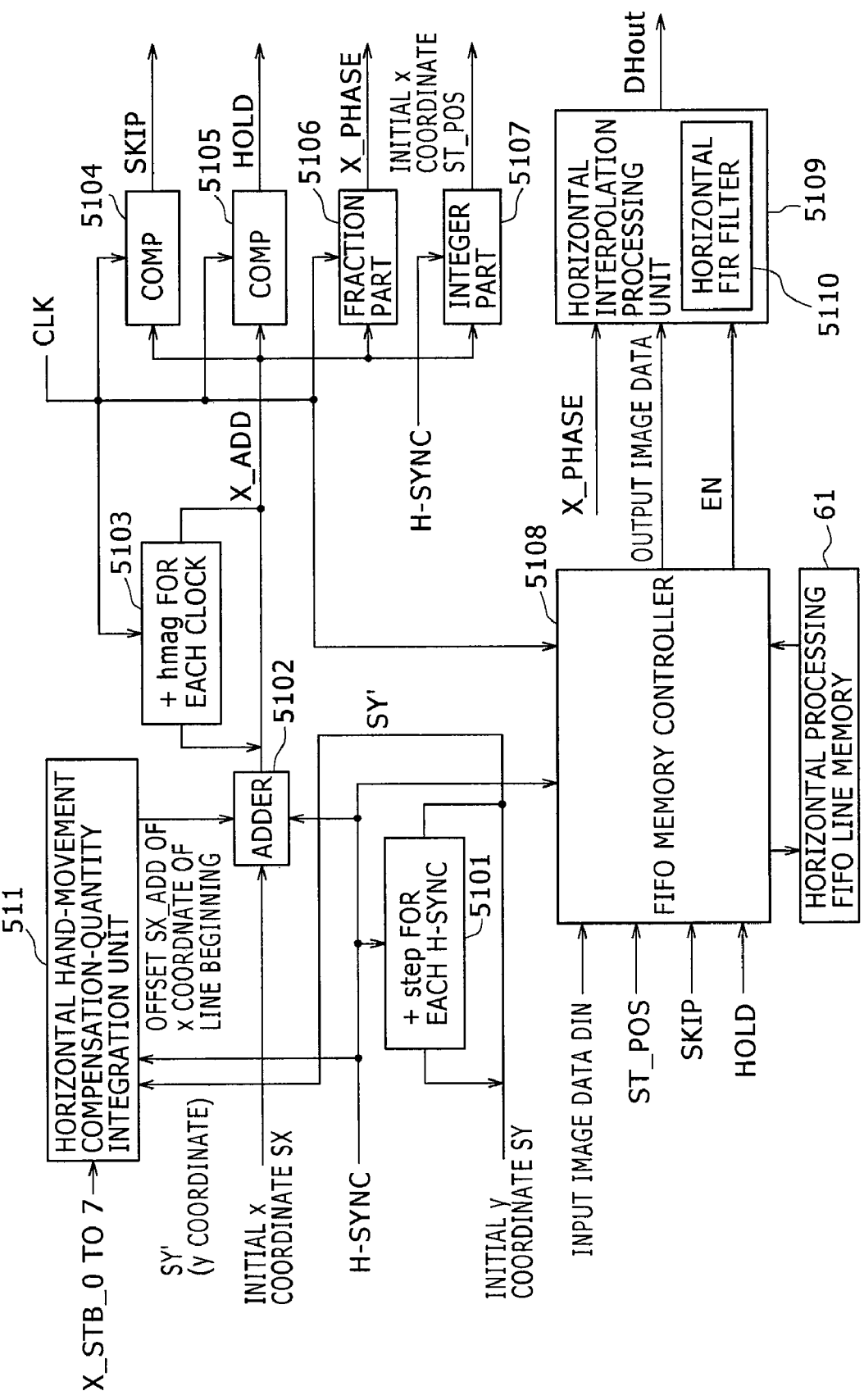
FIG. 46 is a block diagram showing processing operations carried out in a typical detailed configuration of a horizontal image processing unit employed in an image-taking apparatus according to an embodiment.

FIG. 46 is a diagram showing a typical configuration of the horizontal image processing unit 512. In the typical configuration shown in FIG. 46, an adder 5101 is included in the horizontal image processing unit 512 as a unit for cumulatively adding the value 'step' to the initial y-axis coordinate SY for every pulse of the horizontal synchronization signal H-SYNC shown in the flowchart of FIG. 45. For this reason, the initial y-axis coordinate SY is supplied to the horizontal image processing unit 512. In addition, an initial x-axis coordinate SX is also supplied to the horizontal image processing unit 512. The initial y-axis coordinate SY and the initial x-axis coordinate SX are coordinates of the beginning of one frame and set typically by the CPU 1 functioning as the control unit.

A y-axis coordinate SY' produced by the adder 5101 as a result of cumulatively adding the value 'step' to the initial y-axis coordinate SY for every pulse of the horizontal synchronization signal H-SYNC is supplied to the horizontal hand-movement compensation quantity integration unit 511. In response to the y-axis coordinate SY', the horizontal hand-movement compensation quantity integration unit 511 returns a SX_ADD to the horizontal image processing unit 512 as an offset of the x-axis coordinate of the beginning of the currently processed line.

An adder 5102 employed in the horizontal image processing unit 512 adds the horizontal compensation displacement quantity SX_ADD received from the horizontal hand-movement compensation-quantity integration unit 511 to the initial x-axis coordinate SX only once at the beginning of each horizontal line.

Then, an adder 5103 cumulatively adds a value hmag, which is a horizontal enlargement/shrinking parameter, to the output of the adder 5102 for every pulse of a pixel processing clock signal CLK. The output X_ADD of the adder 5103 is supplied to comparison units 5104 and 5105 as well as a fraction-part extraction unit 5106 and an integer-part extraction unit 5107.

The comparison unit 5104 compares the present output X_ADD received from the adder 5103 with the integer part of the output X_ADD received from the adder 5103 at a time leading ahead of the present output X_ADD by one period of a pixel processing clock signal CLK. If the difference between the present output X_ADD received from the adder 5103 and the integer part of the output X_ADD leading ahead of the present output X_ADD by one period of the pixel processing clock signal CLK is found greater than 1, that is, if the pixel position has jumped by at least a distance equal to one pixel pitch, the comparison unit 5104 outputs a signal SKIP indicating the jump. In this embodiment, by knowing the existence of the signal SKIP indicating the jump, it is possible to know the jump-destination pixel position to be processed next with a timing indicated by the pixel processing clock signal CLK. The signal SKIP is supplied to a FIFO memory controller 5108.

In addition, the comparison unit 5015 compares the present output X_ADD received from the adder 5103 with the integer part of the output X_ADD received from the adder 5103 at a time leading ahead of the present output X_ADD by one period of the pixel processing clock signal CLK. If the difference between the present output X_ADD received from the adder 5103 and the integer part of the output X_ADD leading ahead of the present output X ADD by one period of the pixel processing clock signal CLK is found smaller than 1, the comparison unit 5105 outputs a signal HOLD indicating the fact that the difference between the present output X_ADD received from the adder 5103 and the integer part of the output X_ADD leading ahead of the present output X_ADD by one period of the pixel processing clock signal CLK is smaller than 1. Thus, by knowing the existence of the signal HOLD, it is possible to know the fact that the presently read out pixel is the same pixel as a pixel read out at the time leading ahead of the present time by one period of the pixel processing clock signal CLK. The signal HOLD is also supplied to the FIFO memory controller 5108.

The fraction-part extraction unit 5106 extracts the fraction part of the output X_ADD received from the adder 5103 for every pulse of the pixel processing clock signal CLK and outputs a value X_PHASE of the extracted fraction part to a horizontal interpolation processing unit 5109 having a horizontal FIR filter 5110. On the basis of the value X_PHASE, the horizontal interpolation processing unit 5109 searches a multiplication-coefficient table for a multiplication coefficient to be supplied to the horizontal FIR filter 5110.

The integer-part extraction unit 5107 extracts the integer part of the output X_ADD received from the adder 5103 at the beginning of every horizontal line in accordance with the horizontal synchronization signal H-SYNC and outputs a value ST_POS of the extracted integer part to the FIFO memory controller 5108 as the initial x-axis coordinate of the currently processed line.

The FIFO memory controller 5108 carries out a horizontal hand-movement compensation process based on the horizontal compensation displacement quantity SX_ADD on the input image data Din by making use of the horizontal processing FIFO line memory 61 as well as a horizontal-direction enlargement or shrinking process. As will be described later, the horizontal processing FIFO line memory 61 is actually required to have a storage capacity for accommodating image data of one horizontal line only when considering a case in which a partial enlargement process of an image is supported.

To put it in detail, the FIFO memory controller 5108 determines the initial x-axis coordinate of the image data of every horizontal line of the input image data Din by making use of the value ST_POS of the integer part. In addition, the FIFO memory controller 5108 refers to the signals SKIP and HOLD for every pulse of the image processing clock signal CLK in determining pixel data to be read out from the horizontal processing FIFO line memory 61.

Then, the FIFO memory controller 5108 supplies image data read out from the horizontal processing FIFO line memory 61 as described above as the image data of every horizontal line to the horizontal interpolation processing unit 5109 along with a data enable signal EN.

The horizontal interpolation processing unit 5109 handles input image data as valid data only when the data enable signal EN is put in an active state and carries out a horizontal-direction interpolation process by making use of the horizontal FIR filter 5110 on the valid data. As described before, at that time, on the basis of the value X_PHASE supplied to the horizontal interpolation processing unit 5109 as the value of the fraction part, the horizontal interpolation processing unit 5109 searches a multiplication-coefficient table for a multiplication coefficient to be supplied to the horizontal FIR filter 5110.

In this way, the horizontal interpolation processing unit 5109 generates image data DHout as a result of the horizontal hand-movement compensation process carried out in accordance with the horizontal compensation displacement quantity SX_ADD as well as a result of the horizontal-direction enlargement or shrinking process and supplies the image data DHout to the vertical processing block 52.

By the way, the above description does not particularly mention mutual processing timings between the integration process carried out by the horizontal hand-movement compensation quantity integration unit 511 to find the horizontal compensation displacement quantity SX_ADD and the horizontal-direction enlargement or shrinking process carried out by the horizontal image processing unit 512. Convenience provided by execution of the integration process to find the horizontal compensation displacement quantity SX_ADD and the horizontal-direction enlargement or shrinking process in a simple processing sequence without a time delay is limited all but to a case in which a horizontal-direction cutting-out process and a partial enlargement process are not supported as shown in FIG. 47A in the upper part of FIG. 47 to be described later. In FIG. 47, notation V-SYNC denotes a vertical synchronization signal and notation ST_TG denotes a pulse indicating the starting point of an effective horizontal line. In addition, in FIG. 47, each segment enclosed by a shaded rectangle represents a processing segment.

If a vertical-direction cutting-out process and/or a partial enlargement process are supported, on the other hand, the initial y-axis coordinate SY has an extremely large value. It is thus quite within the bounds of possibility that the number of pixel processing cycles (that is, the number of cycles required in the integration process) at the beginning of the frame is very large. Notation tm shown in a sequence of FIG. 47B in the lower part of FIG. 47 denotes the period of the integration process at the beginning of the frame.

With a long first integration process, the first horizontal-direction enlargement or shrinking process in a simple processing sequence shown in FIG. 47A in the upper part of FIG. 47 will go beyond one period of the horizontal synchronization signal H-SYNC so that it is necessary to provide a line memory for storing the image data of the incoming second horizontal line corresponding to the second pulse of the vertical synchronization signal.

In order to solve the above problem, in this embodiment, as shown in the processing sequence of FIG. 47B in the lower part of FIG. 47, the integration process is carried out in the period corresponding to a horizontal synchronization signal H-SYNC pulse leading ahead of a horizontal synchronization signal H-SYNC pulse to start a horizontal-direction enlargement or shrinking process following the integration process by one period of the horizontal synchronization signal H-SYNC. That is to say, the embodiment adopts a sequence of the image processing in which the integration process is always carried out with a timing leading a head of a timing to start a horizontal-direction enlargement or shrinking process following the integration process by one period of the horizontal synchronization signal H-SYNC. Thus, this embodiment employs a horizontal processing FIFO line memory 61 with a storage capacity for accommodating the image data of 1 horizontal period.

The problem described above can be avoided without regard to the image partial enlargement process or the like by adoption of an architecture for always carrying out the horizontal processing on all input lines. In either case, however, if an attempt is made to implement the processing sequence shown in FIG. 47A in the upper part of FIG. 47, a new termination signal of the integration process needs to be generated and the signal must be detected in order to start the image processing so that the configuration becomes complicated to a certain degree. In other words, the technique adopted in the embodiment described above offers a merit that the technique can be implemented without providing additional components to the image processing circuit.

It is to be noted that the technique adopted in the embodiment described above cannot be adopted for a case in which the vertical size of the absolute coordinate system is greater than the number of image processing cycles in 1 period of the horizontal synchronization signal H-SYNC. For such a case, it is necessary to adopt the aforementioned architecture for always carrying out the horizontal processing on all input lines.

[Processing Operations of the Vertical Processing Block 52]

[Integration to Produce a Vertical Hand-Movement Compensation Displacement Quantity SY_ADD]

Figure 48:
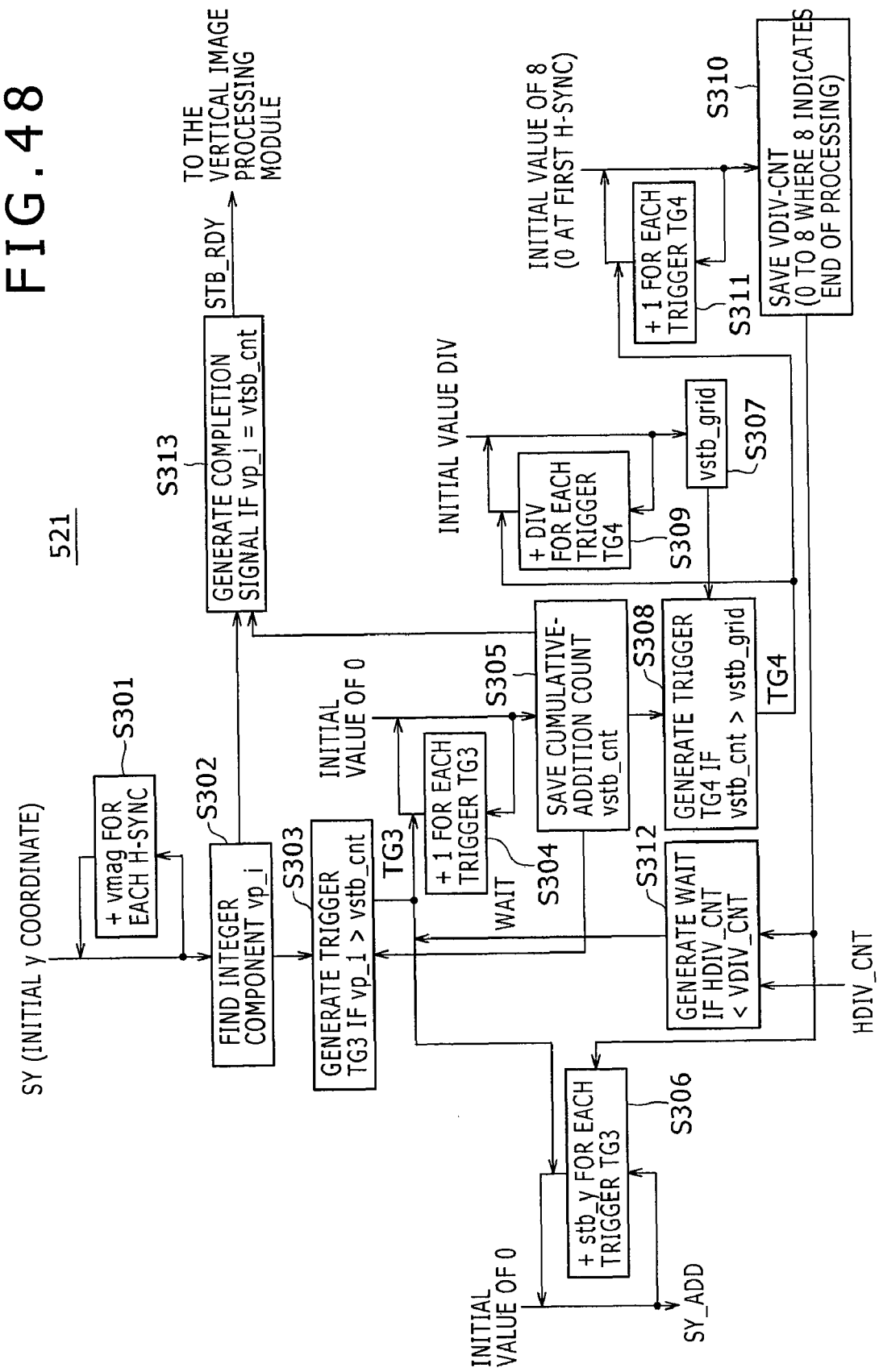
FIG. 48 is a block diagram showing processing operations carried out by a vertical hand-movement quantity-quantity integration unit employed in an image-taking apparatus according to an embodiment.

The following description explains integration processing operations carried out by the vertical hand-movement compensation-quantity integration unit 521 to produce a vertical hand-movement compensation displacement quantity SY_ADD as a result of integration. FIG. 48 shows a flowchart representing integration processing operations carried out by the vertical hand-movement compensation-quantity integration unit 521 to produce a vertical hand-movement compensation displacement quantity SY_ADD as a result of integration.

The integration processing operations carried out by the vertical hand-movement compensation-quantity integration unit 521 to produce a vertical hand-movement compensation displacement quantity SY_ADD as a result of integration are similar to the integration processing operations carried out by the horizontal hand-movement compensation-quantity integration unit 511 to produce a horizontal hand-movement compensation displacement quantity SX_ADD as a result of integration as explained earlier by referring to FIG. 45 except for the following differences.

In the case of the integration processing operations, a value vmag is cumulatively added to the initial y-axis coordinate SY for every pulse of the horizontal synchronization signal H-SYNC, a wait state is established by considering the horizontal picture division value HDIV_CNT representing the state of progress in the horizontal processing and an integration-end signal STB_RDY indicating completion of the integration process for every line is generated to be supplied to a vertical image processing module.

It is assumed that, in this embodiment, the vertical image processing includes a vertical-direction enlargement or shrinking process, and the value vmag is a value representing the enlargement or shrinking factor. Thus, instead of processing all image data output by the horizontal processing block 51, the vertical processing block 52 carries out processing by taking the vertical coordinate of a line output after the enlargement or shrinking process as a reference.

Therefore, also in the vertical-direction integration processing, an operation to output an integration value at a coordinate subjected to the vertical image processing after the vertical-direction integration processing is demanded so that the vertical-direction coordinate increase parameter is cumulatively added to the initial y-axis coordinate SY for every pulse of the horizontal synchronization signal H-SYNC. It is to be noted that, without regard to the image enlargement or shrinking process, the value vmag can be set at 1 (vmag=1) if only a CMOS hand-movement compensation process is to be carried out.

As the second difference, in the case of the integration processing operations carried out by the vertical hand-movement compensation-quantity integration unit 521 to produce a vertical hand-movement compensation displacement quantity SY_ADD, the horizontal picture division value HDIV_CNT representing the state of progress in the horizontal processing needs to be observed because the progress in the vertical processing must not surpass the progress in the horizontal processing. In an enlargement or shrinking process of an ordinary image, the progress in the vertical processing is said to surpass the progress in the horizontal processing when the vertical processing is carried out on an image that has not been generated yet. In order to prevent the progress in the vertical processing from surpassing the progress in the horizontal processing, a mechanism for setting a wait state by itself is required. By the same token, in the vertical-direction integration processing, a mechanism for preventing the progress in the vertical processing from surpassing the progress in the horizontal processing is required even though an image is not processed directly.

To put it in slightly more detail, the horizontal compensation velocity component X_STB_* is a horizontal integration parameter obtained as a result of inverting the sign of the horizontal component of a hand-movement velocity vector close the sampling time of a horizontal line currently being processed. Notation * is an integer in the range 0 to 7. That is to say, in the following description, the horizontal compensation velocity component X_STB_* represents any of the horizontal compensation velocity components X_STB_0 to X_STB_7. By the same token, the vertical compensation velocity component Y_STB_* is a vertical integration parameter obtained as a result of inverting the sign of the vertical component of a hand-movement velocity vector close the sampling time of a horizontal line currently being processed. Notation * is an integer in the range 0 to 7. That is to say, in the following description, the vertical compensation velocity component Y_STB_* represents any of the vertical compensation velocity components Y_STB_0 to Y_STB_7. Strictly speaking, the sampling time corresponds to the center point of a light exposure period of time. The hand-movement velocity vector of a hand movement is a vector representing the magnitude and direction of the hand movement. Thus, if the case of an extremely short light exposure period of time is also taken into consideration, the horizontal compensation velocity component X_STB_* and vertical compensation velocity component Y_STB_* for a horizontal line cannot be possibly confirmed till a time immediately preceding an operation to input the image data of the horizontal line.

Taking the condition described above into consideration, after referring to the horizontal picture division value HDIV_CNT indicating a picture division to which the horizontal line currently being processed in the horizontal-direction integration process pertains, the horizontal compensation velocity component X_STB_* and vertical compensation velocity component Y_STB_* for the horizontal line are latched respectively in a horizontal processing block register and vertical processing block register of the register block 53 to be described in detail later. Thus, the horizontal processing block 51 may sequentially process an input image without the need to provide a special mechanism.

In the integration process carried out by the vertical processing block 52, on the other hand, the result of the integration process is used as an initial offset coordinate of the vertical-direction image process carried out at a later stage. Thus, even if it is known that an image output by the horizontal process for a line has not been received yet at a point of time, at this point of time, the vertical-direction integration process for the line has already been completed. That is to say, the vertical-direction integration process has been carried out on an unconfirmed vertical compensation velocity component.

In order to solve the problem described above, at the stage of the integration process, on the basis of the state of progress in the horizontal process, it is necessary to determine whether or not the vertical compensation velocity component Y_STB_* serving as the integration parameter to be processed has been confirmed.

As a mechanism for determining whether or not the vertical compensation velocity component Y_STB_* serving as the integration parameter for a horizontal line to be processed has been confirmed on the basis of the state of progress in the horizontal process, at a step S312 of the flowchart shown in FIG. 48, a WAIT signal is generated if the vertical picture division value VDIV_CNT representing the state of progress in the vertical process surpasses the horizontal picture division value HDIV_CNT representing the state of progress in the horizontal process. Notation stb_y denoting a vertical-direction compensation velocity component for a picture division is cumulatively added at a step S306 on the left side of the bottom of FIG. 48 to the vertical compensation velocity component Y_STB_ADD for a picture division including the horizontal line currently being processed in the horizontal integration processing with a confirmed vertical compensation velocity component Y_STB_* selected. With the signal WAIT generated, however, the vertical-direction compensation velocity component stb_y for a picture division is prevented from being cumulatively added at the step S306 to the vertical hand-movement compensation displacement quantity SY_ADD for a picture division including the horizontal line currently being processed in the horizontal integration processing with an unconfirmed vertical compensation velocity component Y_STB_* selected.

As the third difference between the integration processing operations carried out by the vertical hand-movement compensation-quantity integration unit 521 to produce a vertical hand-movement compensation displacement quantity SY_ADD as a result of integration as shown in FIG. 48 and the integration processing operations carried out by the horizontal hand-movement compensation-quantity integration unit 511 to produce a horizontal hand-movement compensation displacement quantity SX_ADD as a result of integration as shown in FIG. 45, in the case of the integration processing operations carried out by the vertical hand-movement compensation-quantity integration unit 521 to produce a vertical hand-movement compensation displacement quantity SY_ADD as shown in FIG. 48, an integration-end signal STB_RDY indicating completion of the integration process for the horizontal line currently being processed is generated to be supplied to the vertical image processing module serving as the vertical image processing unit 522 at a later stage. As a result of a vertical integration process carried out for a picture division, the integer part vp_i of the absolute coordinate of the currently processed horizontal line becomes equal to a vertical cumulative-addition count vstb_cnt. At that time, a vertical offset SY_ADD also to be supplied to the vertical image processing module is found and the integration-end signal STB_RDY is used to activate the vertical image processing module.

In the horizontal-direction integration process described earlier, the integration process is started with a timing leading ahead of a timing to input an effective image by one period of the horizontal synchronization signal H-SYNC so that the integration process can be completed before the horizontal image process is carried out on the effective image. In most cases, it is possible to assure a system in which the integration process carried out on an effective image can be completed before the horizontal image process is carried out on the effective image. In the vertical-direction integration process, however, it is quite within the bounds of possibility that a wait state mentioned above is established so that it is impossible to assure that the integration process can be completed in an immediately preceding period of the horizontal synchronization signal H-SYNC for all cases. That is to say, with a wait state established, vertical image processing including a vertical hand-movement correction process and a vertical enlargement or shrinking process is carried out when the integration-end signal STB-RDY is generated.

By referring to the flowchart shown in FIG. 48, the following description explains the vertical-direction integration process carried out by making use of a vertical-direction integration circuit having the functions described above.

As shown in the figure, the flowchart includes a step S301 at which the value 'vmag' is cumulatively added to an initial y-axis coordinate SY representing the position of a horizontal line for every pulse of a horizontal synchronization signal H-SYNC.

By cumulatively adding the value 'vmag' to the initial y-axis coordinate SY for every pulse of the horizontal synchronization signal H-SYNC at the step S301, the absolute coordinate of a horizontal line currently being processed can be found. Then, at a step S302, the integer component vp_i of the absolute coordinate is found. The integer component corresponds to the number of cumulative additions to be carried out on the vertical compensation velocity component Y_STB_* representing the vertical compensation velocity components Y_STB_0 to Y_STB_7 in an integration process up to the present point of time. The number of cumulative additions carried out on a vertical compensation velocity component in the integration process is an integration value for the screen.

Then, at a step S303, the integer component vp_i of the absolute coordinate of the horizontal line currently being processed is compared with the number of cumulative additions carried out on a vertical compensation velocity component in the integration process performed so far up to a horizontal line immediately leading ahead of the horizontal line currently being processed. By the way, the number of cumulative additions carried out on a vertical compensation velocity component in the integration process carried out so far up to a horizontal line immediately leading ahead of the currently processed line is referred to as a vertical cumulative-addition count vstb_cnt. The difference between the integer component vp_i and the vertical cumulative-addition count vstb_cnt indicates how many more additional cumulative additions need to be carried out on a vertical compensation velocity component in the integration process for this the currently processed line. Then, as many trigger pulses TG3 as the needed additional cumulative additions of the integration process are each generated for each processing unit cycle, which is shorter than one horizontal period.

Then, at steps S304 and S305, the vertical cumulative-addition count vstb_cnt is incremented by 1 every time a trigger pulse TG3 is generated.

Subsequently, at a step S306, the integration process is carried out to produce a vertical hand movement correction displacement quantity SY_ADD by cumulative adding a vertical compensation velocity component Y_STB_*, which is selected from the vertical compensation velocity components Y_STB_0 to Y_STB_7 as a component for a picture division including the currently processed line, to a cumulative sum obtained so far every time the trigger pulse TG3 is generated. Notation stb_y shown at the step S306 of the flowchart of FIG. 48 denotes the vertical compensation velocity component Y_STB_* selected from the vertical compensation velocity components Y_STB_0 to Y_STB_7. That is to say, notation stb_y shown at the step S306 of the flowchart of FIG. 48 denotes the vertical compensation velocity component Y_STB_* for a picture division to which the currently processed line pertains.

If the value 'vmag' cumulatively added to the initial y-axis coordinate SY for every pulse of the horizontal synchronization signal H-SYNC at the step S301 is 1 (that is, vmag=1) and the process to output an image is a process not enlarging the image or another normal process, the trigger pulse TG3 is generated for every pulse of the horizontal synchronization signal H-SYNC. Thus, at the step S306, stb_y representing the vertical compensation velocity component Y_STB_* is added cumulatively in the integration process for every horizontal line.

As described before, the vertical compensation displacement quantity SY_ADD obtained in this way is used as a vertical-direction compensation quantity of the read start position for each horizontal line in the CMOS imager. That is to say, the vertical compensation displacement quantity SY_ADD is no other than the vertical initial position (or the vertical offset) of each horizontal line in a vertical-direction image-distortion process carried out by the vertical processing block 52.

As described above, in the integration process carried out at the step S306, one of the vertical compensation velocity components Y_STB_0 to Y_STB_7 must be selected as an object of the process, depending on which of the eight picture divisions Pdiv_0 to Pdiv_7 the currently processed line pertains to. As described before, the eight picture divisions Pdiv_0 to Pdiv_7 are divisions obtained as a result of dividing one screen (or one frame, which is a vertical synchronization period) in the vertical direction.

In this embodiment, at a step S307, a vertical cumulative line count vstb_grid of the vertical compensation velocity components is found. The initial value of the vertical cumulative line count vstb_grid is the line count DIV representing the number of horizontal lines in one picture division.

At a step S308, the vertical cumulative line count vstb_grid is compared with the vertical cumulative-addition count vstb_cnt. Every time the vertical cumulative-addition count vstb_cnt exceeds the vertical cumulative line count vstb_grid, a trigger pulse TG4 is generated at a step S308. Every time a trigger pulse TG4 is generated, the vertical cumulative-addition count hstb_cnt is updated by adding the line count DIV representing the number of horizontal lines in one picture division to the vertical cumulative-addition count hstb_cnt at a step S309.

In the processing described above, a trigger pulse TG4 is generated every time the currently processed line transits from a picture division to the next picture division. Thus, at a step S310, a vertical picture division value VDIV_CNT representing the number of trigger pulses TG4 generated so far in the integration process or the number of picture divisions already processed so far is found. That is to say, the vertical picture division value VDIV_CNT indicates which of the picture divisions Pdiv_0 to Pdiv_7 is being subjected to the integration process. At a step S311, the vertical picture division value VDIV_CNT is incremented by 1 every time a trigger pulse TG4 is generated. Thus, the vertical picture division value VDIV_CNT has an integer value in the range 0 to 7 corresponding to the picture divisions Pdiv_0 to Pdiv_7 respectively. That is to say, the vertical picture division value VDIV_CNT is an indicator showing the degree of progress in the vertical integration process.

It is to be noted that, in this embodiment, the vertical picture division value VDIV_CNT=8 means that the integration process carried out on the image data of one frame has been completed. In addition, if the vertical picture division value VDIV_CNT=8 is incremented by 1, the vertical picture division value VDIV_CNT is reset back to 0.

The vertical picture division value VDIV_CNT indicating the degree of progress in the vertical integration process is compared with the horizontal picture division value HDIV_CNT received from the horizontal processing block 51 as an indicator showing the degree of progress in the horizontal integration process at a step S312. A vertical picture division value VDIV_CNT greater than a horizontal picture division value HDIV_CNT indicates that the progress of the vertical process surpasses the progress of the horizontal process. Thus, in this case, a wait state is established in order to delay the generation of a trigger pulse TG3. That is to say, the generation of a trigger pulse TG3 is delayed in order to generate a trigger pulse TG3 after the wait state is ended.

In this embodiment, at a step S313, the integer component vp_i obtained at the step S302 is compared with the vertical cumulative-addition count vstb_cnt to produce a result of determination as to whether or not the integer component vp_i is equal to the vertical cumulative-addition count vstb_cnt. If the result of the determination indicates that the integer component vp_i is equal to the vertical cumulative-addition count vstb_cnt, an integration-end signal STB-RDY is generated as a signal indicating that the vertical integration process carried out on the currently processed line has been completed. The integration-end signal STB-RDY is supplied to the vertical image processing unit 522 in order to notify the vertical image processing unit 522 that a vertical-direction hand-movement compensation process can be started for the currently processed line. Accordingly, the vertical image processing unit 522 commences the vertical-direction hand-movement compensation process with a timing indicated by the next pulse of the horizontal synchronization signal H-SYNC.

[Processing Operations of the Vertical Image Processing Unit 522]

FIG. 49 is a diagram showing a typical configuration of the vertical image processing unit 522. In the typical configuration shown in FIG. 49, an adder 5201 is included in the vertical image processing unit 522 as a unit for cumulatively adding the value 'vmag' to the initial y-axis coordinate SY for every pulse of the horizontal synchronization signal H-SYNC shown in the flowchart of FIG. 48. For this reason, the initial y-axis coordinate SY is supplied to the vertical image processing unit 522.

A y-axis coordinate SY' produced by the adder 5201 as a result of cumulatively adding the value 'vmag' to the initial y-axis coordinate SY for every pulse of the horizontal synchronization signal H-SYNC is supplied to the vertical hand-movement compensation-quantity integration unit 521. In response to the y-axis coordinate SY', the vertical hand-movement compensation-quantity integration unit 521 returns a SY_ADD to the vertical image processing unit 522 as an offset of the y-axis coordinate of the beginning of the currently processed line.

An adder 5202 employed in the vertical image processing unit 522 adds the vertical compensation displacement quantity SY_ADD received from the vertical hand-movement compensation-quantity integration unit 521 to the initial y-axis coordinate SY only once at the beginning of each horizontal line. The adder 5202 outputs a value Y-ADD to a fraction-part extraction unit 5203 and an integer-part extraction unit 5204.

The fraction-part extraction unit 5203 extracts the fraction part of the output value Y_ADD received from the adder 5202 for every pulse of the horizontal synchronization signal H-SYNC and outputs a value Y_PHASE of the extracted fraction part to a vertical interpolation processing unit 5206 having a vertical FIR filter 5207.

The vertical FIR filter 5207 is a component for carrying out an interpolation process by making use of image data of a plurality of horizontal lines arranged in the vertical direction. On the basis of the value Y_PHASE of the fraction part, the vertical interpolation processing unit 5206 searches a multiplication-coefficient table for a multiplication coefficient to be supplied to the vertical FIR filter 5207. In this case, the interpolation is carried out only in the vertical direction. Thus, the interpolation process is all but the same as the interpolation process carried out in the horizontal direction by making use of the horizontal FIR filter 5109 as explained before by referring to FIGS. 42 to 44.

The integer-part extraction unit 5204 extracts the integer part of the output value Y_ADD received from the adder 5202 at the beginning of every horizontal line in accordance with the horizontal synchronization signal H-SYNC and outputs a value Y_POS of the extracted integer part to the memory controller 5205 as the initial x-axis coordinate of the currently processed line.

The memory controller 5205 carries out a vertical hand-movement compensation process based on the vertical compensation displacement quantity SY_ADD on the image data DHout received from the horizontal processing block 51 by making use of the vertical processing FIFO line memory 62 as well as a vertical-direction enlargement or shrinking process. The vertical processing FIFO line memory 62 is required to have a storage capacity large enough at least for accommodating image data of horizontal lines used in the interpolation process carried out by the vertical FIR filter 5207. That is to say, the vertical processing FIFO line memory 62 is required to have a storage capacity corresponding to the number of taps of the vertical FIR filter 5207.

The memory controller 5205 temporarily stores the image data DHout in the vertical processing FIFO line memory 62 and makes use of the value Y_POS of the integer part for determining pieces of output image data DYout_0, DYout_1, ... and DYout_n, which are pieces of data for a plurality of horizontal lines. Then, the memory controller 5205 reads out the pieces of output image data DYout_0, DYout_1, ... and DYout_n for the horizontal lines from the vertical processing FIFO line memory 62 and outputs the pieces of image data DYout_0, DYout_1, ... and DYout_n to the vertical interpolation processing unit 5206.

The vertical interpolation processing unit 5206 carries out a vertical-direction interpolation process on the pieces of image data DYout_1, DYout_2, - - - and DYout_n by making use of the vertical FIR filter 5207. As described earlier, on the basis of the value Y_PHASE of the fraction part, the vertical interpolation processing unit 5206 searches the multiplication-coefficient table for a multiplication coefficient to be supplied to the vertical FIR filter 5207.

In this way, the vertical interpolation processing unit 5206 generates image data Dout as a result of the vertical hand-movement compensation process carried out in accordance with the vertical compensation displacement quantity SY_ADD as well as a result of the vertical-direction enlargement or shrinking process and outputs the image data Dout.

FIG. 50 shows timing relations in the vertical-direction integration process and the vertical image process, which have been described above. To be more specific, FIG. 50A in the upper part of FIG. 50 shows a case in which a vertical-direction cutting-out process and a partial enlargement/shrinking process are not supported. In this case, the wait state described earlier is not established. The upper limit of the number of the vertical-direction cumulative additions for the currently processed line is set at a slightly small value at the most. Thus, the vertical-direction integration process and the vertical image process for the same horizontal line can both be carried out sequentially in one period of the horizontal synchronization signal H-SYNC. As a result, in this case, it is not necessary to take the trouble to provide the integration-end signal STB_RDY.

On the other hand, FIG. 50B in the lower part of FIG. 50 shows a case in which a vertical-direction cutting-out process and/or a vertical-direction partial enlargement process are supported. In this case, it is quite within the bounds of possibility that a wait state is established in the course of the integration process carried out on the first horizontal line. If a vertical-direction partial shrinking process is supported, on the other hand, it is quite within the bounds of possibility that a wait state is established in the course of the integration process carried out on any horizontal line following the first horizontal line.

In either case, the integration process carried out on the same horizontal line is suspended due to a wait state for a period as long as or even longer than 1 period of the horizontal synchronization signal H-SYNC. Thus, it is necessary to generate an integration-end signal STB_RDY for notifying that the integration process has been completed. Then, as shown in the 2 lowest timing charts of FIG. 50B, the vertical-direction partial enlargement process is started with a timing of a pulse of the horizontal synchronization signal H-SYNC right after a pulse of the integration-end signal STB_RDY at the end of the wait state.

In addition, when the vertical image process carried out on a certain horizontal line has not been completed, the next pulse of the horizontal synchronization signal H-SYNC is masked as a dashed pulse in FIG. 50B. That is to say, a pulse generated in a wait state as a pulse of the horizontal synchronization signal H-SYNC is masked.

FIG. 51 is a diagram showing the flow of the above processing carried out by the recording/reproduction apparatus 5, which includes the horizontal processing block 51 and the vertical processing block 52. That is to say, image data Din supplied by the user-operation input unit 3 is temporarily stored in the horizontal processing FIFO line memory 61 to be read out later while being subjected to a horizontal hand-movement compensation process and a horizontal enlargement or shrinking process by making use of the horizontal hand-movement compensation quantity integration unit 511 and the horizontal image processing unit 512. Then, image data obtained as a process result generated by the horizontal image processing unit 512 is stored in the vertical processing FIFO line memory 62.

Subsequently, the image data stored in the vertical processing FIFO line memory 62 is read out while being subjected to a vertical hand-movement compensation process and a vertical enlargement or shrinking process by making use of the vertical hand-movement compensation-quantity integration unit 521 and the vertical image processing unit 522. Then, image data obtained as a result of the processing carried out by the vertical image processing unit 522 is stored back in the vertical processing FIFO line memory 62. Finally, the image data is read out from the vertical processing FIFO line memory 62 and output as image data Dout.

The image data Dout shown in the right lower corner of FIG. 51 as the final result of the processing carried out by the recording/reproduction apparatus 5 is data of an image compensated for distortions caused by a hand movement.

As described above, the vertical processing FIFO line memory 62 is required to have a minimum storage capacity corresponding to the number of taps of the vertical FIR filter 5207. In actuality, however, if a vertical-direction partial enlargement process is carried out, the speed of the horizontal processing becomes higher than the speed of the vertical processing so that the vertical processing FIFO line memory 62 is required to have a storage capacity large enough for accommodating the result of the horizontal processing as a result to be subjected to the enlargement process.

In addition, even with no vertical-direction partial enlargement process carried out, if the vertical compensation velocity component Y_STB_* is erected vertically in the upward direction, the operations will be the same as those of the case in which a vertical-direction partial enlargement process is carried out. Thus, the vertical processing FIFO line memory 62 is required to have a storage capacity taking the hand-movement changing in the vertical directions into consideration.

It is to be noted that, in the case of the embodiment described above, if 1 vertical period is 1/60 seconds, the time length DIV of each picture division Pdiv is (1/60)/8=1/480 seconds. In accordance with experiment results, with every picture division Pdiv having a time length DIV of 1/480 seconds, the processing to compensate an image for distortions caused by a hand movement on the basis of a detected hand-movement velocity vector provides a sufficient necessary compensation effect, and an image obtained as a result of the compensation processing has been verified to be a good image.

Figure 52:
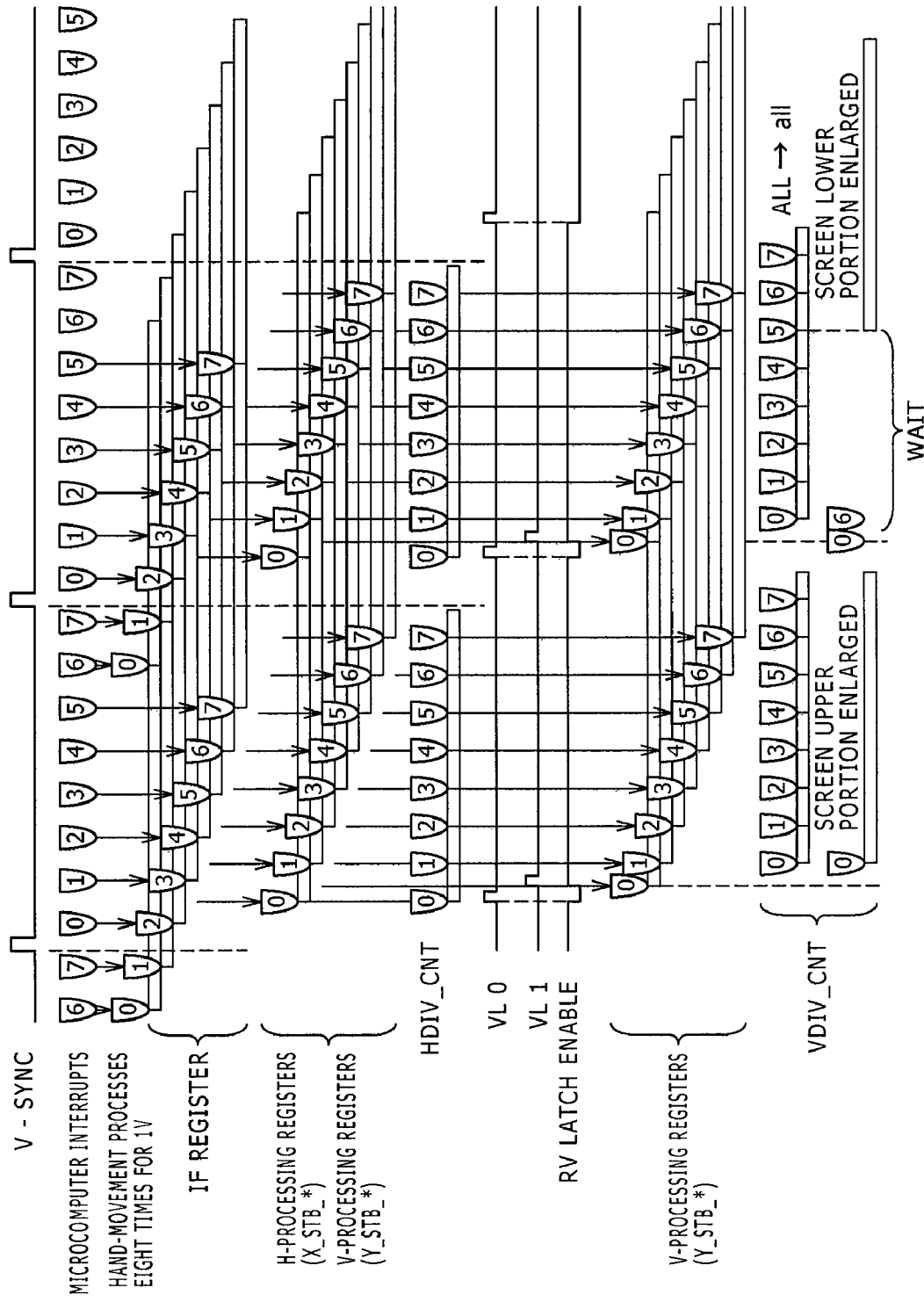
FIG. 52 is an explanatory diagram showing timing charts of operations of registers employed in a register block of a signal processing unit employed in the image-distortion compensation apparatus shown in FIG. 30 as an apparatus according to the first embodiment.

FIG. 52 shows latch timings of registers employed in the register block 53 as latch timings during the horizontal processing and the vertical processing, which have been described above.

As shown in the figure, in this embodiment, a microcomputer interrupt is generated at a point of time corresponding to the first horizontal line of each of the picture divisions Pdiv_0 to Pdiv_7 during one period of the vertical synchronization signal V-SYNC.

When a microcomputer interrupt occurs, a horizontal compensation velocity component X_STB_* and a vertical compensation velocity component Y_STB_* are generated at the velocity-vector processing unit 80 and stored in IF registers employed in the register block 53.

If the values of the horizontal compensation velocity component X_STB_* and the vertical compensation velocity component Y_STB_* are to be computed by the CPU 1 by execution of software, a technique of periodically generating interrupts as shown in FIG. 52 is an effective method.

In the register block 53, changes of the picture division value HDIV_CNT are observed and used as a basis for generating latch pulses. Then, the horizontal compensation velocity component X_STB_* and the vertical compensation velocity component Y_STB_*, which have been set by the CPU 1 in the IF registers as described above, are transferred to a horizontal processing register and a vertical processing register respectively and latched in the horizontal processing register and the vertical processing register with timings set by a latch pulse generated as described above. That is to say, the horizontal compensation velocity component X_STB_* to be used in the horizontal processing block 51 is latched in the horizontal processing register prior to its use. At the same time, the vertical compensation velocity component Y_STB_* to be used in the vertical processing block 52 is also latched in the vertical processing register.

Basically, the vertical compensation velocity component Y_STB_* to be used in the vertical processing block 52 remains continuously at the value of the vertical compensation velocity component Y_STB_*, which is latched in the vertical processing register at the same time as the horizontal compensation velocity component X_STB_* to be used in the horizontal processing block 51.

However, the fact that the vertical processing block 52 remains continuously at such a value exists only for a case in which a period between an active state of a frame processing activation pulse VL1 of the vertical processing block 52 and an active state of a frame processing activation pulse VL0 of the horizontal processing block 51. The active state of the frame processing activation pulse VL1 is a state in which the frame processing activation pulse VL1 is set at a high level. By the same token, the active state of the frame processing activation pulse VL0 is a state in which the frame processing activation pulse VL0 is set at a high level. The period between an active state of the frame processing activation pulse VL1 and an active state of the frame processing activation pulse VL0 is state in which the latch enable signal RV is in an active state or put at a high level.

This is because the vertical process time may become long, extending to not only the vertical synchronization signal V-SYNC of the input image, but also a pulse generated for the next frame as the frame processing activation pulse VL0 of the horizontal processing block 51.

Second Embodiment of the Image-Signal Distortion Compensation Apparatus Provided by the Invention In the case of the first embodiment shown in FIG. 30, the image memory unit 4 includes two frame memories 41 and 42. First of all, the digital taken-image signal received from the data conversion unit 14 is stored as an original frame in the frame memory 41. Then, after the lapse of time corresponding to one frame, the original frame stored in the frame memory 41 is transferred to the frame memory 42 and a new digital taken-image signal received from the data conversion unit 14 is stored as a reference frame in the frame memory 41. That is to say, the original frame stored in the frame memory 42 and the reference frame is stored in the frame memory 41. Thus, the timing adopted by the hand-movement displacement-vector detection unit 15 as a timing to detect a movement vector between the original and reference frames is lagging behind the original frame by a period corresponding to one frame.

In the case of a second embodiment, on the other hand, image data being output by the image pickup device 11 is observed and processed as the image data of a reference frame in a configuration allowing SAD values to be computed for stream data of a luster scan.

Figure 53:
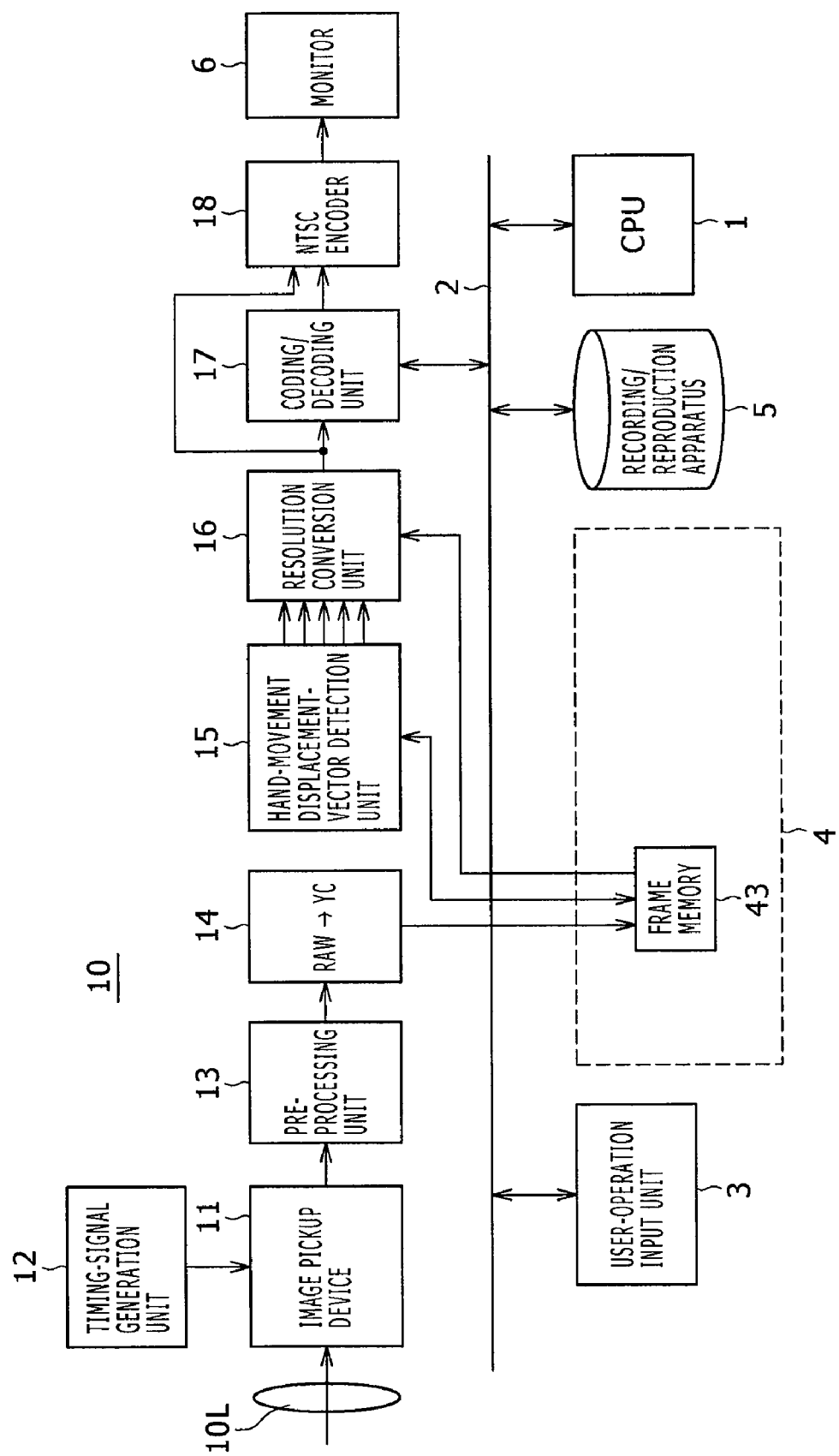
FIG. 53 is a block diagram showing a typical configuration of an image-taking apparatus adopting a method to compensate an image signal for distortions in accordance with a second embodiment.

FIG. 53 is a block diagram showing a second embodiment implementing an image-taking apparatus 10. As is obvious from FIG. 53, the configuration of the image-taking apparatus 10 is exactly identical to the configuration of the image-taking apparatus 10 implemented by the first embodiment shown in FIG. 30 except that, in the case of this second embodiment, the image memory unit 4 includes only one frame memory 43.

In the second embodiment, the original frame serving as the target frame is stored in a frame memory 43 and a frame output by the data conversion unit 14 as a stream is taken as a reference frame. The hand-movement displacement-vector detection unit 15 employed in the first embodiment explained before carries out a process to compute a SAD value as a typical correlation value representing correlation between the target block and a reference block on the basis of image data of two frames stored in the frame memories 41 and 42 respectively. In the case of this second embodiment shown in FIG. 53, on the other hand, image data stored in the frame memory 43 is taken as the image of an original frame serving as a target frame whereas stream image data coming from the data conversion unit 14 is used as the image data of the reference frame, and the hand-movement displacement-vector detection unit 15 carries out a process to compute a SAD value as a typical correlation value representing correlation between the target block on the target frame and a reference block on the reference frame on the basis of image data of these two frames.

Then, the resolution conversion unit 16 cuts out image data from the frame memory 43 on the basis of a movement vector detected by the hand-movement displacement-vector detection unit 15. In this way, it is possible to output image data free of distortions caused by a hand movement. The configuration of the rest and the other operations are the same as the first embodiment.

As described above, in the case of this second embodiment, stream image data coming from the data conversion unit 14 is used as the image data of a reference frame. In consequence, for a certain pixel on the coming reference frame, a plurality of reference blocks including a pixel serving as a copy of the certain pixel exist at the same time on the reference frame. The existence of such reference blocks is explained by referring to FIG. 54.

Figure 54:
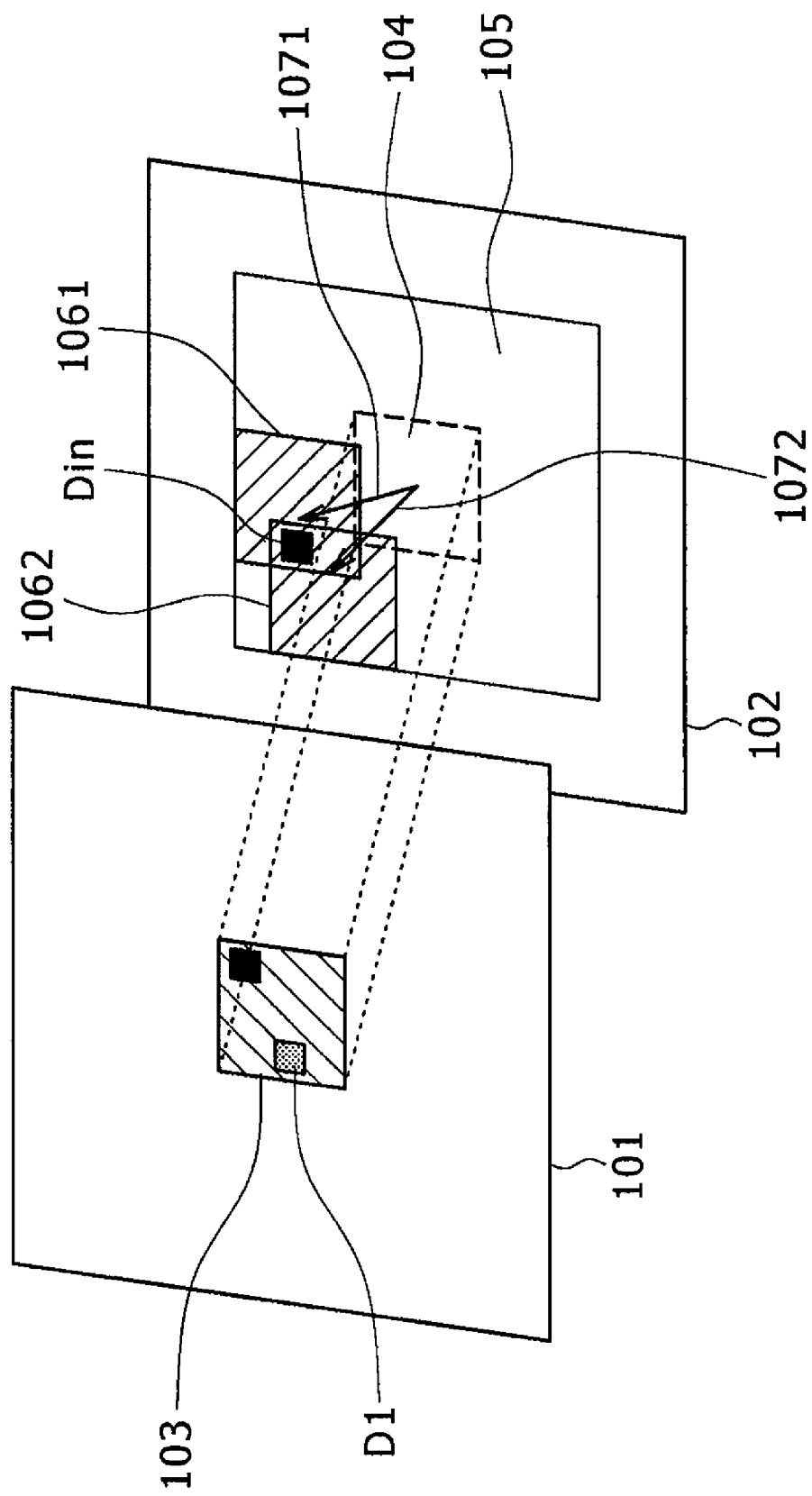
FIG. 54 is an explanatory diagram to be referred to in describing processing to detect a movement vector in the image-taking apparatus according to the second embodiment.

As is obvious from FIG. 54, the search range 105 on the reference frame 102 includes an input pixel Din, which is a copy pixel of a pixel D2 on the target block 103 on the original frame 101. The input pixel Din is a pixel included on the left side of a reference block 1061 pointed to by a reference vector 1071 as well as a pixel included at the right upper corner of a reference block 1062 pointed to by a reference vector 1072.

Thus, in processing the reference block 1061 during a process to compute a difference in pixel value between pixels, the pixel value of the input pixel Din must be compared with a pixel D1 on the target block 103. In processing the reference block 1062 during a process to compute a difference in pixel value between pixels, on the other hand, the pixel value of the input pixel Din must be compared with a pixel D2 on the target block 103.

In order to make explanation easy to understand, FIG. 54 and FIG. 55 to be described later each show only two reference frames. In actuality, however, a number of reference blocks includes the input pixel Din exist.

In the process to compute a SAD value between the target block and a reference block in accordance with this second embodiment, a difference in pixel value is computed by finding the absolute value of the difference between the luminance value Y of the input pixel Din on the reference block 106 being processed and the luminance value Y of a pixel at a point existing on the target block 103 as a point corresponding to the point of the input pixel Din. Each time the absolute value of such a difference is computed, the absolute value of the difference is cumulatively added to a temporary sum stored previously in a table element, which is included in a SAD table 108 as a table element according to a reference vector 107 associated with the reference block 106, as a sum of the absolute values of such differences. The process to compute the absolute value of a difference in pixel value and the process to store the absolute value in a table element are carried out for every reference vector 107 associated with the reference frame 106 including the input pixel Din.

Let us assume for example that the reference block 1061 is a reference block currently being processed. In this case, a difference in pixel value is computed by finding the absolute value of the difference between the luminance value Y of the input pixel Din on the reference block 1061 and the luminance value Y of a pixel D1 at a point existing on the target block 103 as a point corresponding to the point of the input pixel Din. Then, the computed absolute value of the difference is cumulatively added to a temporary sum stored previously in a correlation-value table element (or a SAD table element) 1091, which is included in a correlation-value table (or a SAD table) 108 shown in FIG. 55 as a table element according to a reference vector 1071 associated with the reference block 1061, as a sum of the absolute values of such differences. The process to compute the absolute value of a difference in pixel value and the process to cumulatively add the computed absolute value to a temporary sum computed and stored previously in the SAD table element 1091 are carried out for every reference vector 107 associated with the reference frame 106 including the input pixel Din. For example, the reference vector 1072 is associated with the reference block 1062 also including the input pixel Din. In this case, the process to compute the absolute value of a difference in pixel value and the process to cumulatively add the computed absolute value to a temporary sum computed and stored previously in the SAD table element 1092, which is included in the correlation-value table (or the SAD table) 108 shown in FIG. 55 as a table element according to a reference vector 1072 associated with the reference block 1062, are carried out for the reference vector 1072 as follows. When the reference block 1062 is processed, a difference in pixel value is computed by finding the absolute value of the difference between the luminance value Y of the input pixel Din on the reference block 1062 and the luminance value Y of a pixel D2 at a point existing on the target block 103 as a point corresponding to the point of the pixel Din. Then, the computed absolute value of the difference is cumulatively added to a temporary sum stored previously in a SAD table element 1092, which is included in the SAD table 108 shown in FIG. 35 as a table element according to the reference vector 1072 associated with the reference block 1062, as a sum of the absolute values of such differences.

The processing carried out on all reference blocks 106 each including the input pixel Din as described above is carried out on for all input pixels Din in the search range 105 and, as the processing is done for all the input pixels Din, each table element 109 of the SAD table 108 contains a final SAD value and the creation of the SAD table 108 is completed.

Figure 55:
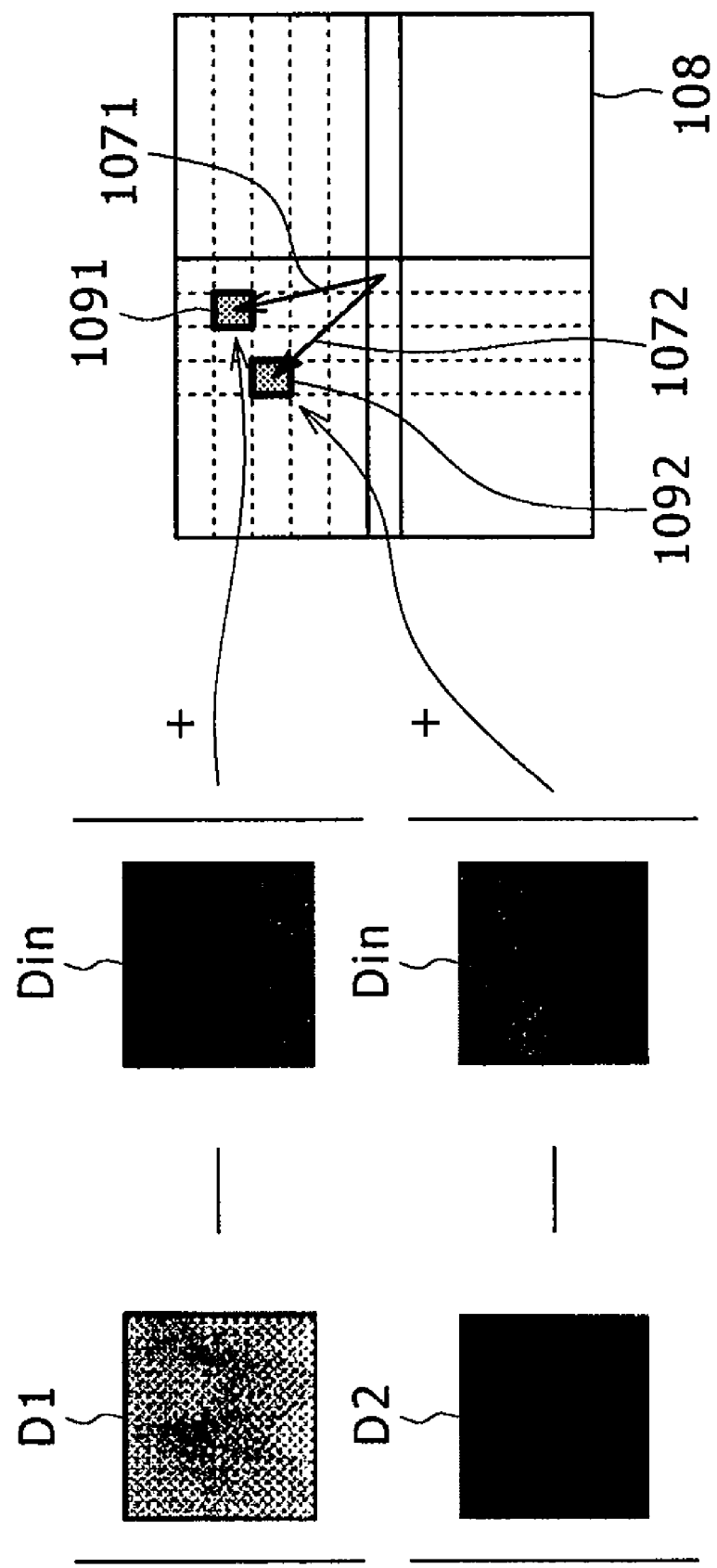
FIG. 55 is an explanatory diagram to be referred to in describing processing to detect a movement vector in the image-taking apparatus according to the second embodiment.

The explanation with reference to FIG. 55 holds true for a case of applying the conventional technique to a process to compute SAD values in a real-time manner. As described before by referring to FIG. 55, the SAD table elements 1091 and 1092 are each a typical SAD table element 109 included in the SAD table 108 as elements associated with the reference vectors 1071 and 1072 respectively. In the case of this second embodiment, on the other hand, each table element 109 of the correlation-value table (or the SAD table) 108 is not a final SAD value, which is a cumulative sum of the absolute values of differences in pixel value as described above. Instead, much like the first embodiment described before, the SAD table 108 is shrunk into a contracted correlation-value table (or a contracted SAD table) and each table element of the contracted correlation-value table (or the contracted SAD table) is a value obtained by executions the steps of:

computing the absolute difference of a difference in pixel value between an input pixel in the search range on a reference frame 106 and the corresponding pixel on the target frame;

contracting a reference vector 107 pointing to a reference block 106 at a contraction factor of 1/n;

splitting the computed absolute difference into a plurality of component absolute differences by adoption of the linear weighted distribution technique; and cumulatively adding the component absolute differences to temporary sums previously computed and stored in a plurality of table elements associated with a plurality of respective neighborhood contracted reference vectors existing in close proximity to a contracted vector obtained as a result of contracting the reference vector 107.

The steps described above are executed for every reference vector 107 pointing to a reference block 106 including the input pixel to obtain the value stored in the table element. The steps executed for all reference vectors 107 pointing to reference blocks 106 sharing an input pixel are repeated for every input pixel. As the execution of the steps is done for every input pixel included in the search range, the contracted correlation-value table (or the contracted SAD table) is completed.

After the contracted SAD table is completed, a process to detect an accurate movable vector in accordance with the second embodiment can be carried out by adoption of entirely the same techniques as the first embodiment. As explained earlier, the typical techniques adopted by the first embodiment are the quadratic-surface technique and the technique based on cubic curves laid on planes oriented in the vertical and horizontal directions.

Figure 56:
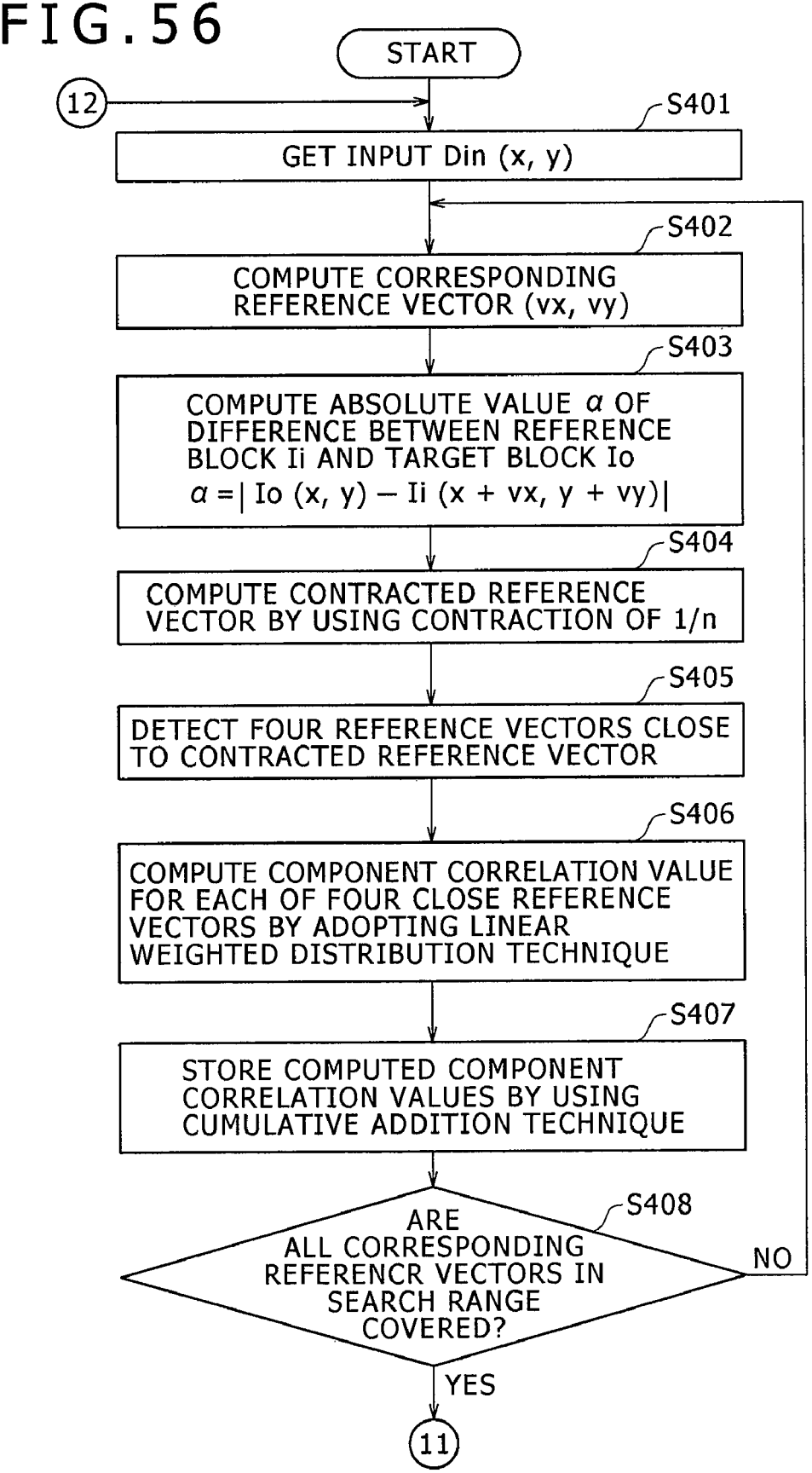
FIG. 56 shows a flowchart representing the processing carried out to detect a movement vector in the image-taking apparatus according to the second embodiment.
Figure 57:
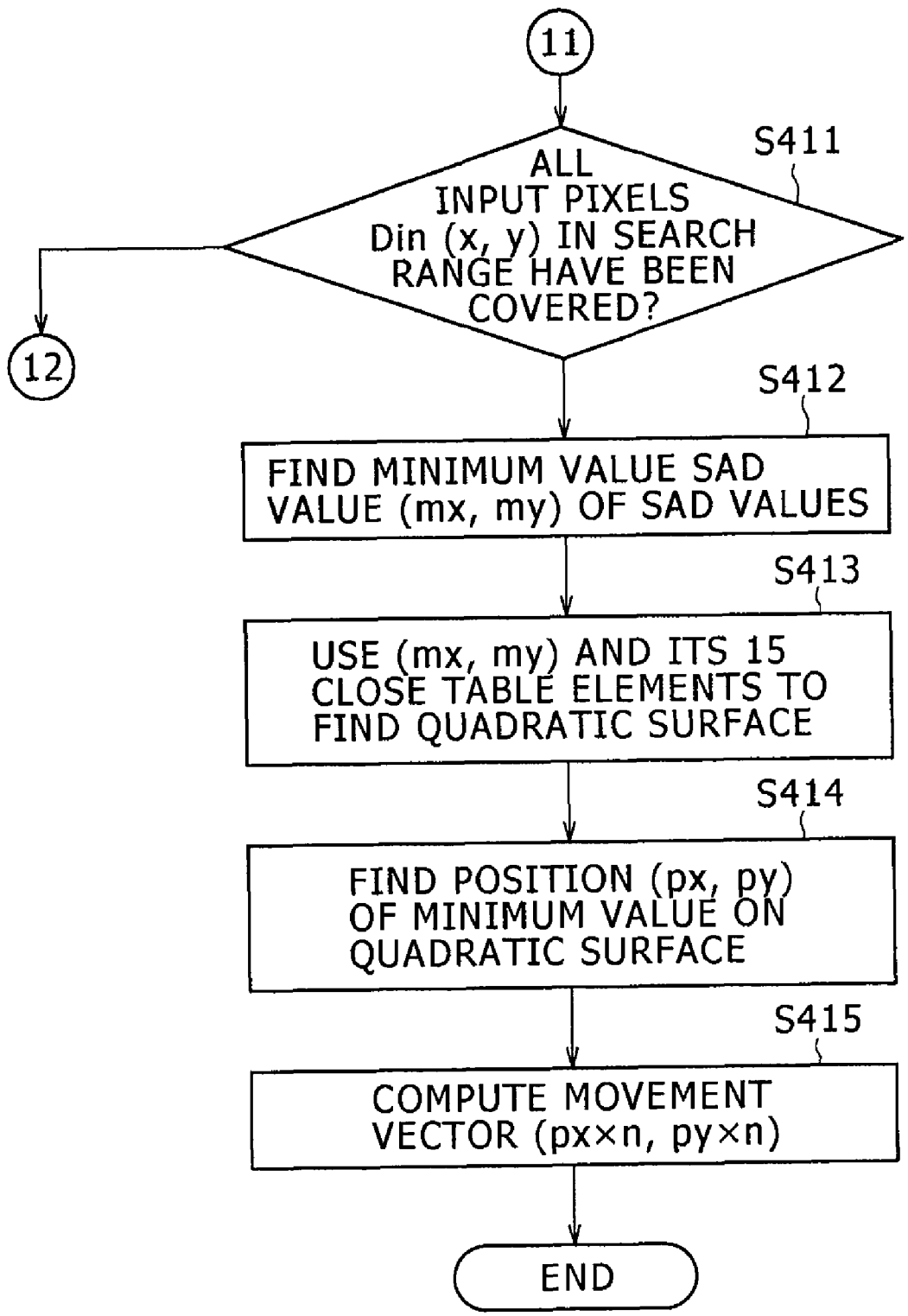
FIG. 57 shows the continuation of the flowchart representing the processing carried out to detect a movement vector in the image-taking apparatus according to the second embodiment.

FIGS. 56 and 57 show a flowchart representing processing carried out by the hand-movement displacement-vector detection unit 15 employed in the image-taking apparatus 10 according to the second embodiment to detect a movement vector.

The flowchart begins with a step S401 at which the hand-movement displacement-vector detection unit 15 receives pixel data Din (x, y) of a pixel at any point (x, y) on a frame included in an input image as a reference frame. Then, at the next step S402, a reference vector (vx, vy) pointing to one of a plurality of reference blocks Ii each including the input pixel Din (x, y) at the position (x, y) is specified.

Let us have notation Ii (x, y) denote the pixel value of the pixel at the point (x, y) on the reference block Ii pointed to by the reference vector (vx, vy) and notation Io (x−vx, y−vy) denotes the pixel value of a pixel at a point (x−vx, y−vy) on the target block Io. In the following description, the point (x−vx, y−vy) in the target block Io is said to be a point corresponding the point (x, y) in the reference block Ii. Then, at the next step S403, the absolute value α of the difference between the pixel value Io (x, y) and the pixel value Io (x−vx, y−vy) is computed in accordance with Eq. (3) as follows:

$$\alpha = |Io(x-vx, y-vy) - Ii(x, y)| \quad (3)$$

Then, at the next step S404, a contracted reference vector (vx/n, vy/n) is computed by contracting the reference vector (vx, vy) pointing to the reference block Ii at a contraction factor of 1/n.

Subsequently, at the next step S405, a plurality of neighborhood reference vectors located at in the neighborhood of the contracted reference vector (vx/n, vy/n) are identified. As described earlier, the neighborhood reference vectors are each a contracted reference vector having an integer vx/n value and an integer vy/n value. In this embodiment, the number of neighborhood reference vectors is set at four. Then, at the next step S406, the absolute value a found at the step S403 as the difference in pixel value is split into four component differences by adoption of the linear weighted distribution technique based on relations between positions pointed to by the neighborhood reference vectors and a position pointed to by the contracted reference vector (vx/n, vy/n) as described earlier. Subsequently, at the next step S407, the four component differences are distributed among four table elements included in the contracted correlation-value table as four table elements associated with the four neighborhood reference vectors respectively.

After the process of the step S407 is completed, the flow of the processing according to the second embodiment goes on to the next step S408 to produce a result of determination as to whether or not the processes of the steps S402 to S407 have been carried out for all reference vectors (vx, vy) each pointing to a reference block Ii including the input pixel Din (x, y). If the result of the determination indicates that the processes of the steps S402 to S407 have not been carried out yet for all reference vectors (vx, vy) each pointing to a reference block Ii including the input pixel Din (x, y), the flow of the processing goes back to the step S402 at which another reference vector (vx, vy) pointing to one of a plurality of reference blocks Ii each including the input pixel Din (x, y) is specified. Then, the processes of the steps S403 to S407 following the step S402 are repeated.

If the determination result produced at the step S408 indicates that the processes of the steps S402 to S407 have been carried out for all reference vectors (vx, vy) each pointing to a reference block Ii including the input pixel Din (x, y), on the other hand, the flow of the processing according to the second embodiment goes on to a step S411 of the flowchart shown in FIG. 57 to produce a result of determination as to whether or not the processes of the steps S402 to S408 have been carried out for all input pixels Din (x, y) in the search range 105. If the result of the determination indicates that the processes of the steps S402 to S408 have not been carried out yet for all input pixels Din (x, y) in the search range 105, the flow of the processing according to the second embodiment goes back to the step S401 at which pixel data Din (x, y) of another pixel at another point (x, y) on a frame is received. Then, the processes of the subsequent steps are carried out.

If the determination result produced at the step S411 indicates that the processes of the steps S402 to S408 have been carried out for all input pixels Din (x, y) in the search range 105, on the other hand, the flow of the processing according to the second embodiment goes on to a step S412 at which the smallest value among all the component final SAD values stored in all the elements of the contracted correlation-value table or the contracted SAD table is detected at a table-element address (mx, my).

Then, at the next step S413, a quadratic surface is created as a surface approximating the minimum correlation value detected at the table-element address (mx, my) and a plurality of correlation values stored in the shrunk correlation-value table as table elements in the neighborhood of the table-element address (mx, my). As described above, the correlation values are each a SAD value. In the case of this second embodiment, the number of correlation values stored in the shrunk correlation-value table as table elements in the neighborhood of the table-element address (mx, my) is set at 15. Then, at the next step S414, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S415, a movement vector (px×n, py×n) with the original magnitude and the original direction is computed by multiplying the minimum-value vector (px, py) by the reciprocal value n of the contraction factor as shown in FIG. 6.

It is to be noted that, also in the case of the second embodiment, in place of the quadratic-surface method described above, the cubic-curve method based on two cubic curves laid on planes oriented the vertical and horizontal directions respectively can also be adopted as a method to detect a movement vector (px, py) pointing to a position with the precision of the fraction level as is the case with the first to third typical implementations of the first embodiment described earlier.

In addition, it is needless to say that, also in the case of the second embodiment, the processing to detect a movement table by using a contracted SAD table can be carried out repeatedly at two or more stages while narrowing the search range and, if necessary, changing the contraction factor as is the case with the third typical implementation of the first embodiment described earlier.

The second embodiment offers merits that the size of the frame memory can be reduced by one frame in comparison with the first embodiment and, hence, the time it takes to store an input image in the frame memory can be shortened. It is needless to say that the effect of the memory-size reduction can be demonstrated. However, the short time it takes to store an input image in the frame memory is also regarded as an important feature in recent years. In a system for handling a moving picture, particularly, the short time it takes to store an input image in the frame memory by itself leads to reduction of the system delay. Thus, elimination of the sense of incompatibility caused by discrepancies between the actual object of photographing and its image appearing on a display panel has a big effect on efforts to solicit the user for its interest in the product.

Other Embodiment and Variant Example

In the case of the first and second embodiments described above, each of the picture divisions is divided in the horizontal direction into a plurality of portions and a target block is set in each of the portions. Then, an average value of movement vectors each detected for one of the target blocks set in portions of every picture division is found as a movement vector of the picture division. It is needless to say, however, that the embodiments can also each be changed to an embodiment with a configuration in which only one target block is set in every picture division and a reference vector is detected for every target block instead of finding an average of reference vectors detected for the target block.

In addition, in the case of the first and second embodiments described above, the horizontal compensation velocity component X_STB_* is used for finding the horizontal hand-movement compensation displacement quantity SX_ADD for the period of a horizontal line in a time-axis integration process, which is actually a simple cumulative addition process for a horizontal line associated with the horizontal compensation velocity component X_STB_*. That is to say, as shown in FIG. 2, the process of integration with respect to time is a process to find the horizontal hand-movement compensation displacement quantity SX_ADD as follows:

$$SX\_ADD = \text{Cumulative sum of } X\_STB\_*$$

By the same token, the vertical compensation velocity component Y_STB_* is used for finding the vertical hand-movement compensation quantity SY_ADD for the period of a horizontal line in a time-axis integration process, which is actually a simple cumulative addition process for a horizontal line associated with the vertical compensation velocity component Y_STB_*. That is to say, the process of integration with respect to time is a process to find the vertical hand-movement compensation quantity SY_ADD as follows:

$$SY\_ADD = \text{Cumulative sum of } Y\_STB\_*$$

Instead of carrying out the process of integration as described above, however, it is needless to say that the embodiments can also each be changed to an embodiment with a configuration in which the vertical hand-movement compensation quantity is found by multiplying the hand-movement compensation quantity SY_ADD by the period of 1 horizontal line as follows:

$$SX\_ADD = X\_STB\_* \times \text{Period of a line}$$

$$SY\_ADD = Y\_STB\_* \times \text{Period of a line}$$

On top of that, in the case of the first and second embodiments described above, the image-taking apparatus compensates an image for distortions caused by a movement made by a hand of the user operating the apparatus. It is needless to say, however, that the embodiments can also be changed to an embodiment with a configuration in which the image-taking apparatus compensates an image for distortions caused by a bias force of vibration resulting in a positional displacement relative to the image pickup device in the horizontal and/or vertical directions of the imager-created image.

Furthermore, in the case of the first and second embodiments described above, a CMOS imager is employed as an X-Y address solid-state image pickup device. It is needless to say, however, that the image pickup device is by no means limited to the CMOS imager.

Moreover, the present application can be applied to not only a camera but also another image-taking apparatus such as a hand phone and a portable information terminal, which are each provided with an image pickup device. In addition, the present application can be applied to not only an apparatus operated by a hand of the user as an apparatus for taking a picture of a photographing object, but also an apparatus installed at a fixed location possibly affected by an external force such as vibration or the like and an apparatus installed in a vehicle or the like as an apparatus for taking a picture of a photographing object by making use of an image pickup device. Examples of the apparatus installed at a fixed location are a personal computer and a TV phone.

By the way, it should be understood by those skilled in the art that a variety of modifications, combinations, sub-combinations and alterations may occur in dependence on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of compensating a signal of an image of one screen for distortions in the horizontal and/or vertical directions of a screen of said image, said method comprising the steps of:
dividing one screen area of said image into a plurality of picture divisions;
detecting a movement vector of said image for each particular one of said picture divisions from information on a difference in image between said particular picture division on one of two screens and said particular picture division on the other of said two screens;
finding a difference in said detected movement vector between any specific picture division and a picture division adjacent to said specific picture division in order to detect a velocity of a change in image distortion for said specific picture division; and
compensating said image for a distortion for each of said picture divisions on the basis of a velocity detected for each of said picture divisions as said velocity of a change in image distortion;
wherein said step of detecting a movement vector of said image for each particular one of said picture divisions comprises the sub-steps of:
making use of images, which are an observed screen serving as a reference screen and an original screen leading ahead of said reference screen for detecting said movement vector;
setting at least one target block having a predetermined size equal to the size of a plurality of pixels at predetermined locations in each of said picture divisions on said original screen;
setting a plurality of reference blocks each having a size equal to said target block in a search range set in said reference screen for each of said target blocks;
detecting a reference block having the strongest correlation with said specific target block from said plurality of reference blocks;
detecting said movement vector representing the magnitude and direction of a shift over said reference screen from a position corresponding to said specific target block to the position of said detected reference block;
wherein said movement vector of said image is detected for each of said picture divisions by carrying out:
a difference absolute value sum computation process for each specific one of said reference blocks as a process of finding a sum of the absolute values of differences in pixel value between all pixels in said specific reference block and all pixels at corresponding positions on said specific target block;
a contracted reference-vector setting process of setting reference vectors each representing the magnitude and direction of a shift over said reference screen from a position corresponding to said specific target block to the position of one of said reference blocks and contracting said reference vectors at a predetermined contraction factor to result in contracted reference vectors;
a sum-of-absolute-difference table creation process of creating a shrunk sum-of-absolute-difference table including table elements, the number of which is determined on the basis of the number of said contracted reference vectors and said contraction factor, and allocating each of said table elements as a location to be used for storing a value computed from sums each found for one of said reference blocks as said sum of the absolute values of said differences in pixel values; and
a movement-vector computation process of computing said movement vector for each of said picture divisions as a movement vector between said reference screen and said original screen by making use of at least a contracted reference vector corresponding to the smallest one among values each stored in said shrunk sum-of-absolute-difference table as said sum of the absolute values of said differences in pixel values, and
said sum-of-absolute-difference table creation process is carried out by execution of
a neighborhood reference vector detection sub-process of determining a plurality of neighborhood reference vectors each having a vector quantity close to the vector quantity of a corresponding one of said contracted reference vectors obtained in said contracted reference-vector setting process,
a sum-component computation sub-process of computing a plurality of sum components each associated with one of neighborhood reference vectors determined in said neighborhood reference vector detection sub-process as said neighborhood reference vectors corresponding to a specific one of said contracted reference vectors from a sum computed in said difference absolute value sum computation process for a reference block, from which said specific contracted reference vector is contracted, as said sum of the absolute values of said differences in pixel values, and
a component-total computation sub-process of computing a total of sum components, which have been computed in said sum-component computation sub-process as said sum components each associated with a specific one of said neighborhood reference vectors, by cumulatively adding each of said sum components to a cumulative total obtained so far for said specific neighborhood reference vector.

2. The method of compensating the signal of the image in accordance with claim 1 wherein a time integration value of a velocity detected for each specific one of said picture divisions of said image as said velocity of a change in image distortion is taken as a distortion displacement quantity of said specific picture division to be compensated and said specific picture division of said image is compensated for a distortion by using said time integration value.

3. The method of compensating the signal of the image in accordance with claim 1 wherein said distortion of said image is a distortion of an image created in an image pickup device due to a positional change made by said image pickup device at a photographing time in a horizontal and/or vertical directions of a photographing object.

4. The method of compensating the signal of the image in accordance with claim 3 wherein:
said image pickup device allows data of said image to be read out in pixel units; and
in each particular one of said picture divisions, said velocity of a change in image distortion is integrated with respect to time by making use of a read delay time relative to the head member of said particular picture division as a read delay time of a member to be compensated for a distortion to give a displacement quantity, which is used as a displacement quantity for said member to be compensated in order to compensate said image created in said image pickup device for a distortion.

5. The method of compensating the signal of the image in accordance with claim 3 wherein:
each of said picture divisions includes a plurality of lines;
data of said image is read out from said image pickup device in line units; and
in each particular one of said picture divisions, a velocity detected for said particular picture division as said velocity of a change in image distortion is integrated with respect to time up to any specific one of said line units to give a displacement quantity, which is used as a displacement quantity at the position of said specific line unit in order to compensate said image for a distortion.

6. The method of compensating the signal of the image in accordance with claim 3 wherein:
said velocity of a change in image distortion is split into a horizontal-direction velocity component and a vertical-direction velocity component;
said image is compensated for a horizontal-direction distortion by making use of said horizontal-direction velocity component; and
said image is compensated for a vertical-direction distortion by making use of said vertical-direction velocity component.

7. A method of compensating a signal of an image in accordance with claim 5 wherein:
said velocity of a change in image distortion is split into a horizontal-direction velocity component and a vertical-direction velocity component;
in each particular one of said picture divisions, said horizontal-direction velocity component for said particular picture division is integrated with respect to time up to any specific one of said line units to give a horizontal-direction displacement quantity, which is used as a horizontal-direction displacement quantity at the position of said specific line unit in order to compensate said image for a horizontal-direction distortion; and
in each particular one of said picture divisions, said vertical-direction velocity component for said particular picture division is integrated with respect to time up to any specific one of said line units to give a vertical-direction displacement quantity, which is used as a vertical-direction displacement quantity at the position of said specific line unit in order to compensate said image for a vertical-direction distortion.

8. The method of compensating the signal of the image in accordance with claim 7 wherein:

a process to compensate said image for a horizontal-direction distortion and a process to compensate said image for a vertical-direction distortion are carried out concurrently with each other; and
said vertical-direction velocity component is integrated with respect to time while always checking the degree of progress in said process to compensate said image created in said image pickup device for a horizontal-direction distortion.

9. The method of compensating the signal of the image in accordance with claim 1 wherein:
each of said picture divisions is further divided into a plurality of picture sub-divisions;
said target block is set in each of said picture sub-divisions;
said movement vector is detected for each of said target block; and
a movement vector for any specific one of said picture divisions is detected from a plurality of said movement vectors each detected for one of said target blocks set in said specific picture division.

10. The method of compensating the signal of the image in accordance with claim 9 wherein an average vector of a plurality of said movement vectors each detected for one of said target blocks set in any specific one of said picture divisions is taken as a movement vector for said specific picture division.

11. The method of compensating the signal of the image in accordance with claim 10 wherein, in a process to compute an average vector of a plurality of said movement vectors each detected for one of said target blocks, said movement vectors are examined to produce a result of determination as to whether or not said movement vectors include an exceptional one and, if said result of said determination indicates that said movement vectors include an exceptional one, said exceptional one is excluded from said process to compute an average vector of said movement vectors.

12. A method of compensating a signal of an image of one screen for distortions in the horizontal and/or vertical directions of a reference screen, said method comprising the steps of:
dividing one screen area of said image into a plurality of picture divisions;
detecting a movement vector of said image for each particular one of said picture divisions from information on a difference in image between said particular picture division on an observed screen serving as said reference screen and said particular picture division on an original screen leading ahead of said reference screen; and
compensating said image for a distortion for each of said picture divisions on the basis of said movement vector detected for each of said picture divisions,
wherein said step of detecting a movement vector of said image for each particular one of said picture divisions includes the sub-steps of
setting at least one target block having a predetermined size equal to the size of a plurality of pixels at predetermined locations in each of said picture divisions on said original screen,
setting a plurality of reference blocks each having a size equal to said predetermined size of said target block in a search range set in said reference screen for each of said target blocks,
detecting a reference block having the strongest correlation with said specific target block from said plurality of reference blocks, and
detecting said movement vector representing the magnitude and direction of a shift over said reference screen from a position corresponding to said specific target block to the position of said detected reference block by carrying out a difference absolute value sum computation process for each specific one of said reference blocks as a process of finding a sum of the absolute values of differences in pixel value between all pixels in said specific reference block and all pixels at corresponding positions on said specific target block, a contracted reference-vector setting process of setting reference vectors each representing the magnitude and direction of a shift over said reference screen from a position corresponding to said specific target block to the position of one of said reference blocks and contracting said reference vectors at a predetermined contraction factor to result in contracted reference vectors, a sum-of-absolute-difference table creation process of creating a shrunk sum-of-absolute-difference table including table elements, the number of which is determined on the basis of the number of said contracted reference vectors and said contraction factor, and allocating each of said table elements as a location to be used for storing a value computed from sums each found for one of said reference blocks as said sum of the absolute values of said differences in pixel values, and a movement-vector computation process of computing said movement vector for each of said picture divisions as a movement vector between said reference screen and said original screen by making use of at least a contracted reference vector corresponding to the smallest one among values each stored in said shrunk sum-of-absolute-difference table as said sum of the absolute values of said differences in pixel values, whereby said sum-of-absolute-difference table creation process is carried out by execution of a neighborhood reference vector detection sub-process of determining a plurality of neighborhood reference vectors each having a vector quantity close to the vector quantity of a corresponding one of said contracted reference vectors obtained in said contracted reference-vector setting process, a sum-component computation sub-process of computing a plurality of sum components each associated with one of neighborhood reference vectors determined in said neighborhood reference vector detection sub-process as said neighborhood reference vectors corresponding to a specific one of said contracted reference vectors from a sum computed in said difference absolute value sum computation process for a reference block, from which said specific contracted reference vector is contracted, as said sum of the absolute values of said differences in pixel values, and a component-total computation sub-process of computing a total of sum components, which have been computed in said sum-component computation sub-process as said sum components each associated with a specific one of said neighborhood reference vectors, by cumulatively adding each of said sum components to a cumulative total obtained so far for said specific neighborhood reference vector.

13. An image taking method for compensating an imager-created image for a distortion generated by a positional change caused by a hand movement as a positional change of an image pickup device and for recording information of said compensated image onto a recording medium, said image taking method comprising the steps of:

dividing one screen area of said image into a plurality of picture divisions;

detecting a movement vector of an image for each particular one of said picture divisions from information on a difference in image between said particular picture division on one of two screens and said particular picture division on the other of said two screens;

detecting a movement vector of said imager-created image for each particular one of said picture divisions from information on a difference in image between said particular picture division on an observed screen and said particular picture division on an original screen leading ahead of said reference screen;

finding a difference in said detected movement vector between any specific picture division and a picture division adjacent to said specific picture division in order to detect a velocity of said positional change for said specific picture division;

compensating said imager-created image for a distortion for each of said picture divisions on the basis of a velocity detected for each of said picture divisions as said velocity of said positional change; and recording image information of said compensated imager-created image onto a recording medium;

wherein said step of detecting a movement vector of said image for each particular one of said picture divisions comprises the sub-steps of:

making use of images, which are an observed screen serving as a reference screen and an original screen leading ahead of said reference screen for detecting said movement vector;

setting at least one target block having a predetermined size equal to the size of a plurality of pixels at predetermined locations in each of said picture divisions on said original screen;

setting a plurality of reference blocks each having a size equal to said target block in a search range set in said reference screen for each of said target blocks;

detecting a reference block having the strongest correlation with said specific target block from said plurality of reference blocks;

detecting said movement vector representing the magnitude and direction of a shift over said reference screen from a position corresponding to said specific target block to the position of said detected reference block;

wherein said movement vector of said image is detected for each of said picture divisions by carrying out:

a difference absolute value sum computation process for each specific one of said reference blocks as a process of finding a sum of the absolute values of differences in pixel value between all pixels in said specific reference block and all pixels at corresponding positions on said specific target block;

a contracted reference-vector setting process of setting reference vectors each representing the magnitude and direction of a shift over said reference screen from a position corresponding to said specific target block to the position of one of said reference blocks and contracting said reference vectors at a predetermined contraction factor to result in contracted reference vectors;

a sum-of-absolute-difference table creation process of creating a shrunk sum-of-absolute-difference table including table elements, the number of which is determined on the basis of the number of said contracted reference vectors and said contraction factor, and allocating each of said table elements as a location to be used for storing a value computed from sums each found for one of said reference blocks as said sum of the absolute values of said differences in pixel values; and a movement-vector computation process of computing said movement vector for each of said picture divisions as a movement vector between said reference screen and said original screen by making use of at least a contracted reference vector corresponding to the smallest one among values each stored in said shrunk sum-of-absolute-difference table as said sum of the absolute values of said differences in pixel values, and said sum-of-absolute-difference table creation process is carried out by execution of a neighborhood reference vector detection sub-process of determining a plurality of neighborhood reference vectors each having a vector quantity close to the vector quantity of a corresponding one of said contracted reference vectors obtained in said contracted reference-vector setting process, a sum-component computation sub-process of computing a plurality of sum components each associated with one of neighborhood reference vectors determined in said neighborhood reference vector detection sub-process as said neighborhood reference vectors corresponding to a specific one of said contracted reference vectors from a sum computed in said difference absolute value sum computation process for a reference block, from which said specific contracted reference vector is contracted, as said sum of the absolute values of said differences in pixel values, and a component-total computation sub-process of computing a total of sum components, which have been computed in said sum-component computation sub-process as said sum components each associated with a specific one of said neighborhood reference vectors, by cumulatively adding each of said sum components to a cumulative total obtained so far for said specific neighborhood reference vector.

14. An apparatus for compensating a signal of an image of one screen for distortions in the horizontal and/or vertical directions of said image, comprising:

a movement-vector detection unit configured to detect a movement vector of said image for each particular one of picture divisions obtained as a result of dividing one screen area of an image of a screen from information on a difference in image between said particular picture division on an observed screen serving as a reference screen and said particular picture division on an original screen leading ahead of said reference screen;

a velocity detection unit configured to detect the velocity of a change in image distortion for each specific one of said picture divisions by finding a difference between said movement vector detected by said movement-vector detection unit for said specific picture division and said movement vector detected by said movement-vector detection unit for a picture division adjacent to said specific picture division; and a distortion compensation unit configured to compensate said image for a distortion for each specific one of said picture divisions on the basis of a velocity detected by said velocity detection unit as said velocity of a change in image distortion for said specific picture division;

wherein said distortion of said image is a distortion of an image created in an image pickup device due to a positional change made by said image pickup device at a photographing time in a horizontal and/or vertical directions of a photographing object;

wherein each of said picture divisions includes a plurality of lines, data of said image is read out from said image pickup device in line units each corresponding to any one of said lines, and said distortion compensation unit further comprises:

a displacement quantity integration unit configured to carry out an integration process with respect to time in each particular one of said picture divisions on a velocity detected for said particular picture division as said velocity of a change in image distortion to time up to any specific one of said line units to give a displacement quantity; and an image compensation unit configured to compensate said image for a distortion by making use of said displacement quantity found by said displacement quantity integration unit as a displacement quantity at the position of said specific line unit;

wherein said displacement quantity integration unit employed in said distortion compensation unit further comprises:

a velocity splitting unit configured to split said velocity of a change in image distortion into a horizontal-direction velocity component and a vertical-direction velocity component;

a horizontal-direction displacement computation unit configured to integrate said horizontal-direction velocity component obtained for any particular one of said picture divisions with respect to time up to any specific one of said line units in each particular one of said picture divisions to give a horizontal-direction displacement quantity to be used as a horizontal-direction displacement quantity at the position of said specific line unit; and a vertical-direction displacement computation unit configured to integrate said vertical-direction velocity component obtained for any particular one of said picture divisions with respect to time up to any specific one of said line units in each particular one of said picture divisions to give a vertical-direction displacement quantity to be used as a vertical-direction displacement quantity at the position of said specific line unit; and said image compensation unit employed in said distortion compensation unit further comprises:

a horizontal-direction compensation unit configured to compensate said image for a horizontal-direction distortion by making use of a horizontal-direction displacement quantity found by said horizontal-direction displacement computation unit as said horizontal-direction displacement quantity at the position of each of said line units in each of said picture divisions; and a vertical-direction compensation unit configured to compensate said image for a vertical-direction distortion by making use of a vertical-direction displacement quantity found by said vertical-direction displacement computation unit as said vertical-direction displacement quantity at the position of each of said line units in each of said picture divisions.

15. The apparatus for compensating the signal of the image in accordance with claim 14 wherein said distortion compensation unit further comprises:

a displacement quantity integration unit configured to compute a time integration value of a velocity detected for each specific one of said picture divisions of said image as said velocity of a change in image distortion and take said time integration value as a distortion displacement quantity of said specific picture division to be compensated; and an image compensation unit configured to compensate said image for a distortion by making use of said time integration value computed by said displacement quantity integration unit.

16. The apparatus for compensating the signal of the image in accordance with claim 14 wherein said image pickup device allows data of said image created by said image pickup device to be read out from said image pickup device in pixel units and said distortion compensation unit further comprises:

a displacement quantity integration unit configured to carry out an integration process with respect to time on said velocity of a change in image distortion in each particular one of said picture divisions by making use of a read delay time relative to the head member of said particular picture division as a read delay time of a member to be compensated for a distortion to give a displacement quantity; and an image compensation unit configured to compensate said image for a distortion by making use of said displacement quantity found by said displacement quantity integration unit.

17. The apparatus for compensating the signal of the image in accordance with claim 14 wherein said distortion compensation unit further comprises:

a velocity splitting unit configured to split said velocity of a change in image distortion into a horizontal-direction velocity component and a vertical-direction velocity component;

a horizontal compensation processing unit configured to compensate said image for a horizontal-direction distortion by making use of said horizontal-direction velocity component output by said velocity splitting unit; and a vertical compensation processing unit configured to compensate said image for a vertical-direction distortion by making use of said vertical-direction velocity component output by said velocity splitting unit.

18. The apparatus for compensating the signal of the image in accordance with claim 14 wherein:

said movement-vector detection unit is a unit for finding a movement vector between an observed screen serving as a reference screen and an original screen leading ahead of said reference screen for each of said picture divisions;

at least one target block having a predetermined size equal to the size of a plurality of pixels are set at predetermined locations in each of said picture divisions on said original screen;

a plurality of reference blocks each having a size equal to said predetermined size of said target block are set in a search range set in said reference screen for each of said target blocks;

said search range set for each specific one of said target blocks is searched for a reference block having the strongest correlation with said specific target block; and said movement vector representing the magnitude and direction of a shift over said reference screen from a position corresponding to said specific target block to the position of said detected reference block is detected.

19. An apparatus for compensating a signal of an image of one screen for distortions in the horizontal and/or vertical directions of said image, comprising:

a movement-vector detection unit configured to detect a movement vector of said image for each particular one of picture divisions obtained as a result of dividing one screen area of an image of a screen from information on a difference in image between said particular picture division on an observed screen serving as a reference screen and said particular picture division on an original screen leading ahead of said reference screen;

a velocity detection unit configured to detect the velocity of a change in image distortion for each specific one of said picture divisions by finding a difference between said movement vector detected by said movement-vector detection unit for said specific picture division and said movement vector detected by said movement-vector detection unit for a picture division adjacent to said specific picture division; and a distortion compensation unit configured to compensate said image for a distortion for each specific one of said picture divisions on the basis of a velocity detected by said velocity detection unit as said velocity of a change in image distortion for said specific picture division;

wherein said movement-vector detection unit is a unit for finding a movement vector between an observed screen serving as a reference screen and an original screen leading ahead of said reference screen for each of said picture divisions;

at least one target block having a predetermined size equal to the size of a plurality of pixels are set at predetermined locations in each of said picture divisions on said original screen;

a plurality of reference blocks each having a size equal to said predetermined size of said target block are set in a search range set in said reference screen for each of said target blocks;

said search range set for each specific one of said target blocks is searched for a reference block having the strongest correlation with said specific target block; and said movement vector representing the magnitude and direction of a shift over said reference screen from a position corresponding to said specific target block to the position of said detected reference block is detected;

wherein said movement-vector detection unit comprises:

a difference absolute value sum computation unit configured to find a sum for each specific one of said reference blocks as a sum of the absolute values of differences in pixel value between all pixels in said specific reference block and all pixels at corresponding positions on said specific target block;

a contracted reference-vector setting unit configured to set reference vectors each representing the magnitude and direction of a shift over said reference screen from a position corresponding to said specific target block to the position of one of said reference blocks and contract said reference vectors at a predetermined contraction factor to result in contracted reference vectors;

a sum-of-absolute-difference table creation unit configured to create a shrunk sum-of-absolute-difference table including table elements, the number of which is determined on the basis of the number of said contracted reference vectors and said contraction factor, and allocate each of said table elements as a location to be used for storing a value computed from sums each found for one of said reference blocks as said sum of the absolute values of said differences in pixel values; and a movement-vector computation unit configured to compute said movement vector for each of said picture divisions as a movement vector between said reference screen and said original screen by making use of at least a contracted reference vector corresponding to the smallest one among values each stored in said shrunk sum-of-absolute-difference table as said sum of the absolute values of said differences in pixel values; and said sum-of-absolute-difference table creation unit includes, a neighborhood reference vector detection unit configured to determine a plurality of neighborhood reference vectors each having a vector quantity close to the vector quantity of a corresponding one of said contracted reference vectors obtained by said contracted reference-vector setting unit, a sum-component computation unit configured to compute a plurality of sum components each associated with one of neighborhood reference vectors determined by said neighborhood reference vector detection unit as said neighborhood reference vectors corresponding to a specific one of said contracted reference vectors from a sum computed by said difference absolute value sum computation unit for a reference block pointed to by a reference vector, from which said specific contracted reference vector is contracted, as said sum of the absolute values of said differences in pixel values, and a component-total computation unit configured to compute a total of sum components, which have been computed by said sum-component computation unit as said sum components each associated with a specific one of said neighborhood reference vectors, by cumulatively adding each of said sum components to a cumulative total obtained so far for said specific neighborhood reference vector.

20. An apparatus for compensating a signal of an image of one screen for distortions in the horizontal and/or vertical directions of said image, comprising:

a movement-vector detection unit configured to detect a movement vector of said image for each particular one of picture divisions obtained as a result of dividing one screen area of an image of a screen from information on a difference in image between said particular picture division on an observed screen serving as a reference screen and said particular picture division on an original screen leading ahead of said reference screen;

a velocity detection unit configured to detect the velocity of a change in image distortion for each specific one of said picture divisions by finding a difference between said movement vector detected by said movement-vector detection unit for said specific picture division and said movement vector detected by said movement-vector detection unit for a picture division adjacent to said specific picture division; and a distortion compensation unit configured to compensate said image for a distortion for each specific one of said picture divisions on the basis of a velocity detected by said velocity detection unit as said velocity of a change in image distortion for said specific picture division;

wherein said distortion of said image is a distortion of an image created in an image pickup device due to a positional change made by said image pickup device at a photographing time in a horizontal and/or vertical directions of a photographing object;

wherein each of said picture divisions includes a plurality of lines, data of said image is read out from said image pickup device in line units each corresponding to any one of said lines, and said distortion compensation unit further comprises:

a displacement quantity integration unit configured to carry out an integration process with respect to time in each particular one of said picture divisions on a velocity detected for said particular picture division as said velocity of a change in image distortion to time up to any specific one of said line units to give a displacement quantity; and an image compensation unit configured to compensate said image for a distortion by making use of said displacement quantity found by said displacement quantity integration unit as a displacement quantity at the position of said specific line unit;

wherein said displacement quantity integration unit employed in said distortion compensation unit further comprises:

a velocity splitting unit configured to split said velocity of a change in image distortion into a horizontal-direction velocity component and a vertical-direction velocity component;

a horizontal-direction displacement computation unit configured to integrate said horizontal-direction velocity component obtained for any particular one of said picture divisions with respect to time up to any specific one of said line units in each particular one of said picture divisions to give a horizontal-direction displacement quantity to be used as a horizontal-direction displacement quantity at the position of said specific line unit; and a vertical-direction displacement computation unit configured to integrate said vertical-direction velocity component obtained for any particular one of said picture divisions with respect to time up to any specific one of said line units in each particular one of said picture divisions to give a vertical-direction displacement quantity to be used as a vertical-direction displacement quantity at the position of said specific line unit; and said image compensation unit employed in said distortion compensation unit further comprises:

a horizontal-direction compensation unit configured to compensate said image for a horizontal-direction distortion by making use of a horizontal-direction displacement quantity found by said horizontal-direction displacement computation unit as said horizontal-direction displacement quantity at the position of each of said line units in each of said picture divisions; and a vertical-direction compensation unit configured to compensate said image for a vertical-direction distortion by making use of a vertical-direction displacement quantity found by said vertical-direction displacement computation unit as said vertical-direction displacement quantity at the position of each of said line units in each of said picture divisions;

wherein said movement-vector detection unit:

further divides each of said picture divisions into a plurality of picture sub-divisions;

sets said target block in each of said picture sub-divisions;

detects said movement vector for each of said target block; and detects a movement vector for any specific one of said picture divisions from a plurality of said movement vectors each detected for one of said target blocks set in said specific picture division.

21. The apparatus for compensating the signal of the image in accordance with claim 20 wherein said movement-vector detection unit takes an average vector of a plurality of said movement vectors each detected for one of said target blocks set in any specific one of said picture divisions as a movement vector for said specific picture division.

22. The apparatus for compensating the signal of the image in accordance with claim 21 wherein said movement-vector detection unit examines a plurality of said movement vectors each detected for one of said target blocks in a process to compute an average vector of said movement vectors in order to produce a result of determination as to whether or not said movement vectors include an exceptional one and, if said result of said determination indicates that said movement vectors include an exceptional one, said movement-vector detection unit excludes said exceptional one from said process to compute an average vector of said movement vectors.

23. An apparatus for compensating an image, said apparatus comprising:
- a movement-vector detection unit configured to detect a movement vector of said image for each particular one of picture divisions obtained as a result of dividing one screen area of an image of a screen from information on a difference in image between said particular picture division on an observed screen serving as a reference screen and said particular picture division on an original screen leading ahead of said reference screen; and
- an image-distortion compensation unit configured to compensate said image for distortions in the horizontal and/or vertical directions of said observed screen for each of said picture divisions on the basis of said movement vector detected for each of said picture divisions, wherein, said movement-vector detection unit has
- a target-block setting unit configured to set at least one target block having a predetermined size including a plurality of pixels at predetermined locations in each of said picture divisions on said original screen,
- a reference-block setting unit configured to set a plurality of reference blocks each having a size equal to said predetermined size of said target block in a search range set in said reference screen for each of said target blocks,
- a reference-block detecting unit configured to detect a reference block having the strongest correlation with said specific target block from said plurality of reference blocks, and
- a movement-vector detection unit configured to detect said movement vector representing the magnitude and direction of a shift over said reference screen from a position corresponding to said specific target block to the position of said detected reference block, said movement-vector detection unit includes
- a difference absolute value sum computation section configured to find a sum of the absolute values of differences in pixel value between all pixels in each of said reference blocks and all pixels at corresponding positions on said specific target block for each of said reference blocks,
- a contracted reference-vector setting section configured to set reference vectors each representing the magnitude and direction of a shift over said reference screen from a position corresponding to said specific target block to the position of one of said reference blocks and contract each of said reference vectors at a predetermined contraction factor to result in contracted reference vectors,
- a sum-of-absolute-difference table creation section configured to create a shrunk sum-of-absolute-difference table including table elements, the number of which is determined on the basis of the number of said contracted reference vectors and said contraction factor, and allocate each of said table elements as a location to be used for storing a value computed from sums each found for one of said reference blocks as said sum of the absolute values of said differences in pixel values, and
- a movement-vector computation section configured to compute said movement vector for each of said picture divisions as a movement vector between said reference screen and said original screen by making use of at least a contracted reference vector corresponding to the smallest one among values each stored in said shrunk sum-of-absolute-difference table as said sum of the absolute values of said differences in pixel values, and said sum-of-absolute-difference table creation section includes
- a neighborhood reference vector detection sub-section configured to determine a plurality of neighborhood reference vectors each having a vector quantity close to the vector quantity of a corresponding one of said contracted reference vectors obtained by said contracted reference-vector setting section,
- a sum-component computation sub-section configured to compute a plurality of sum components each associated with one of neighborhood reference vectors determined by said neighborhood reference vector detection sub-section as said neighborhood reference vectors corresponding to a specific one of said contracted reference vectors from a sum computed by said difference absolute value sum computation section for a reference block pointed to by a reference vector, from which said specific contracted reference vector is contracted, as said sum of the absolute values of said differences in pixel values, and
- a component-total computation sub-section configured to compute a total of sum components, which have been computed by said sum-component computation sub-section as said sum components each associated with a specific one of said neighborhood reference vectors, by cumulatively adding each of said sum components to a cumulative total obtained so far for said specific neighborhood reference vector.

* * * * *